(12) United States Patent
McDonnell

(10) Patent No.: US 12,397,329 B2
(45) Date of Patent: Aug. 26, 2025

(54) DRAIN CLEANER APPARATUS

(71) Applicant: IFLO LLC, Miramar, FL (US)

(72) Inventor: Joseph McDonnell, Miramar, FL (US)

(73) Assignee: IFLO LLC, Miramar, FL (US)

( * ) Notice: Subject to any disclaimer, the term of this patent is extended or adjusted under 35 U.S.C. 154(b) by 0 days.

(21) Appl. No.: 18/739,822

(22) Filed: Jun. 11, 2024

(65) Prior Publication Data

US 2024/0335866 A1   Oct. 10, 2024

Related U.S. Application Data

(63) Continuation of application No. 18/510,138, filed on Nov. 15, 2023, now Pat. No. 12,030,097, which is a
(Continued)

(51) Int. Cl.
*B08B 9/032* (2006.01)
*F24F 13/22* (2006.01)
(Continued)

(52) U.S. Cl.
CPC .......... *B08B 9/0325* (2013.01); *F24F 13/222* (2013.01); *B08B 9/027* (2013.01);
(Continued)

(58) Field of Classification Search
CPC ............. B08B 9/0325; B08B 2209/032; F24F 13/222; F24F 2013/227; F24F 2013/228;
(Continued)

(56) References Cited

U.S. PATENT DOCUMENTS

| 3,525,426 A | 8/1970 | Miller |
| 3,823,427 A | 7/1974 | Pittet |

(Continued)

FOREIGN PATENT DOCUMENTS

| BR | 202019010560 U2 | 12/2020 |
| CA | 2675090 A1 | 2/2011 |

(Continued)

OTHER PUBLICATIONS

Office Action dated Oct. 11, 2022 issued in corresponding U.S. Appl. No. 17/723,795.
(Continued)

*Primary Examiner* — Minh Q Le
(74) *Attorney, Agent, or Firm* — Harness, Dickey & Pierce, P.L.C.

(57) ABSTRACT

An apparatus configured to dispense a cleaner composition includes an apparatus outlet in fluid communication with an exterior of the apparatus, a dispenser device configured to be operated to selectively dispense an amount of the cleaning composition through the apparatus outlet, and a controller configured to operate the dispenser device to cause the amount of the cleaning composition to be dispensed through the apparatus outlet without manual intervention. The apparatus is configured to be electrically connected with a float switch concurrently with dispensing the cleaning composition, and the apparatus is configured to cause at least a portion of an air conditioning system to shut down in response to receiving a signal generated by the float switch.

14 Claims, 66 Drawing Sheets

Related U.S. Application Data continuation of application No. 17/944,662, filed on Sep. 14, 2022, now Pat. No. 11,826,799, which is a continuation-in-part of application No. 17/723,795, filed on Apr. 19, 2022, now Pat. No. 11,719,464.

(60) Provisional application No. 63/277,323, filed on Nov. 9, 2021.

(51) Int. Cl.

| | |
|---|---|
| *B08B 9/027* | (2006.01) |
| *C02F 1/00* | (2023.01) |
| *C02F 1/68* | (2023.01) |
| *C02F 103/02* | (2006.01) |
| *F24F 11/58* | (2018.01) |
| *F24F 11/89* | (2018.01) |
| *H01H 35/18* | (2006.01) |

(52) U.S. Cl.
CPC ......... *B08B 9/032* (2013.01); *B08B 2209/032* (2013.01); *C02F 1/008* (2013.01); *C02F 1/686* (2013.01); *C02F 2103/023* (2013.01); *C02F 2201/006* (2013.01); *C02F 2209/008* (2013.01); *C02F 2303/20* (2013.01); *F24F 11/58* (2018.01); *F24F 11/89* (2018.01); *F24F 2013/227* (2013.01); *F24F 2013/228* (2013.01); *F24F 2221/225* (2013.01); *H01H 35/18* (2013.01)

(58) Field of Classification Search
CPC ..... F24F 2221/225; C02F 1/008; C02F 1/686; C02F 2103/023; C02F 2201/006; C02F 2209/008; H01H 35/18
USPC .............. 134/57 R; 137/238, 487.5; 222/325
See application file for complete search history.

(56) References Cited

U.S. PATENT DOCUMENTS

| | | |
|---|---|---|
| 4,053,955 A | 10/1977 | Canham |
| 4,059,858 A | 11/1977 | Lambel et al. |
| 4,376,321 A | 3/1983 | Dudley |
| 4,426,003 A | 1/1984 | Zarov |
| 4,573,029 A | 2/1986 | Naimer et al. |
| 4,626,951 A | 12/1986 | Nagao |
| 4,962,778 A | 10/1990 | Driskill |
| 5,402,813 A | 4/1995 | Keen |
| 5,514,344 A | 5/1996 | D'Agaro |
| 5,947,432 A | 9/1999 | Reddin et al. |
| 5,996,597 A | 12/1999 | Gallo |
| 6,041,611 A | 3/2000 | Palmer |
| 6,105,638 A | 8/2000 | Edwards et al. |
| 6,487,867 B1 | 12/2002 | Herren |
| 6,526,601 B1 | 3/2003 | Kou Hsiao |
| 6,892,907 B2 | 5/2005 | Varney |
| 7,392,658 B1 | 7/2008 | Hardy, III |
| 7,686,034 B1 | 3/2010 | Coogle |
| 8,277,745 B2 | 10/2012 | Mehus et al. |
| 8,840,729 B1 | 9/2014 | Herren et al. |
| 9,289,803 B1 | 3/2016 | Parks |
| 9,943,778 B1 | 4/2018 | Gutierrez et al. |
| 9,975,152 B1 | 5/2018 | McClarren |
| 10,006,656 B1 | 6/2018 | Parks |
| 10,246,358 B1 | 4/2019 | Lohse |
| 10,514,182 B1 | 12/2019 | Oviedo |
| 10,557,644 B1 | 2/2020 | Steele |
| 10,610,907 B1 | 4/2020 | Scaringe et al. |
| D902,583 S | 11/2020 | Thomas et al. |
| 11,285,520 B2 | 3/2022 | McDonald et al. |
| 11,320,172 B1 | 5/2022 | Walker, Jr. |
| 12,083,238 B1 | 9/2024 | Thompson |
| 2003/0010381 A1 | 1/2003 | Kimbrough et al. |
| 2005/0269418 A1 | 12/2005 | Fuller |
| 2006/0038863 A1 | 2/2006 | Piccinino et al. |
| 2006/0222508 A1 | 10/2006 | Cantolino |
| 2006/0237806 A1 | 10/2006 | Martin et al. |
| 2007/0224050 A1 | 9/2007 | Ward |
| 2008/0276359 A1 | 11/2008 | Morgan et al. |
| 2009/0049592 A1 | 2/2009 | Kipp |
| 2009/0064698 A1 | 3/2009 | Spanger |
| 2009/0165868 A1 | 7/2009 | Pearson |
| 2010/0147876 A1 | 6/2010 | Mehus et al. |
| 2013/0146094 A1 | 6/2013 | Riefenstein et al. |
| 2013/0239315 A1 | 9/2013 | Kipp |
| 2014/0075967 A1 | 3/2014 | Arensmeier et al. |
| 2014/0109988 A1 | 4/2014 | Oakner et al. |
| 2014/0130888 A1 | 5/2014 | Kaiser et al. |
| 2015/0048034 A1 | 2/2015 | Reinolds |
| 2015/0153055 A1 | 6/2015 | Oakner et al. |
| 2015/0323241 A1 | 11/2015 | Oakner et al. |
| 2016/0325981 A1 | 11/2016 | Diaz et al. |
| 2017/0045282 A1 | 2/2017 | Thornberry, Jr. |
| 2017/0130443 A1 | 5/2017 | Mills |
| 2018/0112889 A1 | 4/2018 | Barker et al. |
| 2018/0230689 A1 | 8/2018 | Schaafsma |
| 2018/0259222 A1 | 9/2018 | Murphy |
| 2019/0337027 A1 | 11/2019 | Raynes, II |
| 2019/0353367 A1 | 11/2019 | Atchison |
| 2020/0181898 A1 | 6/2020 | Huitron |
| 2020/0254495 A1 | 8/2020 | Rechlin |
| 2020/0261949 A1 | 8/2020 | Hollars et al. |
| 2020/0269289 A1 | 8/2020 | Hollars et al. |
| 2020/0370772 A1 | 11/2020 | Inoue et al. |
| 2021/0239356 A1 | 8/2021 | Thompson |
| 2021/0341173 A1 | 11/2021 | Akiyama et al. |

FOREIGN PATENT DOCUMENTS

| | | |
|---|---|---|
| CA | 2995074 A1 | 8/2018 |
| CN | 206793163 U | 12/2017 |
| CN | 207306840 U | 5/2018 |
| CN | 208329123 U | 1/2019 |
| CN | 215654197 U | 1/2022 |
| DE | 3831381 A1 | 3/1990 |
| GB | 2281112 A | 2/1995 |
| GB | 2398849 A | 9/2004 |
| KR | 20210140916 A | 11/2021 |
| WO | 2011/075324 A1 | 6/2011 |
| WO | 2012/164289 A1 | 12/2012 |

OTHER PUBLICATIONS

U.S. Notice of Allowance dated Feb. 3, 2023 for corresponding U.S. Appl. No. 17/723,795.
Partial International Search Report and Provisional Written Opinion and Invitation to Pay Additional Fees dated Feb. 2, 2023 for corresponding International Application No. PCT/US2022/078747.
International Search Report and Written Opinion thereof dated Mar. 23, 2023 for corresponding International Application No. PCT/US2022/078747.
U.S. Office Action dated Apr. 28, 2023 for corresponding U.S. Appl. No. 17/944,662.
Extended European Search Report dated Jun. 5, 2023 for corresponding European Application No. 22204020.6.
U.S. Notice of Allowance dated Jun. 16, 2023 for corresponding U.S. Appl. No. 17/723,795.
U.S. Office Action dated Sep. 6, 2023 for corresponding U.S. Appl. No. 17/944,662.
U.S. Notice of Allowance dated Oct. 16, 2023 for corresponding U.S. Appl. No. 17/944,662.
U.S. Office Action dated Feb. 15, 2024 for corresponding U.S. Appl. No. 18/510,138.
U.S. Notice of Allowance dated Mar. 6, 2024 for corresponding U.S. Appl. No. 18/360,173.
U.S. Notice of Allowance dated Apr. 2, 2024 for corresponding U.S. Appl. No. 18/510,138.
"Kollea Reliable Automatic Watering System, Plant Self Watering System Automatic Drip Irrigation Kit with 60-Day Programmable Timer, LED Display & USB Power, Indoor Irrigation System for

(56) References Cited

OTHER PUBLICATIONS

Potted Plants, and Selected Customer Reviews," webpage <https://a.co/d/iCKKroZ>, 17 pages, available on Internet as of at least Dec. 21, 2020, retrieved from Internet on May 7, 2024.

International Preliminary Report on Patentability dated May 2, 2024 for corresponding International Application No. PCT/US2022/078747.

U.S. Office Action dated Oct. 9, 2024 for corresponding Design U.S. Appl. No. 29/871,185.

Drain Line Cleaner, posted Jun. 2, 2017 [online], [retrieved Sep. 23, 2024], Retrieved from internet, https://www.amazon.com/SDNselect-Drain-Cleaner-Condensate-Lines/dp/B072C3PYFB (Year: 2017).

Mini Pump, posted Mar. 16, 2019 [online], [retrieved Sep. 23, 2024], Retrieved from internet, https://www.amazon.com/Condensate-FUJIWARA-Condensation-Automatic-Dehumidifier/dp/B07PR365TV (Year: 2019).

Request for Ex Parte Reexamination of U.S. Pat. No. 11,719,464, filed on Nov. 21, 2024 in U.S. Appl. No. 90/019,736.

U.S. Notice of Allowance dated Jan. 22, 2025 for corresponding U.S. Appl. No. 29/871,185.

U.S. Office Action dated Mar. 31, 2025 for corresponding U.S. Appl. No. 90/019,736.

Notice of Acceptance for Corresponding United Arab Emirates Application No. P6002172/2022 dated Mar. 25, 2025.

Notice of Acceptance for Corresponding United Arab Emirates Application No. P6000292/2024 dated May 13, 2025.

U.S. Office Action dated Jun. 17, 2025 for corresponding U.S. Appl. No. 90/019,736.

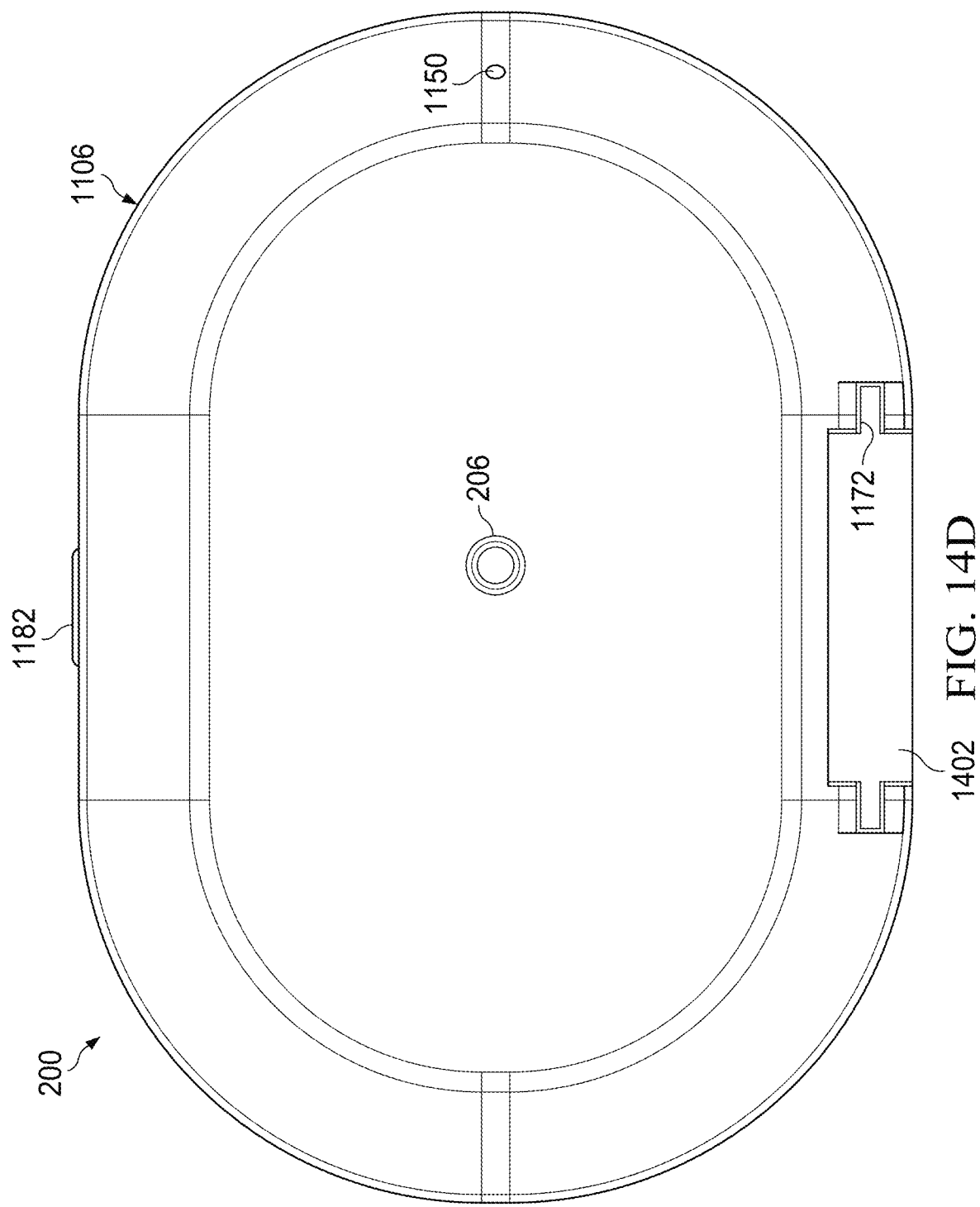

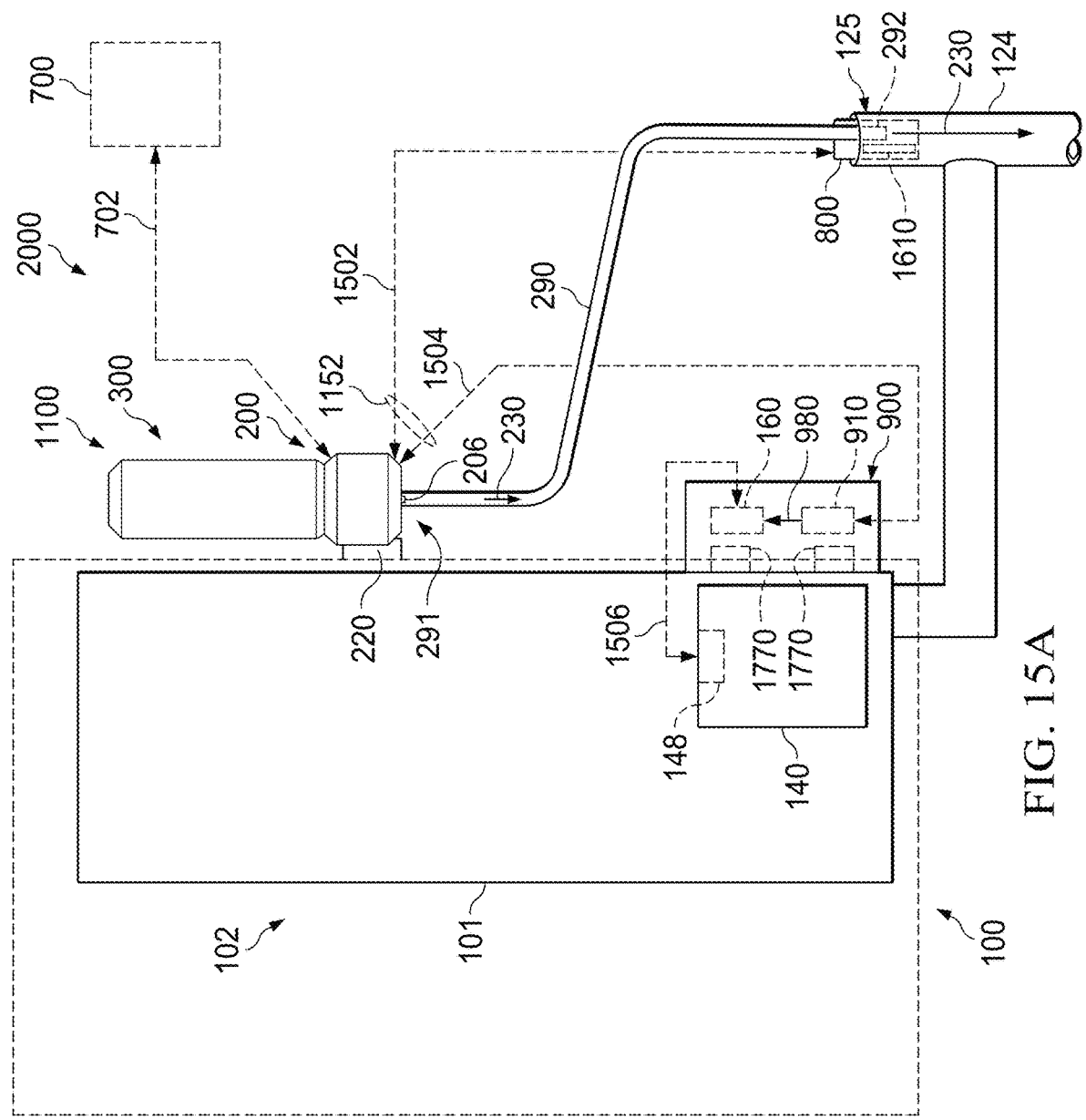

DRAIN CLEANER APPARATUS

CROSS-REFERENCE TO RELATED APPLICATIONS

This application is a continuation of U.S. patent application Ser. No. 18/510,138, filed in the United States Patent and Trademark Office on Nov. 15, 2023, which is a continuation of U.S. patent application Ser. No. 17/944,662, filed in the United States Patent and Trademark Office on Sep. 14, 2022, which is a continuation in part of U.S. patent application Ser. No. 17/723,795 filed in the United States Patent and Trademark Office on Apr. 19, 2022, which claims priority to and the benefit of U.S. Provisional Patent Application No. 63/277,323 filed in the United States Patent and Trademark Office on Nov. 9, 2021, the entire contents of each of which are incorporated herein by reference.

BACKGROUND

Field

The present disclosure relates generally to air-conditioning systems, and more particularly to providing cleaner chemical compositions into condensate drain lines of air handlers of air-conditioning systems without manual intervention.

Description of Related Art

Air-conditioning systems may include an air handler, also referred to as an air handling unit (AHU) that may circulate and cool air within a space and/or structure. An air handler may move air, via operation of an air mover such as a blower or fan, to flow in thermal communication with a heat exchanger such as an air coil. The air handler may circulate a refrigerant through the heat exchanger to absorb (e.g., remove) heat from the flow of air to cool the air, and the air-conditioning system may circulate the refrigerant through a heat exchanger to discharge the absorbed heat into a heat sink (e.g., the ambient environment).

In some cases, cooling air due to the heat exchanger absorbing heat from the air may result in condensation of moisture (e.g., condensate) out of the cooled air at the heat exchanger. The condensate may be collected and discharged from the air handler via a condensate drain line.

SUMMARY

According to some example embodiments, a drain cleaner apparatus for dispensing a cleaning composition into a condensate drain line of an air handler of an air conditioning system may include an apparatus outlet in fluid communication with an exterior of the drain cleaner apparatus, a dispenser device configured to be actuated to selectively dispense an amount of the cleaning composition through the apparatus outlet, a connector interface configured to detachably couple with a complementary connector interface of a cartridge having a cartridge reservoir configured to hold the cleaning composition, to establish flow communication from the cartridge reservoir to the dispenser device, such that the dispenser device is between the connector interface and the apparatus outlet and the dispenser device is configured to be actuated to selectively dispense the amount of the cleaning composition from the cartridge reservoir and through the apparatus outlet, and a controller configured to actuate the dispenser device to cause the amount of the cleaning composition to be dispensed through the apparatus outlet without manual intervention.

The connector interface of the drain cleaner apparatus or the complementary connector interface of the cartridge may include a check valve that is configured to open in response to the connector interface of the drain cleaner apparatus coupling with the complementary connector interface of the cartridge to establish the fluid communication between the cartridge reservoir and the dispenser device.

The dispenser device may include at least one valve that is configured to be selectively opened based on a control signal generated by the controller to establish a flow path through the at least one valve to the apparatus outlet. The drain cleaner apparatus may include a dispenser reservoir that is between the check valve and the at least one valve, such that the connector interface is configured to detachably couple with the complementary connector interface of the cartridge to establish flow communication from the cartridge reservoir to the dispenser reservoir, and the dispenser device is configured to be actuated to selectively dispense the amount of the cleaning composition from the dispenser reservoir and through the apparatus outlet. The controller may be configured to actuate the dispenser device based on causing the at least one valve to open the flow path to enable at least a portion of the cleaning composition held in the dispenser reservoir to flow from the dispenser reservoir to the apparatus outlet.

The drain cleaner apparatus may further include a structure connector that is configured to removably couple with an outer housing of the drain cleaner apparatus, the structure connector configured to connect the drain cleaner apparatus to an external structure to at least partially hold the drain cleaner apparatus in place in relation to an opening of the condensate drain line.

The structure connector may include a magnet configured to magnetically attach the structure connector to a metal surface of the external structure.

The controller may be configured to actuate the dispenser device in response to an elapse of a particular period of time.

The controller may be configured to repeatedly actuate the dispenser device at a fixed time interval that is the particular period of time, based on monitoring a timer that increments a timer value at a fixed frequency, actuating the dispenser device in response to the timer value reaching a particular time value corresponding to the elapse of the particular period of time, and resetting the timer value to an initial timer value in response to actuating the dispenser device.

The controller may be configured to monitor a counter that increments a counter value in response to each actuation of the dispenser device, and generate a depletion signal in response to the counter value reaching a particular counter value that corresponds to at least partial depletion of a fixed reservoir of the cleaning composition.

The controller may be configured to determine a volume of the cartridge reservoir in response to receiving a command signal indicating the volume of the cartridge reservoir, and adjust the particular counter value based on the determination of the volume of the cartridge reservoir.

The drain cleaner apparatus may further include a network communication interface device that is configured to establish a network communication link with a remote computing device. The controller may be configured to cause the depletion signal to be transmitted to the remote computing device via the network communication link.

The drain cleaner apparatus may further include a network communication interface device that is configured to establish a network communication link with a remote computing device. The controller may be configured to cause the counter value to be reset to an initial counter value in response to receiving a reset signal from the remote computing device via the network communication link.

The drain cleaner apparatus may further include a network communication interface device that is configured to establish a network communication link with a remote computing device. The controller may be configured to cause the air conditioning system to shut down, in response to receiving a shutdown command signal from the remote computing device via the network communication link.

The drain cleaner apparatus may be configured to cause at least a portion of the air conditioning system to shut down in response to receiving a signal generated by a float switch apparatus.

The drain cleaner apparatus may be configured to cause a float switch of the air handler to actuate to cause at least the portion of the air conditioning system to shut down in response to receiving the signal generated by the float switch apparatus.

The drain cleaner apparatus may be configured to actuate an actuator to cause the float switch of the air handler to actuate.

According to some example embodiments, a system may be configured to control dispensation of a cleaning composition into a condensate drain line of an air handler of an air conditioning system, where the air handler includes an air handler float switch, where the air handler is configured to shut down in response to actuation of the air handler float switch. The system may include the drain cleaner apparatus, and a float switch apparatus configured to be coupled to the condensate drain line. The float switch apparatus may be configured to enable the drain cleaner apparatus to supply the cleaning composition into the condensate drain line. The float switch apparatus may include a drain cleaner float switch. The drain cleaner float switch may be configured to be electrically coupled to the drain cleaner apparatus such that the drain cleaner float switch is configured to transmit a float switch signal to the drain cleaner apparatus in response to a presence of fluid in the condensate drain line. The controller of the drain cleaner apparatus may be configured to transmit an electrical signal to the air handler to cause at least a portion of the air conditioning system to shut down in response to receiving the float switch signal from the drain cleaner float switch.

According to some example embodiments, a system may be configured to control dispensation of a cleaning composition into a condensate drain line of an air handler of an air conditioning system, where the air handler includes an air handler float switch, where the air handler is configured to shut down in response to actuation of the air handler float switch. The system may include the drain cleaner apparatus, and an actuator apparatus configured to be electrically coupled to the drain cleaner apparatus. The actuator apparatus may include an actuator. The actuator apparatus may be configured to position the air handler float switch in relation to the actuator, such that the actuator apparatus is configured to cause the actuator to actuate the air handler float switch in response to receiving an actuator command signal from the drain cleaner apparatus. The controller of the drain cleaner apparatus may be configured to transmit the actuator command signal to the actuator apparatus to cause the actuator to actuate the air handler float switch.

The system may further include a float switch apparatus configured to be coupled to the condensate drain line. The float switch apparatus may be configured to enable the drain cleaner apparatus to supply the cleaning composition into the condensate drain line. The float switch apparatus may include a drain cleaner float switch. The drain cleaner float switch may be configured to be electrically coupled to the drain cleaner apparatus such that the drain cleaner float switch is configured to transmit a float switch signal to the drain cleaner apparatus in response to a presence of fluid in the condensate drain line. The controller of the drain cleaner apparatus may be configured to transmit the actuator command signal to the actuator apparatus to cause the actuator to actuate the air handler float switch in response to receiving the float switch signal from the drain cleaner float switch.

The apparatus outlet of the drain cleaner apparatus may be coupled to a first end of a dispenser conduit, the dispenser conduit having an opposite, second end in fluid communication with the condensate drain line, such that the apparatus outlet of the drain cleaner apparatus is in fluid communication with the condensate drain line through at least the dispenser conduit.

The float switch apparatus may include a support housing configured to couple with an opening of the condensate drain line, a supply conduit extending through the support housing, a first end of the supply conduit configured to be coupled with the second end of the dispenser conduit, the second end of the supply conduit configured to be in fluid communication with the condensate drain line, such that the supply conduit is configured to establish the fluid communication of the apparatus outlet of the drain cleaner apparatus with the condensate drain line through the dispenser conduit and the supply conduit. The drain cleaner float switch may be attached to the support housing. The drain cleaner float switch and the supply conduit may be offset from a central axis of the support housing.

The actuator may include an actuator piston and a servomotor configured to cause the actuator piston to move along a first axis. The actuator apparatus may be configured to hold the air handler float switch in place in relation to the actuator piston. The actuator apparatus may be configured to actuate the air handler float switch based on causing a float of the air handler float switch to move in relation to a remainder of the air handler float switch based on the actuator piston moving along the first axis.

The actuator apparatus may include a cup structure coupled to the actuator and further configured engage the float of the air handler float switch to move the float along the first axis based on movement of the actuator piston along the first axis.

The actuator apparatus may include a conduit structure having an inner surface defining a conduit space extending along the first axis and having opposite first and second openings, the conduit structure configured to receive the air handler float switch into the conduit space through the first opening, the conduit structure further configured to receive at least the cup structure into the conduit space through the second opening.

The controller of the drain cleaner apparatus may be configured to transmit the actuator command signal to the actuator apparatus to cause the actuator to actuate the air handler float switch based on processing a signal received from a remote computing device via a network communication interface of the drain cleaner apparatus.

According to some example embodiments, an actuator apparatus may be configured to actuate an air handler float switch of an air handler of an air conditioning system. The actuator apparatus may include an actuator and one or more support structures configured to position the air handler float switch in relation to the actuator, such that the actuator apparatus is configured to cause the actuator to actuate the air handler float switch based on causing at least a float of the air handler float switch to move in relation to a remainder of the air handler float switch.

The actuator may include an actuator piston and a servomotor configured to cause the actuator piston to move along a first axis. The actuator apparatus may be configured to hold the air handler float switch in place in relation to the actuator piston. The actuator apparatus may be configured to actuate the air handler float switch based on causing a float of the air handler float switch to move in relation to a remainder of the air handler float switch based on the actuator piston moving along the first axis.

The actuator apparatus may include a cup structure coupled to the actuator and further configured engage the float of the air handler float switch to move the float along the first axis based on movement of the actuator piston along the first axis.

The one or more support structures may include a conduit structure having an inner surface defining a conduit space extending along the first axis and having opposite first and second openings, the conduit structure configured to receive the air handler float switch into the conduit space through the first opening, the conduit structure further configured to receive at least the cup structure into the conduit space through the second opening.

According to some example embodiments, a float switch apparatus configured to be coupled to a condensate drain line of an air conditioning system may include a support housing configured to couple with an opening of the condensate drain line, a drain cleaner float switch attached to the support housing such that the drain cleaner float switch is configured to positioned in the condensate drain line in response to the support housing being coupled with the opening of the condensate drain line, the drain cleaner float switch configured to be actuated to transmit a float switch signal in response to a presence of fluid in the condensate drain line, and a supply conduit extending through the support housing, a first end of the supply conduit configured to be coupled in fluid communication with an apparatus outlet of a drain cleaner apparatus, a second end of the supply conduit configured to be in fluid communication with the condensate drain line, such that the supply conduit is configured to establish fluid communication of the apparatus outlet of the drain cleaner apparatus with the condensate drain line through at least the supply conduit to enable a supply of cleaning composition from the drain cleaner apparatus to the condensate drain line through the float switch apparatus. The drain cleaner float switch and the supply conduit may be offset from a central axis of the support housing.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 14D is a plan bottom view of the drain cleaner apparatus according to some example embodiments.

FIG. 15A is a schematic view of a system including a drain cleaner apparatus system, a float switch apparatus, and an actuator apparatus, according to some example embodiments.

DETAILED DESCRIPTION

Figure 1:
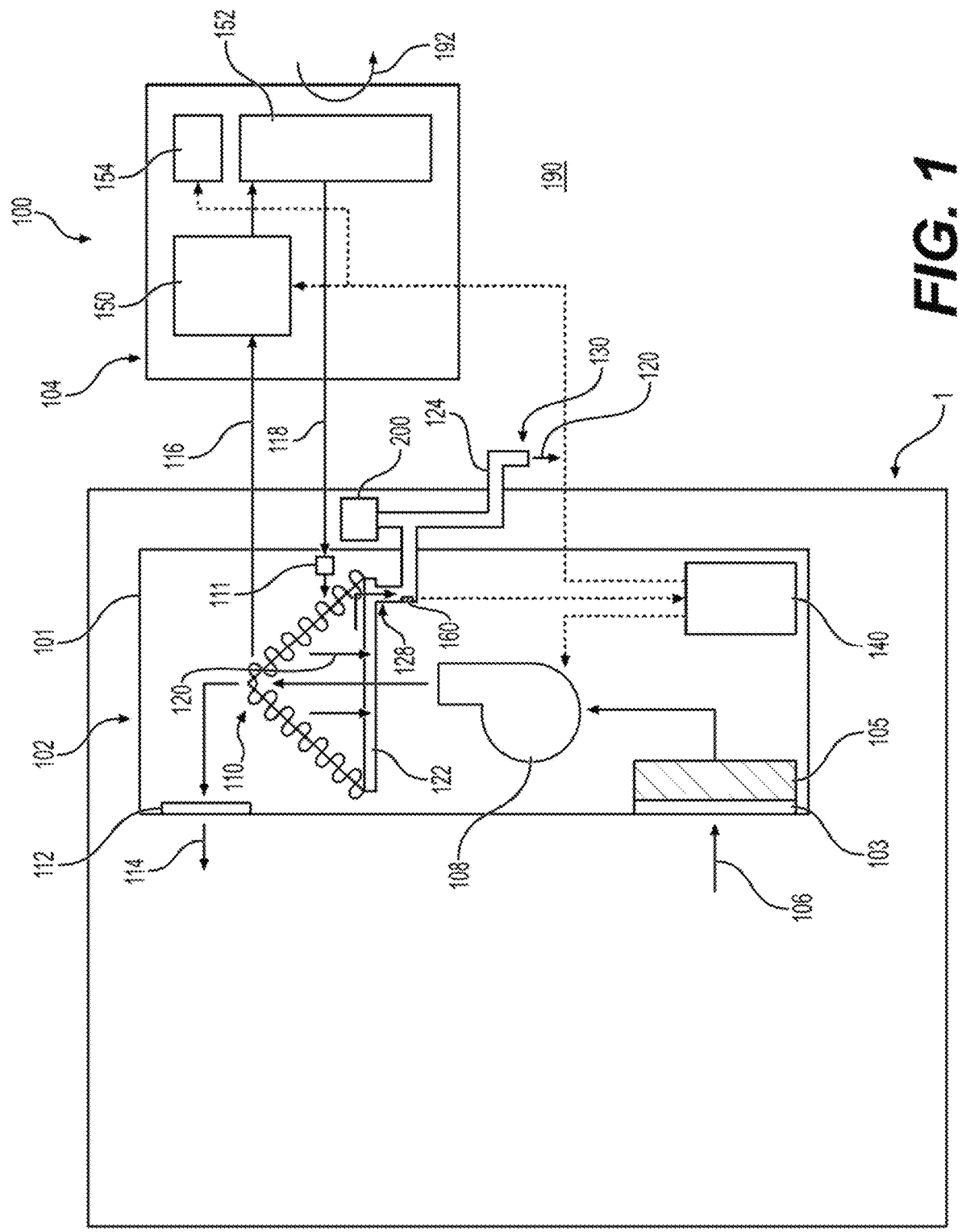
FIG. 1 is a schematic view of an air-conditioning system according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular," "parallel," "flush," or the like with regard to other elements and/or properties thereof (e.g., structures, surfaces, directions, or the like) may be "perpendicular," "parallel," "flush," or the like or may be "substantially perpendicular," "substantially parallel," "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIG. 1 is a schematic view of an air conditioning system 100 according to some example embodiments. The air conditioning system 100, which may be interchangeably referred to as an air conditioning system, air conditioner, or the like, may be configured to provide cooling of air within an interior of a structure 1 and may be at least partially located within the structure 1, but example embodiments are not limited thereto. The air conditioning system 100 may be included as a part of a Heating, ventilation, and air conditioning (HVAC) system, but example embodiments are not limited thereto, and in some example embodiments the air conditioning system 100 may be separate from any heating system.

Referring to FIG. 1, the air conditioning system 100 may include an air handler 102 and a condenser assembly 104 that are configured to draw return air 106 from an interior of the structure 1, cool (e.g., absorb heat from) the drawn return air 106 into conditioned air 114, and discharge (e.g., supply) the conditioned air 114 back into the interior of the structure 1. The air handler 102 may include, within a housing 101 that may at least partially comprise metal (e.g., steel), an air intake 103, an air filter 105, an air mover 108 (e.g., fan, blower, etc.), a heat exchanger 110 (e.g., evaporator coil), an expansion valve 111, a drip pan 122, a condensate drain line 124 (also referred to herein as a condensate drain conduit, condensate drain pipe, etc.), a controller 140, a float switch 160, and an air outlet 112. The condenser assembly 104 may include a compressor 150, a second heat exchanger 152 (e.g., condenser coil), and an air mover 154 (e.g., fan, blower, etc.).

It will be understood that example embodiments of an air conditioning system, air handler, condenser assembly, or the like may have different arrangements of devices therein and may omit or add to the aforementioned elements of the air conditioning system 100 as shown in FIG. 1. It will be understood, for example, that elements shown as being included in the air handler 102 may in some example embodiments be located in the condenser assembly 104 (e.g., the controller 140 may be located in the condenser assembly 104 instead of the air handler 102). As shown, the condenser assembly 104 may be located external to the structure 1 while the air handler 102 is located internal to the structure 1, but example embodiments are not limited thereto.

In some example embodiments, the air conditioning system 100 may draw return air 106 into the air handler 102 via the air intake 103 and through the air filter 105, where the air filter 105 may be any known air filter that is configured to remove some matter (e.g., particulate matter, including dust) from the return air 106. The air mover 108 (e.g., blower) may induce the flow of air into, through, and out of, the air handler 102. The air mover 108 may cause return air 106 to be drawn through the air filter 105 to remove some matter and may move (e.g., blow) the return air 106 through the air mover 108 and to the heat exchanger 110. The return air 106 may flow in thermal communication with (e.g., in contact with outer surfaces of) one or more coils of the heat exchanger 110 so that heat is removed from the return air 106 to cool the return air 106 into conditioned air 114. The air handler 102 may move the conditioned air 114 out of the air handler 102 and back into an interior space of the structure 1 via the air outlet 112.

The air conditioning system 100 may circulate a working fluid (e.g., a refrigerant, including known R22 refrigerant, R410A refrigerant, or any known refrigerant) between the heat exchangers 110 and 152 to remove heat from the return air 106 when the return air 106 flows in thermal communication (e.g., through and/or in contact with one or more coils of) the heat exchanger 110. The heat exchanger 110 may include any known heat exchanger used for an air conditioning system, for example an evaporator coil exchanger that includes one or more coils of one or more tubes through which the working fluid flows (e.g., as a cooled liquid). The heat exchanger 110 may cause heat to be transferred from the return air 106 and into the working fluid when the return air 106 is caused to flow across (e.g., in contact with, in thermal communication with, etc.) the one or more coils, thereby resulting in the working fluid becoming heated (e.g., heated into a low-pressure gas). The heated working fluid may be drawn, via fluid line 116 (e.g., fluid conduit, pipe, etc.) into the condenser assembly 104.

The air conditioning system 100 may include, in the condenser assembly 104, a compressor 150 (which may be any known compressor) that induces flow of the working fluid through the air conditioning system 100. The compressor 150 may draw the heated working fluid from the fluid line 118 and may compress the heated working fluid into a high-pressure gas. The heated working fluid may pass (e.g., flow), for example as the high-pressure gas, from the compressor 150 to the heat exchanger 152 (which may be any known heat exchanger and may be referred to as a condenser coil). The air mover 154 may cause ambient air 192 from the ambient environment 190 to be drawn across (e.g., in thermal communication with) one or more tubes of the heat exchanger 152 to remove heat from the heated working fluid passing through the one or more tubes of the heat exchanger 152, thereby discharging the heat originally removed from the return air 106 into the ambient environment 190 which serves as a heat sink for the air conditioning system 100. As a result, the working fluid passing through the heat exchanger 152 may be cooled back into a liquid. The working fluid may then pass (e.g., flow, circulate, etc.) back to the air handler 102 via a fluid line 118, where the working fluid may pass through an expansion valve 111 (which may be any known expansion valve) to cool the working fluid which then passes into the heat exchanger 110 to remove additional heat from return air 106.

As noted above, the circulation of working fluid through the heat exchanger 110, heat exchanger 152, fluid lines 116 and 118, and expansion valve 111 may be induced by operation of the compressor 150.

As further shown, the air conditioning system 100 may include a controller 140 that is configured to control elements of the air conditioning system 100, including for example controlling operation of the air handler 102, condenser assembly 104, or any part thereof. As described further below, the controller 140 may be implemented by a computing device, including a memory storing a program of instructions and a processor configured to execute the program of instructions. While the controller 140 is shown as being included within the housing 101 of the air handler 102, it will be understood that the controller 140 may be located external to the housing 101 and, in some example embodiments, may be located within the condenser assembly 104 or may be attached to an exterior of the air handler 102 for ease of manual access.

Still referring to FIG. 1, when heat is removed from the return air 106 based on the return air 106 passing in thermal communication with the heat exchanger 110, water may condense out of the cooled return air as condensate 120 at the heat exchanger 110. The air handler 102 may include a drip pan 122 located beneath the heat exchanger 110, and the condensate 120 may fall under gravity to collect in the drip pan 122. The air handler 102 may further include a condensate drain line 124 having an inlet opening 128 coupled to the drip pan 122 (e.g., a bottom surface where the drip pan 122 has an inclined surface that is angled downwards towards the inlet opening 128 of the condensate drain line 124) and an outlet opening 130 that is external to the structure 1 and open to the ambient environment 190, as shown. Condensate 120 collected in the drip pan 122 may pass under gravity to the inlet opening 128 of the condensate drain line 124, and the condensate drain line 124 may direct the condensate 120 to flow out of the air handler 102 and out of the structure 1 to the ambient environment 190 via the outlet opening 130 of the condensate drain line 124.

In some example embodiments, the condensate drain line 124 may become clogged due to buildup of various substances within the condensate drain line. Such substances may include, for example, mold, algae, mildew, bacteria, and/or fungi. When the condensate drain line becomes clogged, backflow and/or overflow of condensate 120 out of the condensate drain line 124 may occur. For example, condensate 120 may accumulate in the drip pan 122 due to the clogging and may eventually overflow over the sides of the drip pan 122. Such overflow of condensate 120 out of the drip pan 122 may cause damage to the air handler 102 and/or to the structure 1, including water damage to structural members of the structure 1, water damage to elements of the air handler 102, flooding of the structure 1 and/or the air handler 102, or the like.

As shown in FIG. 1, the air conditioning system 100 may include a float switch 160 that is located in the drip pan 122 and/or in the condensate drain line 124 (as shown). The float switch 160 may be a switch that is configured to be actuated based on backflow and/or overflow of condensate 120 in the condensate drain line 124. For example, the float switch 160 may be any known float switch and may be configured to be closed or opened (e.g., actuated) based on accumulation of condensate 120 in the drip pan 122 to at least a threshold volume held therein. The float switch 160 may be communicatively (e.g., electrically) coupled to the controller 140, and the controller 140 may be configured to shut down some or all of the air conditioning system 100 (e.g., shut down the air mover 108, the compressor 150, and/or the air mover 154) in response to the float switch 160 being actuated, thereby reducing or preventing damage being caused in the structure and/or air conditioning system 100 due to the condensate 120 accumulation.

Still referring to FIG. 1, in some example embodiments a drain cleaner apparatus 200 may be coupled to the condensate drain line 124 at an opening 125 into the condensate drain line 124 (e.g., a cleanout opening of the condensate drain line 124), where the drain cleaner apparatus 200 is configured to dispense a cleaning composition into the condensate drain line 124. As described herein, the drain cleaner apparatus 200 may be configured to dispense a cleaning composition into the condensate drain line 124 to reduce, remove, and/or prevent clogging of the condensate drain line 124 due to the presence of various potential clogging substances (e.g., mold, algae, mildew, bacteria, and/or fungi) therein.

In some example embodiments, the drain cleaner apparatus 200 may be configured to dispense the cleaning composition into the condensate drain line 124 without human intervention (e.g., automatically), for example to dispense discrete amounts (e.g., a particular amount, which may be a particular volume and/or particular mass) of the cleaning composition at a particular (or, alternatively, predetermined) fixed time interval, thereby reducing or preventing clogging of the condensate drain line 124 due to the presence of various potential clogging substances (e.g., mold, algae, mildew, bacteria, and/or fungi) therein while reducing or minimizing human intervention and/or effort expended to implement the dispensing. Because the drain cleaner apparatus 200 is configured to dispense the cleaning composition (e.g., repeatedly at a fixed time interval) without human intervention, the buildup of potential clogging substances (e.g., mold, algae, mildew, bacteria, and/or fungi) in the condensate drain line 124 may be reduced, removed, or prevented. This may thereby reduce or prevent the likelihood of condensate 120 backup and/or overflow which might otherwise result in shutdown of at least the air handler 102 and/or air conditioning system 100, flooding damage to the air handler 102 and/or structure 1, or the like. Because human intervention is not required to implement the dispensing of the cleaning composition, particularly dispensing of the cleaning composition repeatedly at a fixed time interval, the likelihood of condensate drain line 124 clogging due to a missed or forgotten manual dispensing of cleaning composition by a human operator is reduced or prevented, thereby improving operational performance of the air conditioning system 100 and reducing workload by a human operator.

Figure 2A:
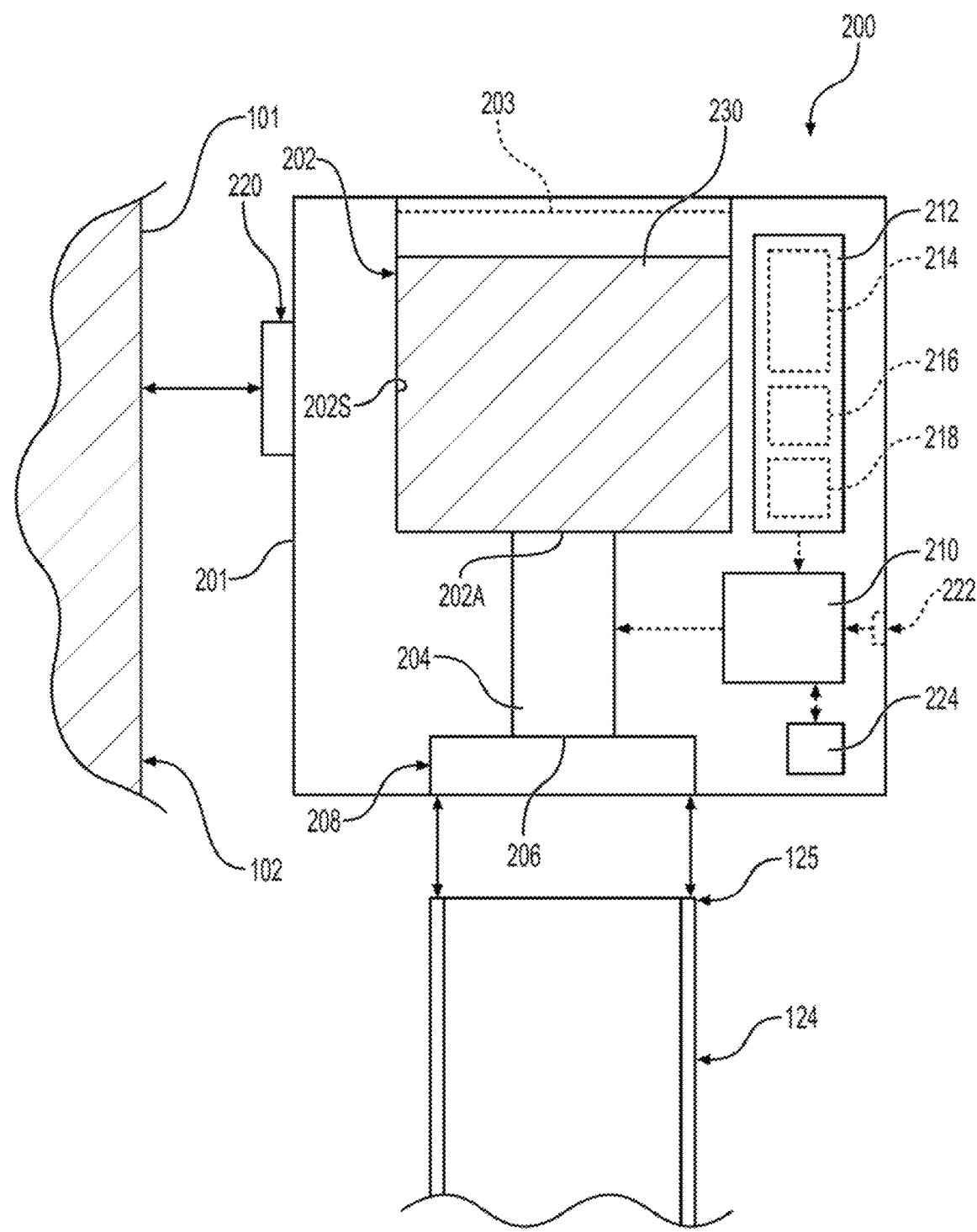
FIGS. 2A and 2B are schematic views of a drain cleaner apparatus according to some example embodiments.
Figure 2B:
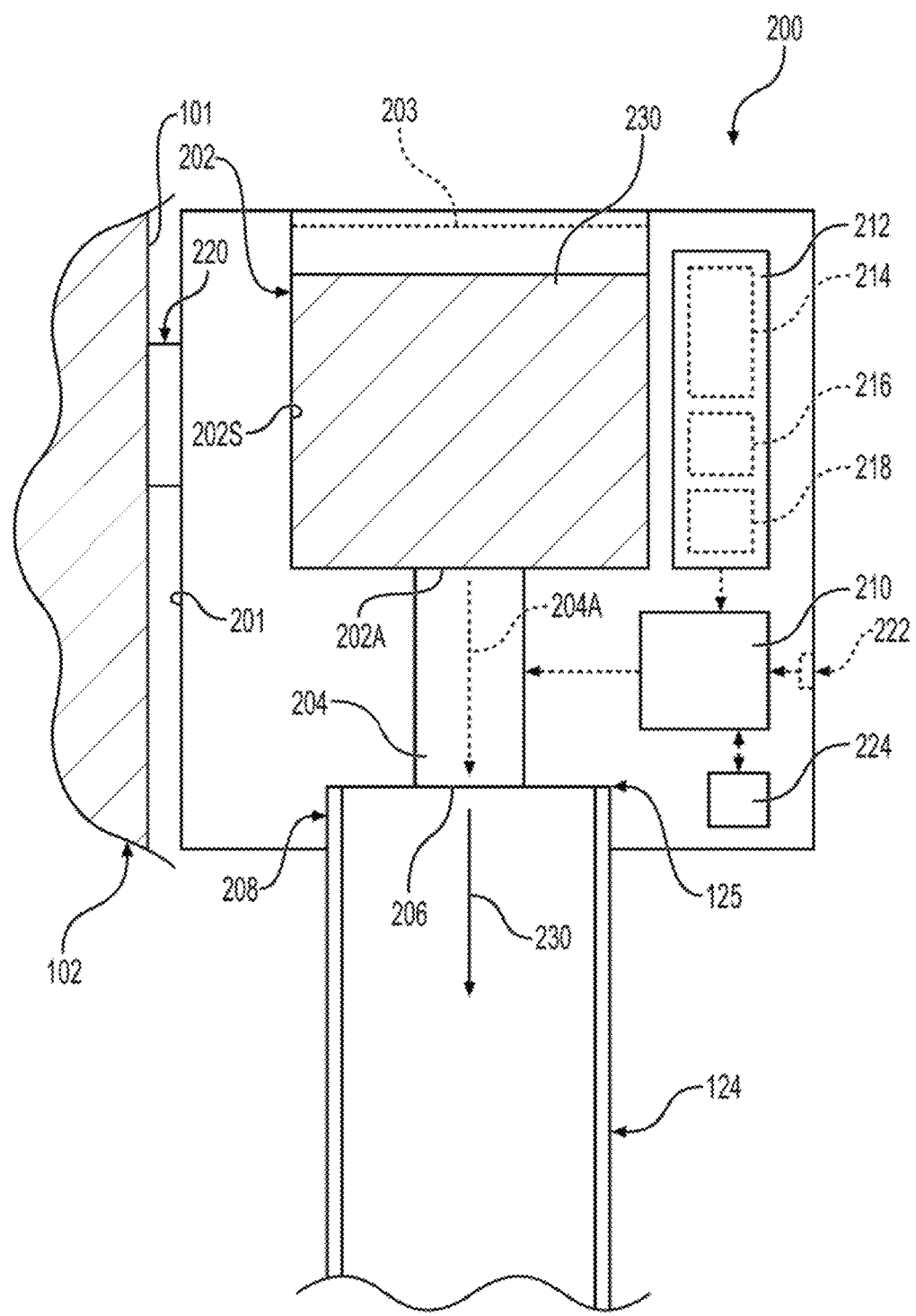

FIGS. 2A and 2B are schematic views of a drain cleaner apparatus 200 according to some example embodiments. Referring to FIGS. 2A and 2B in reference to FIG. 1, the drain cleaner apparatus 200 is configured to dispense a cleaning composition 230 into a condensate drain line 124 of the air handler 102 shown in FIG. 1.

Referring to FIGS. 2A and 2B, the drain cleaner apparatus 200 may include an apparatus reservoir 202 configured to hold the cleaning composition 230, an apparatus outlet 206 (e.g., opening), and a dispenser device 204 that is configured to be actuated (e.g., operated) to selectively dispense an amount (e.g., a particular amount, which may be a particular volume and/or a particular mass) of the cleaning composition 230 from the apparatus reservoir 202 and through the apparatus outlet 206. The drain cleaner apparatus 200 may further include a connector interface 208 that is configured to couple with the condensate drain line 124 to cause the apparatus outlet 206 of the drain cleaner apparatus 200 to be in fluid communication with (e.g., open to) the opening 125 (e.g., cleanout opening) of the condensate drain line 124.

As shown in FIGS. 2A and 2B, the apparatus reservoir 202 may include an inner surface 202S defining an interior volume space in which cleaning composition 230 may be held within a housing 201 of the drain cleaner apparatus 200. The apparatus reservoir 202 may further include an outlet 202A that is configured to be in fluid communication with the dispenser device 204 to enable cleaning composition 230 to flow from the apparatus reservoir 202 to the dispenser device 204. The apparatus reservoir 202 may further include a cover 203 (e.g., a hatch) that may be opened or removed to enable filling or refilling of the apparatus reservoir 202 with cleaning composition 230. However, it will be understood that in some example embodiments, the cleaning composition 230 may be provided within a cartridge container (e.g., "cartridge") that may be received into and held within the apparatus reservoir 202 instead of being poured directly into the apparatus reservoir 202 from outside the drain cleaner apparatus 200.

Still referring to FIGS. 2A and 2B, the dispenser device 204 is a device that may be actuated (e.g., operated, based on an electrical control signal) to selectively open or close at least one fluid path from the apparatus reservoir 202 (e.g., via outlet 202A) to the apparatus outlet 206 to enable at least an amount of the cleaning composition 230 to be dispensed through the apparatus outlet 206.

The dispenser device 204 may be configured to dispense an amount of cleaning composition 230 that is a particular amount (e.g., a particular volume, particular mass, etc.) so that the drain cleaner apparatus 200 may dispense a particular amount of cleaning composition 230 (e.g., repeatedly at a fixed time interval). For example, in some example embodiments, the amount of cleaning composition 230 as described herein that is dispensed when the dispenser device 204 is actuated once may be 3 oz of cleaning composition 230, and the dispenser device 204 may be configured to be actuated to cause the particular amount of cleaning composition 230 from the apparatus reservoir 202 to the apparatus outlet 206.

The connector interface 208 is configured to couple (e.g., removably couple, detachably couple, reversibly couple, etc.) the drain cleaner apparatus 200 with the condensate drain line 124 so that the apparatus outlet 206 is in fluid communication with the opening 125 into the condensate drain line 124, for example as shown in FIG. 2B. As shown, the connector interface 208 is configured to couple with the opening end of the condensate drain line 124 to cause the apparatus outlet 206 to be directly adjacent to, and directly open to, the opening 125 into the condensate drain line 124, so that the actuation of the dispenser device 204 to dispense an amount of the cleaning composition 230 from the apparatus reservoir 202 to the apparatus outlet 206 further causes the amount of the cleaning composition 230 to flow into the condensate drain line 124 through the apparatus outlet 206 and the opening 125 into the condensate drain line 124.

In some example embodiments, the connector interface 208 may be any connector that is configured to couple at least the housing 201 of the drain cleaner apparatus 200 with the condensate drain line 124. In some example embodiments, the connector interface 208 may be a friction fit connector interface that includes an inner surface having an inner diameter that corresponds to the outer diameter of the opening end of the condensate drain line 124, so that the connector interface 208 is configured to establish a friction fit connection with the opening 125. The connector interface 208 may further include a seal, O-ring, or the like along the inner surface of the connector interface 208 to further establish a connection with the opening 125. In some example embodiments, the connector interface 208 includes a threaded connector, bayonet connector, or the like that is configured to be coupled with a complementary connector interface of the condensate drain line 124 (e.g., a threaded connector, bayonet connector, or the like at the opening 125 of the condensate drain line 124). In some example embodiments, the connector interface 208 may include an adaptor (e.g., a variable inner diameter connector) that is configured to couple the drain cleaner apparatus 200 to various condensate drain lines 124 having various outer diameters. In some example embodiments, the connector interface 208 is configured to at least partially transfer a structural load (e.g., weight) of the drain cleaner apparatus 200 to the condensate drain line 124, so that the drain cleaner apparatus 200 is configured to be at least partially structurally supported in place on the condensate drain line 124.

In some example embodiments, the drain cleaner apparatus 200 includes a structure connector 220 that is configured to connect the drain cleaner apparatus 200 to an external structure (e.g., a housing 101 of the air handler 102 as shown) to at least partially hold the drain cleaner apparatus 200 in place in relation to the opening 125 of the condensate drain line 124 (e.g., at least partially structurally support the drain cleaner apparatus 200 on the opening 125). As described further herein, the structure connector 220 may have various structures. For example, the structure connector 220 may include an adhesive connector, a magnet, or the like to couple with the housing 101 of the air handler 102.

In some example embodiments, the dispenser device 204 may include at least one valve that is configured to be actuated to be selectively opened (e.g., to selectively open a flow path 204A through the at least one valve) based on a control signal generated by the controller 210 to establish a flow path 204A through the at least one valve and through which the cleaning composition 230 may flow (e.g., a flow path 204A from the apparatus reservoir 202 to the apparatus outlet 206). For example, a valve of the dispenser device 204 as described herein may include an electromechanically operated valve, including a solenoid valve, which may be selectively actuated based on a control signal from the controller 210.

In some example embodiments, the dispenser device 204 may include a pump (e.g., any known positive displacement pump) that is configured to operate for a particular period of time to move the amount of the cleaning composition 230 from the apparatus reservoir 202 to the apparatus outlet 206, based on a control signal generated by the controller 210.

As described herein, a cleaning composition 230 may be any known chemical composition (e.g., solution, liquid, fluid, etc.) that may be configured to clean (e.g., remove) potential clogging substances (e.g., mold, algae, mildew, bacteria, and/or fungi) from an inner surface of the condensate drain line 124. In some example embodiments, the cleaning composition 230 may be a chemical substance that is or includes a chelating agent (e.g., chelant) including, for example, sodium hexametaphosphate, that is configured to remove potential clogging substances from the inner surface of the condensate drain line based on chelation upon contact with the potential clogging substances. For example, the cleaning composition 230 may be a liquid solution that includes 3%-7% sodium hexametaphosphate, by weight of the total weight of the cleaning composition 230. Based on the drain cleaner apparatus 200 being configured to dispense cleaning composition 230 through the apparatus outlet 206, where the cleaning composition 230 is dispensed into the condensate drain line 124, the drain cleaner apparatus 200 may be configured to enable removal of potential clogging substances (e.g., mold, algae, mildew, bacteria, and/or fungi) from an inner surface of the condensate drain line 124 by the cleaning composition 230, which may thereby reduce or prevent the occurrence of backflow and/or overflow of the condensate drain line 124 due to clogging.

As shown in FIGS. 2A and 2B, the drain cleaner apparatus 200 may include a power supply 212 that is configured to supply electrical power to devices included therein, including the controller 210, the dispenser device 204, a network communication interface 224, a sensor (not shown in FIGS. 2A and 2B, shown in FIG. 5), or the like. As shown, the power supply 212 may include a battery 214, which may include any known rechargeable battery (e.g., a lithium ion battery). As further shown, in some example embodiments the power supply 212 may include a wired power connection 216 which may be configured to couple to a power outlet provided at the structure 1 and/or the air handler 102. The power supply 212 may further include a charging circuit 218 that may be configured to recharge the battery 214 from the wired power connection 216 and may be configured to enable the battery 214 to supply power to operate the drain cleaner apparatus 200 in the absence of electrical power being received via the wired power connection 216.

As shown in FIGS. 2A and 2B, the controller 210 may be configured to actuate the dispenser device 204 to cause a particular amount of the cleaning composition 230 to be dispensed from the apparatus reservoir 202 and through the apparatus outlet 206 without manual intervention. For example, the controller 210 may be configured to cause an electrical signal to be generated and transmitted to the dispenser device 204 to cause the dispenser device 204 to actuate, selectively opening or closing a flow path 204A therethrough, to thus cause a particular amount of the cleaning composition 230 to be dispensed.

The controller 210 may include a memory (e.g., a solid state drive, or SSD) storing a program of instructions, and the controller 210 may include a processor (e.g., a Central Processing Unit, or CPU) configured to execute the program of instructions to implement any functionality of the controller 210 according to any example embodiments. However, example embodiments are not limited thereto. For example, in some example embodiments, the controller 210 may include circuitry that is configured to implement a timer circuit (e.g., a clock, timer, or any combination thereof) and is configured to generate a signal to actuate the dispenser device 204 based on the timer circuit counting a particular time interval.

In some example embodiments, the controller 210 is configured to actuate the dispenser device 204 (e.g., actuate at least one valve, pump, or the like therein) to cause the dispenser device 204 to dispense an amount of cleaning composition 230 through the apparatus outlet 206 to be dispensed into the condensate drain line 124. In some example embodiments, the controller 210 may be configured to generate a signal to cause at least a portion of the dispenser device 204 (e.g., a valve, pump, etc.) to be operated (e.g., a valve opened, a pump operating) for a particular period of time that is associated, at the controller 210, with causing a particular amount of cleaning composition 230 to be dispensed by the dispenser device 204. The controller 210 may cause a particular amount of cleaning composition 230 to be dispensed based on accessing a look-up-table that is stored in a memory of the controller 210, where the look-up-table is empirically generated and associates a period of time of actuation of at least a portion of the dispensing device (e.g., a period of time of generation of a control signal) with dispensing of a corresponding amount of cleaning composition 230 by the dispenser device 204. The controller 210 may determine a particular amount of cleaning composition 230 to be dispensed, access the look-up-table to determine a corresponding duration or period of applied control signal to the dispenser device 204, and then generate a control signal that is transmitted to the dispenser device 204 to cause at least a portion of the dispenser device 204 to be actuated for the corresponding duration or period.

In some example embodiments, the controller 210 is configured to actuate the dispenser device 204 to cause an amount of cleaning composition 230 (e.g., 3 oz) to be dispensed in response to an elapse of a particular period of time (e.g., 7 days, or 168 hours). The controller 210 may be configured to actuate the dispenser device 204 repeatedly upon repeated elapse of the particular period of time, which may be referred to as a "fixed time interval" (e.g., a fixed time interval of 7 days). In some example embodiments, the apparatus reservoir 202 may be configured to hold a total volume of 36 oz, so that the drain cleaner apparatus 200 may be configured to dispense 3 oz of cleaning composition 230 every 7 days for a period of 12 weeks (84 days).

The controller 210 may be configured to repeatedly actuate the dispenser device 204 at a fixed time interval (e.g., 7 days), based on monitoring a timer that increments a timer value at a fixed frequency, actuating the dispenser device 204 in response to the timer value reaching a particular time value corresponding to the elapse of the particular period of time, and resetting the timer value to an initial timer value (e.g., 0 days) in response to actuating the dispenser device 204. For example, the controller 210 may include and/or implement a clock and/or timer that counts a period of elapsed time from an initial timer value (e.g., increments from 0 days) at a fixed frequency (e.g., counts days, hours, minutes and/or seconds at a fixed frequency of days, hours, minutes and/or seconds). In response to determining that a threshold timer value is reached (e.g., a timer value corresponding to the particular period of time and/or fixed time interval of 7 days), the controller 210 may generate a signal to cause the dispenser device 204 to actuate to cause an amount of the cleaning composition 230 to be dispensed through the apparatus outlet 206 and further re-set the timer value so that the controller 210 may subsequently cause the dispenser device 204 to dispense another amount of the cleaning composition 230 upon a re-elapse of the particular period of time. The controller 210 may be configured to perform this process repeatedly so long as electrical power is supplied to the controller 210 (e.g., from power supply 212), so that the process may be performed (e.g., repeatedly at a fixed time interval) without human intervention.

In some example embodiments, the controller 210 is configured to implement a counter that increments a counter value, starting from an initial value (e.g., 0), in response to each actuation of the dispenser device 204. As a result, where the controller 210 repeatedly actuates the dispenser device 204 at a fixed time interval, the controller 210 may track the number (e.g., quantity) of dispensings of an amount of cleaning composition 230 (e.g., the number of actuations of the dispenser device 204) over time. Therefore, where the drain cleaner apparatus 200 is configured to hold a particular total amount of cleaning composition 230 (e.g., 36 oz), the controller 210 may track the counter value to determine when the total amount of cleaning composition 230 available to be dispensed is about to be depleted or is depleted and may generate a signal (e.g., a depletion signal) in response to the counter value reaching a value that corresponds to partial or complete (e.g., total, final, etc.) depletion of the cleaning composition 230 held by the drain cleaner apparatus 200.

For example, where the drain cleaner apparatus 200 is configured to hold a particular total amount of cleaning composition 230 that is 36 oz, and where the controller 210 is configured to cause the dispenser device 204 to dispense an amount of 3 oz of cleaning composition 230 at a fixed time interval of 7 days, the total amount of cleaning composition 230 may be depleted upon completion of 12 dispensings. The controller 210 may store a threshold counter value of 10, 11, or 12 that corresponds to partial depletion, near-depletion, or total depletion of the total amount of cleaning composition 230 held in the drain cleaner apparatus 200. The controller 210 may implement and/or monitor a counter that increments a counter value in response to each actuation of the dispenser device 204, and generate a depletion signal in response to the counter value reaching a particular counter value that corresponds to at least partial depletion of a fixed reservoir of the cleaning composition (e.g., 10, 11, or 12). As described herein, the controller 210 may transmit the depletion signal to a display interface (e.g., an LED, an audio speaker), which may be included in the drain cleaner apparatus 200 or may be included in a remote computing device, to provide a depletion warning. The controller 210 may further or alternatively be configured to cause the depletion signal to a remote computing device (e.g., via a network communication interface 224 as described herein) in order to inform a remote human user supported by the remote computing device of the partial or complete depletion (e.g., final depletion) of the total amount of cleaning composition 230 held in the drain cleaner apparatus 200. The human user may then be informed of the partial or complete depletion so that the human user may take action to replenish the cleaning composition held in the drain cleaner apparatus 200.

Additionally, the drain cleaner apparatus 200 may include a counter reset interface 222 (e.g., a button) that is configured to cause the counter value to be reset to an initial counter value (e.g., 0) in response to human interaction with the counter reset interface 222 (e.g., in response to a human user pushing the button after replenishing the total amount of cleaning composition 230 held in the drain cleaner apparatus 200).

Still referring to FIGS. 2A and 2B, the drain cleaner apparatus 200 may include a network communication interface 224 that is communicatively coupled to the controller 210. It will be understood that the network communication interface 224 may be separate from the controller 210 as shown or may be included in and/or implemented by the controller 210. The network communication interface 224 may be any known network communication transceiver, including a wireless network communication transceiver such as a WI-FI transceiver, 5G cellular network communication transceiver, an ad hoc network communication transceiver such as a Bluetooth® transceiver, any combination thereof, or the like.

The controller 210 may be configured to establish a network communication link (which may be a wired network communication link, a wireless network communication link, an ad hoc wireless network communication link, or the like) with a remote computing device as described herein and may engage in one-way or two-way communication with the remote computing device via the network communication link.

In some example embodiments, the controller 210 may communicate signals over the network communication link that indicate operations of the controller 210 (e.g., indicating actuation of the dispenser device 204 at particular points in time, a present timer value, a present counter value, etc.). In some example embodiments, the controller 210 may communicate the depletion signal (generated in response to the counter value reaching a threshold value) to the remote computing device via the network communication link.

In some example embodiments, the controller 210 may be configured to perform operations in response to receiving signals from the remote computing device via the network communication link. For example, the controller 210 may be configured to cause the counter value of the counter value to be reset to an initial counter value (e.g., 0) in response to receiving a reset signal from the remote computing device via the network communication link (which may be transmitted by the remote computing device in response to a human user replenishing the total amount of cleaning composition 230 held in the drain cleaner apparatus 200).

Figure 3A:
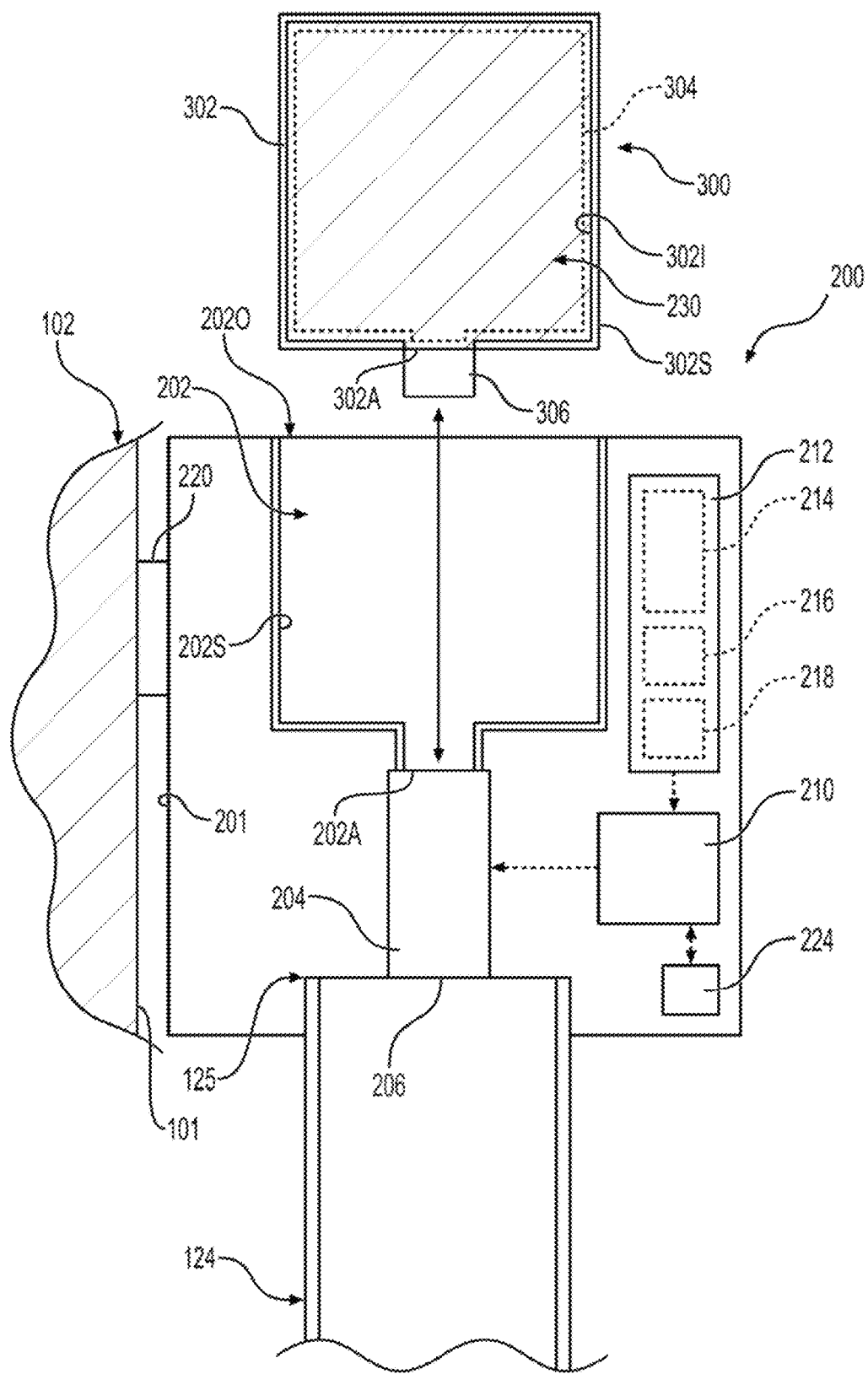
FIGS. 3A and 3B are schematic views of a drain cleaner apparatus and a cartridge according to some example embodiments.
Figure 3B:
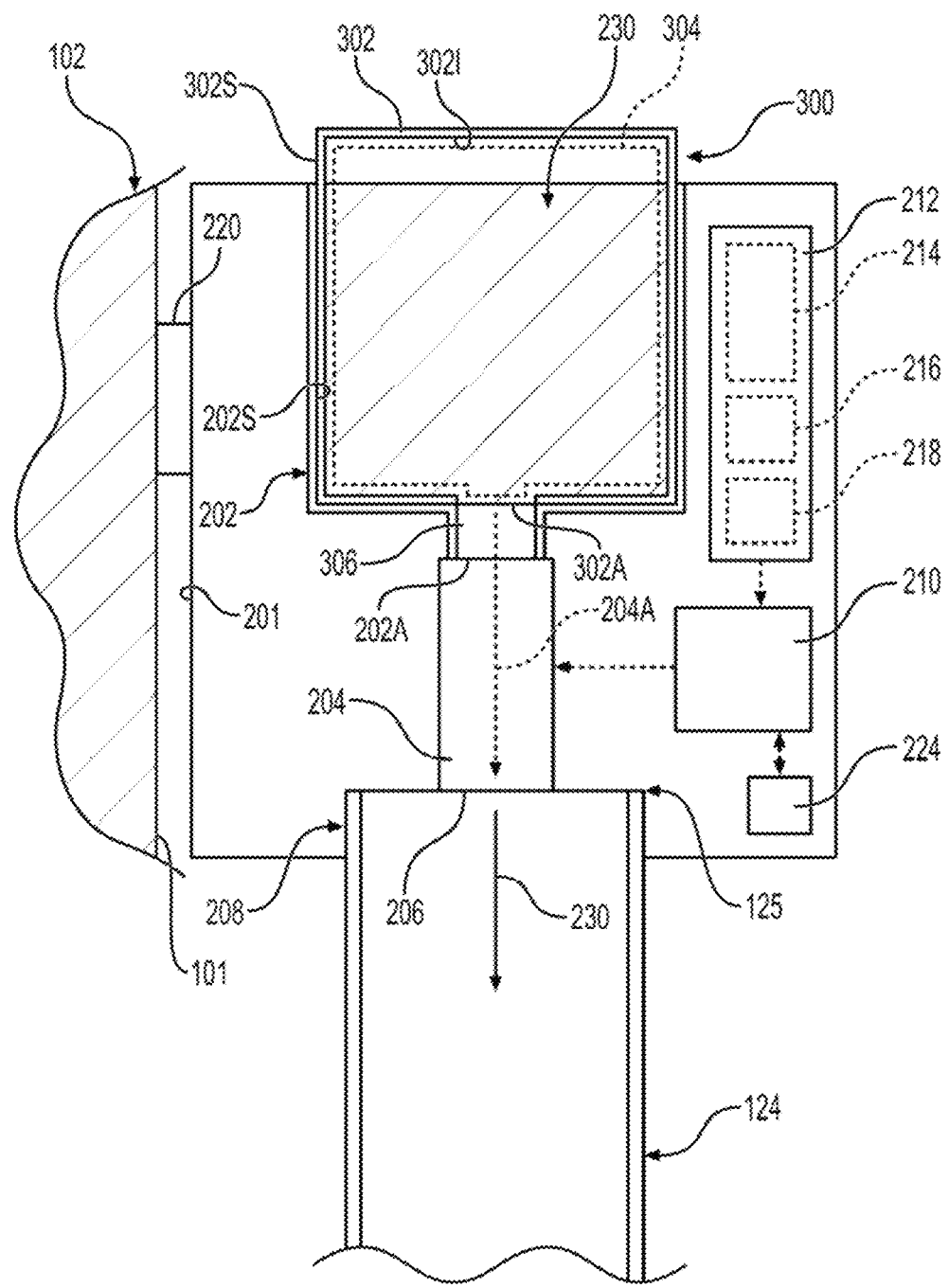

FIGS. 3A and 3B are schematic views of a drain cleaner apparatus 200 and a cartridge 300, also referred to interchangeably as a "cleaner cartridge," "cleaning composition cartridge," or the like according to some example embodiments. Referring to FIGS. 3A and 3B in reference to FIG. 1, the drain cleaner apparatus 200 is configured to dispense a cleaning composition 230 into a condensate drain line 124 of the air handler 102 shown in FIG. 1. The drain cleaner apparatus 200 shown in FIGS. 3A and 3B may include some or all of the same elements as the drain cleaner apparatus of any of the example embodiments.

In some example embodiments, the drain cleaner apparatus 200 may be configured to receive and couple with a cartridge 300 that contains (e.g., holds) the cleaning composition 230 within a cartridge reservoir 304 such that a flow path is established between the cartridge reservoir 304 and the dispenser device 204. The cartridge 300 may be provided instead of the cleaning composition 230 being poured into, and directly held within, the apparatus reservoir 202 in contact with the inner surface 202S thereof, for example as shown in FIGS. 2A and 2B. Replenishment of the cleaning composition 230 held in the drain cleaner apparatus 200 may be simplified based on the cleaning composition 230 being held in the cartridge 300, as replenishment of the total cleaning composition 230 held in the drain cleaner apparatus 200 may involve replacing a cartridge 300 that is coupled to the drain cleaner apparatus 200 based on being inserted into the apparatus reservoir 202 instead of directly pouring the cleaning composition 230 directly into the apparatus reservoir 202. Such simplification may include reducing or preventing inadvertent spilling of cleaning composition 230 during the replenishment process.

As shown in FIGS. 3A and 3B, the cartridge 300 may include a cartridge housing 302 that has at least an inner surface 302I defining a cartridge reservoir 304 which may hold the cleaning composition 230 therein. In some example embodiments, the cartridge reservoir 304 may have a particular volume, for example 36 oz and thus may be configured to hold the particular volume (e.g., 36 oz) of cleaning composition 230.

As further shown, the apparatus reservoir 202 and the cartridge 300 may be sized and shaped so that the cartridge 300 may be received at least partially into the apparatus reservoir 202 to establish a sliding contact fit between the outer surface 302S of the cartridge housing 302 and the inner surface 202S of the apparatus reservoir 202, for example so that the cartridge 300 occupies all or substantially all of the internal volume space of the apparatus reservoir 202 when the cartridge 300 is coupled to the drain cleaner apparatus 200.

As shown in FIGS. 3A and 3B, the cartridge 300 may have a greater volume than the apparatus reservoir 202 and may protrude out of the opening 202O of the apparatus reservoir 202 when the cartridge 300 is received into the apparatus reservoir 202 and coupled with the drain cleaner apparatus 200. Such protrusion of the cartridge 300 may enable easier human access to grasp the cartridge 300 to simplify replacement of cartridges 300, but example embodiments are not limited thereto: in some example embodiments the cartridge 300 may be located entirely within the apparatus reservoir 202 when the cartridge 300 is coupled to the drain cleaner apparatus 200.

As shown in FIGS. 3A and 3B, the drain cleaner apparatus 200 may include the apparatus reservoir 202 which is configured to receive the cartridge 300 to enable the cartridge 300 to be coupled with the drain cleaner apparatus 200, but example embodiments are not limited thereto. For example, in some example embodiments, the apparatus reservoir 202 may be entirely absent from the drain cleaner apparatus 200, and the cartridge 300 may couple with a port that is exposed at the outer surface of the housing 201 of the drain cleaner apparatus 200 to put the cartridge reservoir 304 in fluid communication with the dispenser device 204.

As shown, the cartridge 300 may have a cartridge housing 302 that defines a cartridge outlet 302A through which the cleaning composition 230 may exit the cartridge reservoir 304 when a flow path is established between the cartridge reservoir 304 and the dispenser device 204.

The cartridge outlet 302A may include a connector interface configured to establish a connection with the dispenser device 204, and the dispenser device 204 or the apparatus reservoir 202 may further include a complementary connector interface to enable a complementary connection with the cartridge 300. Such connector interfaces may include any known connector interface, for example a friction fit connector, a threaded connector, a bayonet connector, any combination thereof, or the like.

As further shown, at least one of the cartridge 300 or the drain cleaner apparatus 200 may include a check valve 306 that is configured to be opened based on the drain cleaner apparatus 200 being coupled with the cartridge 300 (e.g., in response to establishing a threaded connection, bayonet connection, friction fit connection, or the like between the drain cleaner apparatus 200 and the cartridge 300). The check valve 306 may be configured to actuate to open a flow path between the cartridge reservoir 304 and the apparatus reservoir 202 and/or between the cartridge reservoir 304 and the dispenser device 204 in response to the drain cleaner apparatus 200 being coupled with the cartridge 300, so that the cartridge reservoir 304 is in fluid communication with the dispenser device 204 via the cartridge outlet 302A.

While, in FIGS. 3A and 3B, the check valve 306 is shown as being a part of the cartridge 300 such that the check valve 306 is fixed to the cartridge housing 302 (e.g., via adhesive and/or the cartridge housing 302 being a plastic material (e.g., high density polyethylene or HDPE) that is formed to at least partially enclose the check valve 306), example embodiments are not limited thereto. For example, in some example embodiments, the check valve 306 may be fixed to the apparatus reservoir 202 and/or the dispenser device 204. The check valve 306 may be included in a connector that is configured to couple with the cartridge 300 to establish the coupling between the drain cleaner apparatus 200 and the cartridge 300. For example, the check valve 306 may be included in a threaded connector, bayonet connector, friction fit connector, or the like. In another example, the check valve 306 may be removably (e.g., detachably) coupled to the apparatus reservoir 202 and/or the dispenser device 204 via a set of complementary connectors (e.g., threaded, bayonet, etc.), and the check valve 306 may be detached from the drain cleaner apparatus 200 and coupled to the cartridge 300 prior to coupling of the drain cleaner apparatus 200 with the cartridge 300, and the check valve 306 may be detached from the cartridge 300 subsequent to removal of an empty cartridge 300 from the drain cleaner apparatus 200 and then attached to a new, full cartridge 300 prior to coupling of the full cartridge 300 to the drain cleaner apparatus 200, such that a check valve 306 may be re-used between separate cartridges 300.

Accordingly, in some example embodiments, the apparatus reservoir 202 may be configured to receive a cartridge 300 that includes a cartridge reservoir 304 configured to hold the cleaning composition 230, and a cartridge outlet 302A, and the drain cleaner apparatus 200 may be configured to couple with the cartridge 300 so that the cartridge reservoir 304 is in fluid communication (e.g., via an open flow channel) with the dispenser device 204 via the cartridge outlet 302A. Additionally, in some example embodiments, the drain cleaner apparatus 200 or the cartridge 300 may include a check valve 306 that is configured to open in response to the drain cleaner apparatus 200 coupling with the cartridge 300 to establish the fluid communication between the cartridge reservoir 304 and the dispenser device 204 via the cartridge outlet 302A.

It will be understood that the dispenser device 204, the controller 210, the power supply 212, and/or the network communication interface 224 of the drain cleaner apparatus 200 of FIGS. 3A and 3B may be configured to operate similarly to the described operation thereof as presented herein with reference to the example embodiments shown in FIGS. 2A and 2B, except that replenishment of cleaning composition 230 held in the drain cleaner apparatus 200 is implemented via replacing the cartridge 300 coupled to the drain cleaner apparatus 200 instead of directly pouring cleaning composition 230 into the apparatus reservoir 202. It will further be understood that the dispenser device 204, the controller 210, the power supply 212, and/or the network communication interface 224 of the drain cleaner apparatus 200 of any of the example embodiments may be configured to operate similarly to the described operation thereof as presented herein with reference to the example embodiments shown in FIGS. 2A and 2B.

Figure 4:
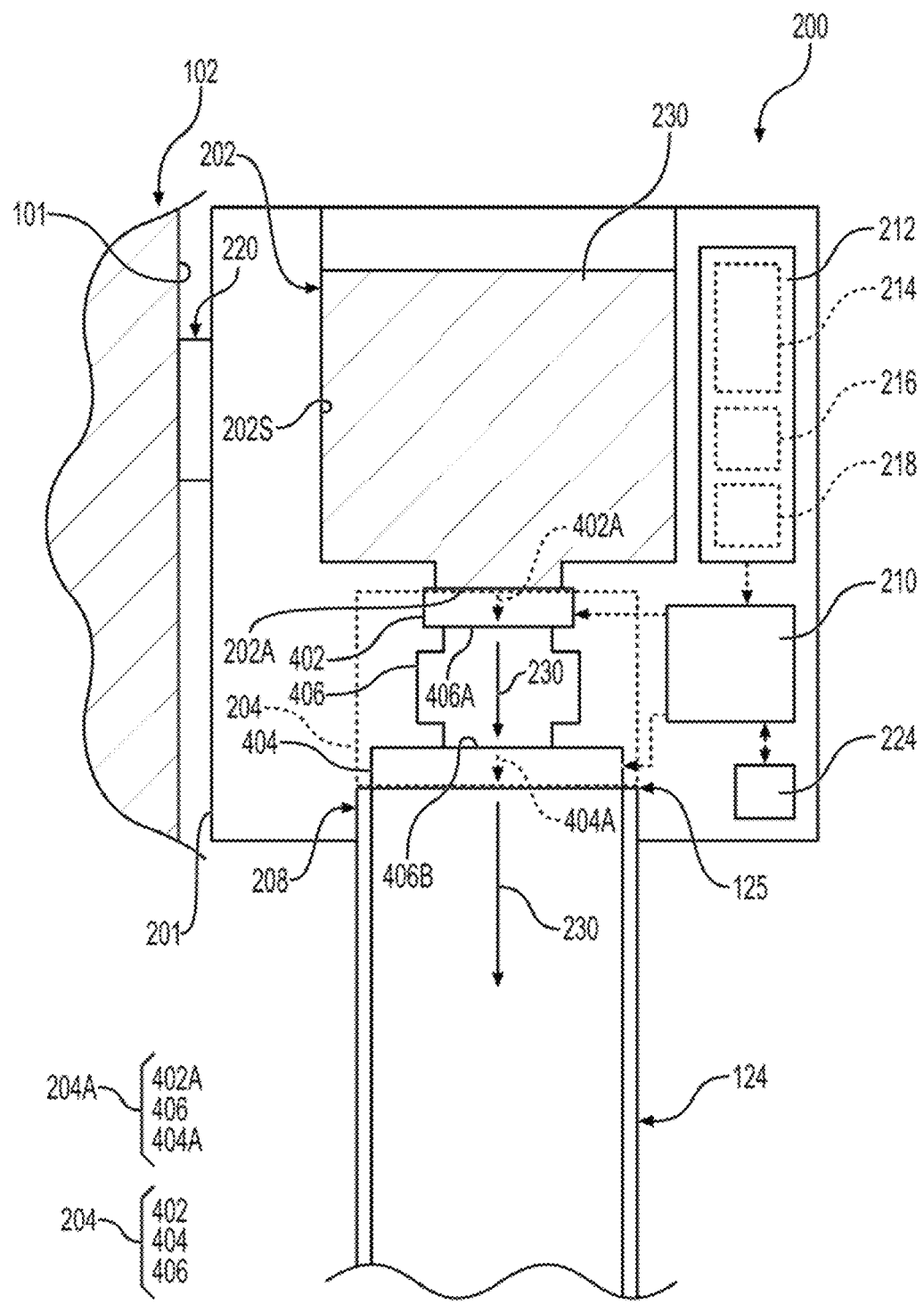
FIG. 4 is a schematic view of a drain cleaner apparatus including a dispenser device that further includes first and second valves and a dispenser reservoir according to some example embodiments.

FIG. 4 is a schematic view of a drain cleaner apparatus 200 including a dispenser device 204 that further includes first and second valves 402 and 404 and a dispenser reservoir 406 according to some example embodiments. Referring to FIG. 4 in reference to FIG. 1, the drain cleaner apparatus 200 is configured to dispense a cleaning composition 230 into a condensate drain line 124 of the air handler 102 shown in FIG. 1.

The drain cleaner apparatus 200 shown in FIG. 4 may include some or all of the same elements as the drain cleaner apparatus of any of the example embodiments. For example, the example embodiments shown in FIG. 4 include an apparatus reservoir 202 configured to directly hold cleaning composition 230, similarly to the example embodiments shown in FIGS. 2A and 2B, but it will be understood that the drain cleaner apparatus 200 shown in FIG. 4 may be configured to couple with a cartridge 300 as shown in FIGS. 3A and 3B instead of cleaning composition 230 being directly held (e.g., poured into) the apparatus reservoir 202 and/or the apparatus reservoir 202 may be entirely absent (e.g., where the dispenser device 204 is configured to couple with a cartridge 300 that is external to housing 201). Conversely, it will be understood that the drain cleaner apparatus 200 according to any of the example embodiments (e.g., the example embodiments shown in FIGS. 2A and 3B, the example embodiments shown in FIGS. 3A and 3B, or the like) may include the dispenser device 204 as shown in FIG. 4.

Referring to FIG. 4, in some example embodiments, the dispenser device 204 may include a dispenser reservoir 406 that is configured to hold the particular amount of the cleaning composition 230 that is to be dispensed when the dispenser device 204 is actuated. For example, the dispenser reservoir (which may be a container having two openings 406A and 406B as shown) may have an internal volume of exactly or about 3 oz.

The dispenser device 204 may include a first valve 402 between the apparatus reservoir 202 and the dispenser reservoir 406. The dispenser device 204 may further include a second valve 404 between the dispenser reservoir 406 and the apparatus outlet 206. As shown, the dispenser reservoir 406 may be directly between the first and second valves 402 and 404, where a first opening 406A of the dispenser reservoir 406 is connected to an outlet of the first valve 402 and the second opening 406B of the dispenser reservoir 406 is connected to an inlet of the second valve 404. The first and second valves 402 and 404 may each be any known type of valve, including for example a solenoid valve.

In some example embodiments, the first valve 402 is configured to be actuated (e.g., based on a control signal generated by the controller 210) to selectively open or close a first flow path 402A between the apparatus reservoir 202 and the dispenser reservoir 406, and the second valve 404 may be configured to be actuated (e.g., based on a separate control signal generated by the controller 210) to selectively open or close a second flow path 404A between the dispenser reservoir 406 and the apparatus outlet 206.

In some example embodiments, the controller 210 may be configured to actuate the dispenser device 204 based on causing the first valve 402 to open the first flow path 402A for a first period of time, to enable the dispenser reservoir 406 to be filled with an amount of the cleaning composition 230 from the apparatus reservoir 202. The controller 210 may cause the first valve 402 to remain open for a first period of time that is sufficiently long to fill the dispenser reservoir 406 from the apparatus reservoir 202 (and/or cartridge 300 in example embodiments where the drain cleaner apparatus 200 is configured to be coupled to a cartridge 300 as described with regard to FIGS. 3A and 3B) regardless of the amount of cleaning composition 230 held in the apparatus reservoir 202 (directly and/or via a cartridge 300 coupled to the drain cleaner apparatus 200), so that the dispenser reservoir 406 holds an amount of cleaning composition 230 that corresponds to (e.g., matches) the internal volume of the dispenser reservoir 406.

In some example embodiments, the controller 210 may be configured to, in response to an elapse of the first period of time, cause the first valve 402 to close the first flow path 402A to isolate the dispenser reservoir 406 from the apparatus reservoir 202, and cause the second valve 404 to open the second flow path 404A to enable the amount of the cleaning composition 230 held in the dispenser reservoir 406 to flow from the dispenser reservoir 406 to the apparatus outlet 408. As a result, the dispenser device 204 may be configured to cause an amount of cleaning composition 230 that is dispensed at each actuation of the dispenser device 204 to be controlled to be a particular amount which corresponds to the specific internal volume of the dispenser reservoir 406, so that the drain cleaner apparatus 200 is configured to improve the uniformity of the amount of cleaning composition 230 dispensed at each actuation of the dispenser device 204.

Figure 5:
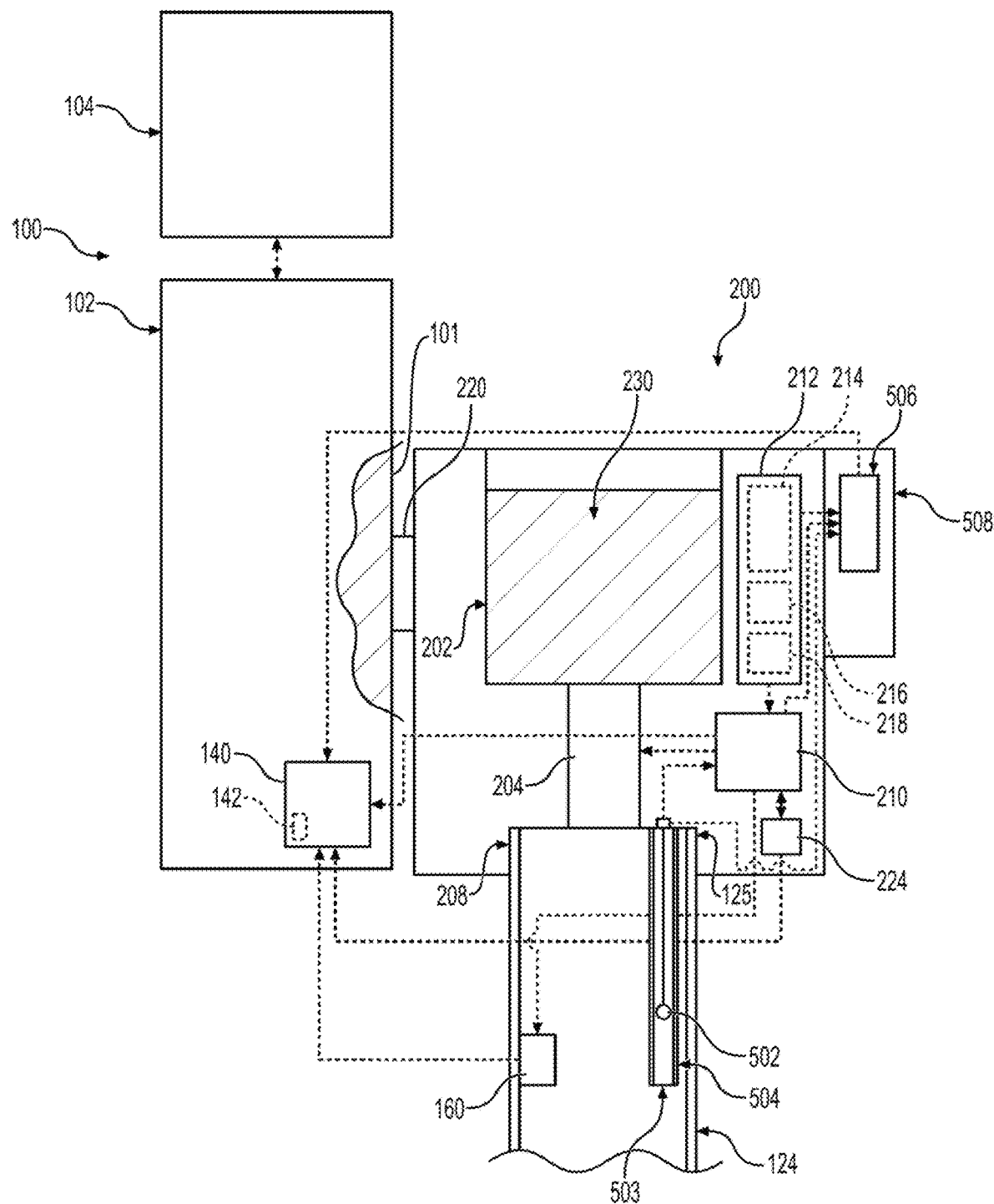
FIG. 5 is a schematic view of a drain cleaner apparatus including a moisture sensor according to some example embodiments.

FIG. 5 is a schematic view of a drain cleaner apparatus 200 including a moisture sensor 500 according to some example embodiments. Referring to FIG. 5 in reference to FIG. 1, the drain cleaner apparatus 200 is configured to dispense a cleaning composition 230 into a condensate drain line 124 of the air handler 102 shown in FIG. 1.

The drain cleaner apparatus 200 shown in FIG. 5 may include some or all of the same elements as the drain cleaner apparatus of any of the example embodiments. For example, the example embodiments shown in FIG. 5 include an apparatus reservoir 202 configured to directly hold cleaning composition 230, similarly to the example embodiments shown in FIGS. 2A and 2B, but it will be understood that the drain cleaner apparatus 200 shown in FIG. 5 may be configured to couple with a cartridge 300 as shown in FIGS. 3A and 3B instead of cleaning composition 230 being directly held (e.g., poured into) the apparatus reservoir 202 and/or the apparatus reservoir 202 may be entirely absent (e.g., where the dispenser device 204 is configured to couple with a cartridge 300 that is external to housing 201). Additionally, the drain cleaner apparatus 200 shown in FIG. 5 may include the dispenser device 204 shown in FIG. 4. Conversely, it will be understood that the drain cleaner apparatus 200 according to any of the example embodiments (e.g., the example embodiments shown in FIGS. 2A and 3B, the example embodiments shown in FIGS. 3A and 3B, the example embodiments shown in FIG. 4, or the like) may include some or all of the elements of the drain cleaner apparatus 200 as shown in FIG. 5.

Referring to FIG. 5, in some example embodiments, the drain cleaner apparatus 200 may include a moisture sensor 502 configured to extend through the opening 125 into the condensate drain line 124 based on the connector interface 208 being connected to the condensate drain line 124. The moisture sensor 502 may be any known moisture sensor, for example a sensor device that is configured to receive electrical power from power supply 212 (either directly or via controller 210 and including a switch that is closed in response to contact with a liquid such as water). The moisture sensor 502 may thus be configured to generate a signal based on contacting condensate backup in the condensate drain line 124.

Such a signal may be used (e.g., may be processed by controller 210) to make a determination that a backflow and/or overflow of condensate 120 in the condensate drain line 124 is occurring and/or is about to occur. The signal may be used to prompt a shutdown of at least a portion of the air conditioning system 100 (e.g., at least the air handler 102, including shutdown of at least one of the air mover 108, compressor 150, and/or air mover 154) which may reduce or stop accumulation of condensate 120 in the drip pan 122 and the condensate drain line 124, which may therefore reduce or prevent damage to the air handler 102 and/or structure 1 that may otherwise result from the backflow and/or overflow of condensate 120 in the condensate drain line 124.

In some example embodiments, the drain cleaner apparatus 200 may include a bypass device 506 that is configured to be actuated to cause at least the air handler 102 to shut down based on the signal generated by the moisture sensor 502. Such a bypass device may be a float switch bypass device that, when actuated, generates a signal that is transmitted to the controller 140 of the air conditioning system 100 and bypasses the float switch 160 of the air conditioning system 100 to serve as a float switch signal and thus cause the controller 140 to shut down some or all of the air conditioning system 100 (e.g., at least the air handler 102), which may include shutting down at least one of the air mover 108, compressor 150, and/or air mover 154.

In the example embodiments shown in FIG. 5, the bypass device 506 is a separate device in a housing 508 that is attached to the housing 201 of the drain cleaner apparatus 200, but example embodiments are not limited thereto. For example, the bypass device 506 may be included in and/or may be implemented by the controller 210, such that the controller 210 may generate a signal that causes the controller 140 to shut down some or all of the air conditioning system 100 (e.g., at least the air handler 102), which may include shutting down at least one of the air mover 108, compressor 150, and/or air mover 154. In some example embodiments, the controller 210 may be communicatively coupled between the moisture sensor 502 and the bypass device 506 (e.g., switch), and the controller 210 may be configured to actuate the bypass device 506 in response to the controller 210 processing a signal generated by the moisture sensor 502 to determine that the bypass device 506 is to be actuated.

In some example embodiments, the bypass device 506, the controller 210, and/or the network communication interface 224 may be communicatively coupled to the controller 140 of the air conditioning system to enable communication of a shutdown signal to the controller 140 in response to the signal generated by the moisture sensor 502. Such a communication coupling may be a wired communication link between the drain cleaner apparatus 200 and the controller 140, a wireless network communication link between the drain cleaner apparatus 200 and the controller 140. For example, the air conditioning system 100 may include a network communication interface 142 separate from, included in, and/or implemented by controller 140, and the controller 210, and/or the network communication interface 224 may be communicatively coupled to the controller 140 of the air conditioning system via a network communication link (e.g., wireless network communication link) between network communication interface 224 and a corresponding network communication interface 142 coupled to, included in, and/or implemented by controller 140 of the air conditioning system 100.

Still referring to FIG. 5, the drain cleaner apparatus 200 may include a containment tube 504 configured to extend through the opening 125 into the condensate drain line 124 based on the connector interface 208 being connected to the condensate drain line 124. As shown, the moisture sensor 502 may be located within an interior of the containment tube 504, and the containment tube 504 may have an open end 503 that is exposed to the interior of the condensate drain line 124. As a result, the containment tube 504 may be configured to isolate the moisture sensor 502 from generating a signal based on the cleaning composition 230 being dispensed by the dispenser device 204 through the apparatus outlet 206, thereby reducing or preventing the risk of a false-positive signal being generated by the moisture sensor 502. The containment tube 504 may further be configured to expose the moisture sensor 502 to the condensate drain line 124 through the open end 503 of the containment tube 504, to enable a condensate 120 backup in the condensate drain line 124 to pass into the interior of the containment tube 504 to contact the moisture sensor 502 and thus enable the moisture sensor 502 to generate the signal indicating condensate 120 backflow/overflow.

While FIG. 5 shows the bypass device 506, in some example embodiments the bypass device 506 and housing 508 may be omitted and the controller 210 may be communicatively coupled to the float switch 160 of the air handler 102 and may be configured to cause the float switch 160 to actuate to cause some or all of the air conditioning system 100 to shut down (e.g., based on operation of the controller 140 in response to float switch 160 actuation) based on the signal generated by the moisture sensor 502.

In some example embodiments, the drain cleaner apparatus 200 may include a network communication interface 224 that is configured to establish a network communication link with a remote computing device, as described herein, and the controller 210 may be configured to generate and transmit a warning signal to the remote computing device via the network communication link in response to detection of the signal generated by the moisture sensor 502. As a result, the drain cleaner apparatus 200 may be configured to warn a human user supported by the remote computing device of the occurrence of the detected backflow/overflow of condensate 120 in the condensate drain line 124.

Figure 6:
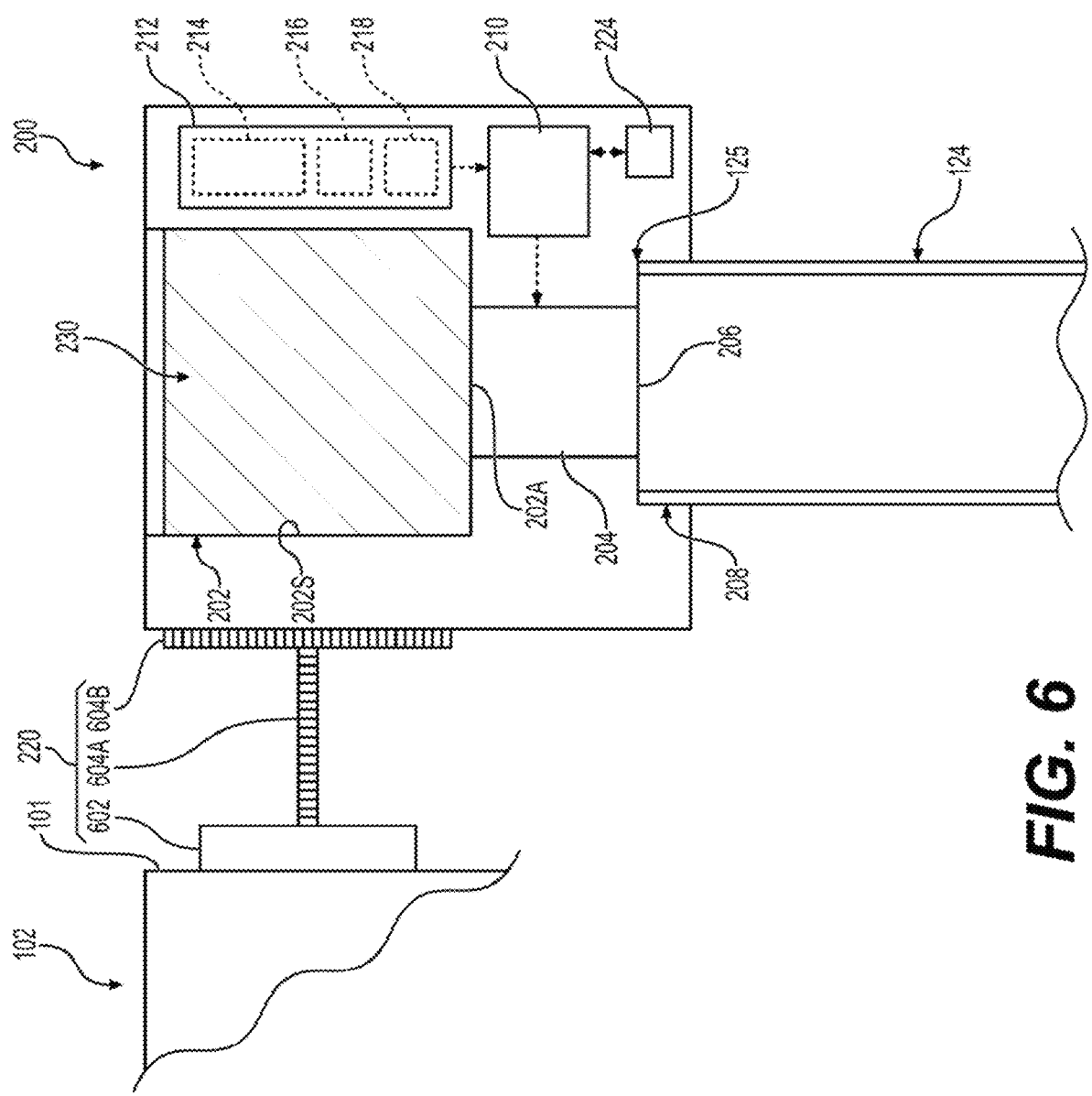
FIG. 6 is a schematic view of a drain cleaner apparatus including a structure connector according to some example embodiments.

FIG. 6 is a schematic view of a drain cleaner apparatus 200 including a structure connector 220 according to some example embodiments. Referring to FIG. 6 in reference to FIG. 1, the drain cleaner apparatus 200 is configured to dispense a cleaning composition 230 into a condensate drain line 124 of the air handler 102 shown in FIG. 1.

The drain cleaner apparatus 200 shown in FIG. 6 may include some or all of the same elements as the drain cleaner apparatus of any of the example embodiments. For example, the example embodiments shown in FIG. 6 include an apparatus reservoir 202 configured to directly hold cleaning composition 230, similarly to the example embodiments shown in FIGS. 2A and 2B, but it will be understood that the drain cleaner apparatus 200 shown in FIG. 6 may be configured to couple with a cartridge 300 as shown in FIGS. 3A and 3B instead of cleaning composition 230 being directly held (e.g., poured into) the apparatus reservoir 202 and/or the apparatus reservoir 202 may be entirely absent (e.g., where the dispenser device 204 is configured to couple with a cartridge 300 that is external to housing 201). Additionally, the drain cleaner apparatus 200 shown in FIG. 6 may include the dispenser device 204 shown in FIG. 4. Additionally, the drain cleaner apparatus 200 shown in FIG. 6 may include the moisture sensor 502, containment tube 504, and/or bypass device 506 as shown in FIG. 5. Conversely, it will be understood that the drain cleaner apparatus 200 according to any of the example embodiments (e.g., the example embodiments shown in FIGS. 2A and 3B, the example embodiments shown in FIGS. 3A and 3B, the example embodiments shown in FIG. 4, the example embodiments shown in FIG. 5, or the like) may include some or all of the elements of the drain cleaner apparatus 200 as shown in FIG. 6.

In some example embodiments, the drain cleaner apparatus 200 may include a structure connector 220 that includes a coupler 602 that is configured to attach to an outer surface of an external structure, such as an outer surface of a housing 101 of the air handler 102. The coupler 602 may include a magnetic bracket (e.g., any known magnet) that is configured to magnetically attach to a metal surface of the external structure (e.g., a metal surface of the housing 101). The coupler 602 may enable the structure connector 220 to couple to the external structure to hold the drain cleaner apparatus 200 in place in relation to the condensate drain line 124.

In some example embodiments, the structure connector 220 may include a set of lateral and vertical adjustable brackets 604A and 604B, respectively. The lateral and vertical adjustable brackets 604A and 604B may each be an adjustable actuator and/or an adjustable bracket (e.g., adjustable mounting bracket), including for example an adjustable tooth bracket (e.g., an adjustable tooth gear, adjustable worm screw and/or worm gear, adjustable rack and pinion, etc.) that is configured to adjustably position the coupler 602, in both a horizontal direction and a vertical direction, respectively, in relation to a remainder of the drain cleaner apparatus 200. As a result, the set of lateral and vertical adjustable brackets 604A and 604B, together with the coupler 602, may enable adjustable positioning of the drain cleaner apparatus 200 in relation to the external structure (e.g., air handler 102) to which the coupler 602 is attached and/or in relation to the condensate drain line 124.

Figure 7:
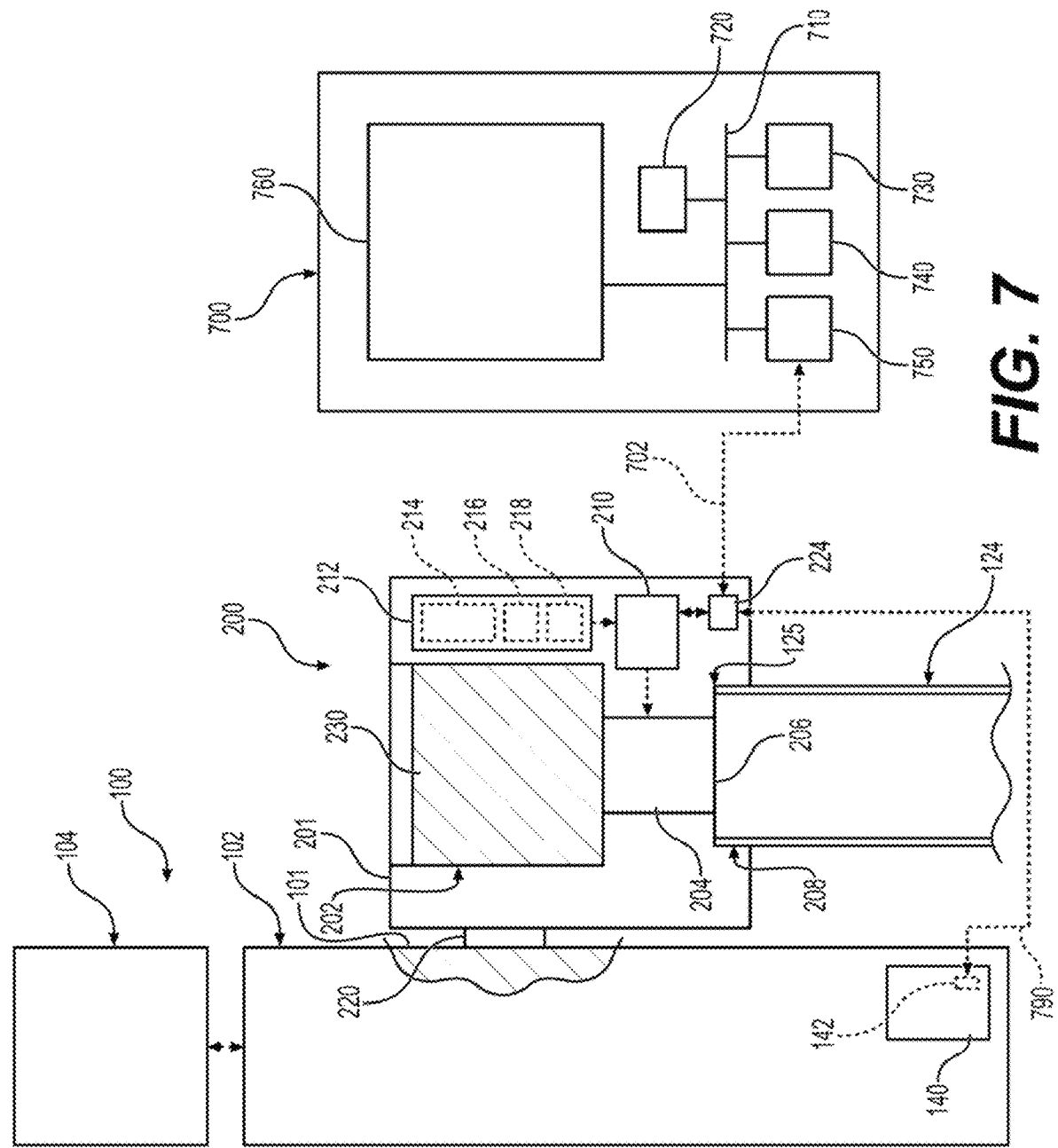
FIG. 7 is a schematic view of a drain cleaner apparatus and a remote computing device communicatively coupled via a network communication link according to some example embodiments.

FIG. 7 is a schematic view of a drain cleaner apparatus 200 and a remote computing device 700 communicatively coupled via a network communication link 702 according to some example embodiments. Referring to FIG. 7 in reference to FIG. 1, the drain cleaner apparatus 200 is configured to dispense a cleaning composition 230 into a condensate drain line 124 of the air handler 102 shown in FIG. 1.

The drain cleaner apparatus 200 shown in FIG. 7 may include some or all of the same elements as the drain cleaner apparatus of any of the example embodiments. For example, the example embodiments shown in FIG. 7 include an apparatus reservoir 202 configured to directly hold cleaning composition 230, similarly to the example embodiments shown in FIGS. 2A and 2B, but it will be understood that the drain cleaner apparatus 200 shown in FIG. 7 may be configured to couple with a cartridge 300 as shown in FIGS. 3A and 3B instead of cleaning composition 230 being directly held (e.g., poured into) the apparatus reservoir 202 and/or the apparatus reservoir 202 may be entirely absent (e.g., where the dispenser device 204 is configured to couple with a cartridge 300 that is external to housing 201). Additionally, the drain cleaner apparatus 200 shown in FIG. 7 may include the dispenser device 204 shown in FIG. 4. Additionally, the drain cleaner apparatus 200 shown in FIG. 7 may include the moisture sensor 502, containment tube 504, and/or bypass device 506 as shown in FIG. 5. Additionally, the drain cleaner apparatus 200 shown in FIG. 7 may include the structure connector 220 as shown in FIG. 6. Conversely, it will be understood that the drain cleaner apparatus 200 according to any of the example embodiments (e.g., the example embodiments shown in FIGS. 2A and 3B, the example embodiments shown in FIGS. 3A and 3B, the example embodiments shown in FIG. 4, the example embodiments shown in FIG. 5, the example embodiments shown in FIG. 6, or the like) may include some or all of the elements of the drain cleaner apparatus 200 as shown in FIG. 7.

In some example embodiments, the drain cleaner apparatus 200 includes a network communication interface 224 (e.g., a wireless network communication transceiver) that is configured to establish a network communication link with a remote computing device 700. The remote computing device 700 may be configured to support a human user.

As shown, the remote computing device 700 may include a processor 720 (e.g., a CPU), a memory 730 (e.g., a SSD), a power supply 740 (e.g., a rechargeable battery), a network communication interface 750 (e.g., a wireless network communication transceiver), and an interface 760 that may include a display device (e.g., an LED display panel, an OLED display panel, or the like) a button, a touchscreen display device, any combination thereof, or the like that are communicatively and/or electrically coupled via a bus connection 710.

At least some of the remote computing device 700, including for example the processor 720, the memory 730, the network communication interface 750, or any combination thereof, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. It will be understood that any type of non-transitory computer readable storage device may be used as the memory 730 in addition or alternative to an SSD. In some example embodiments, the processing circuitry may include a non-transitory computer readable storage device, or memory (e.g., memory 730), for example a solid state drive (SSD), storing a program of instructions, and a processor (e.g., processor 720) that is communicatively coupled to the non-transitory computer readable storage device (e.g., via a bus connection 710) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, any part of the remote computing device 700) will be understood to implement the functionality of said implemented element (e.g., the functionality of the remote computing device 700).

As shown, the network communication interface 224 of the drain cleaner apparatus 200 may be configured to establish a network communication link 702 with the remote computing device 700 (e.g., with network communication interface 750) and may be configured to implement one-way or two-way communication between the drain cleaner apparatus 200 and the remote computing device 700.

In some example embodiments, the controller 210 is configured to generate and transmit signals to the remote computing device 700 via the wireless network communication link 702.

In some example embodiments, the controller 210 may communicate signals over the network communication link 702 that indicate operations of the controller 210 (e.g., indicating actuation of the dispenser device 204 at particular points in time, a present timer value, a present counter value, etc.). In some example embodiments, the controller 210 may communicate the depletion signal (generated in response to the counter value reaching a threshold value) to the remote computing device 700 via the network communication link 702.

In some example embodiments, the controller 210 may be configured to perform operations in response to receiving signals from the remote computing device 700 via the network communication link 702. Such signals may be generated at the remote computing device 700 based on operation of at least a portion of the remote computing device 700 (e.g., based on operation of the processor 720), which may be based on human user interaction with at least a portion of an interface of the remote computing device 700 (e.g., the display screen interface 760, which may be a touchscreen display). For example, the remote computing device 700 may generate a reset signal based on human interaction with a display screen interface 760 to indicate that the amount of cleaning composition 230 held in the drain cleaner apparatus 200 has been replenished (e.g., via replacement of a cartridge 300 coupled to the drain cleaner apparatus 200). The remote computing device 700 may transmit the reset signal to the drain cleaner apparatus 200 via the network communication link 702, and the controller 210 may be configured to cause the counter value of the counter value to be reset to an initial counter value (e.g., 0) in response to receiving the reset signal from the remote computing device 700 via the network communication link 702. As a result, a human user may be able to remotely reset the counter value used by the drain cleaner apparatus 200 in response to cleaning composition 230 replenishment without direct interaction with the drain cleaner apparatus (e.g., via a button on the drain cleaner interface).

Referring to FIGS. 5 and 7, in some example embodiments, the controller 210 may be configured to generate and transmit a warning signal to the remote computing device 700 via the network communication link 702 in response to detection of a signal generated by the moisture sensor 502. As a result, the drain cleaner apparatus 200 may be configured to warn a human user supported by the remote computing device 700 of the occurrence of the detected backflow/overflow of condensate 120 in the condensate drain line 124.

In some example embodiments, the controller 210 may be configured to cause some or all of the air conditioning system 100 to shut down in response to receiving a shutdown command signal from the remote computing device 700 via the network communication link 702. For example, the remote computing device 700 may display a warning notification to a supported user (e.g., via display screen interface 760) in response to receiving the warning signal to the remote computing device 700. The remote computing device 700 may enable the human user to interact with the interface 760 (e.g., a touchscreen display) to command the remote computing device 700 to transmit a shutdown signal to the drain cleaner apparatus 200 in response to the warning signal via the network communication link 702. The remote computing device 700 may transmit the shutdown signal to the drain cleaner apparatus 200 via the network communication link 702. The controller 210 may generate a signal to cause some or all of the air conditioning system 100 to shut down (e.g., transmit a signal to the controller 140 via a network communication link 790 with a network communication interface of the air conditioning system 100 that may be included in and/or implemented by controller 140 to cause the controller 140 to shut down some or all of the air conditioning system 100, actuate the bypass device 506 and/or the float switch 160, etc.) in response to receiving the shutdown signal.

In some example embodiments, the remote computing device 700 may enable the human user to interact with the interface 760 (e.g., via a touchscreen display) to command the remote computing device 700 to transmit a dispensing signal to the drain cleaner apparatus 200 to cause the controller 210 to implement an immediate actuation of the dispenser device 204 to immediately dispense an amount of the cleaning composition 230, thereby allowing more frequent or user-commanded dispensings of cleaning composition. The remote computing device may transmit the dispensing signal to the drain cleaner apparatus 200 via the network communication link 702, and the controller 210 may actuate the dispenser device 204 in response to receiving the dispensing signal.

Figure 8:
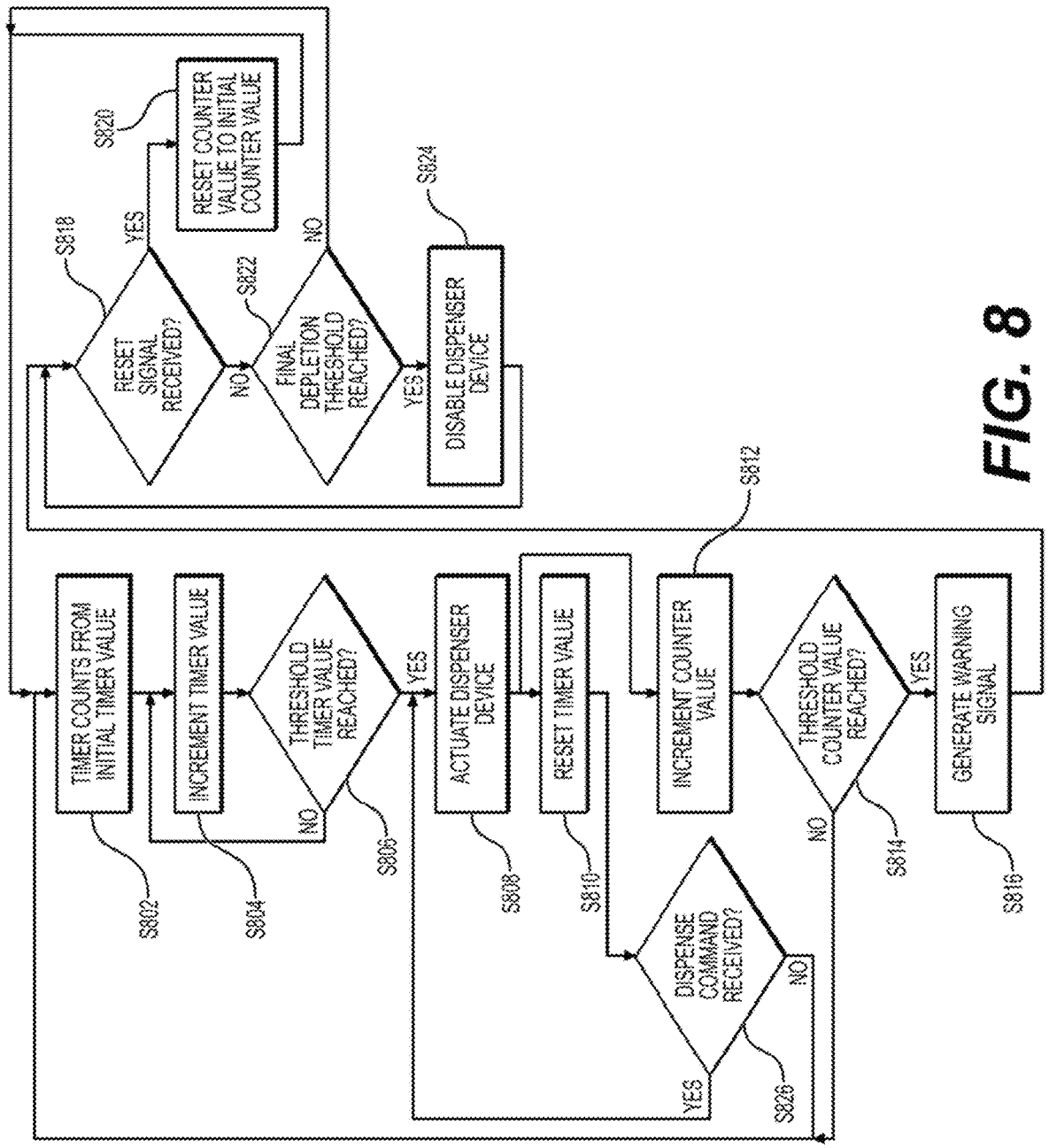
FIG. 8 is a flowchart illustrating a method of operation of the drain cleaner apparatus according to some example embodiments.

FIG. 8 is a flowchart illustrating a method of operation of the drain cleaner apparatus according to some example embodiments. The method shown in FIG. 8 may be implemented by any example embodiment of the drain cleaner apparatus 200 according to any example embodiments.

It will be understood that operations of the method shown in FIG. 8 may be changed in order relative to what is shown in FIG. 8. It will further be understood that one or more operations of the method shown in FIG. 8 may be omitted from the method shown in FIG. 8. It will further be understood that one or more operations may be added to the method shown in FIG. 8.

The method shown in FIG. 8 includes a method for operating a drain cleaner apparatus 200 according to any of the example embodiments to dispense a cleaning composition 230 into a condensate drain line 124 of an air handler 102, where the drain cleaner apparatus 200 is coupled with the condensate drain line 124 such that an apparatus outlet 206 of the drain cleaner apparatus 200 is in fluid communication with an opening 125 of the condensate drain line 124. As shown, the method of FIG. 8 includes controlling a dispenser device 204 of the drain cleaner apparatus 200 to cause the dispenser device 204 to selectively dispense an amount (e.g., 3 oz) of the cleaning composition 230 from an apparatus reservoir 202 of the drain cleaner apparatus 200 and through the apparatus outlet 206 without manual intervention (e.g., without human intervention). It will be understood that some or any of the operations shown in FIG. 8 may be performed (e.g., performed by controller 210) without human intervention (e.g., some or any operations may be performed by controller 210 based on programming of the controller 210 and may be performed independently of any commands or signals received at the controller 210 based on human interaction with an interface (e.g., button, touchscreen display, etc.).

At S802 and S804, a timer of the controller 210 may count (e.g., increment a timer value at a fixed frequency) from an initial timer value (e.g., 0). At S806, the controller 210 compares the timer value with a threshold (e.g., particular) timer value (e.g., 7 days) that may be stored at the controller 210 and determines whether the present timer value has reached (e.g., is equal to or greater than) the threshold timer value. If not, the controller 210 permits the timer to continue to increment at S804. If so, at S808, the controller 210 actuates the dispenser device 204 in response to cause the dispenser device 204 to dispense a particular amount of cleaning composition 230 (e.g., 3 oz), thereby actuating the dispenser device 204 in response to an elapse of a particular period of time.

The amount of cleaning composition 230 that is dispensed at S808 may be based on structural features of the dispenser device 204 and control thereof. For example, referring to FIG. 4, in example embodiments where the dispenser device 204 includes a dispenser reservoir 406 that is configured to hold the amount of the cleaning composition (e.g., 3 oz internal value), a first valve 402 between the apparatus reservoir 202 and the dispenser reservoir 406 and configured to be actuated to selectively open or close a first flow path 402A between the apparatus reservoir 202 and the dispenser reservoir 406, and a second valve 404 between the dispenser reservoir 406 and the apparatus outlet 206 and configured to be actuated to selectively open or close a second flow path 404A between the dispenser reservoir 406 and the apparatus outlet 206, the actuating of the dispenser device at S808 may include generating a signal to cause the first valve 402 to open the first flow path 402A for a first period of time (e.g., 5 seconds), to enable the dispenser reservoir 406 to be filled (e.g., completely filled) with the amount of the cleaning composition 230 (e.g., an amount corresponding to the internal volume of the dispenser reservoir 406) from the apparatus reservoir 202, and, in response to an elapse of the first period of time, causing the first valve 402 to close the first flow path 402A to isolate the dispenser reservoir 406 from the apparatus reservoir 202 and causing the second valve 404 to open the second flow path 404A to enable the amount of the cleaning composition to flow from the dispenser reservoir 406 to the apparatus outlet 206 and thus to be dispensed through opening 125 into the condensate drain line 124.

At S810, in response to the actuating at S808, the controller 210 causes the timer to reset to the initial timer value (0) and resume counting to enable a repeated performance of S802-S808 (at least partially depending upon an outcome of the determination at S826, described further below), thereby repeatedly actuating the dispenser device 204 at a fixed time interval that is the particular period of time, based on monitoring a timer that increments a timer value at a fixed frequency at S802-S806, actuating the dispenser device 204 at S808 in response to the timer value reaching a particular time value corresponding to the elapse of the particular period of time, and resetting the timer value to an initial timer value at S810 in response to actuating the dispenser device at S808.

At S812, in response to the actuating at S808, the controller 210 causes a counter to count (e.g., increment) a counter value from an initial counter value (e.g., 0), thereby tracking a quantity of actuations (S808) and thus a cumulative amount of cleaning composition 230 dispensed.

At S814 the controller 210 compares the counter value with a threshold (e.g., particular) counter value (e.g., 10, 11, 12, etc.) that may be stored at the controller 210 and determines whether the present counter value has reached (e.g., is equal to or greater than) the threshold counter value. If not, the controller 210 returns to S802 and continues the method. If so, at S816, the controller 210 generates a warning signal. The controller 210 may monitor multiple possible threshold values, including a partial depletion threshold counter value (e.g., 10 and/or 11) and a final depletion threshold counter value (e.g., 12) and the controller 210 may generate a particular warning signal (e.g., indicating partial depletion or final depletion (e.g., complete depletion) of cleaning composition 230 held in the drain cleaner apparatus 200) based on which threshold is determined to be reached at S814.

At S818, a determination is made regarding whether to reset the counter to the initial counter value. The determination may include a determination of whether a reset signal that indicates a command to reset the counter value is received. Such a determination may be based upon receiving a reset signal, which may be received from a counter reset interface 222 of the drain cleaner apparatus 200 (e.g., a button) and/or from a remote computing device 700 via a network communication link 702 (e.g., via network communication interface 224). If a reset is determined to be commanded at S818 (e.g., a reset signal is determined to be received at S818), at S820 the controller 210 resets the counter value to the initial counter value. If not, at S822 a further determination is made regarding whether the threshold determined to be reached at S814 is a final depletion threshold (e.g., 12) that indicates complete depletion (e.g., final depletion) of cleaning composition 230 in the drain cleaner apparatus 200. If not, (e.g., a partial depletion threshold of 11 was determined to be reached at S814), then the method returns to S802. If so, at S824 the controller 210 may inhibit further operation of the dispenser device 204 (e.g., disable the dispenser device 204) until a determination is made at S818 to perform a reset at S820 (e.g., until a reset signal is determined to be received at S818). Such operations at S822 and S824 may reduce or prevent the likelihood of the drain cleaner apparatus 200 continuing to actuate the dispenser device 204 in the absence of cleaning composition 230 in the drain cleaner apparatus 200. At S824, the controller 210 may further generate another warning signal indicating that the dispenser device 204 is inhibited (e.g., disabled). Additionally or alternatively, such an indication may be included in the warning signal generated at S816 in response to a determination at S814 that a final threshold counter value is reached.

At S826, a determination is made regarding whether a dispensing command is received, for example based on human interaction with an interface (e.g., button) of the drain cleaner apparatus 200 and/or based on a dispensing signal being receive from a remote computing device 700 via a network communication link based on a dispensing of cleaning composition 230 being commanded at the remote computing device 700. If not, the method continues at S802. If so, the method moves to S808 and the controller 210 actuates the dispenser device 204.

Figure 9:
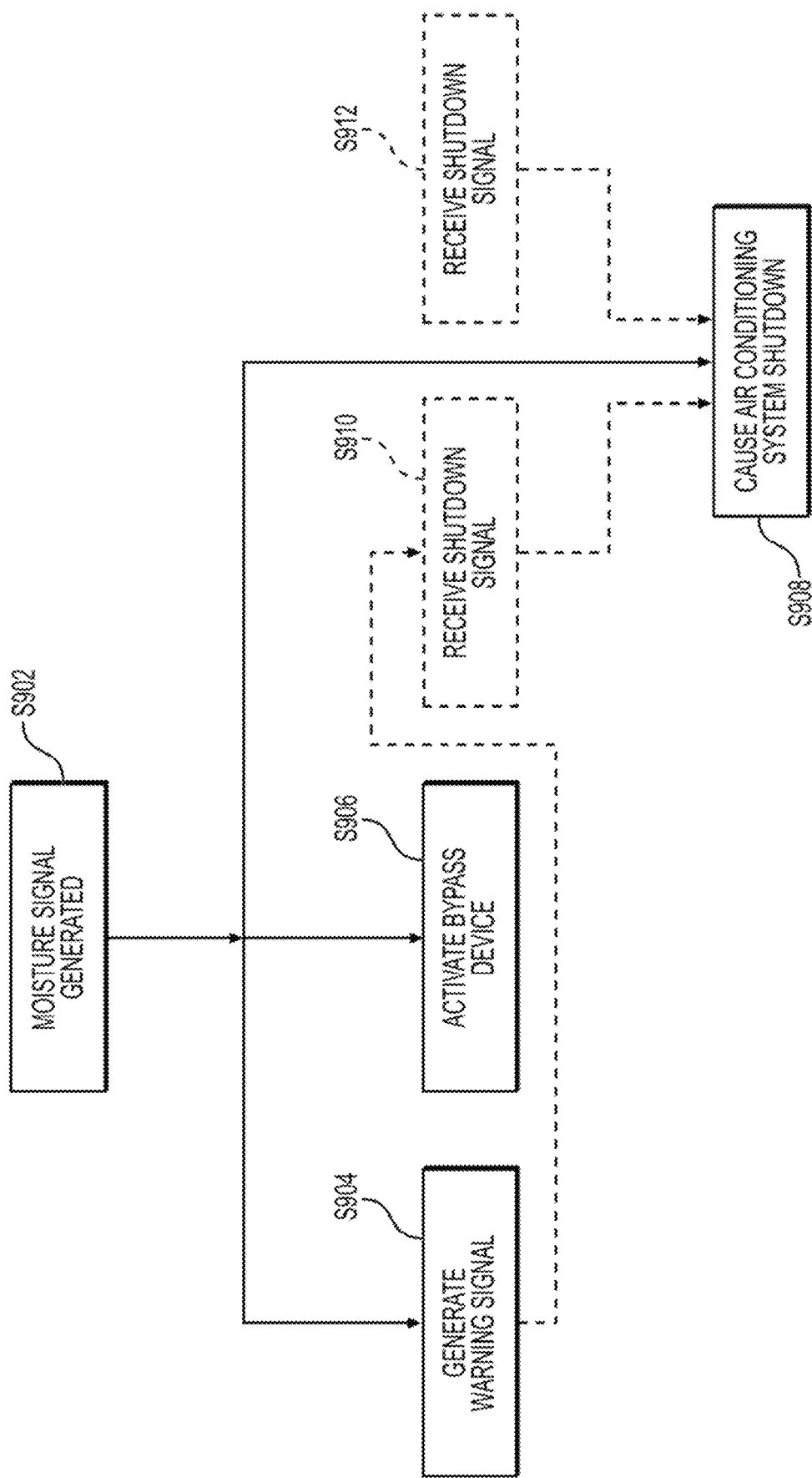
FIG. 9 is a flowchart illustrating a method of operation of the drain cleaner apparatus according to some example embodiments.

FIG. 9 is a flowchart illustrating a method of operation of the drain cleaner apparatus according to some example embodiments. The method shown in FIG. 9 may be implemented by any example embodiment of the drain cleaner apparatus 200 according to any example embodiments.

It will be understood that operations of the method shown in FIG. 9 may be changed in order relative to what is shown in FIG. 9. It will further be understood that one or more operations of the method shown in FIG. 9 may be omitted from the method shown in FIG. 9. It will further be understood that one or more operations may be added to the method shown in FIG. 9.

At S902, a moisture sensor 502 of the drain cleaner apparatus 200, which is coupled to the condensate drain line 124 such that the moisture sensor 502 is within the condensate drain line 124, generates a signal in response to contact thereof with moisture (e.g., liquid, including water) within a condensate drain line 124. Such moisture (e.g., liquid) may contact the moisture sensor 502 based on entering an open end 503 of a containment tube 504 in which the moisture sensor 502 is located.

At S904, the controller 210 generates a warning signal in response to receiving and processing the signal generated by the moisture sensor 502 at S902. The controller 210 may cause the warning signal to be transmitted to a remote computing device 700 via a network communication link 702 therewith according to any example embodiments.

At S906, the controller 210 may generate a shutdown signal that causes some or all of the air conditioning system 100 (e.g., at least the air handler 102) to shut down in response to receiving and processing the signal generated by the moisture sensor 502 at S902. The controller 210 may transmit the signal to a bypass device 506 to actuate the bypass device 506 which causes the controller 140 of the air conditioning system 100 to partially or completely shut down the air conditioning system 100 as described herein. At S906, the controller 210 may transmit the signal to a float switch 160 of the air conditioning system 100, additionally or alternatively to transmitting the signal to the bypass device 506, to actuate the float switch 160 which causes the controller 140 of the air conditioning system 100 to partially or completely shut down the air conditioning system 100 as described herein.

At S908, the controller 210 may generate a shutdown signal that causes at least a portion of the air conditioning system 100 (e.g., at least the air handler 102) to shut down in response to receiving and processing the signal generated by the moisture sensor 502 at S902. The controller 210 may transmit the shutdown signal directly to the controller of the air conditioning system where the signal is processed by the controller 140 and cusses the controller 140 to shut down some or all of the air conditioning system 100 (e.g., shut down at least the air handler 102) as described herein.

As shown in FIG. 9, in some example embodiments, the controller 210 may receive a shutdown signal at S910 from a remote computing device 700, subsequently to transmitting the warning signal to the remote computing device 700 at S904. The remote computing device 700 may generate the shutdown signal automatically (e.g., without human intervention) in response to receiving the warning signal that is generated at S904. The remote computing device 700 may generate the shutdown signal in response to human user interaction with the remote computing device 700.

As shown in FIG. 9, in some example embodiments, the controller 210 may receive a shutdown signal at S912 from a remote computing device 700. The remote computing device 700 may generate the shutdown signal automatically (e.g., without human intervention) or in response to human user interaction with the remote computing device 700. The shutdown signal may be received at S912 independently of any warning signal generated at S904—while the shutdown signal may be generated at the remote computing device 700 and transmitted to the drain cleaner apparatus 200 to be received at the controller 210 at S910 in response to the warning signal generated at S904, the shutdown signal that is generated at the remote computing device 700 and transmitted to the drain cleaner apparatus 200 to be received at the controller 210 at S912 may be generated, transmitted, and received independently of any signal generated at the drain cleaner apparatus 200.

In some example embodiments, the controller 210 may generate a shutdown signal at S908 that causes some or all of the air conditioning system 100 (e.g., at least the air handler 102) to shut down in response to receiving the shutdown command at S910 and/or S912. In some example embodiments, the controller 210 may generate a shutdown signal at S908 independently of any signal generated by the moisture sensor at S902 (e.g., the controller 210 may generate a shutdown signal at S908 in response to receiving the shutdown signal at S912).

Figure 10:
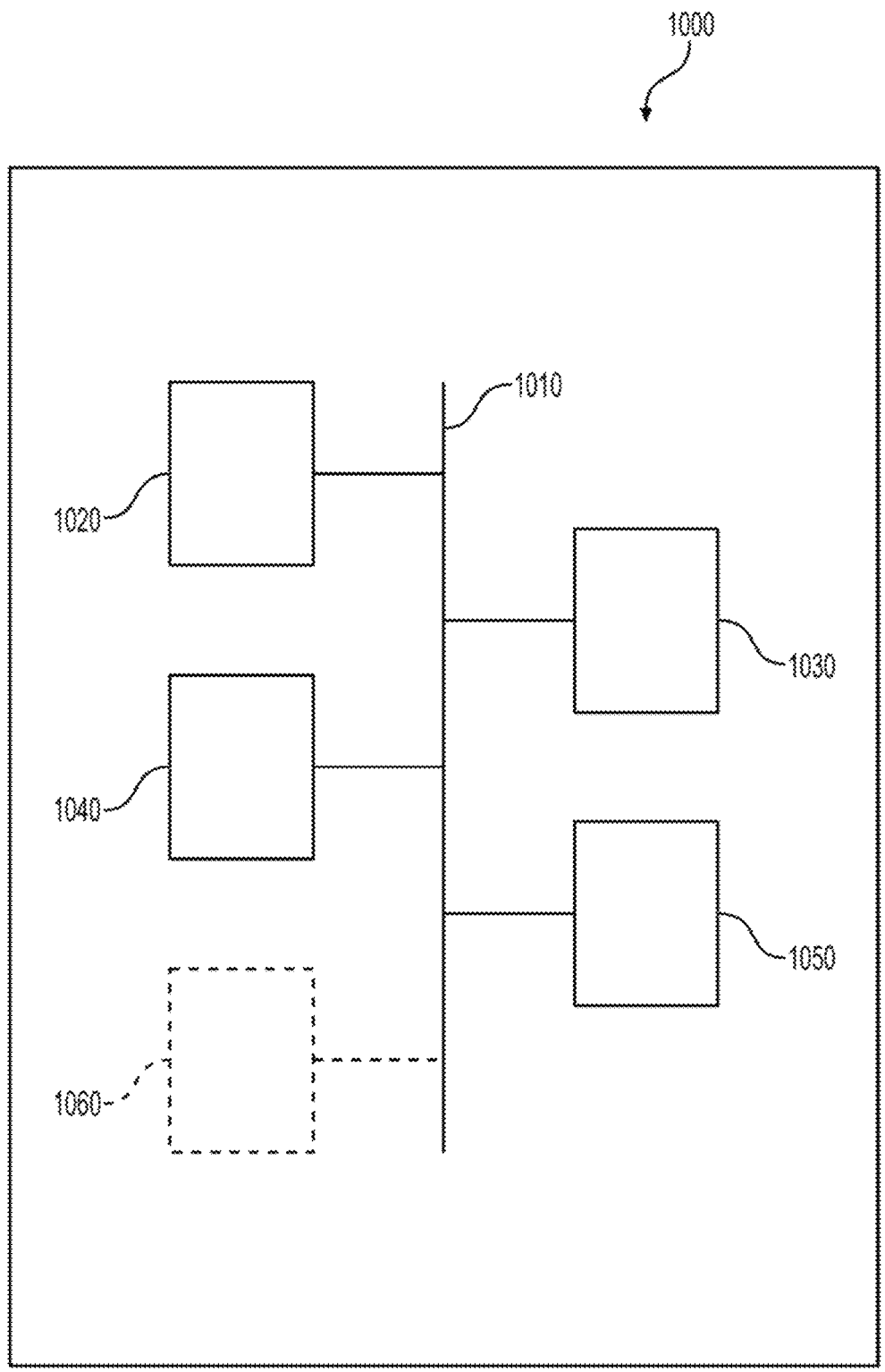
FIG. 10 is a schematic view of a computing device according to some example embodiments.

FIG. 10 is a schematic view of a controller of a computing device 1000 according to some example embodiments. The computing device 1000 may implement any of the computing devices, controllers, processors, or the like according to any of the example embodiments, including controller 140, controller 210, and any portion of remote computing device 700.

As shown in FIG. 10, the computing device 1000 may include some or all of a processor 1020 (e.g., a CPU), a memory 1030 (e.g., a solid state drive, or SSD), a communication interface 1040 (e.g., a wireless network communication interface, which may for example implement network communication interface 224, network communication interface 750, network communication interface 142, a network communication interface of the air conditioning system 100, or the like), and a power supply 1050 that are communicatively coupled together via a bus connection 1010. It will be understood that any type of non-transitory computer readable storage device may be used as the memory 1030 in addition or alternative to an SSD. The computing device 1000 may include additional devices, including a user interface device 1060 (e.g., "interface") that may include a display device (e.g., an LED display screen, OLED display screen, etc.), a touchscreen display, a button interface, any combination thereof, or the like. The user interface device 1060 may be communicatively coupled to the bus connection 1010.

In some example embodiments, some or all of any of the computing device 1000 may include, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. In some example embodiments, the processing circuitry may include a non-transitory computer readable storage device, or memory (e.g., memory 1030), for example a solid state drive (SSD), storing a program of instructions, and a processor (e.g., processor 1020) that is communicatively coupled to the non-transitory computer readable storage device (e.g., via a bus connection 1010) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, etc.) that is described as "implementing" an element (e.g., controller 210, drain cleaner apparatus 200, controller 140, air conditioning system 100, remote computing device 700, etc.) will be understood to implement the functionality of said implemented element and/or any other elements (e.g., the functionality of the controller 210, the functionality of the drain cleaner apparatus 200, the functionality of the controller 140, the functionality of the air conditioning system, the functionality of the remote computing device 700, etc.).

Figure 11A:
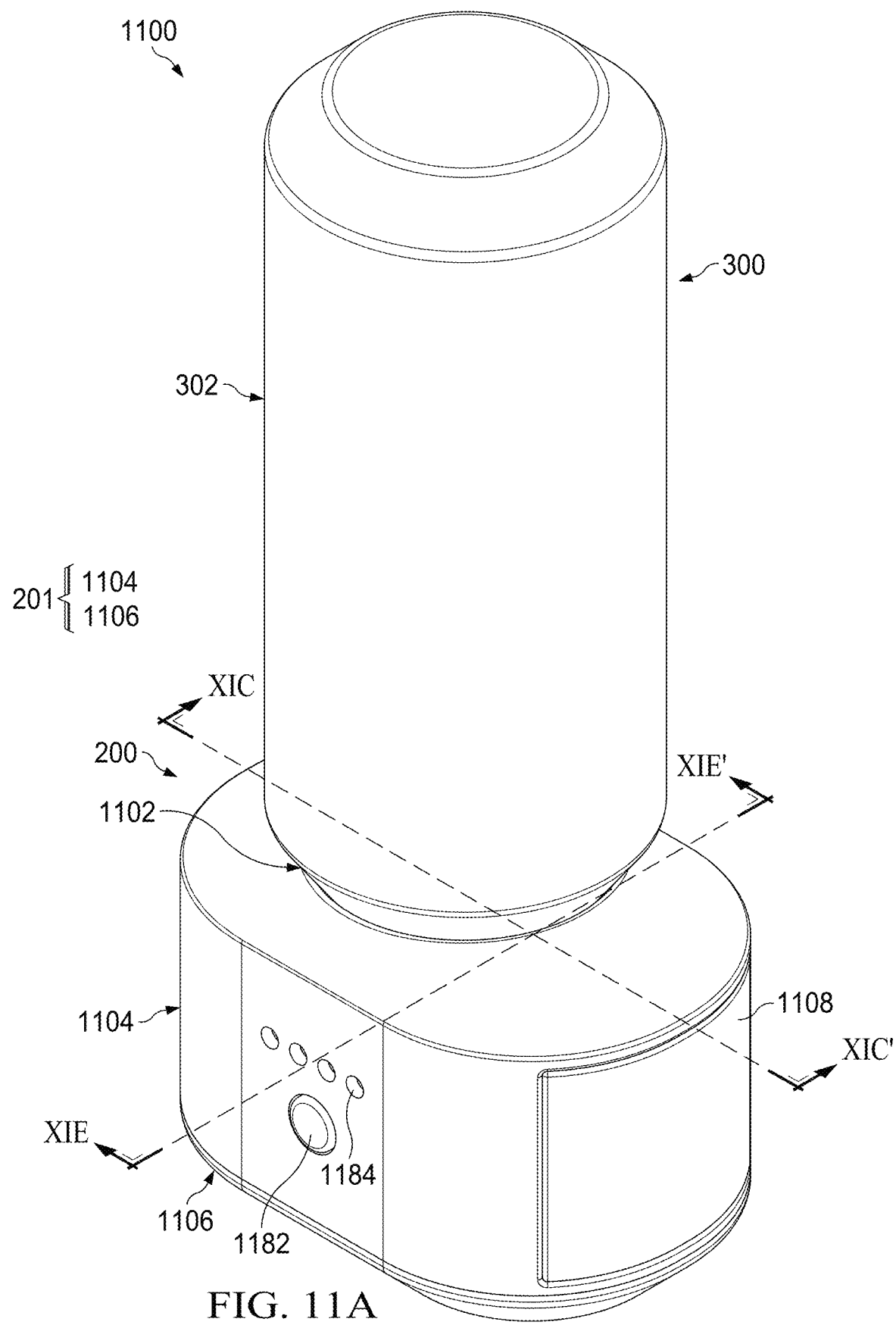
FIG. 11A is a perspective top-front-right view of a drain cleaner apparatus system according to some example embodiments.
Figure 11B:
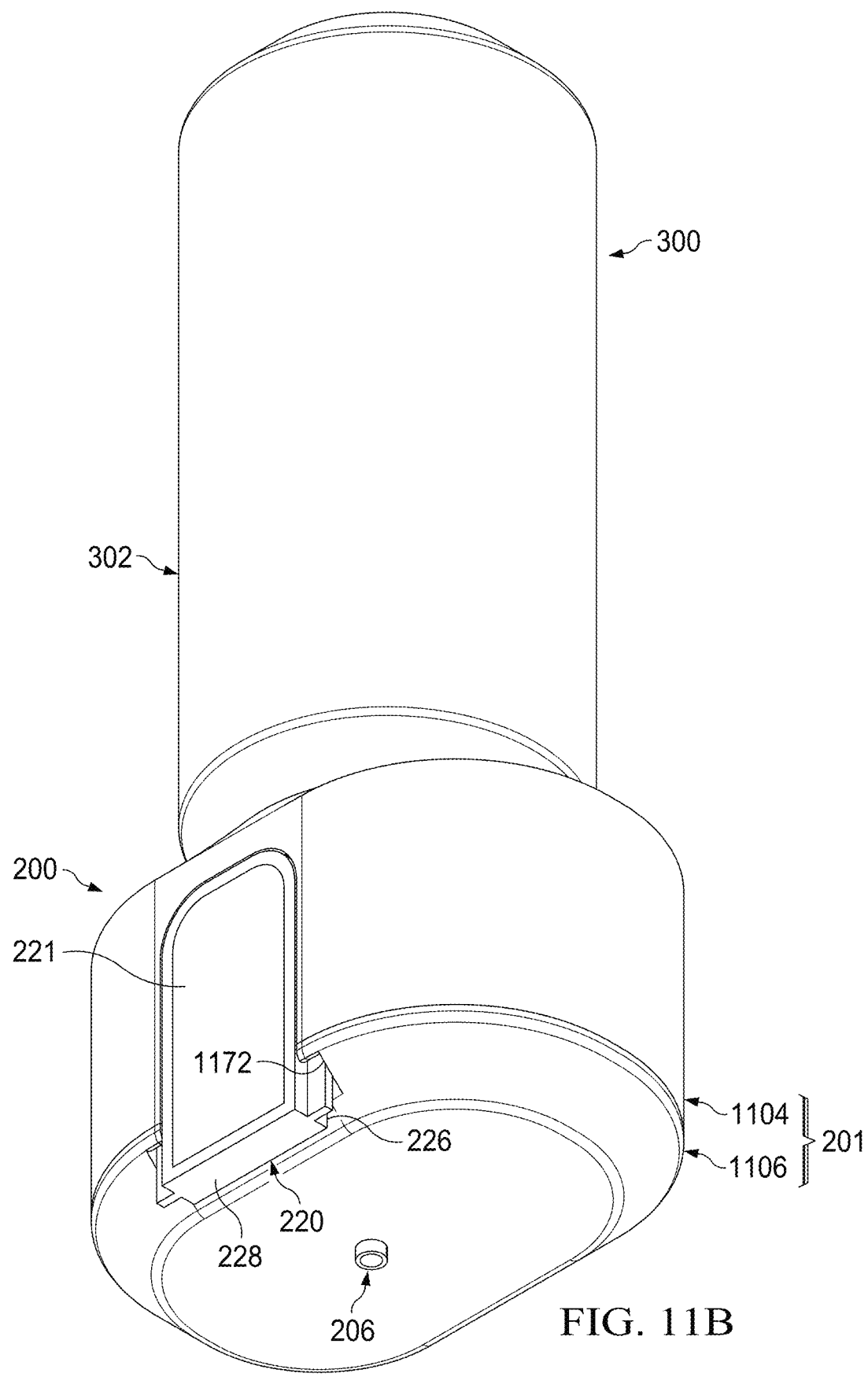
FIG. 11B is a perspective bottom-rear-left view of the drain cleaner apparatus system of FIG. 11A according to some example embodiments.
Figure 11C:
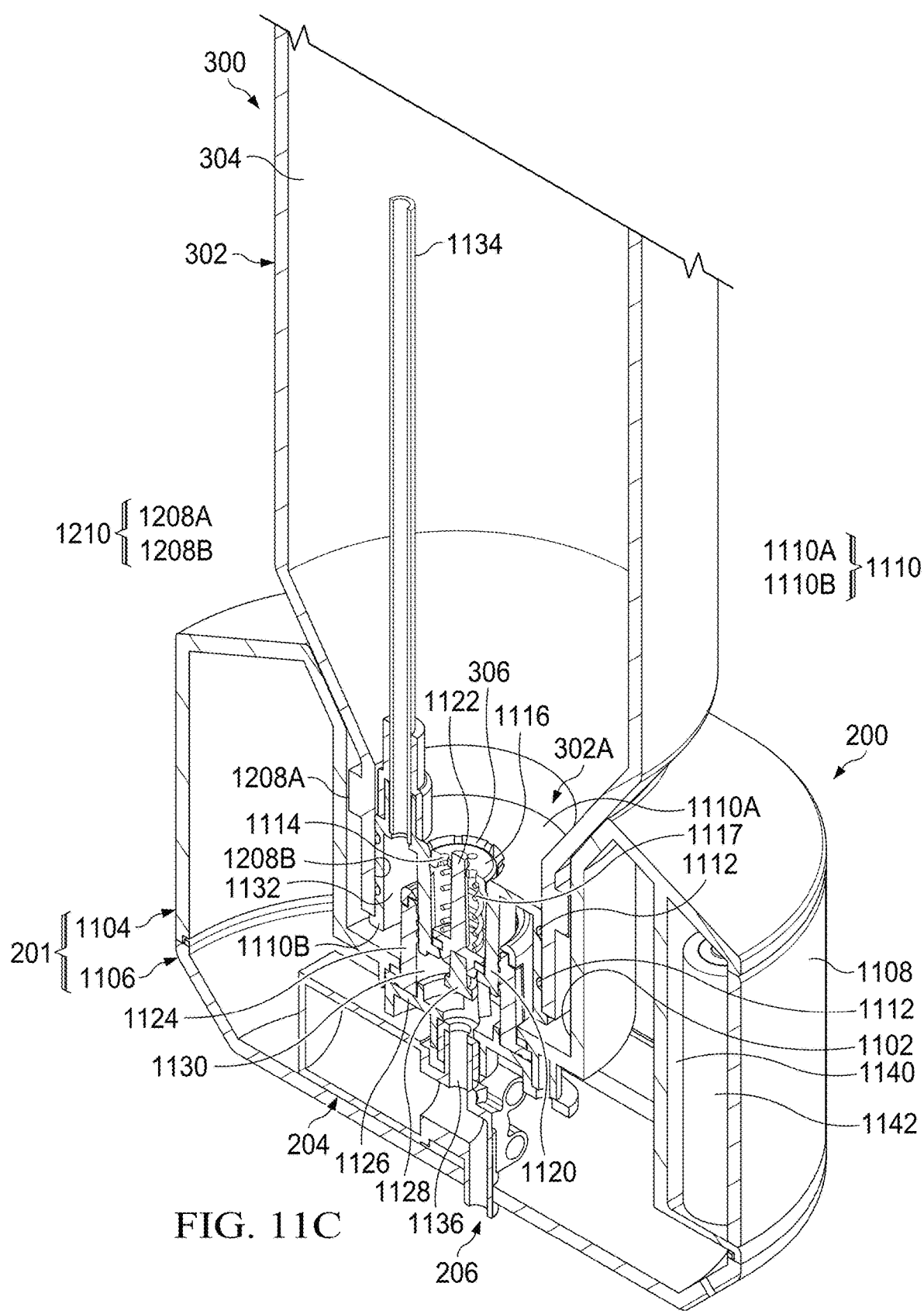
FIG. 11C is a perspective cross-sectional view of the drain cleaner apparatus system along cross-sectional view line XIC-XIC' of FIG. 11A according to some example embodiments.
Figure 11D:
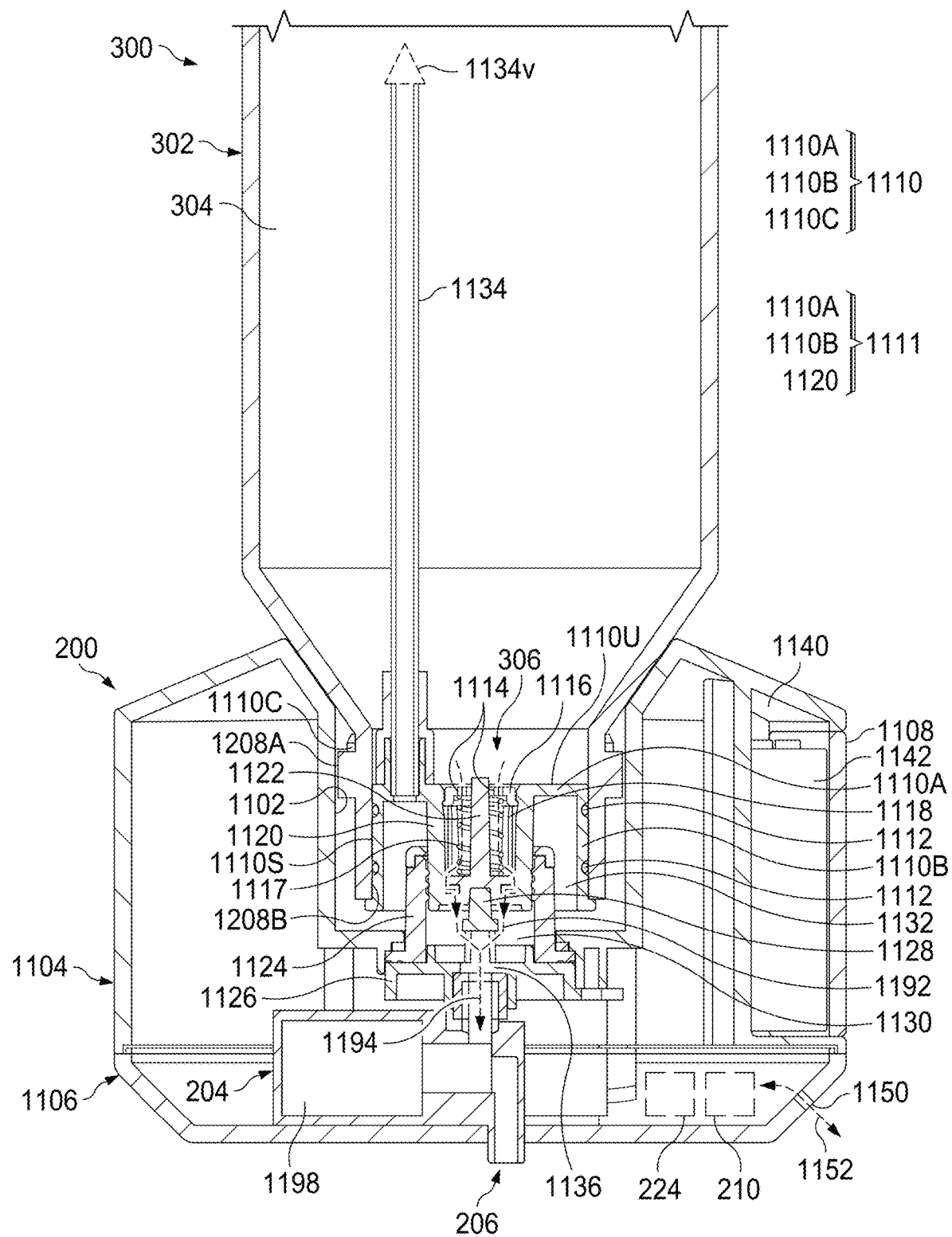
FIG. 11D is a plan cross-sectional view of the drain cleaner apparatus system along cross-sectional view line XIC-XIC' of FIG. 11A according to some example embodiments.
Figure 11E:
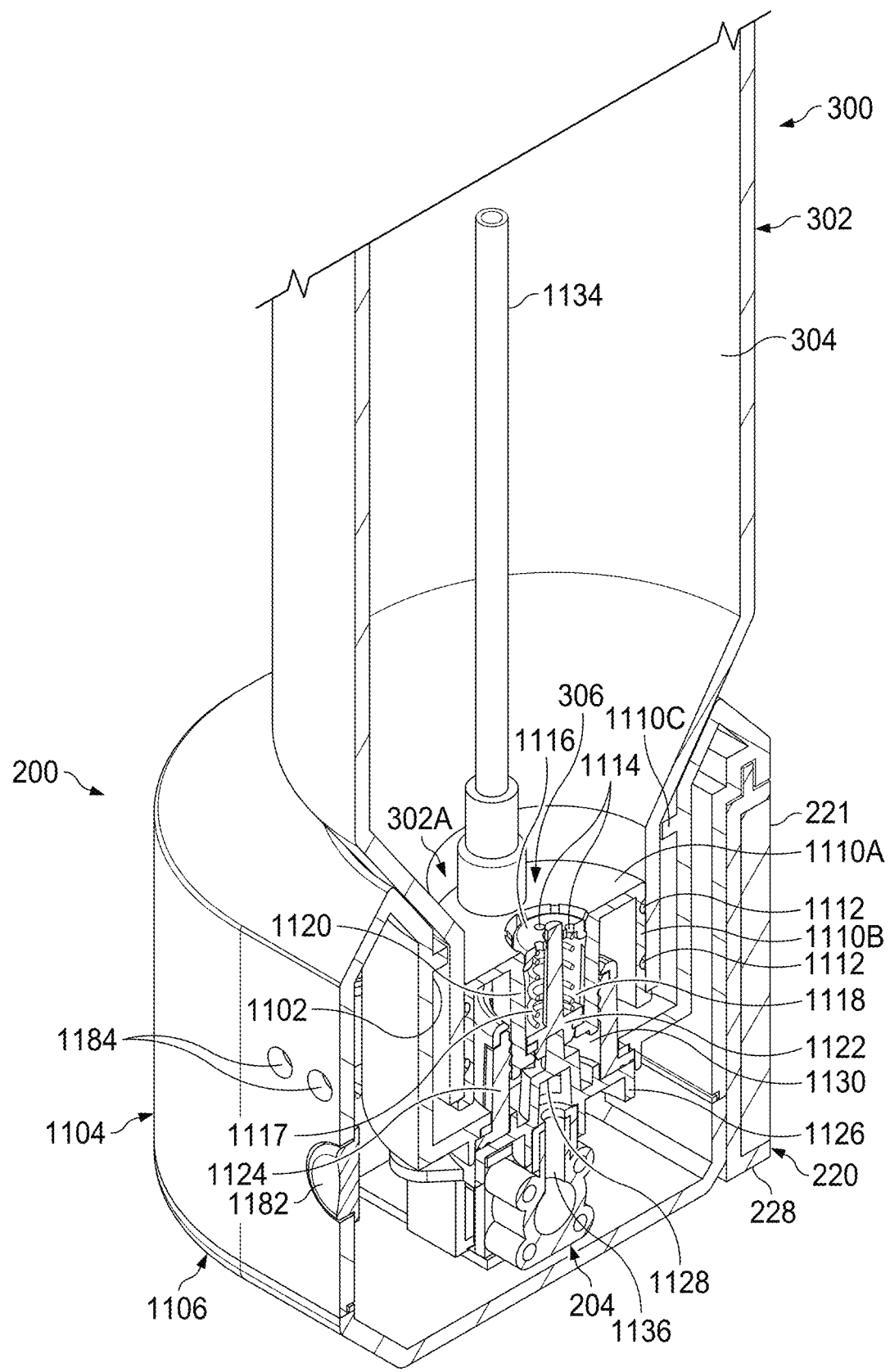
FIG. 11E is a perspective cross-sectional view of the drain cleaner apparatus system along cross-sectional view line XIE-XIE' of FIG. 11A according to some example embodiments.
Figure 11F:
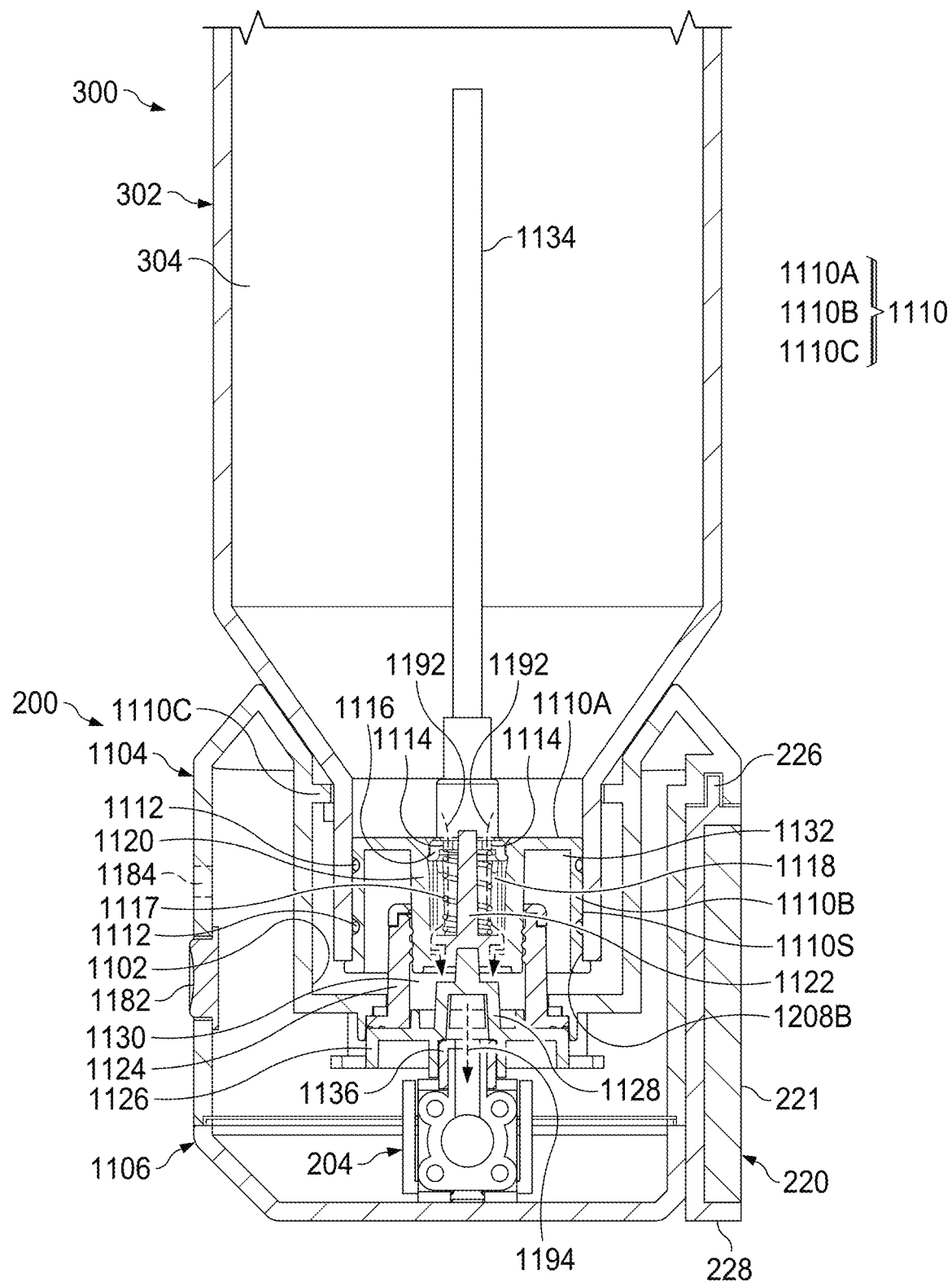
FIG. 11F is a plan cross-sectional view of the drain cleaner apparatus system along cross-sectional view line XIE-XIE' of FIG. 11A according to some example embodiments.

FIG. 11A is a perspective top-front-right view of a drain cleaner apparatus system 1100 according to some example embodiments. FIG. 11B is a perspective bottom-rear-left view of the drain cleaner apparatus system 1100 of FIG. 11A according to some example embodiments. FIG. 11C is a perspective cross-sectional view of the drain cleaner apparatus system 1100 along cross-sectional view line XIC-XIC' of FIG. 11A according to some example embodiments. FIG. 11D is a plan cross-sectional view of the drain cleaner apparatus system 1100 along cross-sectional view line XIC-XIC' of FIG. 11A according to some example embodiments. FIG. 11E is a perspective cross-sectional view of the drain cleaner apparatus system 1100 along cross-sectional view line XIE-XIE' of FIG. 11A according to some example embodiments. FIG. 11F is a plan cross-sectional view of the drain cleaner apparatus system 1100 along cross-sectional view line XIE-XIE' of FIG. 11A according to some example embodiments.

Figure 12A:
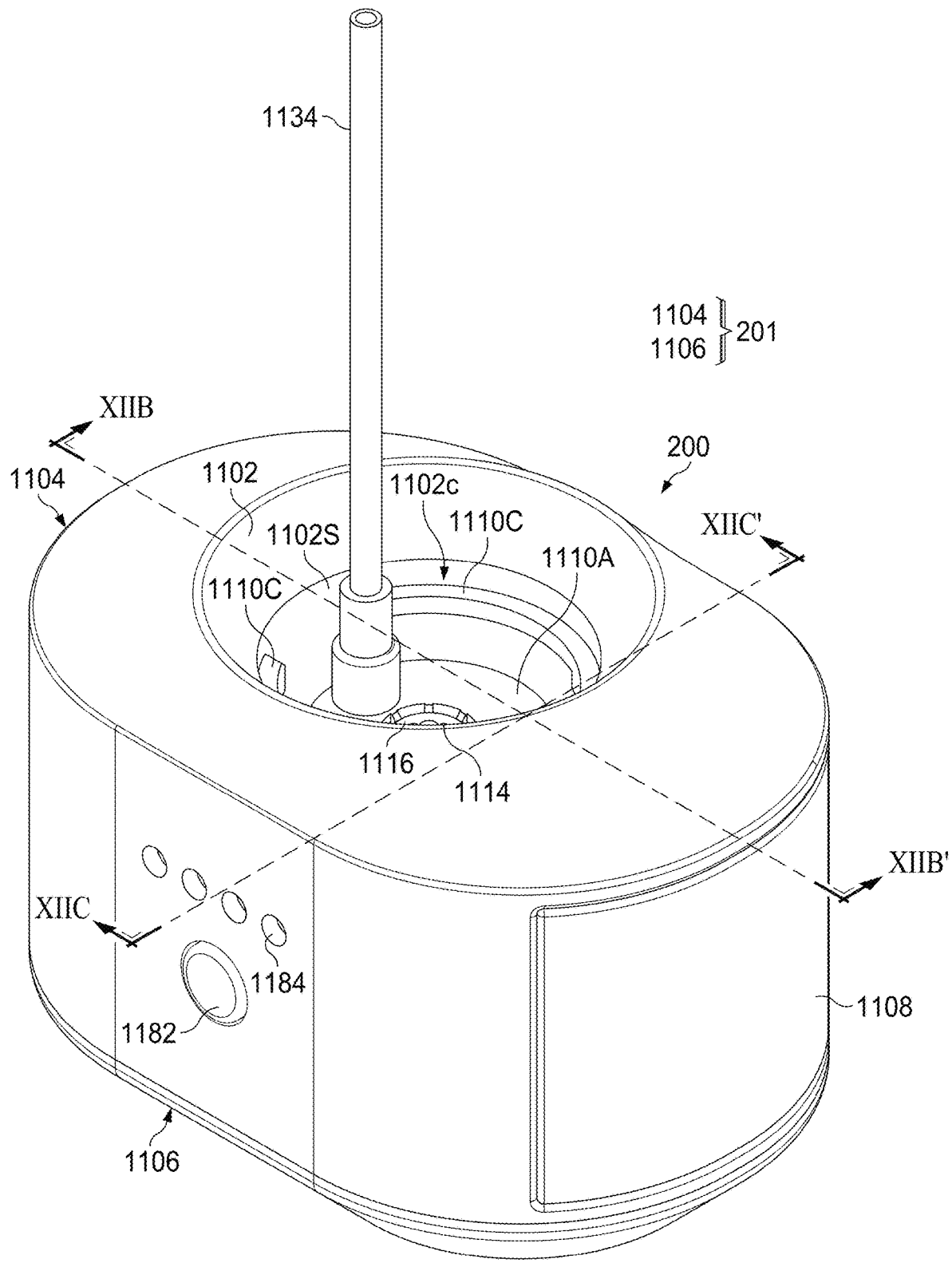
FIG. 12A is a perspective top-front-right view of the drain cleaner apparatus shown in FIG. 11A according to some example embodiments.
Figure 12B:
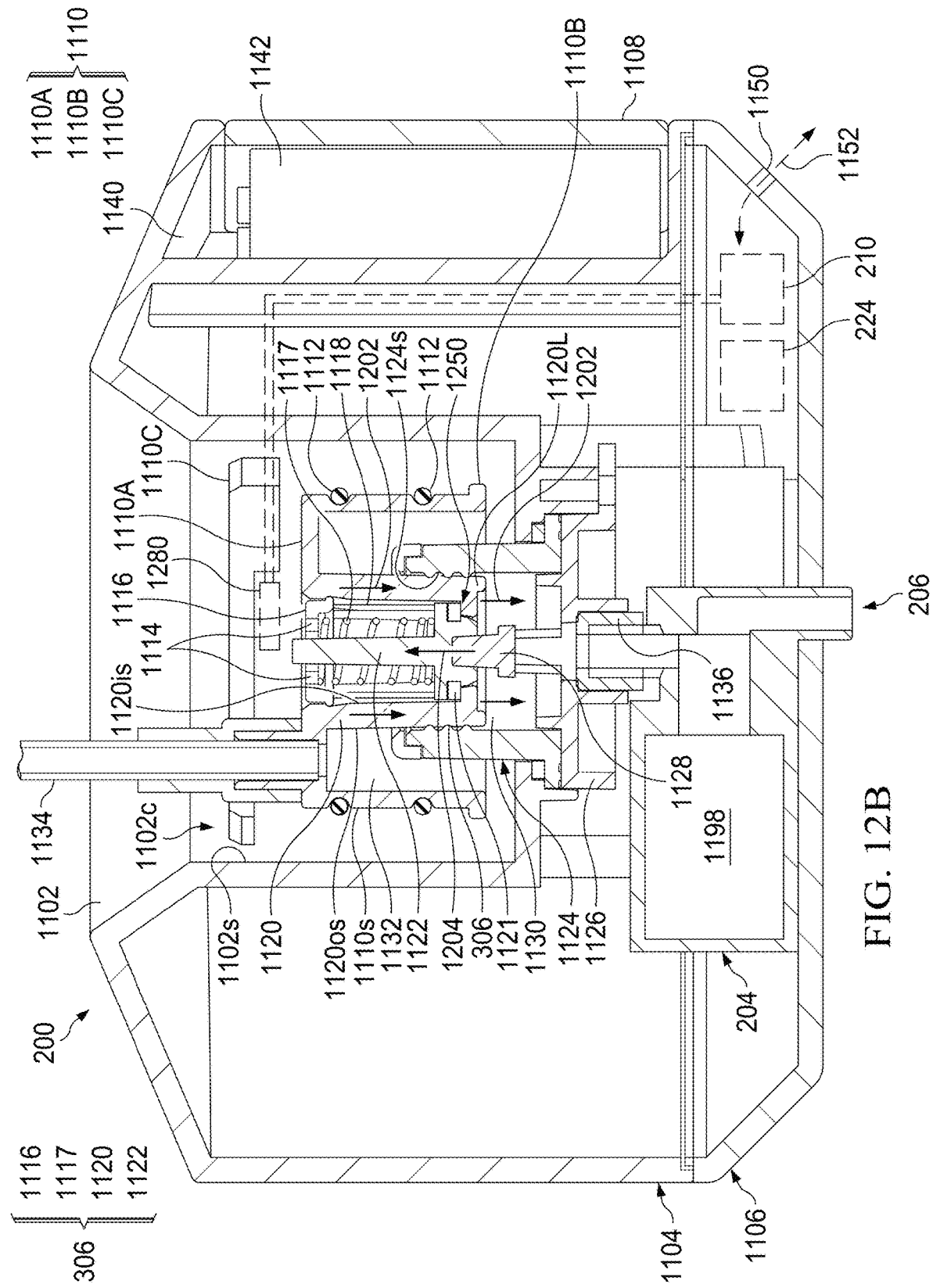
FIG. 12B is a plan cross-sectional view of the drain cleaner apparatus along cross-sectional view line XIIB-XIIB' of FIG. 12A according to some example embodiments.
Figure 12C:
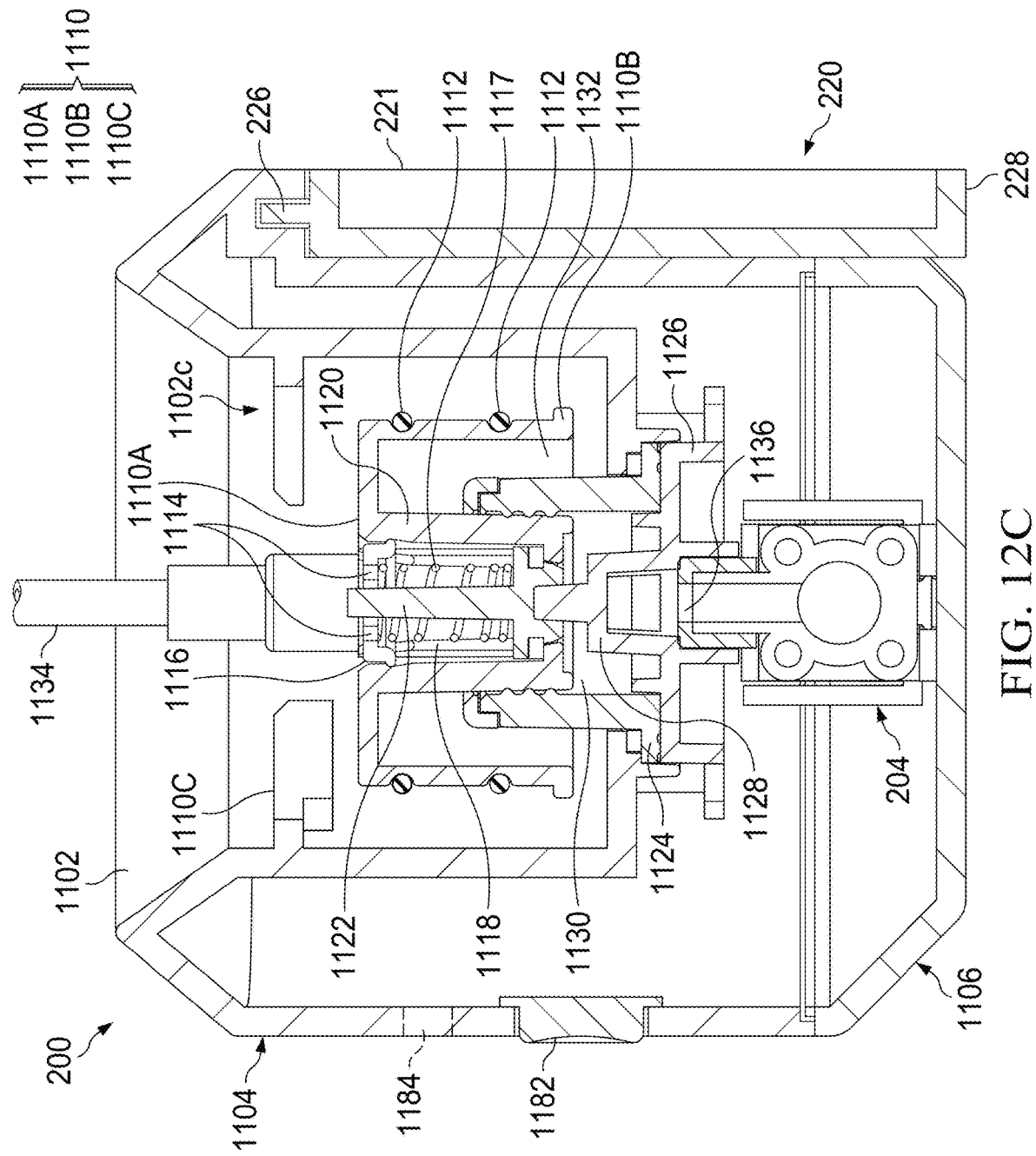
FIG. 12C is a plan cross-sectional view of the drain cleaner apparatus along cross-sectional view line XIIC-XIIC' of FIG. 12A.
Figure 12D:
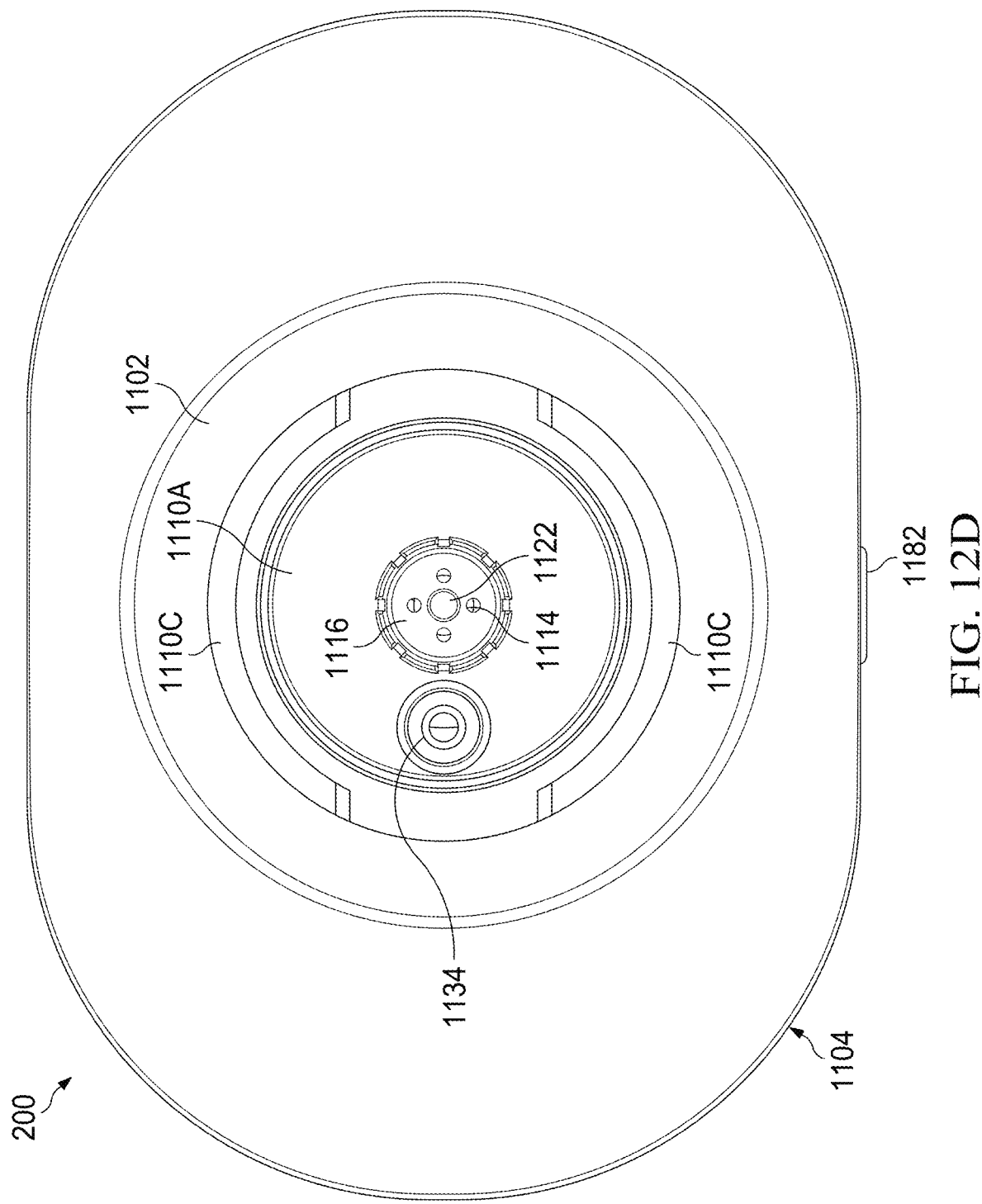
FIG. 12D is a plan top view of the of the drain cleaner apparatus of FIG. 12A according to some example embodiments.

FIG. 12A is a perspective top-front-right view of the drain cleaner apparatus 200 shown in FIG. 11A according to some example embodiments. FIG. 12B is a plan cross-sectional view of the drain cleaner apparatus 200 along cross-sectional view line XIIB-XIIB' of FIG. 12A according to some example embodiments. FIG. 12C is a plan cross-sectional view of the drain cleaner apparatus 200 along cross-sectional view line XIIC-XIIC' of FIG. 12A. FIG. 12D is a plan top view of the of the drain cleaner apparatus 200 of FIG. 12A according to some example embodiments.

Figure 13A:
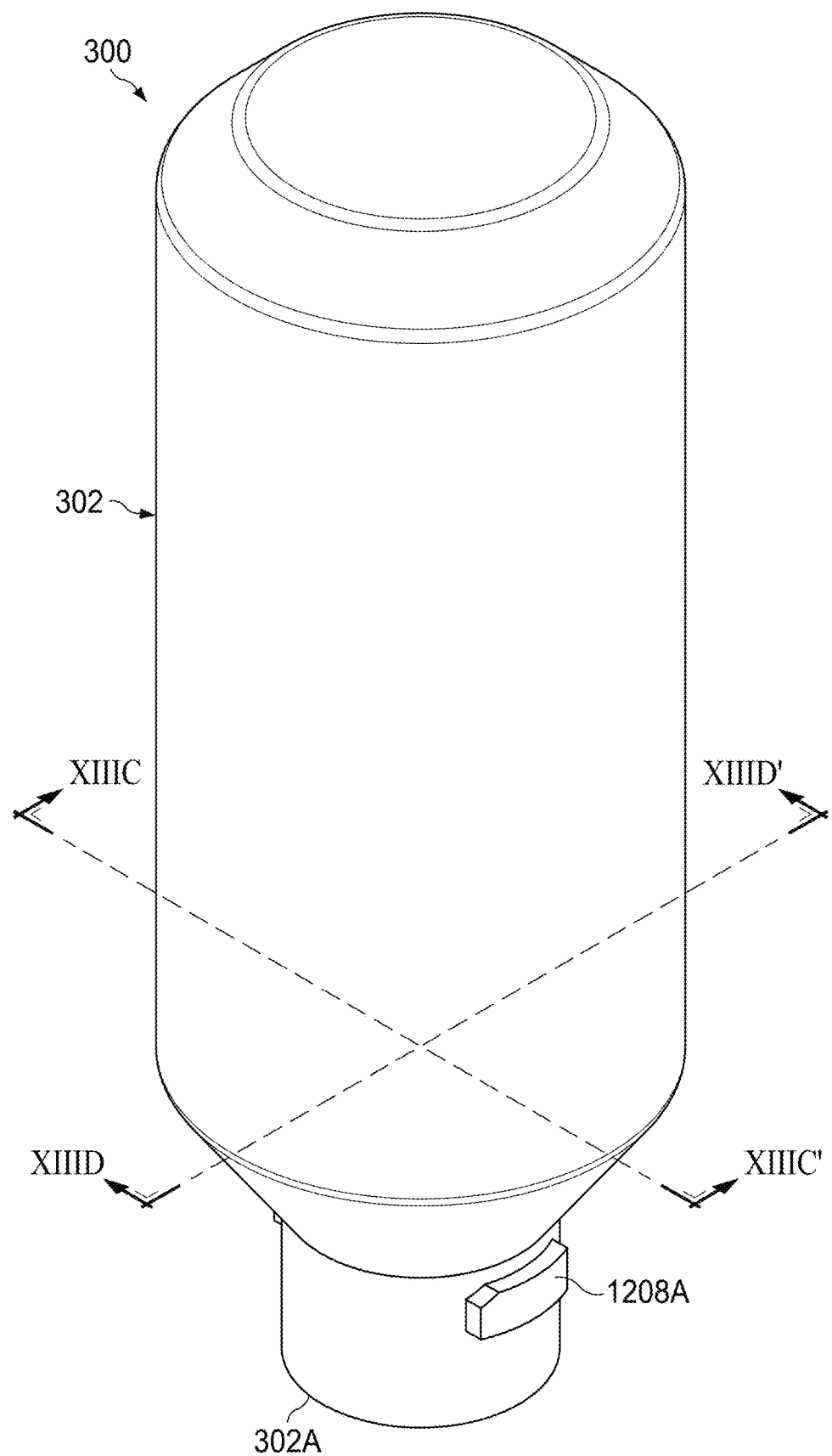
FIG. 13A is a perspective top-front-right view of the cartridge shown in FIG. 11A according to some example embodiments.
Figure 13B:
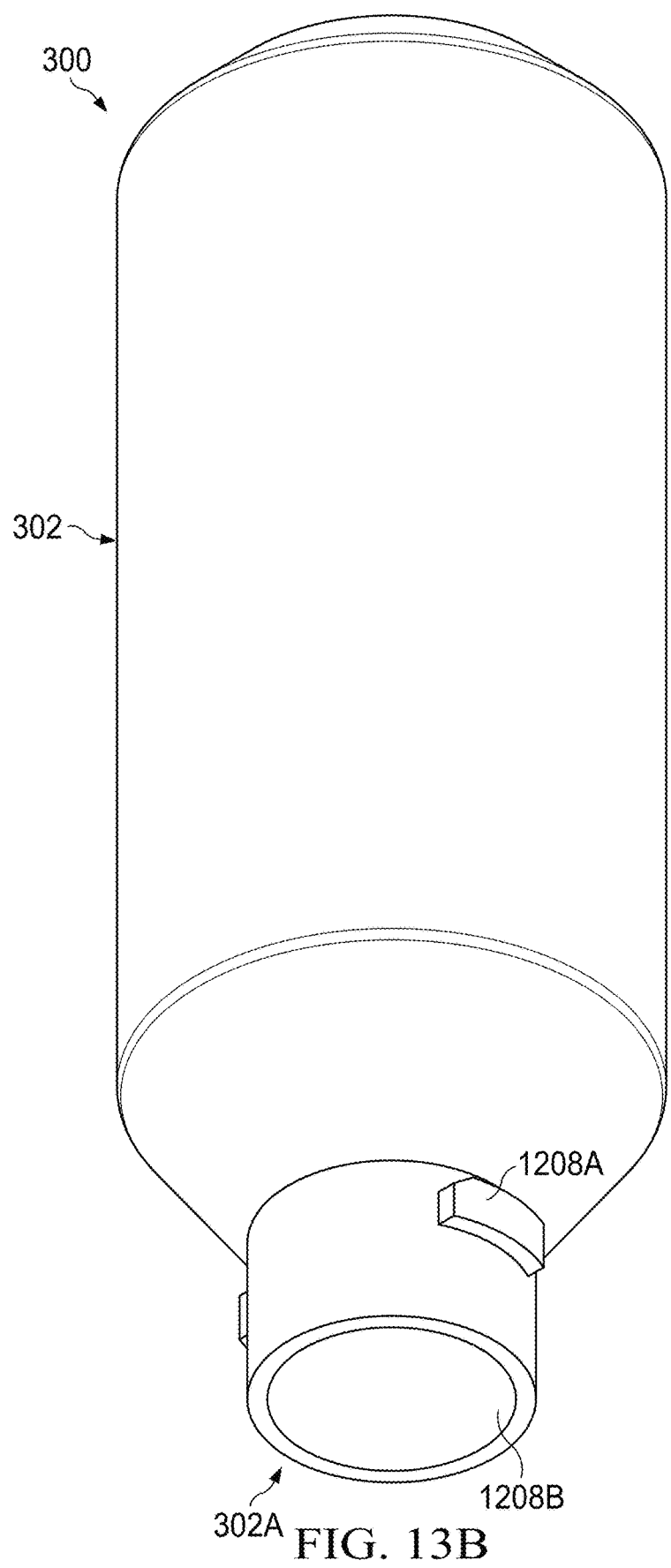
FIG. 13B is a perspective bottom-rear-left view of the cartridge shown in FIG. 13A according to some example embodiments.
Figure 13C:
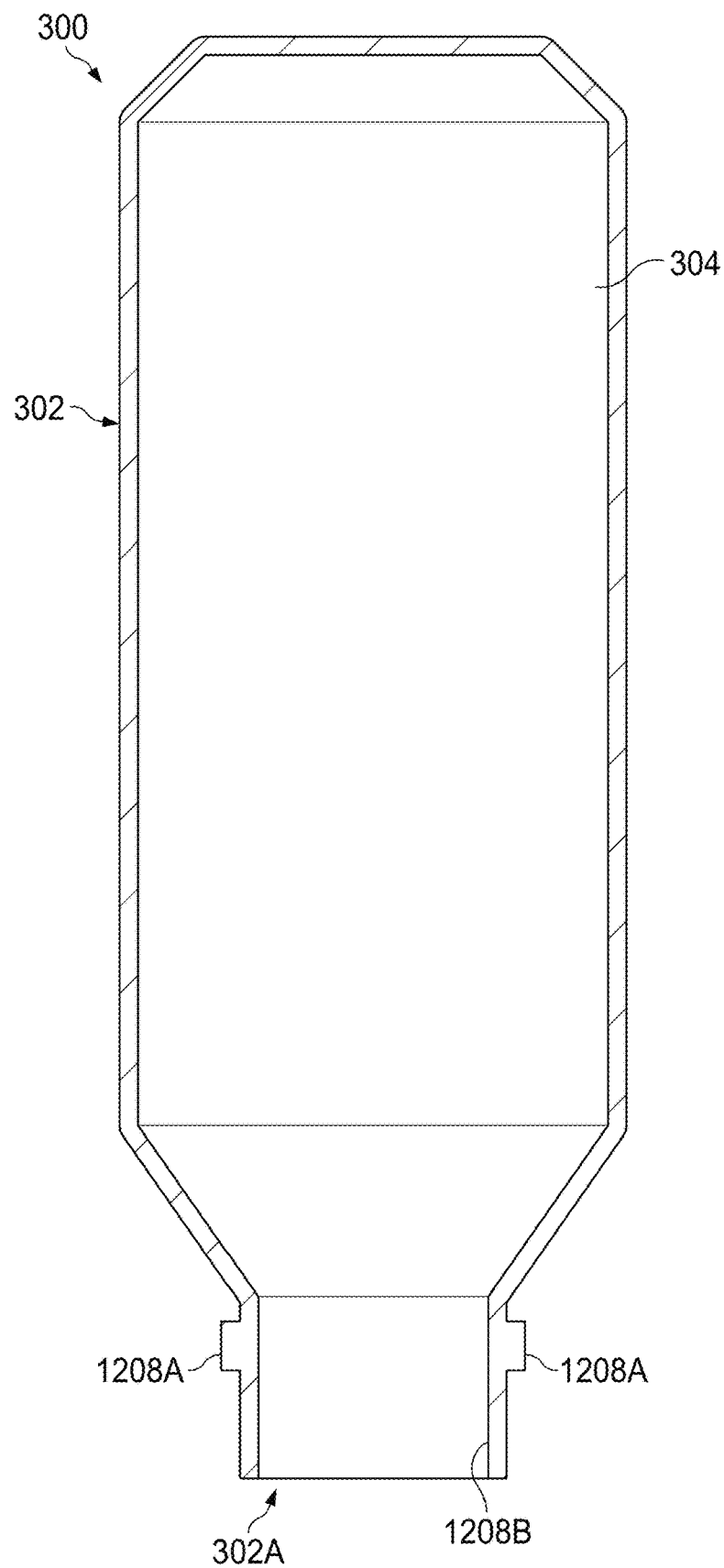
FIG. 13C is a plan cross-sectional view of the cartridge along cross-sectional view line XIIIC-XIIIC' of FIG. 13A according to some example embodiments.
Figure 13D:
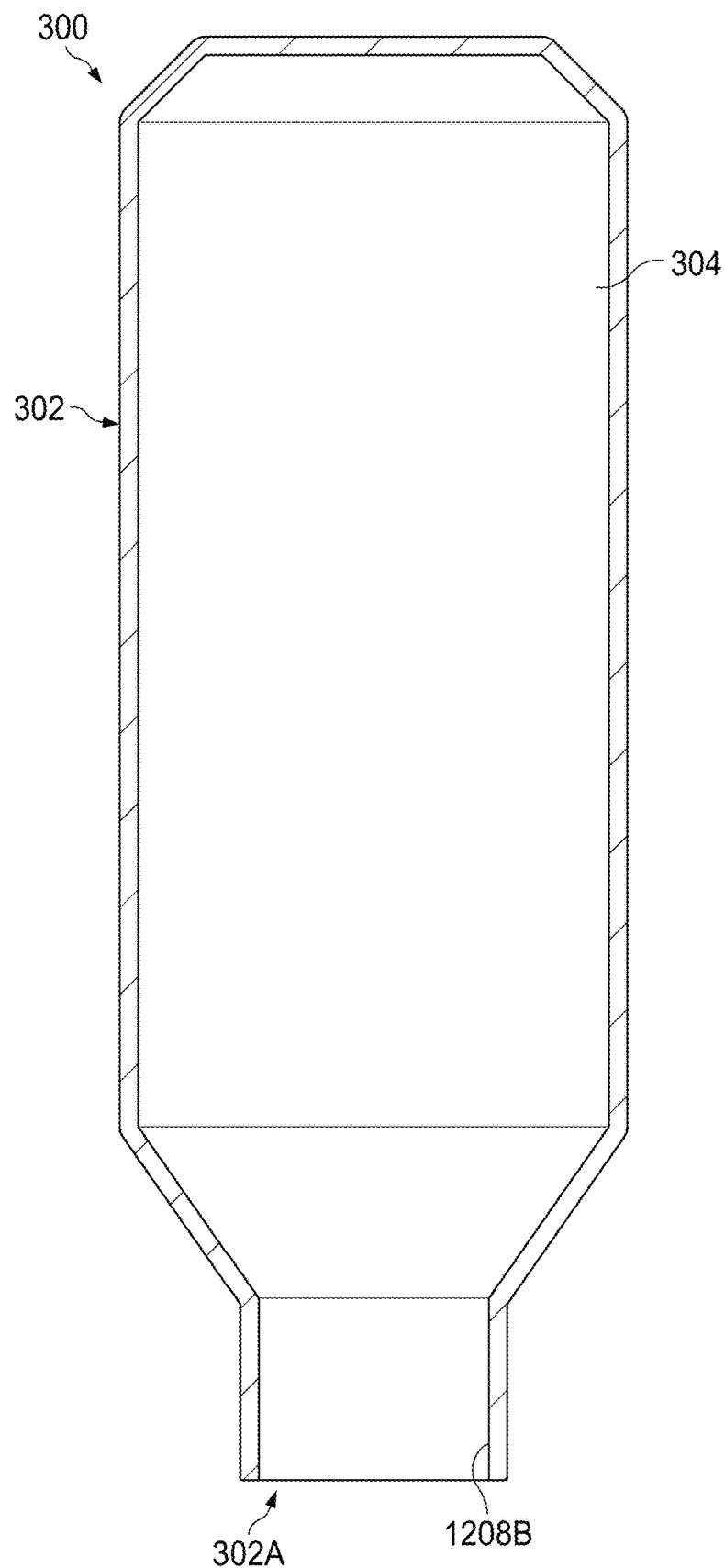
FIG. 13D is a plan cross-sectional view of the cartridge along cross-sectional view line XIIID-XIIID' of FIG. 13A according to some example embodiments.

FIG. 13A is a perspective top-front-right view of the cartridge 300 shown in FIG. 11A according to some example embodiments. FIG. 13B is a perspective bottom-rear-left view of the cartridge 300 shown in FIG. 13A according to some example embodiments. FIG. 13C is a plan cross-sectional view of the cartridge 300 along cross-sectional view line XIIIC-XIIIC' of FIG. 13A according to some example embodiments. FIG. 13D is a plan cross-sectional view of the cartridge 300 along cross-sectional view line XIIID-XIIID' of FIG. 13A according to some example embodiments.

It will be understood that the drain cleaner apparatus 200 shown in FIGS. 11A-12D may include any of the elements of any of the example embodiments of the drain cleaner apparatus shown in any of the drawings and/or described herein. It will be understood that the cartridge 300 shown in FIGS. 11A-11F and 13A-13D may include any of the elements of any of the example embodiments of the cartridge shown in any of the drawings and/or described herein. The drain cleaner apparatus 200 may be referred to interchangeably herein as a drain cleaner base, a drain cleaner apparatus base, a drain cleaner system base, a drain cleaner base device, or the like.

Referring generally to FIGS. 11A-12D, in some example embodiments, the drain cleaner apparatus 200 includes a housing 201 include a side housing 1104 and a base housing 1106 which are coupled together to at least partially define an interior of the drain cleaner apparatus 200. As shown, the side housing 1104 may at least partially define one or more portions of the drain cleaner apparatus 200 including, for example, the apparatus reservoir 202, a connector interface 1110C of the drain cleaner apparatus 200, or the like.

Referring to FIGS. 11A-12D and further referring to FIGS. 13A-13D, the drain cleaner apparatus 200 may be coupled (e.g., detachably coupled, reversibly coupled, etc.)

with a cartridge 300 having a cartridge housing 302 enclosing a cartridge reservoir 304 holding the cleaning composition in order to establish flow communication between the cartridge reservoir 304 and the dispenser device 204 (e.g., an inlet port of the dispenser device 204) of the drain cleaner apparatus 200. As shown, the apparatus reservoir 1102, also referred to herein interchangeably as a connection port structure, cartridge sleeve structure, or the like, is configured to receive and accommodate at least a portion of the cartridge 300 holding the cleaning composition when the cartridge 300 is detachably coupled with the drain cleaner apparatus 200, such that the apparatus reservoir 1102 may include one or more inner surfaces 1102s that may define at least a portion of an open cylindrical enclosure 1102c which may at least partially enclose at least the cartridge outlet 302A of the cartridge 300 coupled to the drain cleaner apparatus 200.

As shown, the drain cleaner apparatus 200 may include a connector interface 1110 configured to couple with one or more complementary connector interfaces of the cartridge 300 to couple the cartridge 300 at the cartridge outlet 302A with the drain cleaner apparatus 200. The connector interface 1110 may include a connector structure 1111 configured to engage the cartridge outlet 302A and to establish a friction fit seal with the cartridge housing 302 to enable flow communication to be established between the cartridge reservoir 304 and the dispenser device 204. The connector structure 1111 may include an upper disc structure 1110A having a top surface 1110U configured to be directly exposed to the cartridge reservoir 304 when the cartridge 300 is coupled with the connector interface 1110 and a cylindrical sidewall structure 1110B having an outer sidewall surface 1110S and one or more O-rings 1112 extending circumferentially around the outer sidewall surface 1110S. As further shown, the connector structure 1111 may include one or more elements at least partially defining a check valve 306, such as the cylindrical structure 1120, but example embodiments are not limited thereto. Each of the interfaces and/or structures 1110A, 1110B, 1110C, and/or 1111 may be referred to, individually or collectively, as a connector interface of the drain cleaner apparatus 200.

The one or more complementary connector interfaces of the cartridge 300 may include, for example, connector interface 1208A and connector interface 1208B. Connector interface 1208A is a bayonet connector and complementary to bayonet connector interface 1110C. Connector interface 1208B is an inner surface of the cartridge housing 302 at the cartridge outlet 302A and configured to engage and establish a friction fit with an outer sidewall surface 1110S of the connector interface 1110 and/or an O-ring 1112 extending around the outer sidewall surface 1110S. The bayonet connector interface 1110C may be configured to couple with the connector interface 1208A of the cartridge 300 to establish a bayonet interface connection between the drain cleaner apparatus 200 and the cartridge 300. As shown, the connector interface 1110C and the connector interface 1208A of the cartridge 300 may be complementary interfaces, including complementary bayonet connector interfaces, but example embodiments are not limited thereto and may include any type of complementary connector interfaces including, for example, complementary threaded connector interfaces.

As shown, the connector interface 1110C may be a structure (e.g., bayonet connector interface structure) at least partially defined by a surface and/or structure of the apparatus reservoir 1102. For example, the apparatus reservoir 1102 structure may have an inner surface 1102s at least partially defining an open cylindrical enclosure 1102c configured to receive at least a portion of the cartridge housing 302 including the cartridge outlet 302A and in some example embodiments further include one or more complementary connector interfaces 1208B and/or 1208A, where the inner surface 1102s at least partially defines lateral sidewalls of the open cylindrical enclosure 1102c from which the connector interface 1110C structure (e.g., a bayonet interface structure configured to establish a bayonet connection with a complementary connector interface 1208A of the cartridge 300) extends into the open cylindrical enclosure 1102c. In some example embodiments, either or both of the complementary connector interfaces 1110C/1208A and/or 1110B/1208B may couple (e.g., detachably couple) the cartridge 300 with the drain cleaner apparatus 200. In some example embodiments, the complementary connector interfaces 1110B/1208A may be configured to couple the cartridge outlet 302A with the drain cleaner apparatus 200 to establish flow communication between the cartridge reservoir 304 and the dispenser device 204 via at least the inlet port 1136, and the complementary connector interfaces 1110C/1208A may secure (e.g., reversibly lock) the cartridge 300 to the drain cleaner apparatus 200.

As shown in at least FIG. 12B, the drain cleaner apparatus 200 may include an electrical switch device 1280 that may include a structure extending into enclosure 1102c and configured to be engaged and moved from a switch-open position to a switch-closed position by at least a portion of the cartridge 300 when a connector interface of the cartridge 300 (e.g., connector interface 1208A) couples with a connector interface of the drain cleaner apparatus 200 (e.g., connector interface 1110C). The electrical switch device 1280 may be configured to close an electrical circuit that includes the controller 210 when moved to the switch-closed position, thereby enabling an electrical signal to be received at the controller 210. The controller 210 may be configured to apply electrical power to the circuit and may be configured to determine that the cartridge 300 is coupled with the drain cleaner apparatus 200 in response to determining that the circuit including the electrical switch device 1280 is closed such that an electrical signal (e.g., an induced current) is present in the circuit). The controller 210 may be configured to selectively enable or disable actuation of the dispenser device 204 based upon whether a cartridge 300 is determined to be coupled to the drain cleaner apparatus 200 (e.g., based upon receiving an electrical signal via the circuit including the switch device 1280 to determine that the circuit is closed and thus a cartridge 300 is coupled with the drain cleaner apparatus 200 to move the switch device 1280 to the switch-closed position).

Still referring to FIGS. 11A-12D, the drain cleaner apparatus 200 may include a reservoir 1130, also referred to herein as a dispenser reservoir, apparatus reservoir, first reservoir of the drain cleaner apparatus 200, internal reservoir, or the like. While the reservoir 1130 is shown in FIGS. 11A-12D to be separate from the dispenser device 240, it will be understood that the reservoir 1130 may be referred to as being a dispenser reservoir included within the dispenser device, separately from a valve of the dispenser device 240, such as shown in at least FIG. 4 with regard to reservoir 406 and valve 404 of the dispenser device 204 (and absent the first valve 402, or where the first valve 402 is a check valve as described herein with reference to FIGS. 11A-12D).

As shown, the drain cleaner apparatus 200 may be configured to establish flow communication from the cartridge reservoir 304 of a coupled (e.g., detachably coupled) cartridge 300 to the reservoir 1130 of the drain cleaner apparatus 200, where the reservoir 1130 is in flow communication between at least one connector interface of the drain cleaner apparatus 200 (e.g., the connector interface 1110) and at least one valve 1198 of the dispenser device 204, which may be the same as any of the valves described herein according to any of the example embodiments, for example any of the first valve 402, the second valve 404, or the like. The at least one valve 1198 may, for example, be a solenoid valve. The dispenser device 204 may further be understood to be configured to be in fluid communication between the connector interface 1110 (e.g., via at least the reservoir 1130 and the inlet port 1136) and the apparatus outlet 206. The dispenser device 204 may thus be configured to be actuated (e.g., by controller 210) to selectively dispense an amount (e.g., a particular amount) of the cleaning composition from the cartridge reservoir 304 and through the apparatus outlet 206 (e.g., via the reservoir 1130). The at least one valve 1198 may be configured to be controlled by the controller 210 to be actuated similarly to any of the valves of any of the example embodiments of the dispenser device 204. The controller 210 may be configured to actuate the dispenser device 204 (e.g., actuate the at least one valve 1198) to cause the amount of the cleaning composition to be dispensed through the apparatus outlet 206 without manual intervention.

While the dispenser device 204 may include at least one valve 1198 (e.g., a solenoid valve), example embodiments are not limited thereto. In some example embodiments, the dispenser device 204 may include a pump (e.g., any known positive displacement pump) that is configured to operate for a particular period of time to move an amount of the cleaning composition 230 from the cartridge reservoir 304 and through the apparatus outlet 206 (e.g., from an inlet of the pump that is open to and/or in fluid communication with the reservoir 1130 to an outlet of the pump that is open to and/or in fluid communication with the apparatus outlet 206, etc.), based on a control signal generated by the controller 210.

Still referring to FIGS. 11A-12D, the connector interface 1110 may include an upper disc structure 1110A and a cylindrical sidewall structure 1110B which may be separate parts of a single piece of material (e.g., plastic) or separate pieces of material of the connector structure 1111, and where the cylindrical sidewall structure 1110B may include one or more circumferential grooves configured to accommodate separate, respective O-rings 1112 or any other known seal structure. The outer sidewall surface 1110S of the cylindrical sidewall structure 1110B and/or the O-ring(s) 1112 may be configured to engage a complementary inner surface of the cartridge housing 302 at the cartridge outlet 302A which defines the connector interface 1208B of the cartridge 300. As a result, the outer sidewall surface 1110S of the cylindrical sidewall structure 1110B, alone or in combination with one or more of the O-rings 1112, establishes a fluid seal (e.g., air-tight seal) between the cylindrical sidewall structure 1110B (and thus the connector interface 1110) and the cartridge housing 302, thereby minimizing or preventing leaking of cleaning composition from the cartridge reservoir 304 to an exterior of the cartridge 300 independently of being supplied through the apparatus outlet 206 by the dispenser device 204, for example minimizing or preventing leaking of cleaning composition from the cartridge reservoir 304 into the open cylindrical enclosure 1102c.

As shown, when the connector structure 1111 and thus the connector interface 1110 couples with the connector interface 1208B of the cartridge 300 (e.g., at the cylindrical sidewall structure 1110B where the coupling is sealed by one or more surfaces of the cylindrical sidewall structure 1110B, the connector interface 1208B, and/or one or more of the O-rings 1112), the upper disc structure 1110A of the connector interface 1110 may be exposed directly to an interior of the cartridge reservoir 304 and at least some or any cleaning composition held in the cartridge reservoir 304.

Still referring to FIGS. 11A-12D, the connector interface 1110 may include a check valve 306 which may be configured to open in response to the connector interface 1110 coupling with one or more connector interfaces 1208A and/or 1208B of the cartridge 300 to establish fluid communication between the cartridge reservoir 304 and the dispenser device 204 (e.g., via the reservoir 1130). As shown, the check valve 306 may be at least partially defined by a cylindrical structure 1120 (which may be a part of a single piece of material with at least the upper disc structure 1110A of the connector structure 1111) having an inner surface 1120 is defining cylindrical side surfaces of an internal cylindrical conduit 1118, a top plate 1116 defining a top surface of the internal cylindrical conduit 1118 and having one or more ports 1114, also referred to interchangeably as openings, extending therethrough to the cylindrical conduit 1118 and configured to be directly exposed to at least the open cylindrical enclosure 1102c and thus to the cartridge reservoir 304 when the cartridge 300 is coupled with the connector interface 1110, a bottom structure 1122 defining a bottom surface of the internal cylindrical conduit 1118, a seal 1121 such as an O-ring extending around a lower portion of the bottom structure 1122, and a spring 1117 in contact between the top plate 1116 and the bottom structure 1122.

As shown, the bottom structure 1122 may include a pin protrusion extending axially through the cylindrical conduit 1118 and which may extend through a central opening in the top plate 1116. The bottom structure 1122, alone or together with the seal 1121, may be configured to engage against a ledge structure 1120L of the cylindrical structure 1120 to selectively seal an interface between the bottom structure 1122 and the cylindrical structure 1120. As further shown, the reservoir 1130 may be at least partially defined by a cylindrical side structure 1124 and a bottom disc structure 1126, where the bottom disc structure 1126 may at least partially define the inlet port 1136 to the dispenser device 204 (e.g., to at least one valve 1198 thereof). As shown, the cylindrical side and bottom disc structures 1124 and 1126 may define an open cylindrical enclosure that is enclosed at a top end by the combined cylindrical structure 1120 and ledge structure 1120L thereof and a bottom surface of the bottom structure 1122 extending through an opening space between opposing surfaces of the ledge structure 1120L, such that inner surfaces of the structures 1124, 1126, 1120, and 1122 at least partially define the reservoir 1130. As further shown, the drain cleaner apparatus 200 may include a fixed structure 1128 which may be coupled to the bottom disc structure 1126 and may be a part of a same single piece of material as the bottom disc structure 1126. The fixed structure 1128 may project upwards into the reservoir 1130 under the bottom structure 1122 of the check valve 306.

Still referring to FIGS. 11A-12D, the connector interface 1110 is configured to move axially downwards 1202 (e.g., toward the apparatus outlet 206) in response to the cartridge 300 coupling with the drain cleaner apparatus 200 (e.g., the connector interface 1110 coupling with one or more of the connector interfaces 1208A and/or 1208B of the cartridge 300), for example based on the weight of the cartridge 300 and the cleaning composition held within pushing the connector interface 1110 downwards 1202. As shown, the outer surface 1120os of the cylindrical structure 1120 coupled to the upper disc structure 1110A is configured to engage and establish a seal (in some example embodiments with one or more O-rings) with the inner surface 1124s of the cylindrical side structure 1124 at least partially defining the reservoir 1130, thereby minimizing or preventing leakage of cleaning composition from the reservoir 1130 via the interface between surfaces 1120os and 1124s.

As the connector interface 1110 moves downward 1202 due to the weight of the cartridge 300 and cleaning composition therein (which may directly contact the top surface of the upper disc structure 1110A and the top plate 1116) may push the top plate 1116 and the cylindrical structure 1120 downwards 1202 axially, where the spring 1117 may further push the bottom structure 1122 axially downwards based on the top plate 1116 pushing the top end of the spring 1117 downwards. As shown, the top plate 1116 may engage an underside of a ledge or lip structure of the upper disc structure 1110A so that the downwards 1202 axial movement of the upper disc structure 1110A causes the top plate 1116 to move downwards 1202 axially together with the upper disc structure 1110A. As a result, the top plate 1116 together with the spring 1117 may cause the bottom structure 1122 and the cylindrical structure 1120 to move downwards 1202 together until a bottom surface of the bottom structure 1122 contacts (e.g., directly contacts) a top surface of the fixed structure 1128 in the reservoir 1130 interior. As the fixed structure 1128 is fixed to a surface at least partially defining the reservoir 1130 (e.g., fixed to the bottom disc structure 1126), the contact between opposing surfaces of the bottom structure 1122 and the fixed structure 1128 may arrest downwards axial movement of the bottom structure 1122 and compress the spring 1117 while the cylindrical structure 1120, top plate 1116, and connector interface 1110 continue to move axially downwards 1202, thereby causing the relative movement of the bottom structure 1122 in relation to the cylindrical structure 1120 to be upwards 1204, opening an annular passage 1250 between the downwards-moving ledge structure 1120L and the arrested bottom structure 1122 (and any washer or seal such as an O-ring seal 1121 configured to seal an interface between the bottom structure 1122 and the ledge structure 1120L) fixed in place between the spring 1117 and the fixed structure 1128. The opened annular passage 1250 may enable a flow along flow path 1192 (e.g., based on enabling fluid communication) through the cylindrical conduit 1118 to the reservoir 1130 via ports 1114 and the opened annular passage 1250.

As long as the weight of the cartridge 300 and the cleaning composition held therein on the connector interface 1110 is greater than the spring force of the spring 1117, the top plate 1116 and the bottom structure 1122 contacting the fixed structure 1128 may compress the spring 1117 and open the annular passage 1250 to the reservoir 1130 to enable a flow of cleaning composition along the flow path 1192 from the cartridge reservoir 304 to the reservoir 1130 via the check valve 306. When the weight of the cartridge 300 and the cleaning composition held therein on the connector interface 1110 is smaller than the spring force of the spring 1117, the spring force of the spring 1117 may enable the spring 1117 to push the top plate 1116, and thus the connector interface 1110 upwards 1204 axially away from the bottom structure 1122 and/or seal 1121 to close the annular passage 1250 and close the fluid communication between the cartridge reservoir 304 and the reservoir 1130.

Still referring to FIGS. 11A-12D, the connector structure 1111 may establish (e.g., define) an air volume 1132 in fluid communication with the ambient environment via the open cylindrical enclosure 1102c, and the connector interface 1110 (e.g., the connector structure 1111) may include an air tube 1134 extending through the connector interface to the upper disc structure 1110A to establish fluid connection between the air volume 1132 and a top region of the cartridge reservoir 304 when the cartridge 300 is coupled to the drain cleaner apparatus 200. The air tube 1134 may be configured to supply air into the upper portion of the cartridge reservoir 304 as cleaning composition leaves the cartridge reservoir 304 via the cartridge outlet 302A (e.g., via the check valve 306) to equalize pressure in the cartridge reservoir 304, thereby preventing vacuum in the cartridge reservoir 304 and preventing loss of flow rate of the flow along flow path 1192 into the reservoir 1130. The air tube 1134 may include a backflow prevention valve 1134v, such as a duckbill valve which may also be interchangeably referred to as a duck mouth valve, at a distal end, where the backflow prevention valve 1134v may be configured to reduce, minimize, or prevent flow of cleaning composition from the cartridge reservoir 304 into the air volume 1132 via the air tube 1134 while still enabling air to flow into the cartridge reservoir 304 from the air volume 1132 via the air tube 1134.

Still referring to FIGS. 11A-12D, the dispenser device 204 may include at least one valve 1198 (e.g., a solenoid valve corresponding to the second valve 404 shown in at least FIG. 4) that is configured to be controlled (e.g., selectively actuated) by the controller 210 to selectively induce a flow of cleaning composition along the flow path 1194 from the reservoir 1130 to the apparatus outlet 206, thereby dispensing the cleaning composition from the drain cleaner apparatus 200. The at least one valve 1198 may operate, and/or may be configured to be controlled to operate/actuate, in the same way as any of the valves described herein according to any of the example embodiments.

Accordingly, as shown in at least FIGS. 11A-12D, the dispenser device 204 may include at least one valve 1198 that is configured to be selectively opened based on a control signal generated (e.g., transmitted) by the controller 210 to establish a flow path 1194 through the at least one valve 1198 to the apparatus outlet 206, and the drain cleaner apparatus 200 may include a reservoir 1130 (e.g., dispenser reservoir) that is in flow communication between the check valve 306 and the at least one valve 404, such that the connector interface 1110 is configured to detachably couple with the connector interface 1208A of the cartridge 300 to establish flow communication (e.g., flow path 1192) from the cartridge reservoir 304 to the reservoir 1130, and the dispenser device 204 may be configured to be actuated (e.g., by controller 210) to selectively dispense an amount of the cleaning composition from the reservoir 1130 and through the apparatus outlet 206. The controller 210 may be configured to actuate the dispenser device 204 based on causing the at least one valve 1198 to open the flow path 1194 to enable at least a portion of the cleaning composition held in the reservoir 1130 to flow from the reservoir 1130 to the apparatus outlet 206.

While FIGS. 11A-12D show a drain cleaner apparatus 200 and cartridge 300 configured to couple via a connector interface 1110 which includes a check valve 306, it will be understood that example embodiments are not limited thereto, and in some example embodiments different configurations of connector interfaces 1110 and/or connector structures 1111 may be present in the drain cleaner apparatus 200. In some example embodiments, the check valve 306 may be omitted. For example, in some example embodiments the cartridge 300 may include a flexible membrane (e.g., a silicone membrane) extending transversely across the cartridge outlet 302A, and the connector interface 1110 may include at least a puncturing structure (e.g., one or more needles) configured to puncture the membrane when the cartridge 300 is coupled with the connector interface 1110 in order to establish fluid communication between the cartridge reservoir 304 and the dispenser device 204 (e.g., via reservoir 1130). The connector interface 1110 may include another puncturing structure (e.g., similar in function to air tube 1134) configured to allow air to flow into an upper portion of the cartridge reservoir 304 to enable pressure equalization as cleaning composition flows out of the cartridge reservoir 304. The connector interface 1110 may include a protecting plate defining a recess having openings aligned with the puncturing structures and that is spring-loaded by a spring and is configured to move vertically between an upper rest position where the puncturing structures are underneath the protecting plate and external to the recess and a lower compressed position where the spring is compressed and where the puncturing structures extend through the openings in the protecting plate to be located within the recess. The protecting plate may be configured to receive the cartridge outlet 301A into the recess such that the cartridge 300 pushes the protecting plate downwards against the spring to expose the puncturing structures to puncture the membrane of the cartridge 300 and to establish fluid communication between the cartridge reservoir 304 and the dispenser device 204 (e.g., via the reservoir 1130). Upon removal of the cartridge 300 from the drain cleaner apparatus 200, the protecting plate may rise, under load from the spring, back to the rest position to obscure the puncturing structures. A distal portion of the cartridge 300 including the cartridge outlet 302A may be indented (e.g., include a notch structure or cavity) in relation to a remainder to the cartridge housing 302, and the drain cleaner apparatus 200 may include a spring-loaded locking mechanism configured to engage and couple with the indented portion of the cartridge 300 when the cartridge 300 is inserted into the apparatus reservoir 1102 to hold the cartridge 300 coupled with the drain cleaner apparatus 200. The locking mechanism may further be configured to lock the protecting plate in the upper rest position when the locking mechanism is in a spring-loaded rest position. The locking mechanism may be configured to move (e.g., move horizontally) against the spring to a compressed position to unlock the vertical movement of the protecting plate, based on the locking mechanism engaging a surface of a cartridge 300 being inserted into the drain cleaner apparatus 200, thereby enabling the cartridge outlet 302A to enter the recess of the protecting plate and push the protecting plate downwards to expose the puncturing structures. The cartridge 300 may be configured to include the indented portion that is positioned to engage the locking mechanism when the cartridge outlet 302A is inserted into the bottom of the recess of the protecting plate and the protecting plate is moved downwards to the lower, compressed position. When the locking mechanism engages the indented portion, the locking mechanism may return from the compressed position to an at least partial rest position, where the locking mechanism engaged with the indented portion may be in locking engagement with the cartridge 300 and may lock the cartridge 300 in place in relation to the drain cleaner apparatus 200. The drain cleaner apparatus 200 may include a release mechanism configured to release the locking mechanism from locking engagement with the cartridge 300 to enable decoupling of the cartridge 300 from the drain cleaner apparatus 200.

As further shown in FIGS. 11A-12D, the drain cleaner apparatus 200 may include a power supply compartment 1140 which may be at least partially defined by the housing 201 (e.g., the side housing 1104) and in which a power supply (e.g., batteries 1142 may be located and may be electrically coupled (e.g., via internal circuitry of the drain cleaner apparatus 200) with the dispenser device 204, the controller 210, a network communication interface 224, etc., or the like of the drain cleaner apparatus 200. The drain cleaner apparatus 200 may include a power supply cover plate 1108 which may be configured to couple with the housing 201 to cover the power supply compartment 1140 and to at least partially define an outer surface of the drain cleaner apparatus 200.

Still referring to FIGS. 11A-12D, the drain cleaner apparatus 200 may include a user interface 1182 (e.g., a button) with which a user may interact (e.g., press the button) to control operation of the drain cleaner apparatus 200, for example to turn the drain cleaner apparatus 200 on or off (e.g., activate or deactivate the drain cleaner apparatus 200), to cause the controller 210 to enable/activate controlling of the dispenser device 204 (e.g., one or more valves 1198 thereof) to be actuated to dispense cleaning composition at fixed intervals) and/or to cause the controller 210 disable/deactivate the dispenser device 204 from being actuated at fixed intervals. It will be understood that the controller 210 of the drain cleaner apparatus 200 may include any of the elements of any of the example embodiments of the controller 210 as described herein and/or illustrated in any of the drawings. It will be understood that the drain cleaner apparatus 200 shown in FIGS. 11A-12D may include any of the elements of any of the example embodiments of the drain cleaner apparatus 200 as described herein and/or illustrated in any of the drawings, including for example a network communication interface 224.

The drain cleaner apparatus 200 and/or any portion thereof (e.g., controller 210, network communication interface 224, etc.) may be configured to perform any of the functions described herein and/or illustrated in any of the drawings with regard to any of the example embodiments. For example, in some example embodiments the controller 210 may be configured to actuate the dispenser device 204 (e.g., at least one valve 1198 thereof) in response to a determination, by the controller 210, of an elapse of a particular (e.g., predetermined, fixed) period of time. The controller 210 may be configured to repeatedly actuate the dispenser device 204 at a fixed time interval that is the particular period of time, based on monitoring a timer (which may be implemented by the controller 210) that increments a timer value at a fixed frequency, actuating the dispenser device 204 in response to the timer value reaching a particular time value corresponding to the elapse of the particular period of time, and resetting the timer value to an initial timer value in response to actuating the dispenser device 204. The controller 210 may be configured to monitor a counter (which may be implemented by the controller 210) that increments a counter value in response to each actuation of the dispenser device 204, and generate a depletion signal (which may be communicated to an external device via the network communication interface 224 and/or may be used to generate a visual signal by one or more light indicators 1184 such as activating a yellow LED thereof) in response to the counter value reaching a particular counter value that corresponds to at least partial depletion of a fixed reservoir (e.g., the reservoir 1130 and/or the cartridge reservoir 304) of the cleaning composition.

In some example embodiments, the controller 210 may be configured to adjust (e.g., calibrate) the particular counter value to correspond to a number of actuations corresponding to a particular volume of the cartridge reservoir 304. For example, in some example embodiments, the cartridge reservoir 304 is configured to hold a volume of about 36 oz of cleaning composition, but example embodiments are not limited thereto; for example, the drain cleaner apparatus 200 may be configured to couple with various sizes of cartridges 300 having similar connector interfaces 1208A and 1208B configured to couple with the connector interface 1110 of the drain cleaner apparatus 200 but having different volumes of cartridge reservoir 304, including a volume of 36 oz, 72 oz, or the like. The controller 210 may be configured to determine a volume of the cartridge reservoir 304 in response to receiving a command signal indicating the volume of the cartridge reservoir, and adjust the particular counter value based on the determination of the volume of the cartridge reservoir. For example, in some example embodiments the drain cleaner apparatus 200 may be configured to receive a command signal indicating the cartridge reservoir 304 volume of a coupled cartridge 300 via a command from a remote computing device 700 received via the network communication interface 224 based on human user interaction with at least a portion of an interface of the remote computing device 700 (e.g., the display screen interface 760, which may be a touchscreen display) to cause the remote computing device 700 to inform the drain cleaner apparatus 200 of the volume of the coupled cartridge 300 and/or to command the drain cleaner apparatus 200 to adjust the particular counter value to correspond to the volume of the coupled cartridge 300. In another example, in some example embodiments the drain cleaner apparatus 200 may be configured to receive a command signal indicating the cartridge reservoir 304 volume of a coupled cartridge 300 via a command received from a user interface 1182 of the drain cleaner apparatus 200 via user interaction therewith.

In another example, in some example embodiments the drain cleaner apparatus 200 may be configured to receive a command signal indicating the cartridge reservoir 304 volume of a coupled cartridge 300 based on sensor data generated by a sensor device of the drain cleaner apparatus 200. The drain cleaner apparatus 200 may include a pressure sensor (e.g., any known pressure sensor) that is exposed to the reservoir 1130, the cylindrical conduit 1118, the upper surface of the upper disc structure 1110A configured to be directly exposed to the cartridge reservoir 304 of a coupled cartridge 300, or any portion of the drain cleaner apparatus 200 configured to be in fluid communication with the cartridge reservoir 304 of a coupled cartridge 300. The pressure sensor may generate sensor data indicating a static pressure of cleaning composition at the location of the pressure sensor in the drain cleaner apparatus 200 and may communicate such sensor data to the controller 210. The controller may be configured to process the sensor data to determine a pressure value indicated by the sensor data and may determine a corresponding volume of cleaning composition held in a cartridge reservoir 304 of a coupled cartridge 300 based on applying the sensor data and/or pressure value indicated thereby to an empirically-determined look-up table that associates sensor data and/or indicated pressure values with corresponding magnitudes of volume of cleaning composition held in the cartridge reservoir 304 of a coupled cartridge 300. The controller 210 may be configured to monitor variations in the pressure data and/or corresponding volume indicated by the sensor data and look-up table over time. In response to a rate of change of the pressure and/or volume indicated by the sensor data that exceeds a threshold rate of change that is stored at the controller, where exceeding the threshold rate is associated with an at least partially depleted cartridge 300 being replaced with a new, more full cartridge 300 being newly coupled to the drain cleaner apparatus 200, the controller 210 may responsively monitor a new volume indicated by the sensor data and look-up table subsequent to the rate of change of indicated volume/pressure value subsequently dropping below the threshold rate to indicate that the newly-coupled cartridge 300 is stabilized, where the new volume determined based on processing the sensor data in view of the look up corresponds to the volume of the cartridge reservoir 304. The controller 210 may responsively adjust the particular counter value to a value corresponding to a quantity of actuations (each actuation corresponding to causing the dispenser device 204 to dispense a particular amount (e.g., volume) of cleaning composition such as 3 oz) that is at least a particular proportion of the determined volume of the new cartridge reservoir 304 (e.g., 90% of the determined volume).

In some example embodiments, the drain cleaner apparatus 200 may include a network communication interface 224 that is configured to establish a network communication link with a remote device (e.g., a remote computing device). The controller 210 may be configured to cause a depletion signal to be transmitted to the remote computing device 700 via the network communication link. The controller 210 may be configured to cause the counter value to be reset to an initial counter value in response to receiving a reset signal from the remote computing device via the network communication link. It will be understood that the controller 210 and/or the network communication interface 224 may be configured to perform any of the communications and/or interactions with one or more remote computing devices 700 as described herein with regard to any of the example embodiments of the drain cleaner apparatus 200, the remote computing device 700, or the like, including the operations and/or interactions between the drain cleaner apparatus 200 and a remote computing device 700 via network communication link 702 as described herein with regard to at least FIG. 7, FIG. 8, FIG. 9, or the like.

In some example embodiments, referring to FIGS. 11A-12D and further referring to FIG. 1, the drain cleaner apparatus 200 may be communicatively coupled, via an electrical connection 1152 extending through an opening 1150 in the housing 201 or via a wireless network connection, with a float switch of the air handler 102 of an air conditioning system 100 with a controller of the air condition system 100, with the air handler 102 itself (e.g., with a controller 140 of the air handler 102 via a float switch signal connection interface 148 of the controller 140), and/or with a device/apparatus configured to control the float switch and/or controller of the air conditioning system 100.

The electrical connection 1152 may comprise one or more wires ("wiring") electrically coupled to the controller 210 and extending out of the drain cleaner apparatus 200, for example via opening 1150. For example, in some example embodiments, the electrical connection 1152 may include two or more separate sets of wires, each separate set of wires including at least two wires comprising at least a portion of an electrical circuit that includes at least a portion of circuitry of the drain cleaner apparatus 200 (e.g., an electrical circuit that includes at least the controller 210), such that the electrical connection 1152 may comprise a plurality of sets of wires that at least partially comprise separate, respective electrical circuits that each include at least a portion of circuitry of the drain cleaner apparatus 200 (e.g., the separate respective electrical circuits may include separate and/or common portions of the controller 210). Each wire extending from the drain cleaner apparatus 200 may at least partially comprise an electrical connection, implemented by at least serially coupled wires and connections (e.g., male/female connections), between the drain cleaner apparatus 200 and one or more separate devices, as described herein.

In some example embodiments, the controller 210 may be configured to detect an occurrence of an event (e.g., actuation of a float switch) based on detecting a signal in a first electrical circuit (labeled as electrical connection 1502 herein) that comprises at least one set of wires of the electrical connection 1152, for example a first set of at least two wires extending from the drain cleaner apparatus 200 to be centrically connected to a drain cleaner float switch 1610 as described herein to establish the first electrical circuit as including at least a portion of the drain cleaner apparatus 200 and at least a portion of the drain cleaner float switch 1610. It will be understood that, as described herein, elements "electrically connected" to other elements may be directly or indirectly electrically connected thereto (e.g., electrically connected via one or more interposing conductive elements, including one or more serially connected wires). The drain cleaner apparatus 200 may provide a power source (e.g., from a power supply of the drain cleaner apparatus 200 such as batteries 1142) coupled to the first set of at least two wires to drive the electrical current in the first electrical circuit when said first electrical circuit is closed. The signal detected in the first electrical circuitry by the drain cleaner apparatus 200 may include a float switch signal that may be detected by the drain cleaner apparatus 200 (e.g., by controller 210) as an initiation or inhibition of electrical current in the first electrical circuit due to closing or opening of a switch implemented by and/or included in the drain cleaner float switch 1610 to close or open the first electrical circuit. For example, the drain cleaner apparatus 200 may include a sensor such as an ammeter, current sensor, or the like configured to detect (e.g., generate signals which may be processed by the controller 210 to detect in response to) a presence and/or magnitude of electrical current in the first set of at least two wires extending from the drain cleaner apparatus 200 to at least partially comprise the first electrical circuit. The controller 210 may respond to a determination of a presence or absence of electrical current (e.g., a presence or absence of current above a threshold magnitude) in the first set of at least two wires, a change between an absence and a presence of at least a threshold electrical current in the first set of at least two wires, or the like, based on processing and/or detecting signals generated by the sensor to determine that a float switch signal is received from the drain cleaner float switch 1610 indicating that the drain cleaner float switch 1610 is actuated in response to a fluid engaging the drain cleaner float switch 1610.

In some example embodiments, the controller 210 may be configured to, in response to detecting the occurrence of the event (e.g., in response to detecting the float switch signal from the drain cleaner float switch 1610 via detecting presence, absence, change between presence and absence, etc. of an electrical current in the first electrical circuit), transmit a separate signal in a separate, second electrical circuit (labeled as electrical connection 1504 in FIG. 15A) that comprises a separate, second set of wires of the electrical connection 1152, for example a second set of at least two wires extending from the drain cleaner apparatus 200 to a remote device, such as the actuator apparatus 900 as described herein, an actuator 910 of the actuator apparatus 900 as described herein, or the like to establish the second electrical circuit as including at least a portion of the drain cleaner apparatus 200 and at least a portion of the actuator apparatus 900 (e.g., the actuator 910, a servoactuator or servomotor thereof, etc.). The drain cleaner apparatus 200 may provide a power source (e.g., from a power supply of the drain cleaner apparatus 200 such as batteries 1142) coupled to the second set of at least two wires to drive an electrical current in the second electrical circuit when said second electrical circuit is closed. The separate signal may be "transmitted" based on the drain cleaner apparatus 200 (e.g., the controller 210) controlling (e.g., initiating, for a particular, predetermined period of time) a flow of electrical current in the second electrical circuit (e.g., based on controller 210 operating a switch implemented by and/or included in the drain cleaner apparatus 200 to close or open the second electrical circuit, respectively, based on the controller 210 selectively and/or adjustably controlling a supply of electrical power to the actuator apparatus 900 and/or the actuator 910 via the second electrical circuit, or the like) for a particular period of time. Such controlled flow of electrical current in the second electrical circuitry may be referred to as a signal, command, signal or the like (e.g., an actuator command signal) to cause the actuator 910 of the actuator apparatus 900 to actuate an air handler float switch 160 of the air handler 102 which is held in the actuator apparatus 900, to cause a flow of electrical current in a separate electrical circuit (labeled as electrical connection 1506 herein) between at least a portion of the air handler 102 (e.g., controller 140 thereof) and the air handler float switch 160 to be initiated or inhibited (e.g., based on the actuation of the air handler float switch 160 closing or opening the separate electrical circuit between the air handler 102 and the air handler float switch 160). Such initiated or inhibited flow of electrical current in the separate electrical circuit that includes at least a portion of the air handler 102 (e.g., the controller 140) and the air handler float switch 160, where the initiation or inhibition of electrical current in the separate electrical circuit is caused by actuation of the air handler float switch 160 by the actuator 910 of the actuator apparatus 900, may be detected and processed by a portion of the air conditioning system 100 (e.g., the air handler 102, the controller 140, etc.) to be a receipt and/or detection of a float switch signal "transmitted" by the air handler float switch 160 to command a shutdown of at least a portion of at least a portion of the air conditioning system 100 (e.g., at least the air handler 102) thereby causing at least a portion of the air conditioning system 100 (e.g., at least the air handler 102) to shut down (e.g., based on operation of the controller 140) in response to detection (e.g., by the controller 140) of the signal that is "transmitted" by the air handler float switch 160 due to actuation thereof by the actuator 910 of the actuation apparatus 900 based on a signal transmitted to the actuator apparatus 900 from the drain cleaner apparatus 200 via the separate, second electrical circuit. For example, the separate electrical circuit (e.g., electrical connection 1506) may at least partially comprise at least two particular wires extending from the controller 140 (e.g., electrically connected to at least interface 148 thereof) and electrically connected with separate, respective wires extending from the air handler float switch 160 and at least partially comprising an electrical circuit that includes the air handler float switch 160, and the air handler float switch 160 may be configured to selectively open or close the separate electrical circuit, to selectively inhibit or initiate flow of electrical current in the separate electrical circuit, based on being actuated. The air handler 102 may be configured to provide and electrical power supply to the separate electrical circuit to drive an electrical current in the separate electrical circuit when closed. The air handler 102 (e.g., the controller 140) may include a sensor such as an ammeter, current sensor, or the like configured to detect and/or generate data which may be processed by the controller 140 to detect (e.g., generate signals which may be processed by the controller 140 to detect in response to) a presence and/or magnitude of electrical current in the at least two particular wires extending from the controller 140 (e.g., electrically connected to at least interface 148 thereof) to at least partially comprise the separate electrical circuit. The controller 140 may respond to a determination of a presence or absence of electrical current (e.g., a presence or absence of current above a threshold magnitude) in the at least two particular wires, a change between an absence and a presence of at least a threshold electrical current in the second set of at least two wires, or the like, based on processing and/or detecting signals generated by the sensor to determine that a float switch signal is received from the air handler float switch 160 indicating that the air handler float switch 160 is actuated in response to the actuator 910 actuating the air handler float switch 160.

Figure 15B:
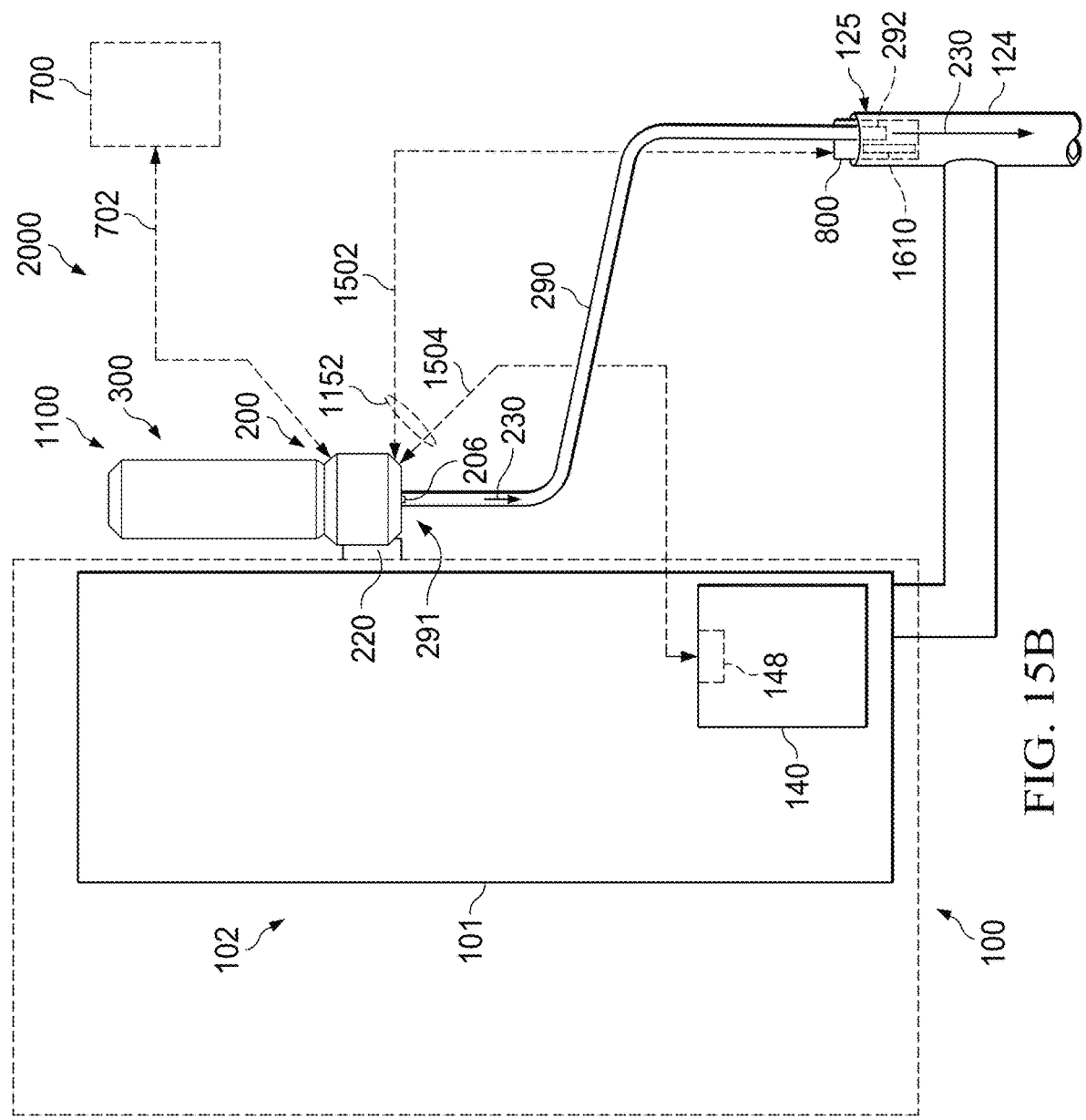
FIG. 15B is a schematic view of a system including a drain cleaner apparatus system and a float switch apparatus, according to some example embodiments.

In some example embodiments, the controller 210 may be configured to, in response to detecting the occurrence of the event (e.g., in response to detecting the float switch signal from the drain cleaner float switch 1610 via detecting presence, absence, change between presence and absence, etc. of an electrical current in the first electrical circuit), transmit a separate signal in a separate, second electrical circuit (labeled as electrical connection 1504 in FIG. 15B) that comprises a separate, second set of wires of the electrical connection 1152, for example a second set of at least two wires extending from the drain cleaner apparatus 200 to a remote device, such as the air handler 102 of the air conditioning system 100, a controller 140 of the air handler 102, or the like to establish the second electrical circuit as including at least a portion of the drain cleaner apparatus 200 and at least a portion of the air conditioning system 100 (e.g., at least a portion of the air handler 102, the controller 140, the float switch signal connection interface 148, etc.). The drain cleaner apparatus 200 may provide a power source (e.g., from a power supply of the drain cleaner apparatus 200 such as batteries 1142) coupled to the second set of at least two wires to drive an electrical current in the second electrical circuit when said second electrical circuit is closed. The separate signal may be "transmitted" based on the drain cleaner apparatus 200 (e.g., the controller 210) controlling (e.g., initiating, inhibiting, adjusting a magnitude and/or frequency of, etc.) a flow of electrical current in the second electrical circuit, for example based on controller 210 operating a switch implemented by and/or included in the drain cleaner apparatus 200 to close or open the second electrical circuit, respectively, based on the controller 210 selectively and/or adjustably controlling a supply of electrical power to the portion of the air conditioning system 100 (e.g., at least a portion of the air handler 102, the controller 140, the float switch signal connection interface 148, etc.) via the second electrical circuit, or the like. Such controlled (e.g., initiated, inhibited, adjusted, etc.) flow of electrical current in the second electrical circuitry may be referred to as a signal, command, signal or the like (e.g., an electrical signal, a float switch signal, or the like) transmitted to the portion of the air conditioning system 100 (e.g., at least a portion of the air handler 102, the controller 140, the float switch signal connection interface 148, etc.). Such initiated or inhibited flow of electrical current in the second electrical circuit that includes the portion of the air conditioning system 100 may be detected and processed by the portion of the air conditioning system 100 (e.g., the air handler 102, the controller 140, etc.) to be a receipt and/or detection of a float switch signal "transmitted" by the drain cleaner apparatus 200 to command a shutdown of at least a portion of at least a portion of the air conditioning system 100 (e.g., at least the air handler 102) thereby causing at least a portion of the air conditioning system 100 (e.g., at least the air handler 102) to shut down (e.g., based on operation of the controller 140) in response to detection (e.g., by the controller 140) of the signal that is "transmitted" by the drain cleaner apparatus 200 (e.g., by controller 210). For example, the second electrical circuit (e.g., electrical connection 1504 as shown in FIG. 15B) may at least partially comprise at least two particular wires extending from the controller 140 (e.g., electrically connected to at least interface 148 thereof) that are electrically connected to separate, respective wires of the second set of at least two wires extending from the drain cleaner apparatus 200 and at least partially comprising an electrical circuit that includes at least a portion of the drain cleaner apparatus 200 (e.g., the controller 210) and the portion of the air conditioning system 100 (e.g., at least a portion of the air handler 102, the controller 140, the float switch signal connection interface 148, etc.). The air handler 102 (e.g., the controller 140) may include a sensor such as an ammeter, current sensor, or the like configured to detect and/or generate data which may be processed by the controller 140 to detect (e.g., generate signals which may be processed by the controller 140 to detect in response to) a presence and/or magnitude of electrical current in the at least two particular wires extending from the controller 140 (e.g., electrically connected to at least interface 148 thereof) to at least partially comprise the second electrical circuit. The controller 140 may respond to a determination of a presence or absence of electrical current (e.g., a presence or absence of current above a threshold magnitude) in the at least two particular wires, a change between an absence and a presence of at least a threshold electrical current in the second set of at least two wires, or the like, based on processing and/or detecting signals generated by the sensor to determine that an electrical signal (e.g., a float switch signal is received, indicating that a float switch is actuated.

Each set of one or more wires extending out of the drain cleaner apparatus 200 may at least partially comprise the electrical connection 1152 such that each set of wires of the electrical connection 1152 may at least partially comprise a set of serially coupled wires and connections (e.g., male/female connections) to connect a wire extending from the drain cleaner apparatus 200 to a separate wire extending from one or more separate devices to at least partially establish an electrical circuit that includes at least a portion of the drain cleaner apparatus 200 and at least a portion of the one or more separate devices, where such one or more separate devices may include, for example, at least one of the float switch apparatus 800, the actuator apparatus 900, the air conditioning system 100, the air handler 102, the controller 140 of the air handler 102, the float switch interface connection 148 of the controller 140, or the like. The controller 210 may be configured to cause the air conditioning system 100 to shut down (e.g., based on causing an air handler float switch of the air conditioning system 100 to actuate, based on transmitting a command signal to the controller of the air conditioning system 100 which causes the controller of the air conditioning system 100 to shut down the air conditioning system 100. The controller 210 may be configured to cause the air conditioning system 100 to shut down in response to receiving a shutdown command signal from a remote computing device via the network communication link established by the network communication interface 224.

Still referring to FIGS. 11A-12D, the drain cleaner apparatus 200 may include light indicators 1184 (e.g., light emitting diodes, or LEDs) which may extend through respective openings in the housing 201 (e.g., respective openings in the side housing 1104 as shown) and may be configured to provide visible indications of a status of the drain cleaner apparatus 200. For example, referring to FIG. 11A, the light indicators 1184 may include a left-most green LED configured to selectively emit green light, a center-left yellow LED configured to selectively emit yellow light, a center-right red LED configured to selectively emit red light, and a right-most blue LED configured to selectively emit blue light. The controller 210 may selectively activate the green LED to emit green light to indicate that the drain cleaner apparatus 200 is activated (e.g., based on human user interaction with the user interface 1182 and/or with a remote computing device 700 to cause the remote computing device 700 to command the drain cleaner apparatus 200 to activate via a network communication link 702) and/or to indicate that the controller 210 is presently implementing a timer to enable actuating the dispenser device 204 at a fixed frequency (e.g., fixed intervals). The controller 210 may be configured to selectively activate the yellow LED to emit yellow light to indicate a depletion signal in response to a determination that a counter value implemented by the controller 210, as described herein, reaches a particular counter value that corresponds to at least partial depletion of a fixed reservoir (e.g., the cartridge reservoir 304) of the cleaning composition as described herein according to any of the example embodiments. It will be understood that the controller 210 may be configured to selectively deactivate operation of at least the dispenser device 204 (e.g., disable the periodic actuation of the dispenser device 204), activate a visual indicator such as the yellow LED, and/or transmit a warning signal to a remote computing device 700 via a network communication link 702 to cause the remote computing device to generate (e.g., transmit) a warning (e.g., a graphic indication shown on the display screen interface 760) to warn a supported human user that the cartridge reservoir 304 is at least partially depleted in response to determination that the counter value has reached or exceeded the particular counter value. The controller 210 may be configured to selectively activate the red LED to emit red light in response to a determination that the electrical circuit including the electrical switch device 1280 is open, such that the controller 210 determines that the drain cleaner apparatus 200 is not coupled with a cartridge 300 while the drain cleaner apparatus 200 is activated. It will be understood that the controller 210 may be configured to selectively deactivate operation of at least the dispenser device 204 (e.g., disable the periodic actuation of the dispenser device 204), activate a visual indicator such as the red LED, and/or transmit a warning signal to a remote computing device 700 via a network communication link 702 to cause the remote computing device to generate (e.g., transmit) a warning (e.g., a graphic indication shown on the display screen interface 760) to warn a supported human user that the drain cleaner apparatus 200 has disabled operation of the dispenser device 204 due to non-coupling of the drain cleaner apparatus 200 with a cartridge 300. a supply of power (e.g., by batteries 1142) is at least partially depleted (e.g., a determined loss of power source supply voltage below 10% of a predetermined reference voltage magnitude). The controller 210 may be configured to selectively activate the blue LED to emit blue light to indicate that the network communication interface 224 has established an active network communication link 702 with at least one remote computing device 700.

Figure 14A:
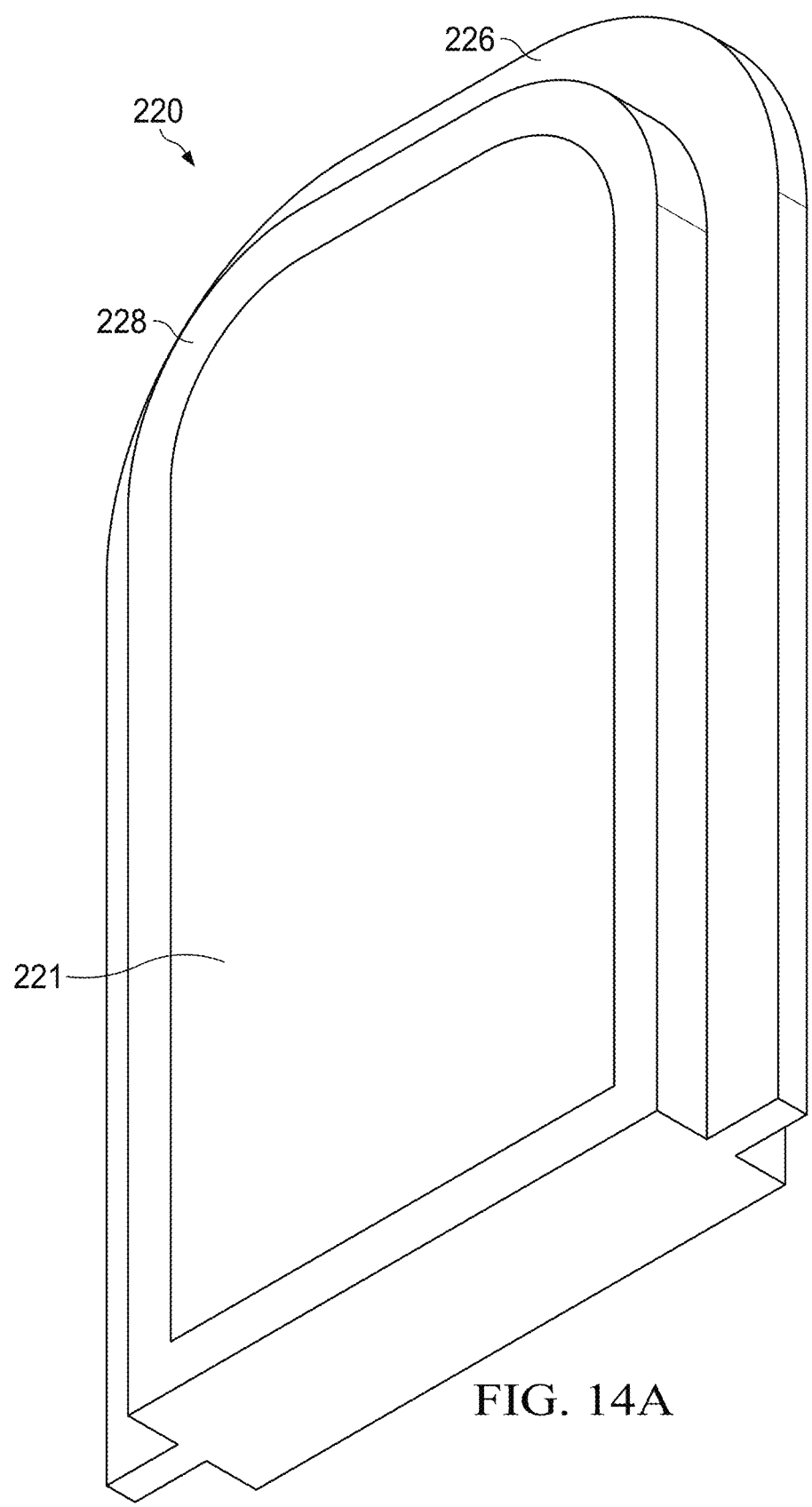
FIG. 14A is a perspective bottom-rear-left view of the structure connector shown in FIG. 11A according to some example embodiments.
Figure 14B:
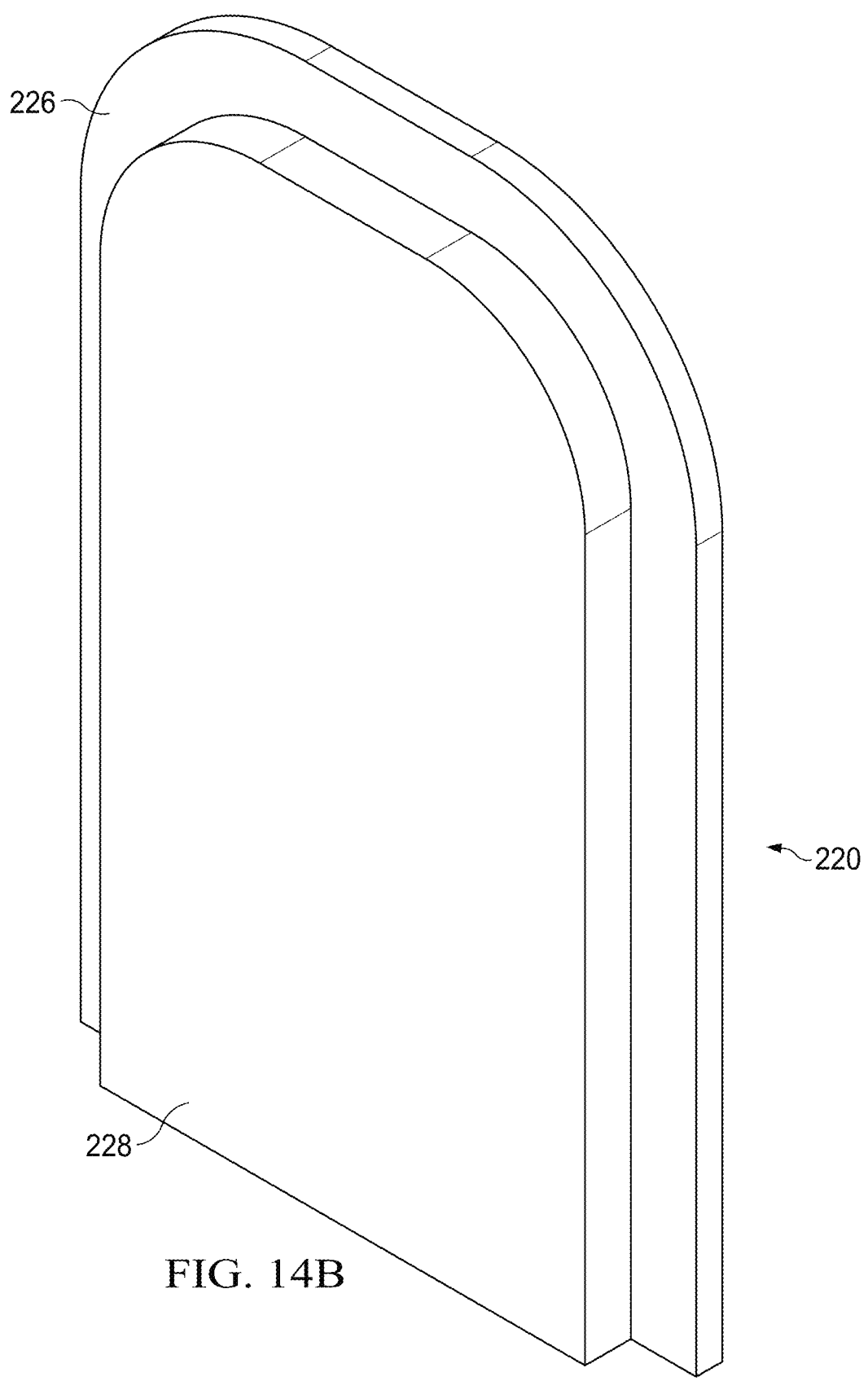
FIG. 14B is a perspective top-front-right view of the structure connector shown in FIG. 14A according to some example embodiments.
Figure 14C:
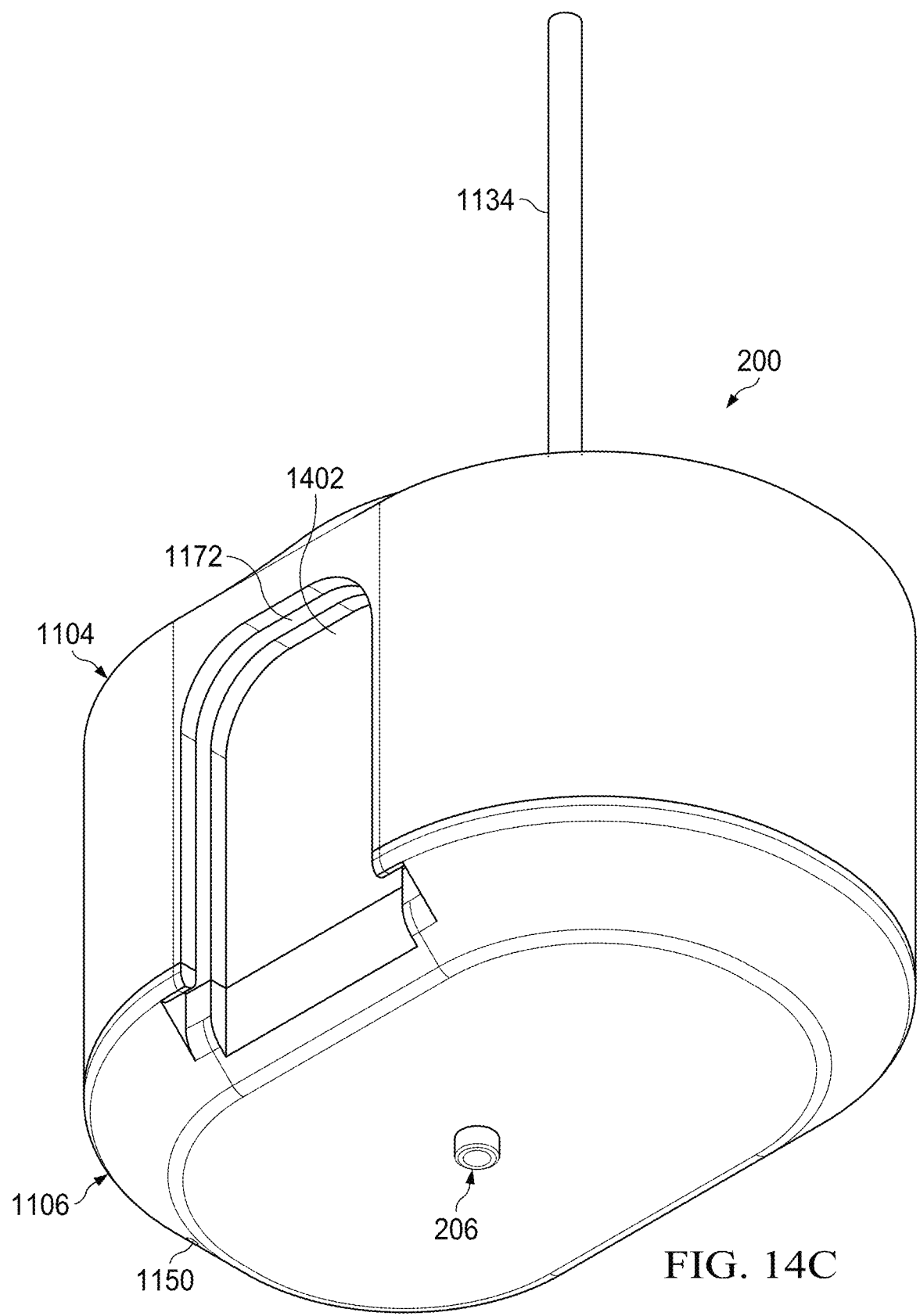
FIG. 14C is a perspective view of the drain cleaner apparatus according to some example embodiments.

FIG. 14A is a perspective bottom-rear-left view of the structure connector 220 shown in FIG. 11A according to some example embodiments. FIG. 14B is a perspective top-front-right view of the structure connector 220 shown in FIG. 14A according to some example embodiments. FIG. 14C is a perspective view of the drain cleaner apparatus 200 according to some example embodiments. FIG. 14D is a plan bottom view of the drain cleaner apparatus 200 according to some example embodiments. It will be understood that the structure connector 220 and the drain cleaner apparatus 200 shown in FIGS. 11A-12D may include any of the elements of any of the example embodiments of the structure connector and/or the drain cleaner apparatus shown in any of the drawings and/or described herein.

As shown in FIGS. 14A-14D, the structure connector 220 may include a housing structure 228 (e.g., a plastic structure), a coupling structure 221 that is coupled (e.g., adhered via an adhesive) to the housing structure 228, and an interface structure 226 configured to engage a complementary coupling structure 1172 of the drain cleaner apparatus 200 to couple the structure connector 220 to the drain cleaner apparatus 200 and thus enable the structure connector 220 to couple the drain cleaner apparatus 200 to the fixed structure to which the coupling structure 221 is coupled.

In some example embodiments, the coupling structure 221 is or includes a magnet configured to magnetically attach the structure connector 220 to a fixed external structure, such as a metal surface of the external structure, for example a metal housing 101 of an air handler 102 as shown in FIG. 1. Thus, the magnet coupling structure 221 may configure the structure connector 220 to be magnetically coupled to a metal external structure such as a metal housing 101 of an air handler 102. In some example embodiments, the coupling structure 221 may include an adhesive material configured to adhere to a surface of an external structure.

As shown in FIGS. 14A-14D, in some example embodiments, the interface structure 226 may include a flange or bracket structure configured to slidably engage with a complementary, downwards-opening complementary coupling structure 1172 (e.g., complementary flange or bracket structure) at least partially defining a slot or cavity 1402 in the drain cleaner apparatus 200 housing 201 that is configured to accommodate at least a portion of the structure connector 220 due to relative downwards motion of the drain cleaner apparatus 200 in relation to the structure connector 220 (e.g., downwards sliding engagement of the complementary coupling structure 1172 with the interface structure 226 of the structure connector 220 so that at least a closed top portion of the complementary coupling structure 1172 engages a top portion of the interface structure 226 to transfer a load or weight of the drain cleaner apparatus 200 and any cartridge 300 coupled thereto to the structure connector 220. As a result of the structure connector 220 being coupled (e.g., magnetically coupled) to a fixed external structure via the coupling structure 221 (e.g., magnet) being coupled to the fixed external structure, the drain cleaner apparatus 200 and any cartridge 300 coupled thereto (e.g., the drain cleaner apparatus system 1100, which may be referred to interchangeably herein as a drain cleaner system) may at least partially rest upon the structure connector 220 to be held in place in relation to the external structure (e.g., to at least partially transfer a load or weight of the drain cleaner apparatus system 1100 to the fixed external structure via the structure connector 220. It will be understood that the drain cleaner apparatus 200 and the cartridge 300 coupled (e.g., connected, detachably connected, etc.) thereto may collectively partially or entirely comprise the drain cleaner apparatus 1100, which may be referred to interchangeably herein as a drain cleaner system.

It will be understood that the structures of the interface structure 226 and the complementary coupling structure 1172 may be different from the example embodiments shown in FIGS. 11A-11F and 14A-14D. As shown, the interface structure 226 of the structure connector 220 may be a protruding tab (e.g., male, or flange) connector structure and the complementary coupling structure 1172 may be a complementary slot (e.g., female) connector structure configured to slidably engage the interface structure 226 to receive the structure connector 220 into the cavity 1402, but example embodiments are not limited thereto. For example, in some example embodiments, the interface structure 226 of the structure connector 220 may be a slot (e.g., female) connector structure and the complementary coupling structure 1172 may be a complementary protruding tab (e.g., male, or flange) connector structure configured to slidably engage the interface structure 226 to receive the structure connector 220 into the cavity 1402. In some example embodiments, the drain cleaner apparatus 200 may include an interlock structure configured to lock the structure connector 220 together with the drain cleaner apparatus 200. In some example embodiments, the structure connector 220 may be configured to be detachably coupled to the drain cleaner apparatus 200 or may be a fixed part of the drain cleaner apparatus, omitting the interface structure 226 while the drain cleaner apparatus 200 omits the complementary coupling structure 1172, that is configured to not be detached from the drain cleaner apparatus 200.

FIG. 15A is a schematic view of a system 2000 including a drain cleaner apparatus system 1100 that further includes a drain cleaner apparatus 200 and a cartridge 300, a float switch apparatus 800, and an actuator apparatus 900, according to some example embodiments. As shown, the drain cleaner apparatus 200 may be communicatively coupled to at least one remote computing device 700 via a network communication link 702 and configured to operate based at least in part upon communication with the remote computing device 700 as described herein with reference to any of the example embodiments, but example embodiments are not limited thereto. It will be understood that the drain cleaner apparatus 200 and the air handler 102 shown in FIG. 15A may include any of the elements of any of the example embodiments of the drain cleaner apparatus 200 and/or the air handler 102 shown in any of the drawings and/or described herein. It will be understood that the float switch apparatus 800 shown in FIG. 15A may include any of the elements of any of the example embodiments of the float switch apparatus 800 shown in any of the drawings and/or described herein. It will be understood that the actuator apparatus 900 shown in FIG. 15A may include any of the elements of any of the example embodiments of the actuator apparatus 900 shown in any of the drawings and/or described herein.

Referring to FIG. 15A, in some example embodiments, the apparatus outlet 206 of the drain cleaner apparatus 200 may be coupled to a first end of a dispenser conduit 290 (e.g., a tube, hose, or the like), where the dispenser conduit 290 has an opposite second end that is positioned in fluid communication with the condensate drain line 124 (e.g., extending through and/or coupled with the opening 125 of the condensate drain line 124 via a clip connector, adhesive, or any known coupling device), such that the apparatus outlet 206 of the drain cleaner apparatus 200 is in fluid communication with the condensate drain line 124 through at least the dispenser conduit 290. The dispenser conduit 290 may be a flexible tube (e.g., a vinyl tube), such that the dispenser conduit 290 may enable the drain cleaner apparatus 200 to be adjustably positioned in various fixed positions in relation to the opening 125 of the condensate drain line 124, thereby improving flexibility of the drain cleaner apparatus 200 to provide cleaning composition 230 dispensation to the condensate drain line in various environments having different arrangements of structures to which the drain cleaner apparatus 200 may be coupled (e.g., a surface of housing 101 to which the drain cleaner apparatus 200 may be coupled via structure connector 220) in relation to the opening 125 of the condensate drain line 124.

Still referring to FIG. 15A, the air handler 102 of the air conditioning system 100 may include an air handler float switch 160 (which may be any known float switch), and the air handler 102 may be configured to shut down in response to actuation of the air handler float switch 160. For example, the air handler 102 may include a controller 140 according to any of the example embodiments described and/or illustrated herein, where the controller 140 is configured to shut down the air handler 102 in response to actuation of the air handler float switch 160, as the air handler float switch 160 may be configured to communicate a float switch actuation signal to the controller 140 via an electrical connection 1506 between the air handler float switch 160 and the controller 140.

The electrical connection 1506 may comprise serially coupled (e.g., serially connected) wires and connections (e.g., male/female connections) to connect wiring (e.g., two or more wires) extending from the air handler float switch 160 to a separate wiring or circuitry of the air handler 102, for example wiring (e.g., two or more separate wires) extending from a float switch signal connection interface 148 of the controller 140 or an electrical connector at the controller 140 that comprises a float switch signal connection interface 148. The controller 140 may be configured to receive float switch signals from the float switch 160 at the float switch signal connection interface 148. The controller 140 may be configured to cause at least a portion of the air conditioning system 100 (e.g., the air handler 102) to shut off (e.g., shut down) in response to receiving a signal (e.g., a float switch signal) at the float switch signal connection interface 148 via which the controller 140 may be electrically connected to the air handler float switch 160 through the electrical connection 1506.

In some example embodiments, the electrical connection 1506 may include wires (also referred to herein interchangeably as wiring) extending from the air handler float switch 160 (which may be considered wiring of the air handler float switch 160) and which may be connected to wires (e.g., wiring) and/or circuitry of the air handler 102, which may be further connected to the controller 140 (e.g., the wiring extending from the air handler float switch 160 may extend to the a float switch signal connection interface 148 or may be connected to wiring and/or a connector of the air handler 102 that is further connected to the float switch signal connection interface 148 of the controller 140), to establish the electrical connection 1506. In some example embodiments, the electrical connection 1506 may be established based on connecting wiring extending from the air handler float switch 160 to corresponding wiring extending from the controller 140 (e.g., wiring extending from the float switch signal connection interface 148) in the air handler 102, for example based on connection of complementary (e.g., male/female) connectors of the respective connected wiring extending from the air handler float switch 160 and the controller 140. In some example embodiments, the electrical connection 1506 may be established based on connecting wiring extending from the air handler float switch 160 to the float switch signal connection interface 148 of the controller 140. In some example embodiments, the electrical connection 1506 may be established based on connecting an electrical connector at a distal end of wiring extending from the air handler float switch 160 to a complementary electrical connector of the air handler 102 that is electrically connected, via internal wiring and/or circuitry, to the float switch signal connection interface 148 of the controller 140.

Referring to FIG. 15A, in some example embodiments, the electrical connection 1506 may comprise a particular set of at least two wires of the air conditioning system 100 which are electrically connected (directly or indirectly) to the controller 140 (e.g., via being electrically connected to the float switch signal connection interface 148) and extend from the air conditioning system 100 (e.g., from air handler 102) and which may each be connected (e.g., directly or indirectly or indirectly, as part of a serial connection of wires and/or interfaces/connectors therebetween) to separate, respective wires extending from the air handler float switch 160 to establish the electrical connection 1506 as a float switch electrical circuit that includes at least a portion of the air conditioning system 100 (e.g., at least a portion of the air handler 102, the controller 140, the float switch signal connection interface 148, or the like) and at least a portion of the air handler float switch 160. The air handler 102 may provide a power source (e.g., from a power supply of the air handler 102, such as a connection to mains power) coupled to the particular set of at least two wires to drive the electrical current in the float switch electrical circuit of the electrical connection 1506 when said float switch electrical circuit is closed. The air handler float switch 160 may actuate to close or open the float switch electrical circuit of the electrical connection 1506 and thus enable the initiation or inhibition, respectively, of electrical current therein. The signal detected in the float switch electrical circuit of the electrical connection 1506 by at least a portion of the air conditioning system 100 (e.g., a signal received at the controller 140 from the air handler float switch 160 via the electrical connection 1506) may include a float switch signal that may be detected by at least a portion of the air conditioning system, such as the air handler 102 (e.g., by controller 140) as an initiation, inhibition, and/or change in magnitude of electrical current in the float switch electrical circuit of the electrical connection 1506 due to closing or opening of the switch implemented by and/or included in the air handler float switch 160 to close or open the float switch electrical circuit of the electrical connection 1506. For example, the air handler 102 (e.g., the controller 140) may include a sensor such as an ammeter, current sensor, or the like configured to detect (e.g., generate signals which may be processed by the controller 140 to detect in response to) a presence and/or magnitude of electrical current in the float switch electrical circuit of the of the electrical connection 1506. The controller 140 may respond to a determination of a presence or absence of electrical current (e.g., a presence or absence of current above a threshold magnitude) in the float switch electrical circuit of the electrical connection 1506, a change in magnitude of electrical current in the float switch electrical circuit of the electrical connection 1506 (e.g., a change of at least a threshold magnitude), or the like, based on processing and/or detecting signals generated by the sensor to determine that a float switch signal is received from the air handler float switch 160, via the float switch electrical circuit of the electrical connection 1506, indicating that the air handler float switch 160 is actuated. The air conditioning system 100 (e.g., the air handler 102, the controller 140, etc.) may be configured to shut down (e.g., shut off) at least a portion of the air conditioning system 100 (e.g., at least the air handler 102) in response to determining (e.g., detecting) that the float switch signal is received from the air handler float switch 160, via the float switch electrical circuit of the electrical connection 1506 (e.g., based on processing signals generated by the sensor), indicating that the air handler float switch 160 is actuated.

The air handler float switch 160 may be normally configured to be positioned in fluid communication with the condensate drain line 124 and/or a drip pan 122 of the air handler 102. However, as shown, the system 2000 may be configured to actuate 980 the air handler float switch 160, to cause the air handler 102 to shut down, without the air handler float switch encountering condensate (e.g., in response to a separate float switch being actuated, in response to a command received at the drain cleaner apparatus 200, or the like), thereby enabling improved control over air handler 102 operation and thus of air conditioning system 100 operation.

Still referring to FIG. 15A, the system 2000 may include, in addition to the drain cleaner apparatus 200, an actuator apparatus 900 configured to be electrically coupled to the drain cleaner apparatus 200 (e.g., via electrical connection 1504, which may at least partially comprise electrical connection 1152 to the controller 210 as shown in FIGS. 11A-12D). In some example embodiments, the actuator apparatus 900 may be referred to interchangeably as a "air handler float switch holster," a "float switch holster," a "holster," or the like. As shown, the actuator apparatus 900 may include an actuator 910 (e.g., a servoactuator or servomotor-driven piston, linear actuator, or the like), and the actuator apparatus 900 may be configured to position the air handler float switch 160 in relation to the actuator, such that the actuator apparatus 900 is configured to cause the actuator 910 to actuate 980 the air handler float switch 160 (e.g., based on causing a float of the air handler float switch 160 to move in relation to a remainder of the air handler float switch 160) in response to receiving an actuator command signal from the drain cleaner apparatus 200 (e.g., via electrical connection 1504).

The controller 210 of the drain cleaner apparatus 200 may be configured to transmit the actuator command signal to the actuator apparatus 900 (e.g., via electrical connection 1504) to cause the actuator 910 to actuate 980 the air handler float switch 160. The controller 210 may transmit the actuator command signal in response to receiving a command at the drain cleaner apparatus 200. Such a command may include a signal (e.g., an electrical signal, also referred to herein as a float switch signal) received from a separate float switch that is in fluid communication with the condensate drain line 124 and electrically coupled to the drain cleaner apparatus 200 (e.g., the controller 210) via an electrical connection 1502 (where electrical connections 1502 and 1504 collectively comprise the electrical connection 1152 described herein although potentially including separate electrical wire connections).

Electrical connections 1502 and 1504 may each comprise a set of serially coupled wires and connections (e.g., male/female connections) to connect a wire extending from the drain cleaner apparatus 200 to a separate wire extending from one of the float switch apparatus 800 or the actuator apparatus 900. It will be understood that in some example embodiments the electrical connections 1502 and/or 1504 may be wireless network communication links between respective network communication interface devices of the drain cleaner apparatus 200 and at least one of the float switch apparatus 800 or the actuator apparatus 900.

Referring to FIG. 15A, in some example embodiments, the electrical connection 1502 may comprise a first set of at least two wires of the drain cleaner apparatus 200 (at least partially comprising electrical connection 1152) which are electrically connected (directly or indirectly) to the controller 210 and extend from the drain cleaner apparatus 200 (e.g., via opening 1150) and which may each be connected (e.g., directly or indirectly, as part of a serial connection of wires and/or interfaces there between) to separate, respective wires extending from the drain cleaner float switch 1610 of the float switch apparatus 800 to establish the electrical connection 1502 as a first electrical circuit that includes at least a portion of the drain cleaner apparatus 200 and at least a portion of the drain cleaner float switch 1610. The drain cleaner apparatus 200 may provide a power source (e.g., from a power supply of the drain cleaner apparatus 200 such as batteries 1142) coupled to the first set of at least two wires to drive the electrical current in the first electrical circuit of the electrical connection 1502 when said first electrical circuit is closed. The drain cleaner float switch 1610 may actuate, in response to a fluid in the condensate drain line 124 engaging the drain cleaner float switch 1610, to close or open the first electrical circuit of the electrical connection 1502 and thus enable initiation or inhibition, respectively, of electrical current in the first electrical circuit of the electrical connection 1502. The signal detected in the first electrical circuit by the drain cleaner apparatus 200 (e.g., a signal received at the drain cleaner apparatus 200 from the drain cleaner float switch 1610 via the electrical connection 1502) may include a float switch signal that may be detected by the drain cleaner apparatus 200 (e.g., by controller 210) as an initiation, inhibition, and/or change in magnitude of electrical current in the first electrical circuit of the electrical connection 1502 due to closing or opening of the switch implemented by and/or included in the drain cleaner float switch 1610 to close or open the first electrical circuit of the electrical connection 1502. For example, the drain cleaner apparatus 200 (e.g., the controller 210) may include a sensor such as an ammeter, current sensor, or the like configured to detect (e.g., generate signals which may be processed by the controller 210 to detect in response to) a presence and/or magnitude of electrical current in the first set of at least two wires extending from the drain cleaner apparatus 200 and thus of electrical current in the first electrical circuit of the of the electrical connection 1502. The controller 210 may respond to a determination of a presence or absence of electrical current (e.g., a presence or absence of current above a threshold magnitude) in the first electrical circuit of the electrical connection 1502, a change in magnitude of electrical current in the first electrical circuit of the electrical connection 1502, or the like, based on processing and/or detecting signals generated by the sensor to determine that a float switch signal is received from the drain cleaner float switch 1610, via the first electrical circuit of the electrical connection 1502, indicating that the drain cleaner float switch 1610 is actuated in response to a fluid engaging the drain cleaner float switch 1610 in the condensate drain line 124.

Still referring to FIG. 15A, in some example embodiments, the electrical connection 1504 may comprise a second set of at least two wires of the drain cleaner apparatus 200 (at least partially comprising electrical connection 1152) which are electrically connected (directly or indirectly) to the controller 210 and extend from the drain cleaner apparatus 200 (e.g., via opening 1150) and which may each be connected (e.g., directly or indirectly, as part of a serial connection of wires and/or interfaces there between) to separate, respective wires extending from the actuator apparatus 900 (e.g., from actuator 910) to establish the electrical connection 1504 as a second electrical circuit that includes at least a portion of the drain cleaner apparatus 200 and at least a portion of the actuator apparatus 900 (e.g., at least the actuator 910 thereof). The drain cleaner apparatus 200 may provide a power source (e.g., from a power supply of the drain cleaner apparatus 200 such as batteries 1142) coupled to the second set of at least two wires to drive an electrical current in the second electrical circuit of the electrical connection 1504 when said second electrical circuit is closed. The drain cleaner apparatus 200 (e.g., controller 210) may be configured to generate and transmit an electrical signal (e.g., electrical current), also referred to herein as an actuator command signal, to the actuator apparatus 900 via the second electrical circuit of the electrical connection 1504 (e.g., based on controller 210 operating a switch implemented by and/or included in the drain cleaner apparatus 200 to close or open the second electrical circuit of the electrical connection 1504, respectively, based on the controller 210 selectively and/or adjustably controlling a supply of electrical power to the actuator apparatus 900 and/or the actuator 910 via the second electrical circuit of the electrical connection 1504, or the like) for a particular period of time. Such controlled flow of electrical current in the second electrical circuitry may be referred to as a signal, command, signal or the like (e.g., an actuator command signal) to cause the actuator 910 of the actuator apparatus 900 to actuate the air handler float switch 160 of the air handler 102 which is held in the actuator apparatus 900, to cause a flow of electrical current in a separate electrical circuit (e.g., float switch electrical circuit) of the electrical connection 1506 between at least a portion of the air handler 102 (e.g., controller 140 thereof) and the air handler float switch 160 to be initiated, inhibited, or adjusted in magnitude (e.g., based on the actuation of the air handler float switch 160 closing or opening the float switch electrical circuit of the electrical connection 1506). Such initiated, inhibited, or adjusted flow of electrical current in the float switch electrical circuit of the electrical connection 1506 that includes at least a portion of the air handler 102 (e.g., the controller 140) and the air handler float switch 160, where the initiation or inhibition of electrical current in the separate electrical circuit is caused by actuation of the air handler float switch 160 by the actuator 910 of the actuator apparatus 900, may be detected and processed by a portion of the air conditioning system 100 (e.g., the air handler 102, the controller 140, etc.) to be a receipt and/or detection of a float switch signal "transmitted" by the air handler float switch 160 to command a shutdown of at least a portion of at least a portion of the air conditioning system 100 (e.g., at least the air handler 102) thereby causing at least a portion of the air conditioning system 100 (e.g., at least the air handler 102) to shut down (e.g., based on operation of the controller 140) in response to detection (e.g., by the controller 140) of the signal that is "transmitted" by the air handler float switch 160 due to actuation thereof by the actuator 910 of the actuation apparatus 900 based on a signal transmitted to the actuator apparatus 900 from the drain cleaner apparatus 200 via the separate, second electrical circuit. For example, the float switch electrical circuit of the electrical connection 1506 may at least partially comprise at least two particular wires extending from the controller 140 (e.g., electrically connected to at least interface 148 thereof) and at least partially comprising an electrical circuit that includes the air handler float switch 160, and the air handler float switch 160 may be configured to selectively open or close the separate electrical circuit, to selectively inhibit or initiate flow of electrical current in the separate electrical circuit, based on being actuated.

Accordingly, it will be understood that the actuator apparatus 900 may be configured to function similarly to the bypass device 506 described with reference to FIG. 5, where the actuator apparatus 900 may be configured to operate as a bypass device to actuate the air handler float switch 160 to cause at least a portion of the air conditioning system, including at least the air handler 102, to shut down (e.g., shut off), based on a signal generated by the drain cleaner apparatus 200 (e.g., based on a signal generated by the controller 210 as described herein), which may include shutting down at least one of the air mover 108, compressor 150, and/or air mover 154.

In addition or alternative, it will be understood that the controller 210 of the drain cleaner apparatus 200, and thus the drain cleaner apparatus 200 itself, may be configured to function similarly to the controller 210 and/or drain cleaner apparatus 200 described withe reference to FIG. 5, wherein the controller 210 is configured to cause the air handler float switch 160 to actuate to cause some or all of the air conditioning system 100 to shut down (e.g., based on operation of the controller 140 in response to float switch 160 actuation).

It will be understood that the controller 210 may be configured to generate the signal that is communicated to the actuator apparatus 900 as described herein, to cause the actuator 910 of the actuator apparatus 900 to operate (e.g., actuate) so that the actuator apparatus 900 actuates the air handler float switch 160 to cause the air handler 102 to shut down, based on the float switch signal generated by a separate flow switch, such as a float switch of the float switch apparatus 800. However, example embodiments are not limited thereto, and in some example embodiments the controller 210 may be configured to generate the signal that is communicated to the actuator apparatus 900 as described herein, to cause the actuator 910 of the actuator apparatus 900 to operate (e.g., actuate) so that the actuator apparatus 900 actuates the air handler float switch 160 to cause the air handler 102 to shut down independently to actuation of any flow switch due to presence of a fluid such as condensate at any float switch. For example, in some example embodiments, the controller 210 may be configured to generate the signal that is communicated to the actuator apparatus 900 as described herein, to cause the actuator 910 of the actuator apparatus 900 to operate (e.g., actuate) so that the actuator apparatus 900 actuates the air handler float switch 160 to cause the air handler 102 to shut down in response to the controller receiving and processing a command signal received at the drain cleaner apparatus 200. In some example embodiments, the command signal may be received at the drain cleaner apparatus 200 via a signal received at the network communication interface 224 from a remote computing device 700 via a network communication link 702 as described herein with regard to at least FIG. 7, and the drain cleaner apparatus 200 may be configured to cause the air handler float switch 160 to be actuated by the actuator apparatus 900 to cause the air handler 102 to shut down based on a remote computing device 700 transmitting a command to the drain cleaner apparatus 200 which, when received by the network communication interface 244 and transmitted to the controller 210, where the controller 210 responds to receipt and processing of the command by transmitting the signal to the actuator apparatus 900 via the electrical connection 1504. As a result, the drain cleaner apparatus 200 may be configured to cause the air handler 102 to shut down independently of a float switch being actuated due to presence of condensate in the condensate drain line 124. For example, a user supported by the remote computing device 700 may desire to cause the air conditioning system 100 to shut down, and the drain cleaner apparatus 200 and/or the actuator apparatus 900 may be configured to implement such a shutdown via the network communication link 702 and the electrical connection 1504 with the actuator apparatus 900 in which the air handler float switch 160 is positioned, thereby enabling improved control over the operation at least the air handler and/or the air conditioning system 100 as a whole via remote control.

Figure 28:
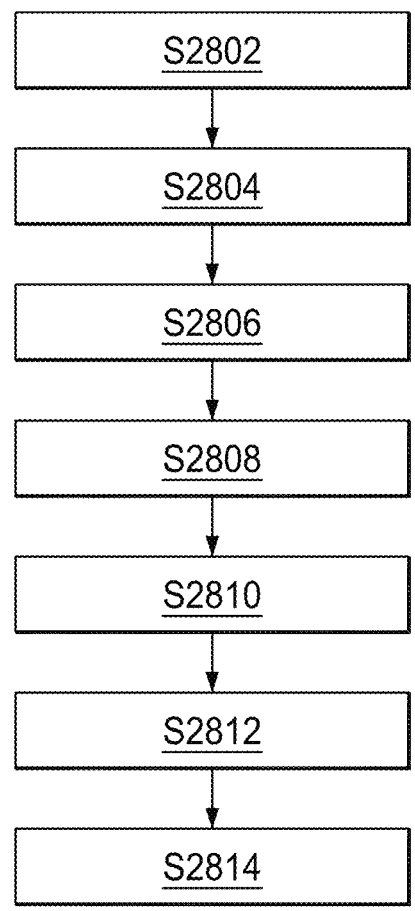
FIG. 28 is a flowchart showing a method of operation of a system according to some example embodiments.

The above operation of the drain cleaner apparatus 200 to control the actuator apparatus 900 to actuate 980 the air handler float switch 160 may proceed as shown in FIG. 28. FIG. 28 is a flowchart illustrating operation of the system 2000 according to some example embodiments. Referring to FIG. 28, at S2802, the drain cleaner float switch 1610 of the float switch apparatus 800 that is coupled to the condensate drain line 124 may actuate in response to a presence of a fluid such as condensate in the condensate drain line. The drain cleaner float switch 1610 may include a bimetal switch device and may actuate the bimetal switch device in response to a float of the drain cleaner float switch 1610 moving (e.g., rising) with a level of a surface of condensate in the condensate drain line. At S2804, the drain cleaner float switch 1610, and thus the float switch apparatus 800, may transmit an electrical signal (e.g., float switch signal) to the drain cleaner apparatus 200 (e.g., the controller 210) via electrical connection 1502 to indicate that the drain cleaner float switch 1610 is actuated. At S2806, the electrical signal transmitted by the drain cleaner float switch 1610 is received at the controller 210 of the drain cleaner apparatus 200 and processed to determine that the drain cleaner float switch 1610 has actuated. At S2808, the controller 210 responds to determining that the drain cleaner float switch 1610 has actuated by transmitting an electrical signal and/or command (e.g., actuator command signal) to the actuator apparatus 900 via electrical connection 1504. The controller 210 may further, at S2808, generate and transmit a warning signal in response to determining that the drain cleaner float switch 1610 has actuated. The warning signal may be transmitted to a remote computing device 700 via network communication link 702 to cause the remote computing device 700 to provide a warning to a supported human user (e.g., via a display screen interface 760) informing the supported human user that the drain cleaner float switch 160 is actuated and/or that at least a portion of the air conditioning system 100 (e.g., at least the air handler 102) is being shut down (e.g., shut off). At S2810, the actuator apparatus 900 causes the actuator 910 thereof to actuate 980 in order to move a float of the air handler float switch 160 positioned in relation to the actuator 910 by the actuator apparatus 900, thereby causing the air handler float switch 160 to actuate. As shown in at least FIGS. 25A-25B, the air handler float switch 160 may include a bimetal switch device 2510 and may actuate the bimetal switch device 2510 in response to a float of the air handler float switch 160 moving (e.g., rising) due to operation of the actuator 910 in the actuator apparatus 900. At S2812, the air handler float switch 160 may transmit an electrical signal (e.g., float switch signal) to the air handler (e.g., controller 140) via electrical connection 1502 to indicate that the air handler float switch 160 is actuated. At S2814, the air handler 102 (e.g., the controller 140 thereof) may selectively shut down at least a portion of the air conditioning system 100 (e.g., at least the air handler 102) in response to determining that the air handler float switch 160 is actuated.

In some example embodiments, the controller 210 may be configured to transmit the electrical signal to the actuator apparatus 900 at S2808 to cause the actuator 910 to actuate 980 independently of a signal from the drain cleaner float switch 1610, for example in response to receiving a command signal from the remote computing device 700 via network communication link 702 based on human user interaction with the remote computing device 700, thereby enabling the drain cleaner apparatus 200 to provide remote human user control over air conditioning system 100 operation. In such example embodiments, operations S2802 to S2806 may be omitted.

In some example embodiments, subsequently to operation S2808, the controller 210 may transmit a subsequent electrical signal to the actuator apparatus 900 via electrical connection 1504 to cause the actuator 910 to "de-actuate" from an actuated position to a non-actuated position, to cause the float of the air handler float switch 160 to move (e.g., drop) from an actuated position to a rest, non-actuated position and thus to cause the air handler float switch 160 to become de-actuated (e.g., reset). Such transmission may occur subsequently to S2814. Such transmission may be performed by the controller 210 in response to a determination at the controller 210 that a particular period of time has elapsed after the transmission of the actuator command signal at S2808. Such transmission may be performed by the controller 210 in response to receiving a command (e.g., a reset command) from a remote computing device 700 via a network communication link (e.g., based on human user interaction with the remote computing device 700). The air handler 102 (e.g., controller 140) may be configured to re-start at least a portion of the air conditioning system 100 (e.g., at least the air handler 102) in response to the air handler float switch 160 being de-actuated. As a result, the system 2000 (e.g., at least the drain cleaner apparatus 200) may enable improved control over operation of the air conditioning system 100 based on being configured to enable shut down and/or re-start of at least a portion of the air conditioning system 100, including being configured to enable remote control of the air conditioning system 100 (e.g., shut down and/or re-start) via human user interaction with the remote computing device 700.

It will be understood that the signal transmitted to the actuator apparatus 900 by the drain cleaner apparatus 200 at S2808 may be an electrical current which causes an actuator motor (e.g., servomotor) of the actuator 910 to operate for a particular period of time in order to cause an actuator piston of the actuator 910 to move a certain distance in order to cause a float of the air handler float switch 160 to move in relation to a remainder of the air handler float switch 160, thereby actuating the air handler float switch 160. The magnitude (e.g., current and/or voltage magnitude) and duration of the current may be stored at the controller 210 (e.g., at a memory thereof) and the controller 210 may control a supply of electrical power to the actuator 910 via the electrical connection 1504 at the magnitude and duration indicated via information stored at the controller 210 in order to actuate the actuator 910.

The controller 210 may be configure to cause the actuator 910 (e.g., an actuator piston driven by a servomotor and rotary gear as described herein) to actuate 980 to cause an actuator piston thereof to move from a non-actuated position to an actuated position and remain at the actuated position for a particular period of time, where the particular period of time is associated with causing the float of the air handler float switch 160 to remain at a certain position for a sufficient period of time to ensure that the air handler float switch 160 is actuated to cause the air handler 102 to shut off, based on transmitting an electrical signal that causes the actuator 910 to move the float of the float switch to the certain position and remain at the certain position for at least the sufficient period of time. The controller 210 may further be configured to cause the actuator 910 (e.g., actuator piston thereof) to, after remaining at the actuated position for at least the particular period of time, subsequently return to a non-actuated or "rest" position to return the float of the air handler float switch 160 to a non-actuated or "rest" position to enable a re-set, re-initialization and/or re-start of operation of at least a portion of the air conditioning system 100 (e.g., at least the air handler 102) subsequently to being at least partially shut down due to actuation of the air handler float switch 160, and thereby enabling improved control of the air handler 102 and/or air conditioning system 100. The controller 210 may be configured to transmit a separate signal (e.g., restart signal) to the actuator apparatus 900 via electrical connection 1504 to cause the actuator 910 to move from the actuated position to the non-actuated position in response to a determination that a particular period of time (information indicating the duration of the particular period of time being stored at the controller 210 and accessed thereby) has elapsed since a signal was transmitted to the actuator apparatus 900 from the controller 210 to cause the actuator 910 to actuate 980 the air handler float switch 160). The controller 210 may be configured to transmit a separate signal (e.g., restart signal) to the actuator apparatus 900 via electrical connection 1504 to cause the actuator 910 to move from the actuated position to the non-actuated position in response to receiving a reset signal from a remote computing device 700 via network communication link 702. The controller 210 may be configured to transmit a separate signal (e.g., restart signal) to the actuator apparatus 900 via electrical connection 1504 to cause the actuator 910 to move from the actuated position to the non-actuated position in response to receiving a rest signal based on user interaction with a user interface 1182 of the drain cleaner apparatus 200, some combination thereof, or the like.

It will be understood that the system 2000 may enable the air handler 102, and thus at least a portion of the air conditioning system 100 to be controlled (e.g., shut down) based on presence of condensate in the condensate drain line 124 without requiring the air handler float switch 160 to be coupled to and/or positioned within the condensate drain line 124 (e.g., the air handler float switch 160, being positioned in relation to the actuator 910 by the actuator apparatus 900, may be entirely outside the condensate drain line 124 and the opening 125 thereof). As a result, the drain cleaner apparatus 200 may be configured to reduce, minimize, or prevent the likelihood of the dispensing of cleaning composition 230 into the condensate drain line 124 affecting operation of the air handler float switch 160 (and thus the air handler 102 and air conditioning system 100) based on reducing, minimizing, or preventing contact between the air handler float switch 160 and the cleaning composition 230 supplied to the condensate drain line 124 by the drain cleaner apparatus 200 and thus reducing, minimizing, or preventing inadvertent operation and/or actuation of the air handler float switch 160 due to such contact. The float switch apparatus 800, as described herein, may be configured to provide a float switch (e.g., drain cleaner float switch 1610 as described herein) which enables the air handler float switch 160 to be actuated in response to presence of condensate or other fluids in the condensate drain line (e.g., due to the electrical connections between the float switch apparatus 800 and drain cleaner apparatus 200 via electrical connection 1502, the electrical connection between the drain cleaner apparatus 200 and the actuator apparatus 900, and the positioning of the air handler float switch 160 in relation to the actuator 910 by the actuator apparatus 900) where the float switch apparatus 800 may be configured to reduce, minimize, or prevent the likelihood of the float switch thereof (e.g., drain cleaner float switch 1610) being actuated due to contact with cleaning composition dispensed to the condensate drain line 124 by the drain cleaner apparatus based on the float switch apparatus 800 being configured to position the float switch thereof in the condensate drain line 124 spaced apart from a position in the condensate drain line at which the cleaning composition 230 is supplied into the condensate drain line 124 interior (e.g., offset from a central axis of the float switch apparatus 800). As a result, the float switch apparatus 800 may be configured to enable reliable operation of system 2000 to dispense cleaning composition 230 to the condensate drain line 124 and control the operation of the air handler 102 via control of the air handler float switch 160 via actuator apparatus 900 despite potential variations in the shape or structure of the air handler float switch 160 which might otherwise affect the likelihood of the air handler float switch 160 being actuated by the cleaning composition 230 being applied in to the condensate drain line 124 and to provide reliable access and supply of the cleaning composition 230 into the condensate drain line 124 via opening 125 while further allowing a float switch to be positioned into the condensate drain line 124 through the same opening 125 with reduced, minimized, or prevented obstruction of the opening 125 which might reduce, minimize, or prevent cleaning composition 230 supply into the condensate drain line 124 via opening 125 and further reduce, minimize, or prevent the likelihood of inadvertent operation, corrosion, wear, damage or the like of the float switch positioned in the condensate drain line 124 by the supplied cleaning composition while still enabling reliable operation of the float switch (e.g., drain cleaner float switch 1610 as described herein), thereby improving overall performance and reliability of the system 2000 and the air conditioning system 100.

It will be understood that in some example embodiments the float switch apparatus 800 may be omitted from system 2000.

While the above description of the drain cleaner apparatus 200 together with the actuator apparatus 900 causing the air handler 102 to shut down based on actuation of the air handler float switch 160 involves the drain cleaner apparatus 200 transmitting a signal to the actuator apparatus 900 to actuate the air handler float switch 160 in response to the drain cleaner apparatus 200 receiving a command from a remote computing device 700 via a wireless network communication link (e.g., 702 as described in FIG. 7), example embodiments are not limited thereto. For example, in some example embodiments, the controller 210 may generate and transmit the signal to the actuator apparatus 900, to cause the actuator apparatus 900 to actuate the air handler float switch 160, in response to receiving a command signal at the drain cleaner apparatus 200 via manual interaction with a user interface of the drain cleaner apparatus 200 (e.g., a human pressing a user interface 1182 of the drain cleaner apparatus 200 that is a button).

FIG. 15B is a schematic view of a system 2000 including a drain cleaner apparatus system 1100 that further includes a drain cleaner apparatus 200 and a cartridge 300 and a float switch apparatus 800, according to some example embodiments.

In some example embodiments, the actuator apparatus 900 may be omitted from the system 2000, and the drain cleaner apparatus 200 may be electrically connected to the air handler 102 (e.g., controller 140 thereof via being electrically connected to the float switch signal connection interface 148 of the controller 140) without an interposing actuator apparatus 900 and/or air handler float switch 160. For example, the air handler float switch 160 shown in FIG. 15A may, as shown in FIG. 15B, be disconnected from the air handler 102, such that the electrical connection 1506 is omitted, and the drain cleaner apparatus 200 may be electrically connected to the air handler 102 (e.g., to the float switch signal connection interface 148 of the controller 140) in place of the air handler float switch 160. For example, wires and/or connections extending from the drain cleaner apparatus 200 may be connected to wires, circuitry, and/or connections of the air handler 102 to establish electrical connection 1504 to electrically connect the drain cleaner apparatus 200 to the float switch signal connection interface 148 of the controller 140, where the controller 140 is configured to respond to signals (e.g., float switch signals) received at the float switch signal connection interface 148 by causing at least a portion of the air conditioning system 100 (e.g., the air handler 102) to shut off.

As a result, the electrical connection 1504 as shown in FIG. 15B may comprise serially coupled wires and connections (e.g., male/female connections) to connect one or more wires extending from the drain cleaner apparatus 200 to separate one or more wires or circuitry of the air handler 102, for example wiring extending from a float switch signal connection interface 148 of the controller 140 or an electrical connector at the controller 140 that comprises a float switch signal connection interface 148. The controller 140 may be configured to cause the air handler 102 to shut off in response to receiving a signal (e.g., a float switch signal) from the drain cleaner apparatus 200 at the float switch signal connection interface 148 via electrical connection 1504.

As a result of the drain cleaner apparatus 200 being electrically connected to the air handler 102 via the electrical connection 1504, the drain cleaner apparatus 200 (e.g., the controller 210 thereof) may be configured to generate and transmit an electrical signal to the air handler 102 (e.g., to controller 140 via the float switch signal connection interface 148) via the electrical connection 1504 to cause at least a portion of the air conditioning system 100 (e.g., the air handler 102) to shut off, despite the omission of the air handler float switch 160 from the air handler 102. The controller 140, receiving the electrical signal from the drain cleaner apparatus 200 via the float switch signal connection interface 148 and electrical connection 1504, may process (e.g., interpret) the received electrical signal as if the electrical signal were received from an actuated air handler float switch 160 and may respond accordingly to cause at least a portion of the air conditioning system 100 (e.g., the air handler 102) to shut off.

As shown in FIG. 15B, and as described above with reference to FIG. 15A, the drain cleaner apparatus 200 may be electrically coupled to the float switch apparatus 800 via electrical connection 1502, and the float switch apparatus 800 may include a drain cleaner float switch 1610 that may be configured to transmit a float switch signal to the drain cleaner apparatus 200 via the electrical connection 1502 in response to the drain cleaner float switch 1610 being actuated due to fluid (e.g., condensate backflow) in the condensate drain line 124. In some example embodiments, the drain cleaner apparatus 200 (e.g., the controller 210) may be configured to, in response to receiving a float switch signal from the drain cleaner float switch 1610 of the float switch apparatus 800 via electrical connection 1502, generate and transmit the electrical signal to the air handler 102 (e.g., the controller 140 via float switch signal connection interface 148) via electrical connection 1504 to cause the electrical signal to be received at the controller 140 via the float switch signal connection interface 148, thereby causing the controller 140 to cause at least a portion of the air conditioning system 100 (e.g., the air handler 102) to shut off in response to actuation of the drain cleaner float switch 1610 of the float switch apparatus 800.

In some example embodiments, based on electrically connecting the drain cleaner apparatus 200 to the air handler 102 (e.g., to the float switch signal connection interface 148 of the controller 140) and configuring the drain cleaner apparatus 200 to generate and transmit an electrical signal to the air handler 102 via the electrical connection 1504 to cause at least a portion of the air conditioning system 100 (e.g., at least the air handler 102) to be shut down (e.g., shut off) in response to the drain cleaner apparatus 200 receiving a float switch signal from the drain cleaner float switch 1610 of the float switch apparatus 800 via the electrical connection 1502, the drain cleaner apparatus 200 may be configured to perform additional operations in response to the drain cleaner float switch 1610 being actuated, beyond causing at least a portion of the air conditioning system 100 (e.g., at least the air handler 102) to shut down.

In some example embodiments, the drain cleaner apparatus 200 (e.g., the controller 210) may be configured to, in response to receiving a float switch signal from the float switch 1610 of the float switch apparatus 800 via electrical connection 1502, and in addition to transmitting the electrical signal to the air handler 102 via the electrical connection 1504, control the dispenser device 204 to cause an amount of cleaning composition 230 to be dispensed (e.g., from the cartridge reservoir 304 and/or reservoir 1130) through the apparatus outlet 206 to the condensate drain line 124. Such a float switch-responsive dispensation of the cleaning composition 230 by the drain cleaner apparatus 200 may be performed independently of the drain cleaner apparatus 200 (e.g., the controller 210) operating the dispenser device 204 to dispense an amount of cleaning composition 230 based on operation of a timer as described herein. For example, where an actuation of the drain cleaner float switch 1610 of the is due to an obstruction (e.g., clogging) of the condensate drain line 124 due to buildup of one or more various substances (e.g., mold, algae, mildew, bacteria, and/or fungi) within the condensate drain line 124 to cause condensate backflow in the condensate drain line 124, the float switch-responsive dispensation of the cleaning composition 230 by the drain cleaner apparatus 200 in response to receiving the float switch signal from the drain cleaner float switch 1610 due to such actuation may reduce and/or remove the obstruction (e.g., by cleaning, chelating, breaking down, etc. the one or more various substances at least partially comprising the obstruction). As a result, the drain cleaner apparatus 200 may be configured to at least partially mitigate backflow of condensate in the condensate drain line 124, facilitate drainage of the condensate through the condensate drain line 124, and reduce or prevent the risk of damage that might result from condensate backflow through the condensate drain line opening 125 due to the obstruction.

The float switch-responsive dispensation of the cleaning composition 230 may not cause any re-setting of the aforementioned timer that is implemented by the drain cleaner apparatus 200 (e.g., by the controller 210) to repeatedly actuate the dispenser device 204 at a fixed time interval or may cause the timer to re-set. The float switch-responsive dispensation of the cleaning composition 230 may cause the aforementioned counter that is implemented by the drain cleaner apparatus 200 (e.g., by the controller 210) to increment a counter value in response to each actuation of the dispenser device 204 to be incremented to represent a dispensation of cleaning composition 230 from the drain cleaner apparatus system 1100 as a result of the float switch-responsive dispensation of the cleaning composition 230.

In some example embodiments, based on the drain cleaner apparatus 200 being configured to further implement a float-switch responsive dispensing of cleaning composition by the dispenser device 204 in response to receiving the float switch signal from the drain cleaner float switch 1610, the drain cleaner apparatus 200 may be configured to attempt a corrective action in response to indications of condensate drain line 124 obstruction causing condensate backflow to actuate the drain cleaner float switch 1610, thereby potentially reducing, mitigating, or correcting the problem causing the condensate backflow and providing an active solution in addition to causing at least a portion of the air conditioning system 100 to at least partially shut down and to report the shutdown to a human user supported by a remote computing device 700, thereby improving operational performance of the air conditioning system 100 based on providing an ability to responsively mitigate condensate backflow in the condensate drain line beyond simply shutting down at least a portion of the air conditioning system 100.

In some example embodiments, the drain cleaner apparatus 200 (e.g., the controller 210) may be configured to, in response to receiving a float switch signal from the float switch 1610 of the float switch apparatus 800 via electrical connection 1502, in addition to transmitting the electrical signal to the air handler 102 via the electrical connection 1504, transmit a warning signal to a remote computing device 700 via a network communication link 702 to cause the remote computing device to generate (e.g., transmit) a warning (e.g., a graphic indication shown on the display screen interface 760) to warn a supported human user that at least a portion of the air conditioning system 100 (e.g., at least the air handler 102) is being shut down (e.g., shut off).

In some example embodiments, based on the drain cleaner apparatus 200 being configured to further enable a human user supported by a remote computing device 700 to be warned that at least a portion of the air conditioning system 100 is being shut down due to the actuation of the drain cleaner float switch 1610 (e.g., in response to condensate backflow in the condensate drain line 124), the drain cleaner apparatus 200 may be configured to provide improved communication of the state of operation of the air conditioning system 100 to a remote human user and enabling more rapid human response to shutdown of the air conditioning system (e.g., manual cleaning of the condensate drain line 124, requesting and/or performing maintenance on the air conditioning system 100, re-setting and re-starting the air conditioning system 100, etc.), thereby reducing or minimizing air conditioning system 100 downtime and thereby reducing or minimizing excessive warming of a structure being cooled by the air conditioning system 100.

Referring to FIG. 15B, in some example embodiments, the electrical connection 1504 may comprise a second set of at least two wires of the drain cleaner apparatus 200 (at least partially comprising electrical connection 1152) which are electrically connected (directly or indirectly) to the controller 210 and extend from the drain cleaner apparatus 200 (e.g., via opening 1150) and which may each be connected (e.g., directly or indirectly, as part of a serial connection of wires and/or interfaces there between) to separate, respective wires extending from the air conditioning system 100 (e.g., from air handler 102, from the controller 140, from the float switch signal connection interface 148, etc.) to establish the electrical connection 1504 as a second electrical circuit (e.g., where the electrical circuit of the electrical connection 1502 is referred to as a first electrical circuit). The drain cleaner apparatus 200 (e.g., controller 210) may be configured to generate and transmit an electrical signal (e.g., electrical current), also referred to herein as a float switch signal, to the air conditioning system 100 9 e.g., controller 140 via interface 148) via the electrical connection 1504, for example in response to the controller 210 determining that a float switch signal is received from the drain cleaner float switch 1610 via the first electrical circuit of the electrical connection 1502. The electrical signal may be "transmitted" based on the drain cleaner apparatus 200 (e.g., the controller 210) controlling (e.g., initiating, inhibiting, adjusting a magnitude and/or frequency of, etc.) a flow of electrical current in the second electrical circuit of the electrical connection 1504, for example based on controller 210 operating a switch implemented by and/or included in the drain cleaner apparatus 200 to close or open the second electrical circuit of the electrical connection 1504, respectively, based on the controller 210 selectively and/or adjustably controlling (e.g., initiating, inhibiting, adjusting a magnitude thereof, or the like) a supply of electrical power to the portion of the air conditioning system 100 (e.g., at least a portion of the air handler 102, the controller 140, the float switch signal connection interface 148, etc.) via the second electrical circuit of the electrical connection 1504, or the like. Such controlled (e.g., initiated, inhibited, adjusted, etc.) flow of electrical current in the second electrical circuitry may be referred to as a signal, command, signal or the like (e.g., an electrical signal, a float switch signal, or the like) transmitted to the portion of the air conditioning system 100 (e.g., at least a portion of the air handler 102, the controller 140, the float switch signal connection interface 148, etc.). Such initiated, inhibited, or adjusted flow of electrical current in the second electrical circuit of the electrical connection 1504 that includes the portion of the air conditioning system 100 may be detected and processed by the portion of the air conditioning system 100 (e.g., the air handler 102, the controller 140, etc.) to be a receipt and/or detection of a float switch signal "transmitted" by the drain cleaner apparatus 200 to command a shutdown of at least a portion of at least a portion of the air conditioning system 100 (e.g., at least the air handler 102) thereby causing at least a portion of the air conditioning system 100 (e.g., at least the air handler 102) to shut down (e.g., based on operation of the controller 140) in response to detection (e.g., by the controller 140) of the signal that is "transmitted" by the drain cleaner apparatus 200 (e.g., by controller 210). For example, the air handler 102 (e.g., the controller 140) may include a sensor such as an ammeter, current sensor, or the like configured to detect and/or generate data which may be processed by the controller 140 to detect (e.g., generate signals which may be processed by the controller 140 to detect in response to) a presence and/or magnitude of electrical current in the second electrical circuit of the electrical connection 1504 (e.g., an electrical current at interface 148). The controller 140 may respond to a determination of a presence or absence of electrical current (e.g., a presence or absence of current above a threshold magnitude) in the second electrical circuit of the electrical connection 1504, a change in magnitude of electrical current in the second electrical circuit of the electrical connection 1504, or the like, based on processing and/or detecting signals generated by the sensor to determine that an electrical signal (e.g., a float switch signal generated and transmitted by the drain cleaner apparatus 200 via electrical connection 1504) is received. The air conditioning system 100 (e.g., the air handler 102, the controller 140, etc.) may be configured to shut down (e.g., shut off) at least a portion of the air conditioning system 100 (e.g., at least the air handler 102) in response to determining (e.g., detecting, based on processing signals generated by the sensor) that the float switch signal is received (e.g., received at interface 148) as a result of the drain cleaner apparatus 200 generating the electrical signal that is transmitted to the air conditioning system 100 and received (e.g., at interface 148) via electrical connection 1504.

Figure 16A:
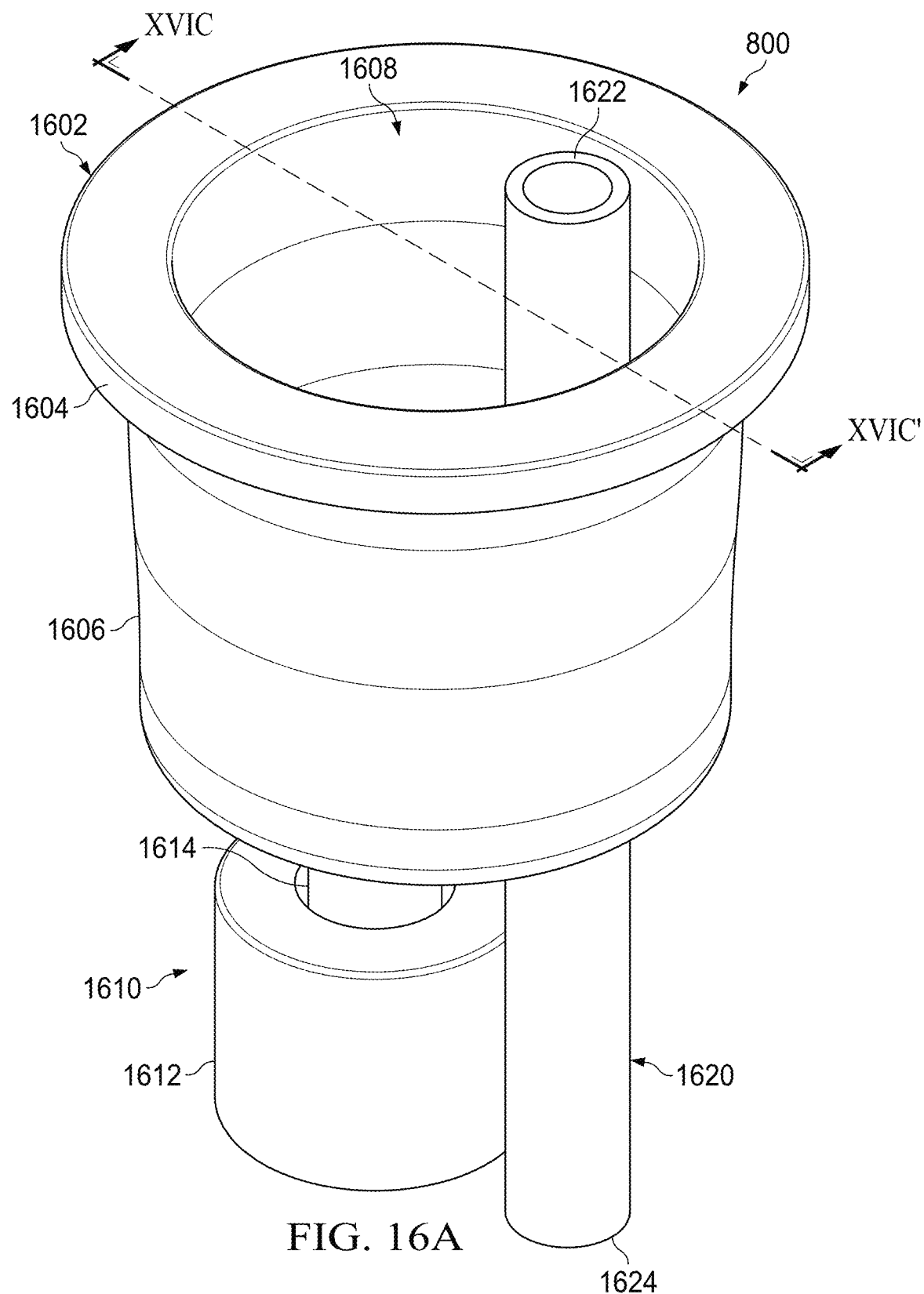
FIG. 16A is a perspective top-front-right view of a float switch apparatus according to some example embodiments.
Figure 16B:
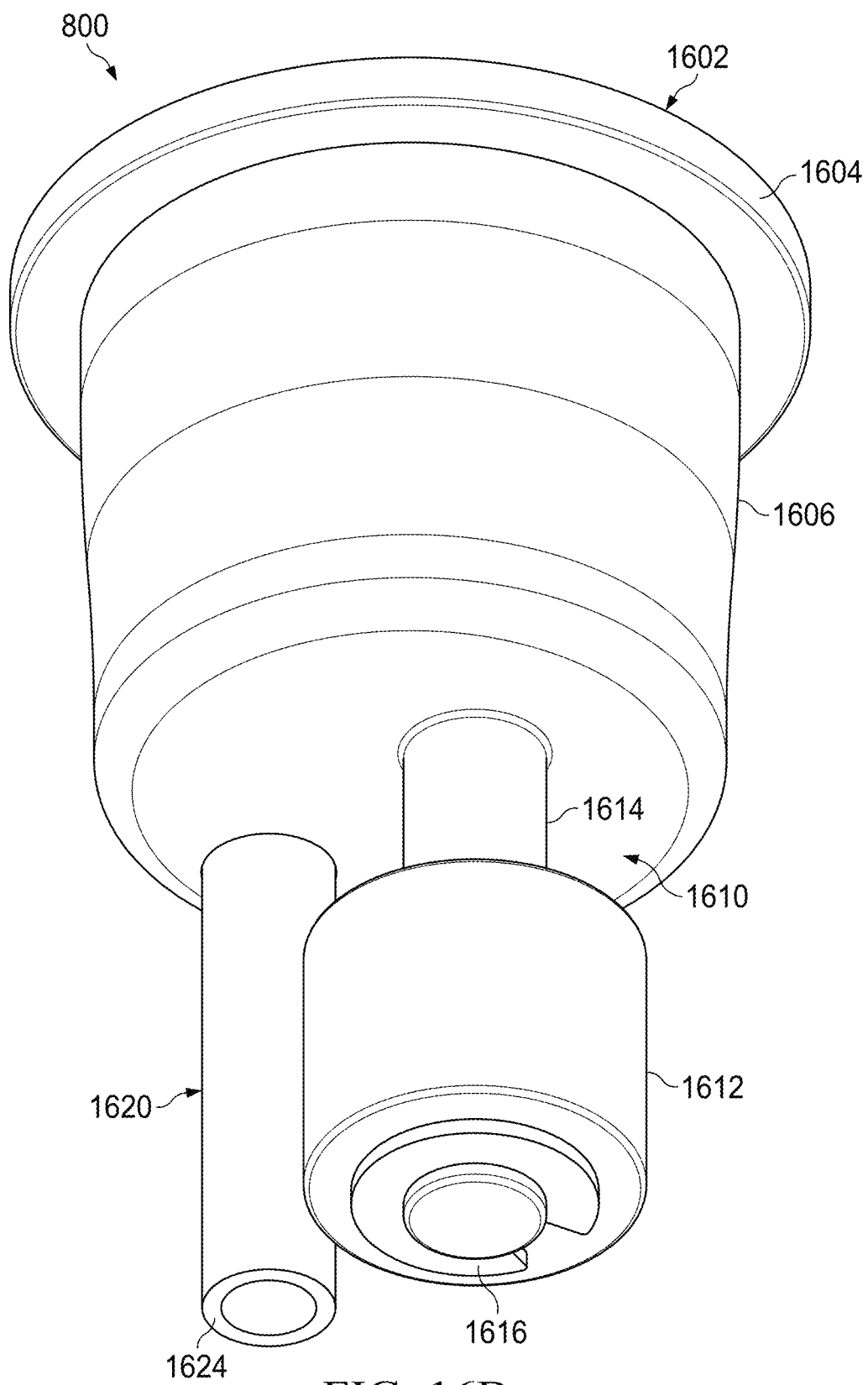
FIG. 16B is a perspective bottom-rear-left view of the float switch apparatus of FIG. 16A according to some example embodiments.
Figure 16C:
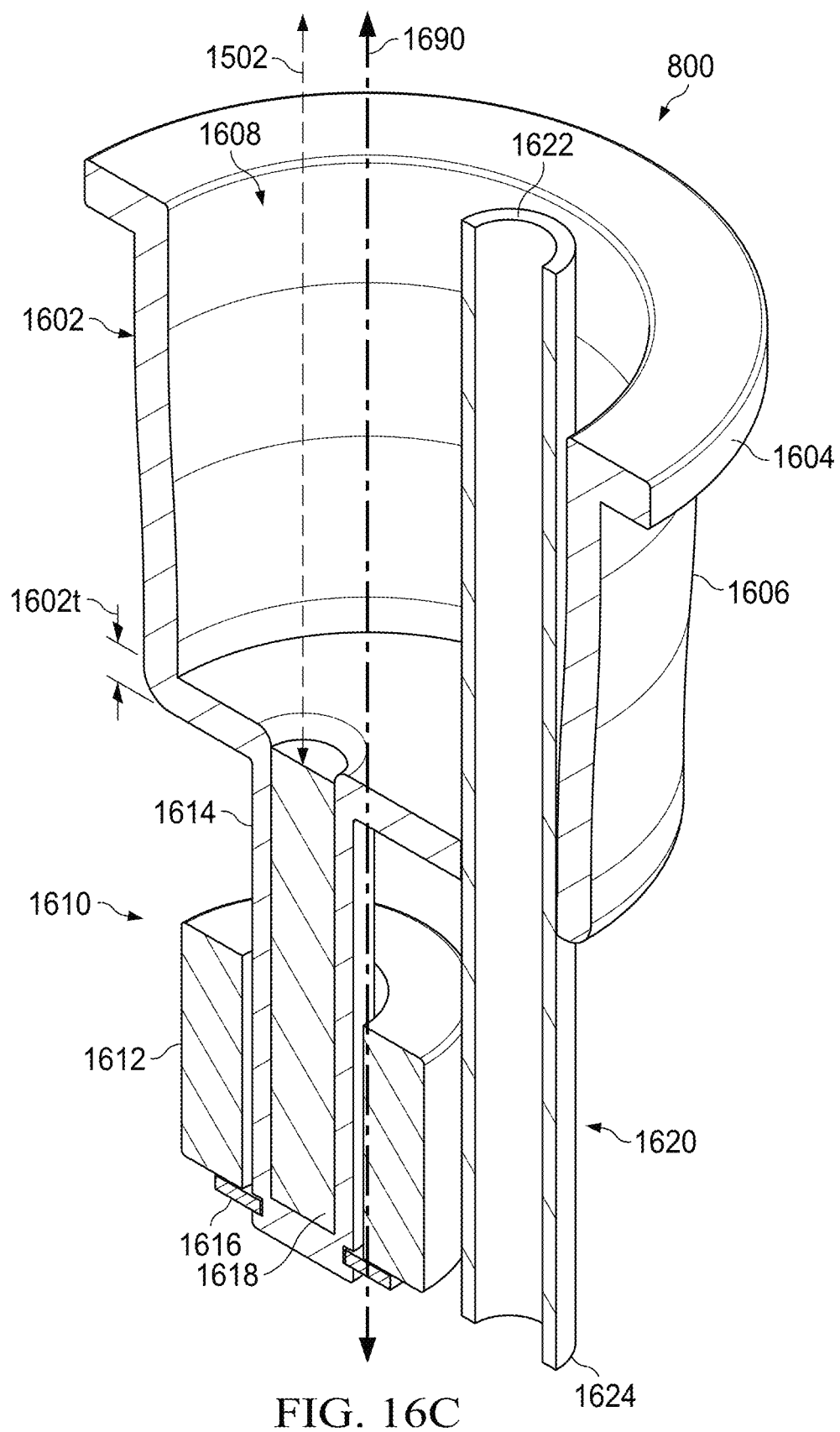
FIG. 16C is a perspective cross-sectional view of the float switch apparatus along cross-sectional view line XVIC-XVIC' of FIG. 16A according to some example embodiments.
Figure 16D:
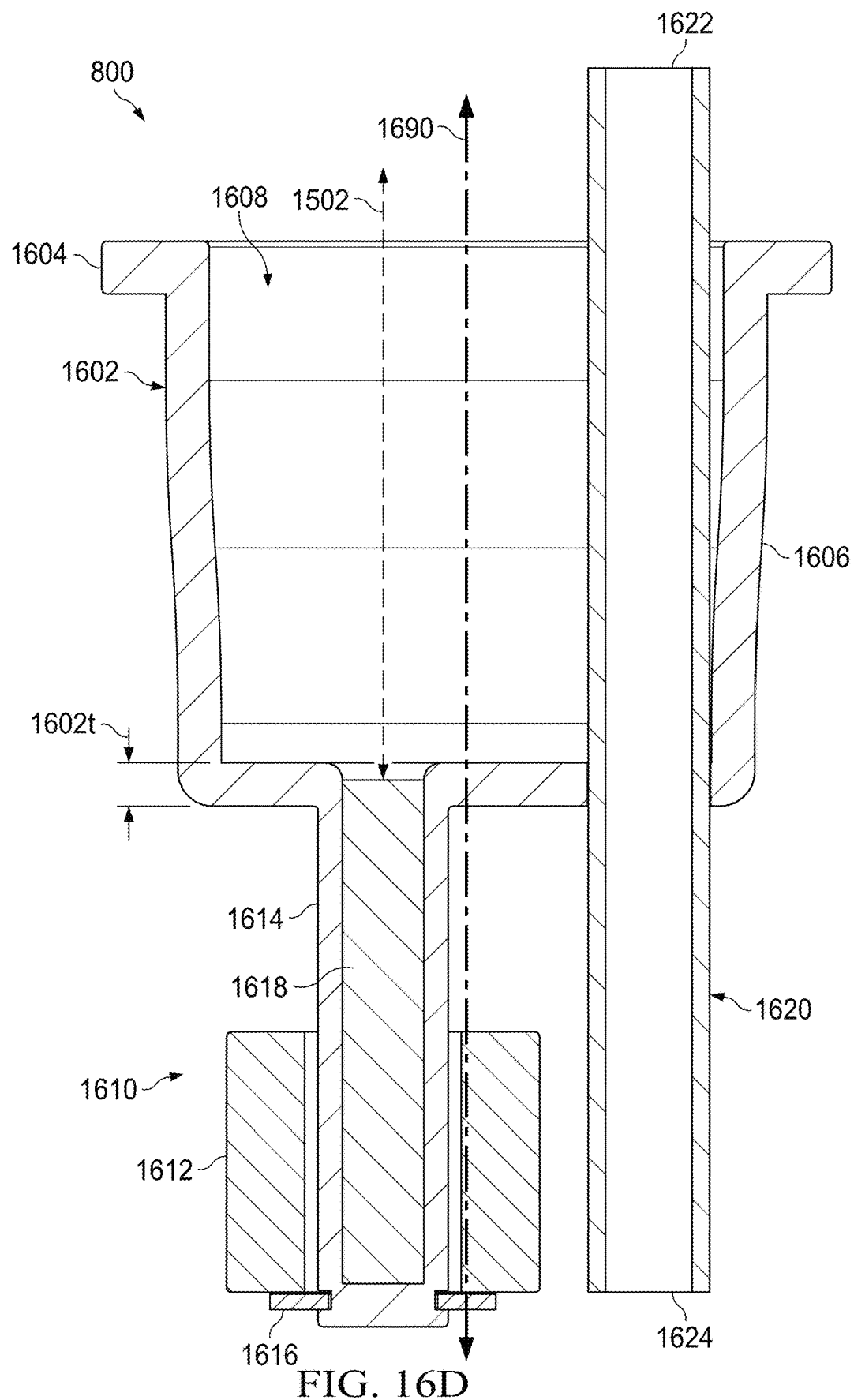
FIG. 16D is a plan cross-sectional view of the float switch apparatus along cross-sectional view line XVIC-XVIC' of FIG. 16A according to some example embodiments.
Figure 16E:
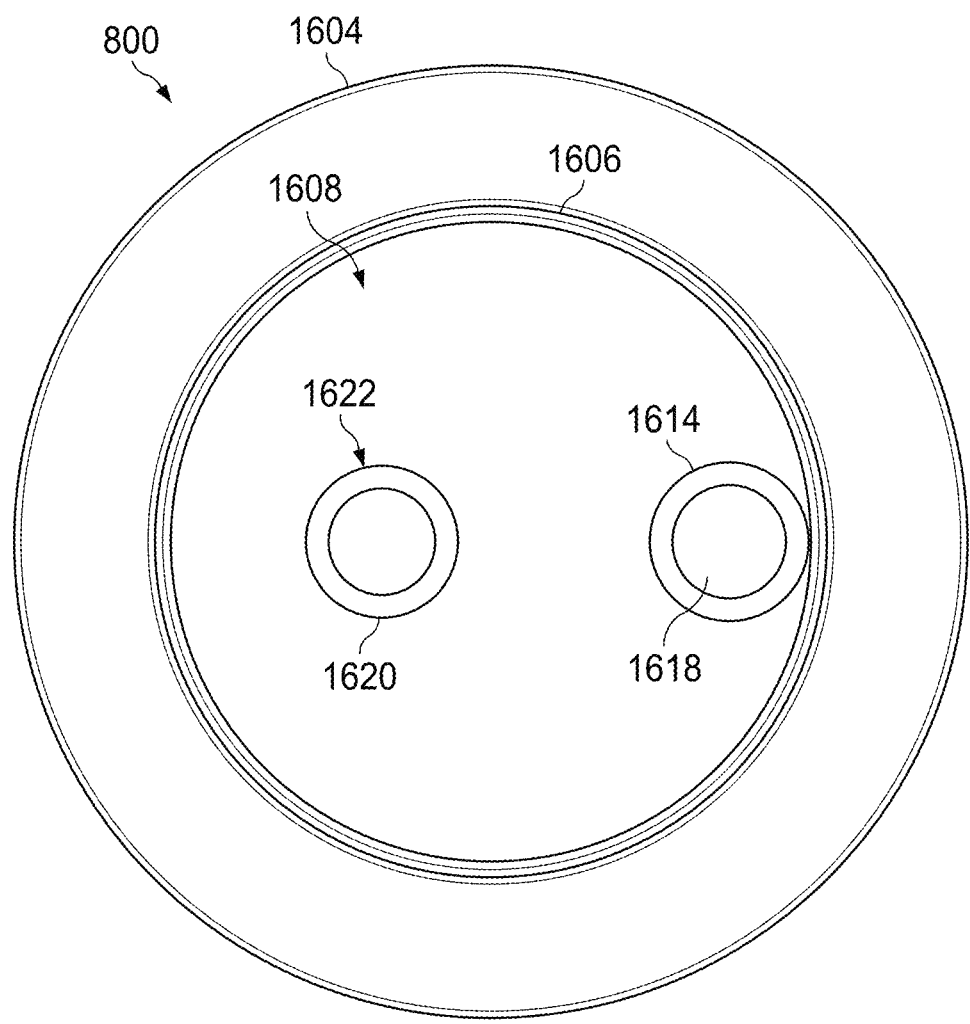
FIG. 16E is a plan top view of the float switch apparatus of FIG. 16A according to some example embodiments.

FIG. 16A is a perspective top-front-right view of a float switch apparatus 800 according to some example embodiments. FIG. 16B is a perspective bottom-rear-left view of the float switch apparatus 800 of FIG. 16A according to some example embodiments. FIG. 16C is a perspective cross-sectional view of the float switch apparatus 800 along cross-sectional view line XVIC-XVIC' of FIG. 16A according to some example embodiments. FIG. 16D is a plan cross-sectional view of the float switch apparatus 800 along cross-sectional view line XVIC-XVIC' of FIG. 16A according to some example embodiments. FIG. 16E is a plan top view of the float switch apparatus 800 of FIG. 16A according to some example embodiments.

It will be understood that the float switch apparatus 800 shown in FIGS. 16A-16E may include any of the elements of any of the example embodiments and of the devices, apparatuses, or the like shown in any of the drawings and/or described herein.

Referring to FIGS. 16A-16E, in some example embodiments, the float switch apparatus 800 is configured to be coupled to the condensate drain line 124 (e.g., coupled to the opening 125 of the condensate drain line 124). The float switch apparatus 800 may include a drain cleaner float switch 1610. The drain cleaner float switch 1610 may include float switch circuitry 1618 (e.g., switch device, a bimetal switch device, processing circuitry, electrical circuitry, an electrical switch, or the like configured to generate a float switch signal in response to movement of the float 1612 along the shaft 1614) in a housing including a shaft 1614 and a stop 1616, and the drain cleaner float switch 1610 may include a float 1612 configured to move axially along the longitudinal axis of the shaft 1614 to actuate the drain cleaner float switch 1610 to cause the circuitry 1618 to responsively generate a float switch signal. It will be understood that the drain cleaner float switch 1610 is not limited to the structure shown in FIGS. 16A-16D and may include any known float switch (e.g., bimetal float switch).

The drain cleaner float switch 1610 (e.g., the circuitry 1618 thereof) may be configured to be electrically coupled (e.g., electrically connected, which may include directly or indirectly electrically connected) to the drain cleaner apparatus 200 (e.g., via electrical connection 1502, which may include one or more wires extending from the drain cleaner float switch 1610, through the open enclosure 1608, and out of the float switch apparatus 800 to electrically couple with the controller 210 of the drain cleaner apparatus 200, for example based on coupling with a separate one or more wires extending from the drain cleaner apparatus 200. The float switch apparatus 800 may be configured to couple with the opening 125 of the condensate drain line 124 to position the drain cleaner float switch 1610 in the condensate drain line 124 so that the drain cleaner float switch 1610 may be positioned within the condensate drain line 124 and configured be actuated to transmit a float switch signal to the drain cleaner apparatus 200 in response to a presence of fluid in the condensate drain line 124 which may cause the float 1612 to move (e.g., rise) axially in relation to the shaft 1614 to cause the drain cleaner float switch 1610 to actuate.

Referring back to FIG. 15A, the controller 210 of the drain cleaner apparatus 200 may be configured to transmit the actuator command signal to the actuator apparatus 900 to cause the actuator 910 to actuate 980 the air handler float switch 160 (to cause the air handler 102 to shut down) in response to the controller 210 receiving the float switch signal from the drain cleaner float switch 1610.

Referring again to FIGS. 16A-16E, the float switch apparatus may include a support housing 1602 configured to couple with an opening 125 of the condensate drain line 124. The support housing 1602 may include a cylindrical structure 1606 configured to extend into the condensate drain line 124 and may be configured to establish a friction fit with an inner surface to the condensate drain line 124 to hold the float switch apparatus 800 in place. The support housing 1602 may include an upper lip or ledge structure 1604 which may be configured to be outside the condensate drain line 124 and engaging the outer end of the opening 125 of the condensate drain line 124 in order to restrict the distance that the float switch apparatus 800 extends into the condensate drain line 124 and to improve ease of coupling and decoupling of the float switch apparatus 800 with the opening 125 of the condensate drain line 124. As shown, the support housing 1602 may define a cup structure defining an interior open cylindrical enclosure 1608 and configured to fit into the opening 125 of the condensate drain line 124. The support housing 1602 may comprise a single piece of material (e.g., plastic) defining the structures 1604 and 1606. At least a portion of the drain cleaner float switch 1610, for example at least the shaft 1614, may be integrated into the support housing 1602 so that, for example, at least the shaft 1614 and the support housing 1602 are separate portions of the same piece of material (e.g., plastic material), but example embodiments are not limited thereto. It will be understood that the drain cleaner float switch 1610 may be referred to as being attached to the support housing 1602, either as a separate element coupled via adhesion, friction fit, coupling, or the like or based on at least a part of the drain cleaner float switch 1610 being a part of a same piece of material defining at least a portion of the support housing 1602.

In some example embodiments, the float switch apparatus 800 may be configured to enable the drain cleaner apparatus 200 to supply the cleaning composition into the condensate drain line 124, for example based on the support housing 1602 being configured to enable the dispenser conduit 290 to extend through the support housing 1602 to be in fluid communication with the condensate drain line 124 interior, but example embodiments are not limited thereto. Referring to FIGS. 16A-16E, in some example embodiments, the float switch apparatus 800 may include a supply conduit 1620, which may be rigid (e.g., plastic) or flexible tube and may extend through the support housing 1602. As shown, the supply conduit 1620 may have opposite first and second ends 1622 and 1624. The first end 1622 of the supply conduit 1620 may be configured to be coupled with the second end 292 of the dispenser conduit 290 (e.g., via a clip connector, via friction fit between opposing surfaces of the first end 1622 and the second end 292, or the like). The second end 1624 of the supply conduit 1620 may be configured to be in fluid communication with the condensate drain line 124 when the float switch apparatus 800 is coupled to the condensate drain line 124, such that the supply conduit 1620 is configured to establish the fluid communication of the apparatus outlet 206 of the drain cleaner apparatus 200 with the condensate drain line 124 interior through the dispenser conduit 290 and the supply conduit 1620 coupled thereto. As shown, the supply conduit 1620 may penetrate through a thickness 1602t of the support housing 1602 to extend from the open enclosure 1608 to the same lower side of the cup formed by the support housing 1602 as the drain cleaner float switch 1610 that is on an opposite side of the support housing 1602 from the open enclosure 1608. In some example embodiments, the supply conduit 1620 and the support housing 1602 may be separate portions of a single piece of material (e.g., plastic material, which as described herein may include polyvinyl chloride or PVC material).

Still referring to FIGS. 16A-16E, the drain cleaner float switch 1610 and the supply conduit 1620 are offset from a central axis 1690 of the support housing 1602, for example offset in a direction that is perpendicular to the central axis 1690. As shown, the drain cleaner float switch 1610 (e.g., at least the shaft 1614) and the supply conduit 1620 may extend in parallel with each other and in parallel with the central axis 1690. As a result, the float switch apparatus 800 may be configured to minimize or prevent any effect of the supply of cleaning composition to the condensate drain line 124 via the supply conduit 1620 on the operation (e.g., actuation) of the drain cleaner float switch 1610.

Figure 17A:
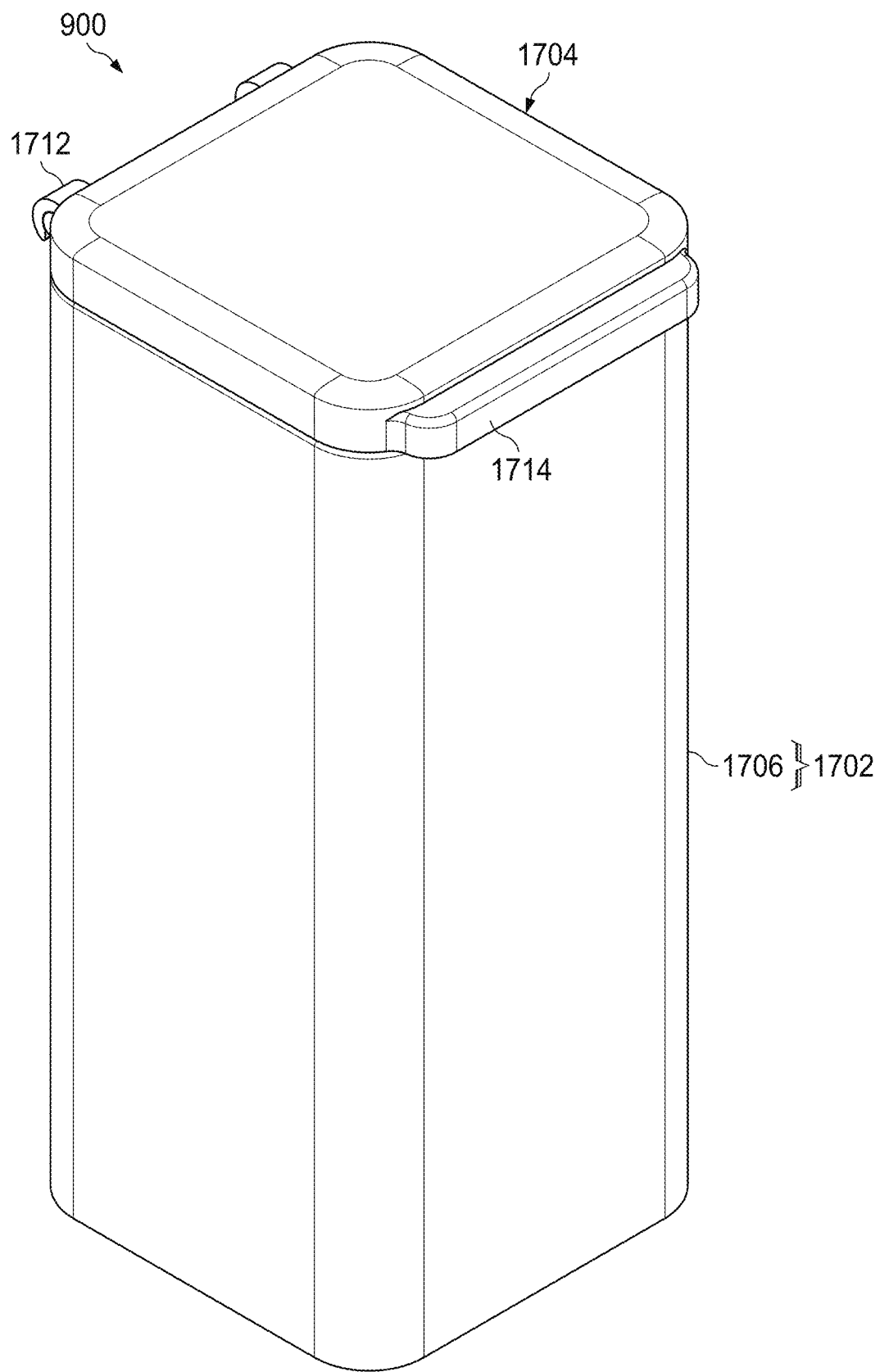
FIG. 17A is a perspective top-front-right view of an actuator apparatus according to some example embodiments.
Figure 17B:
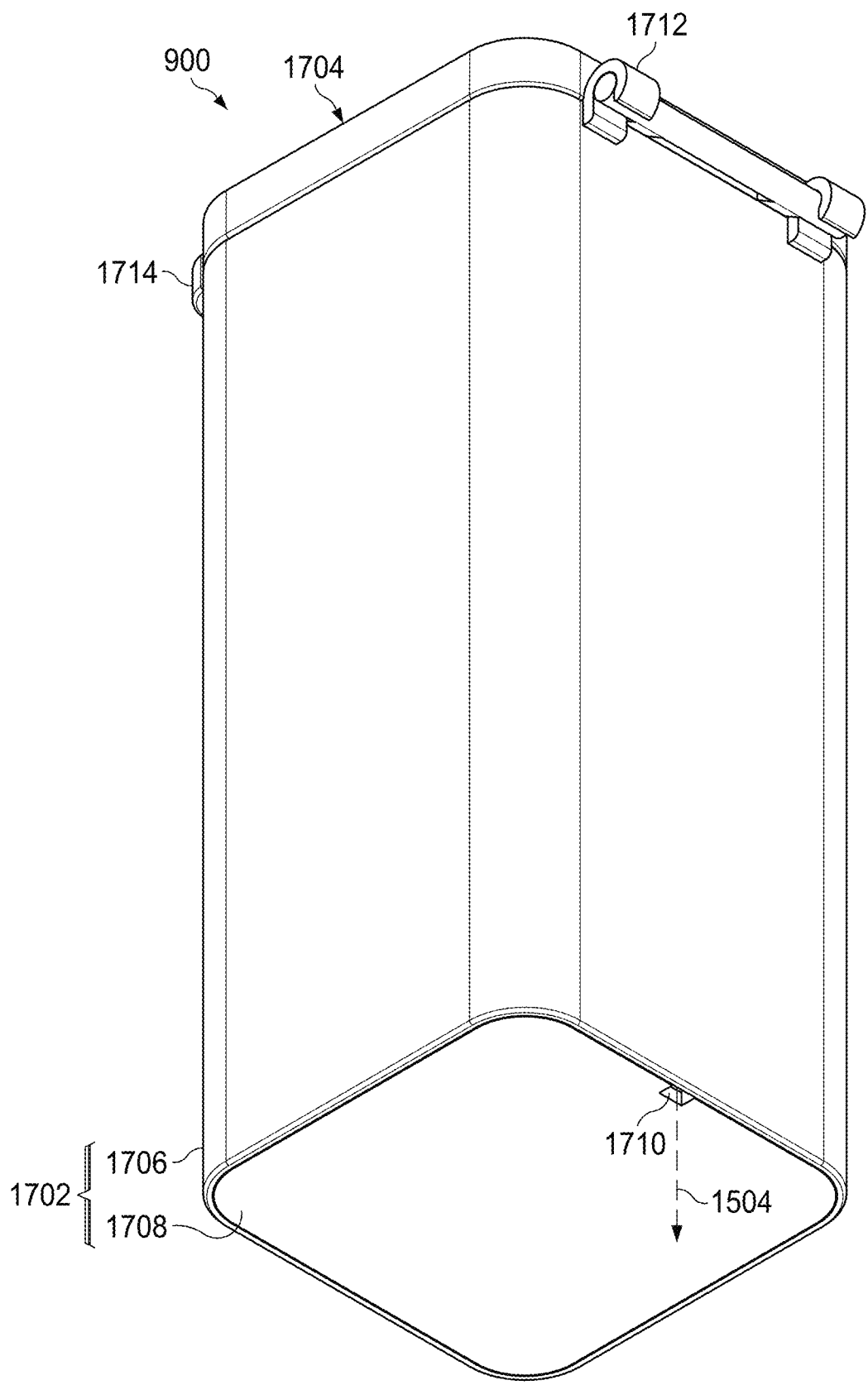
FIG. 17B is a perspective bottom-rear-left view of the actuator apparatus of FIG. 17A according to some example embodiments.
Figure 17C:
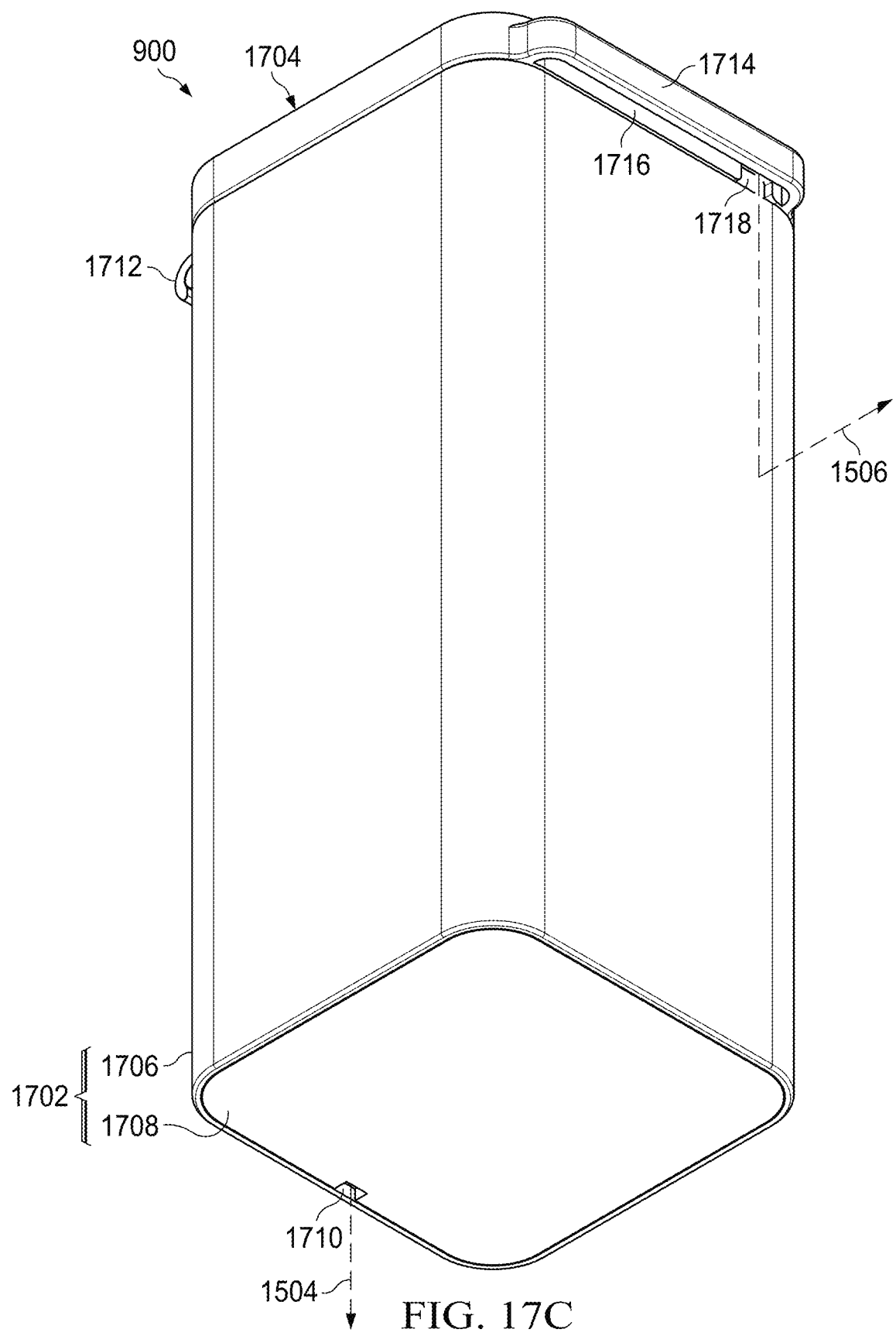
FIG. 17C is a perspective bottom-rear-right view of the actuator apparatus of FIG. 17A according to some example embodiments.

FIG. 17A is a perspective top-front-right view of an actuator apparatus 900 according to some example embodiments. FIG. 17B is a perspective bottom-rear-left view of the actuator apparatus 900 of FIG. 17A according to some example embodiments. FIG. 17C is a perspective bottom-rear-right view of the actuator apparatus 900 of FIG. 17A according to some example embodiments.

Figure 18A:
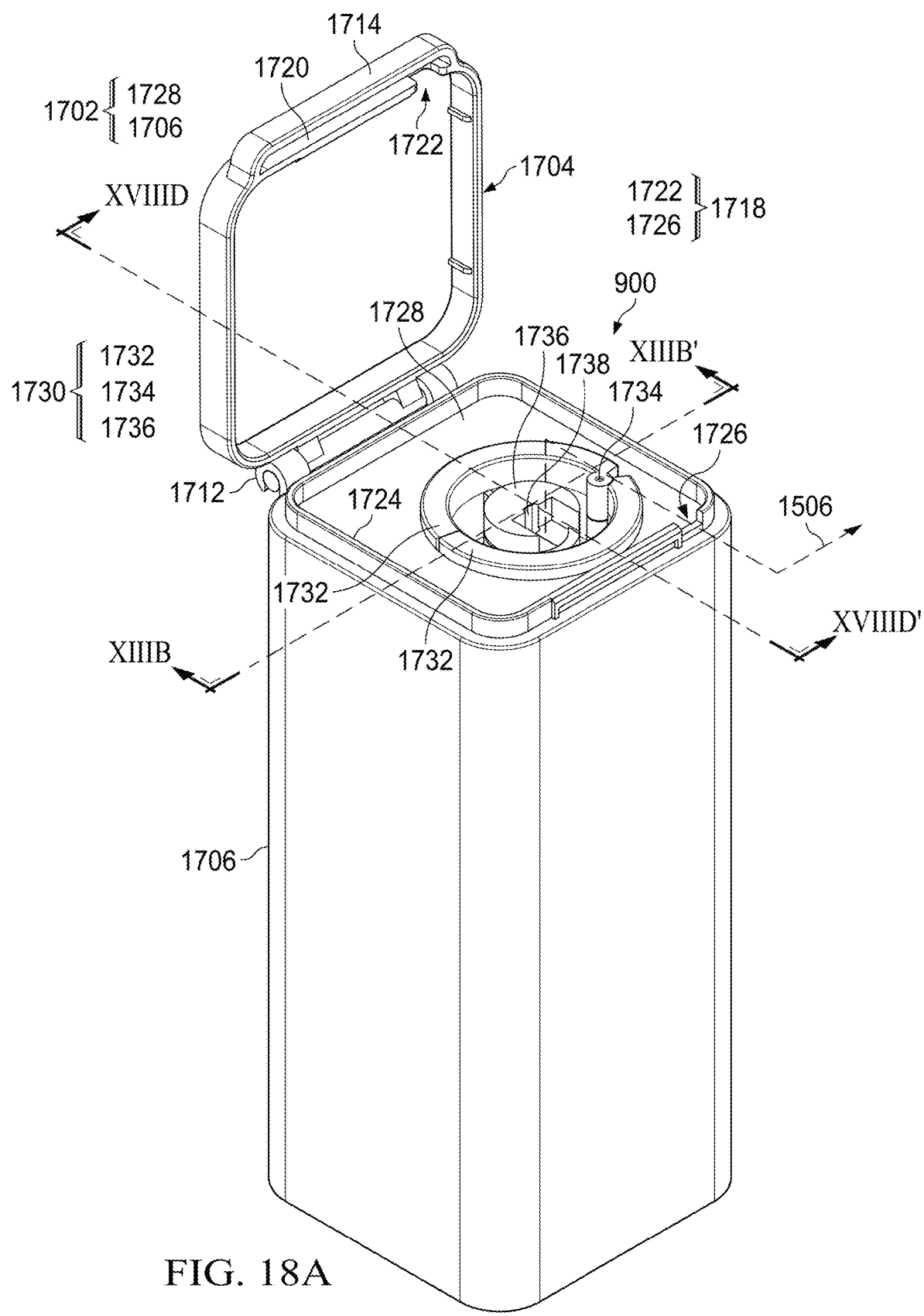
FIG. 18A is a perspective top-front-right view of an actuator apparatus according to some example embodiments.
Figure 18B:
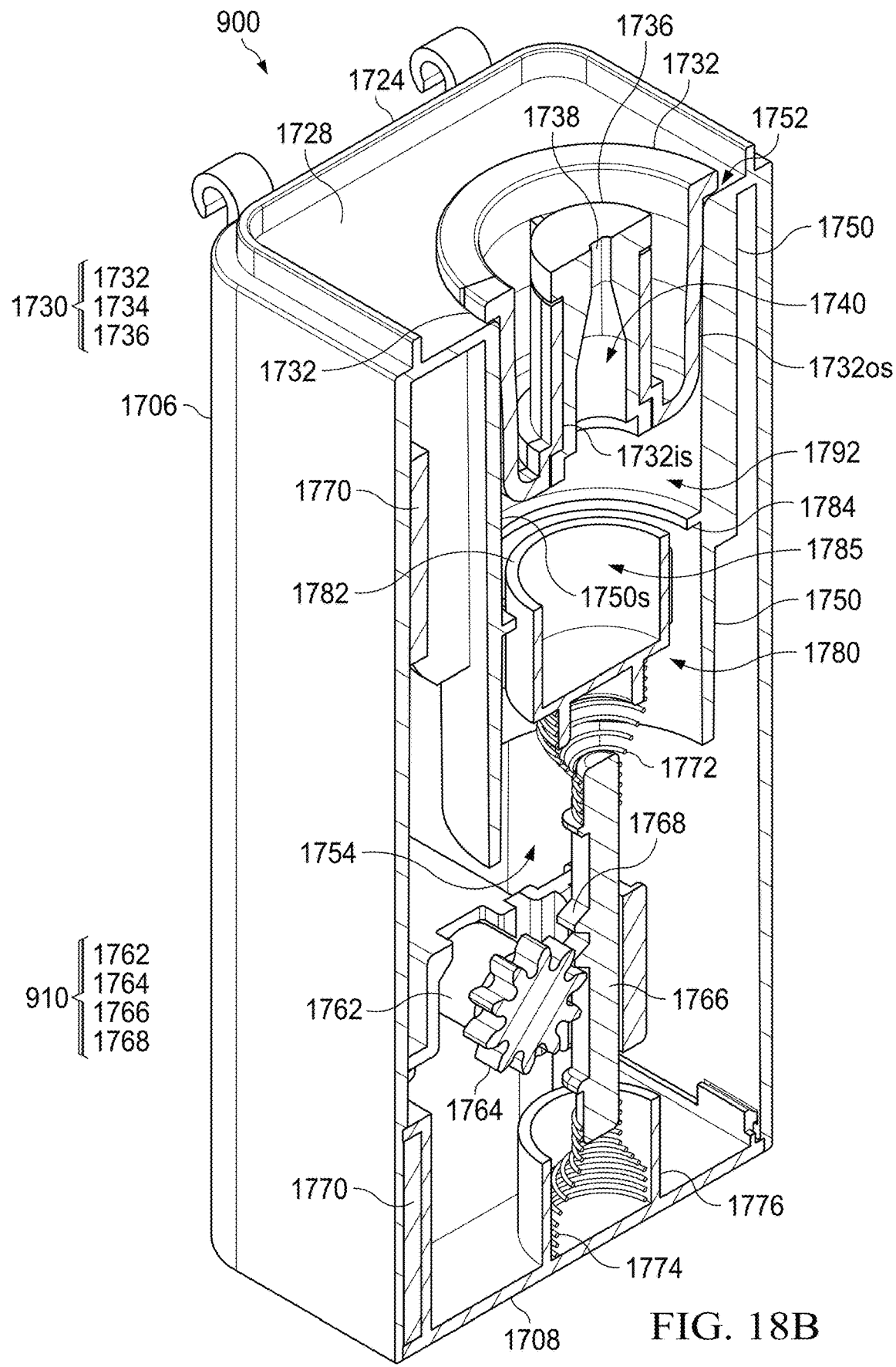
FIG. 18B is a perspective cross-sectional view of the actuator apparatus along cross-sectional view line XVIIIB-XVIIIB' of FIG. 18A according to some example embodiments.
Figure 18C:
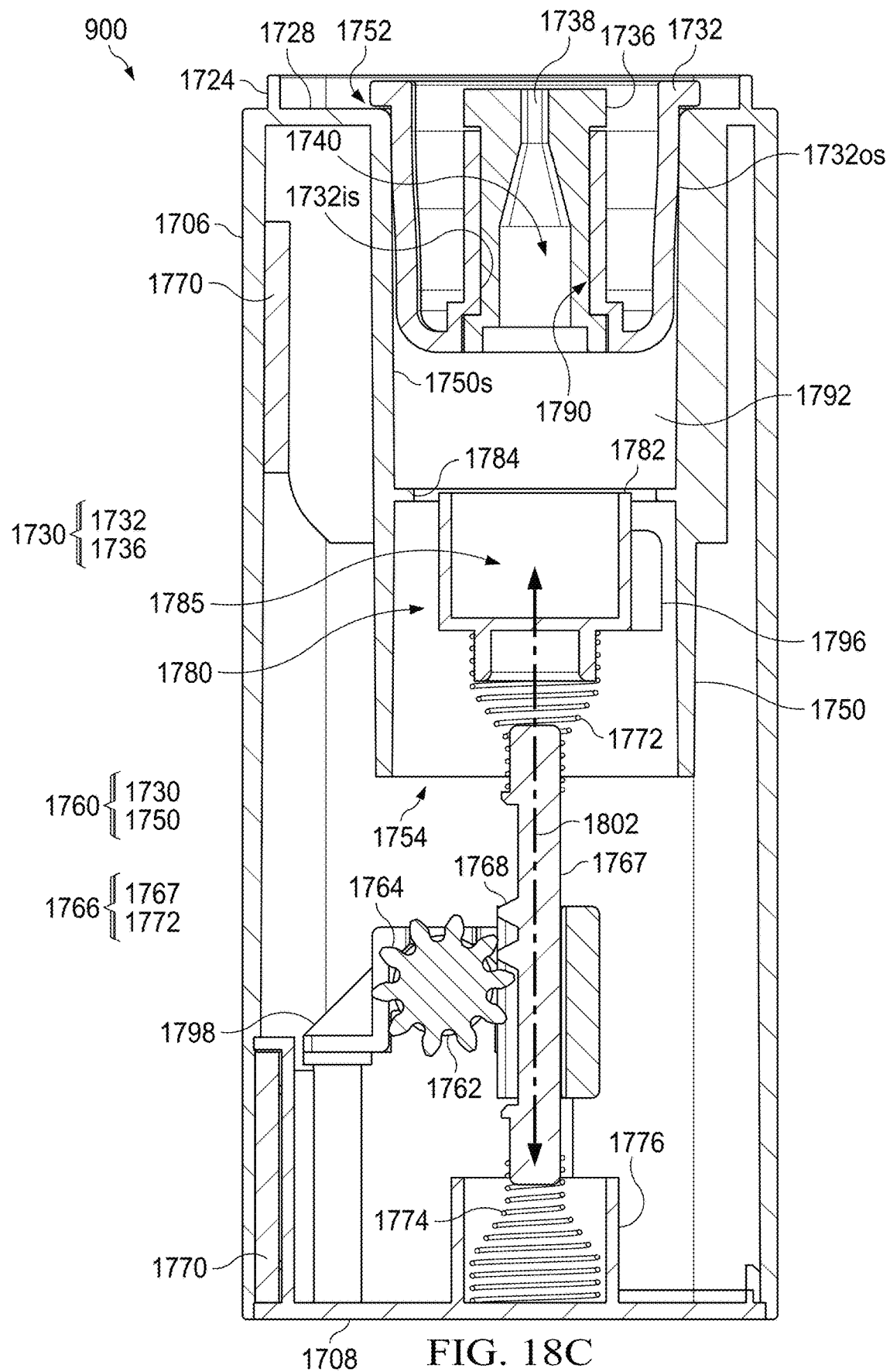
FIG. 18C is a plan cross-sectional view of the actuator apparatus along cross-sectional view line XVIIIB-XVIIIB' of FIG. 18A according to some example embodiments.
Figure 18D:
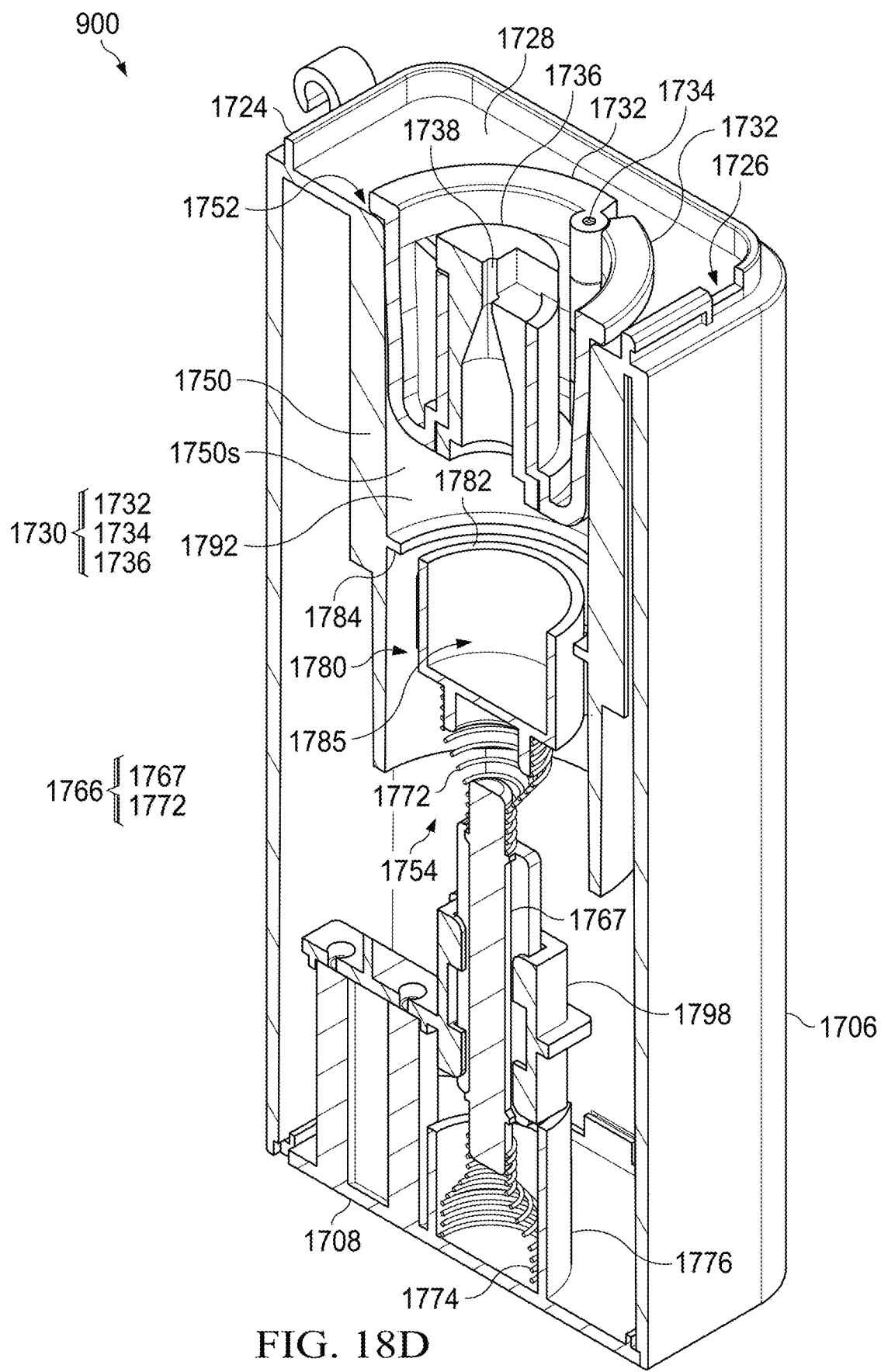
FIG. 18D is a perspective cross-sectional view of the actuator apparatus along cross-sectional view line XVIIID-XVIIID' of FIG. 18A according to some example embodiments.
Figure 18E:
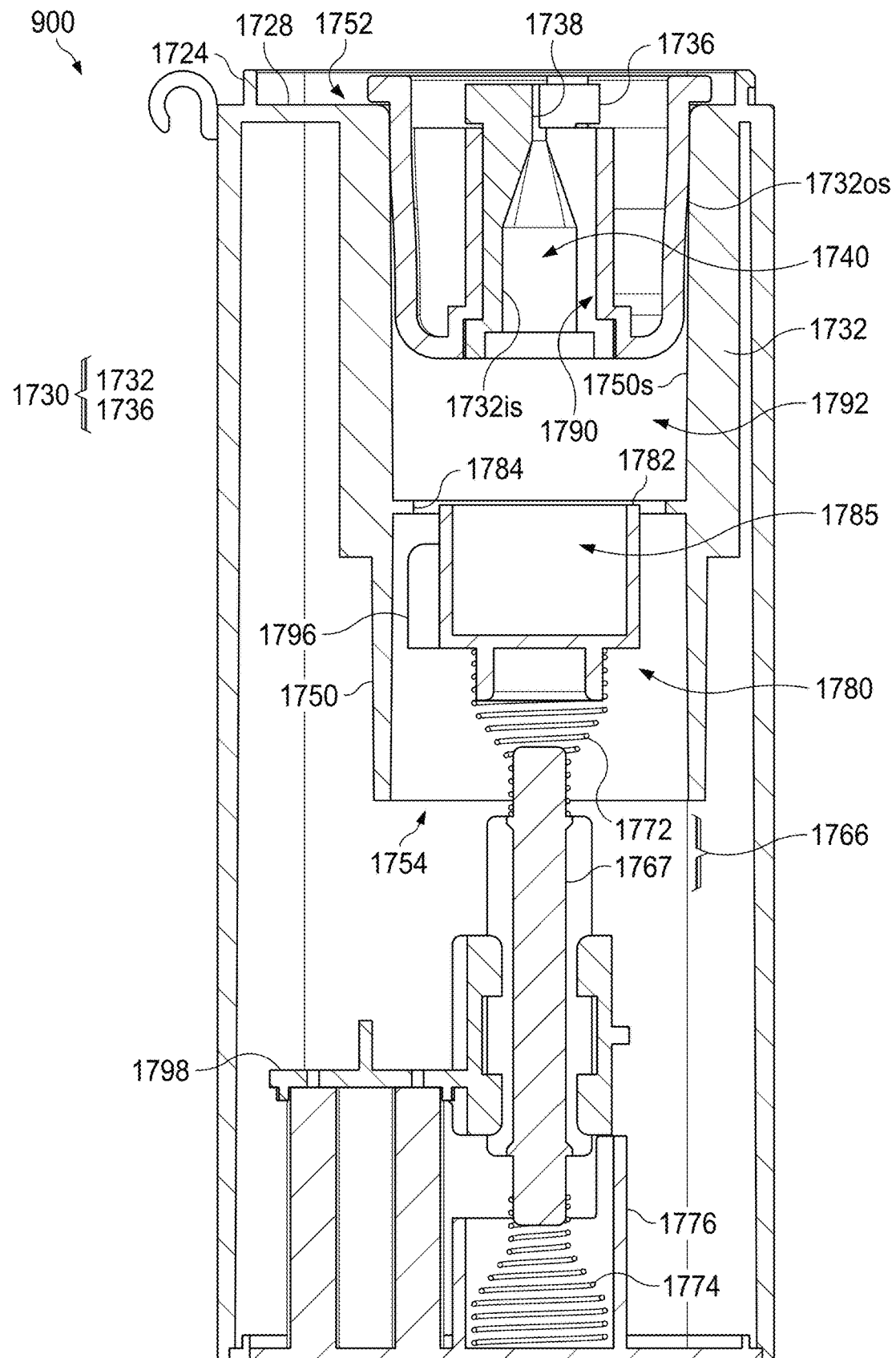
FIG. 18E is a plan cross-sectional view of the actuator apparatus along cross-sectional view line XVIIID-XVIIID' of FIG. 18A according to some example embodiments.

FIG. 18A is a perspective top-front-right view of an actuator apparatus 900 according to some example embodiments. FIG. 18B is a perspective cross-sectional view of the actuator apparatus 900 along cross-sectional view line XVIIIB-XVIIIB' of FIG. 18A according to some example embodiments. FIG. 18C is a plan cross-sectional view of the actuator apparatus 900 along cross-sectional view line XVIIIB-XVIIIB' of FIG. 18A according to some example embodiments. FIG. 18D is a perspective cross-sectional view of the actuator apparatus 900 along cross-sectional view line XVIIID-XVIIID' of FIG. 18A according to some example embodiments. FIG. 18E is a plan cross-sectional view of the actuator apparatus 900 along cross-sectional view line XVIIID-XVIIID' of FIG. 18A according to some example embodiments.

Figure 19A:
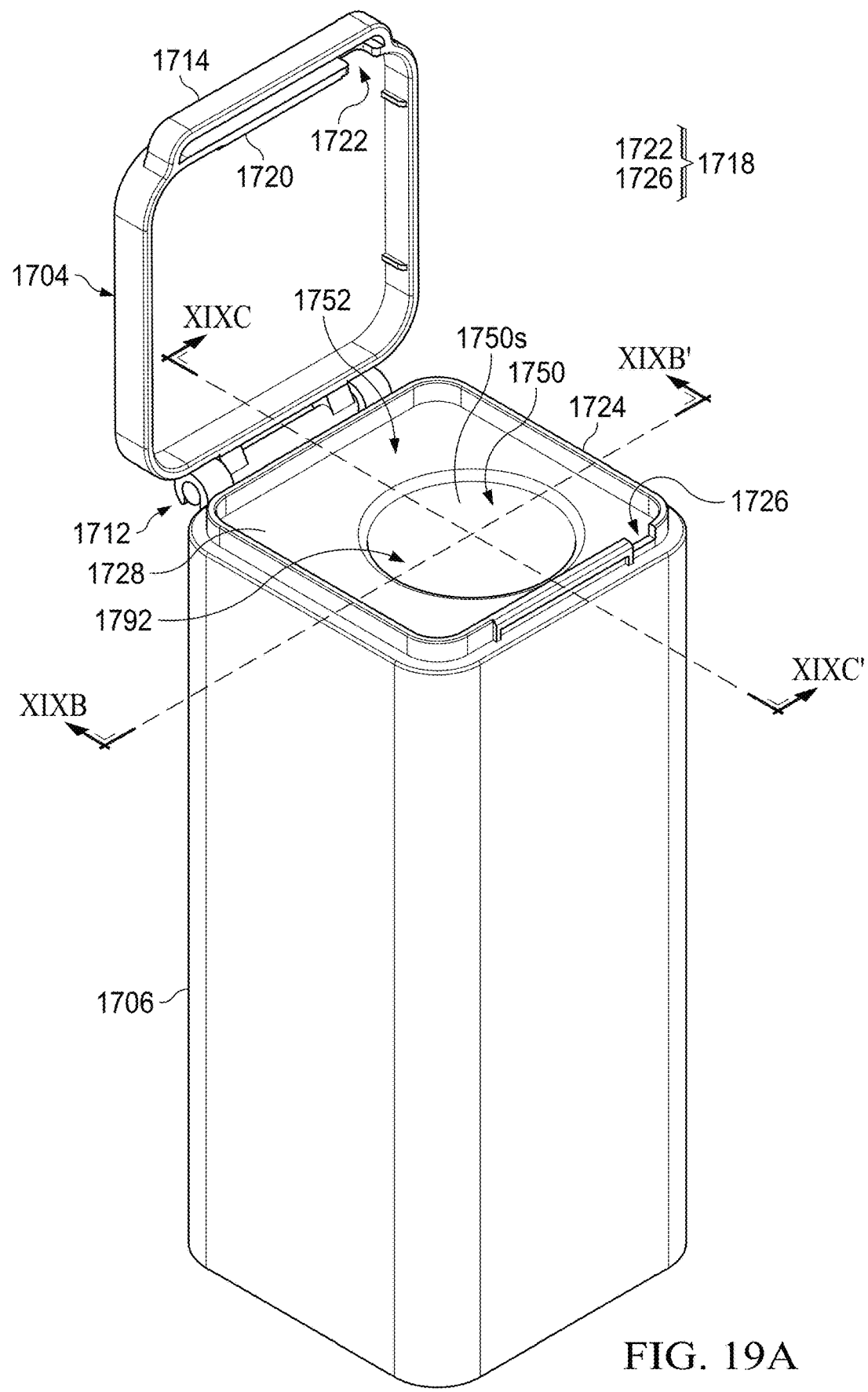
FIG. 19A is a perspective top-front-right view of an actuator apparatus according to some example embodiments.
Figure 19B:
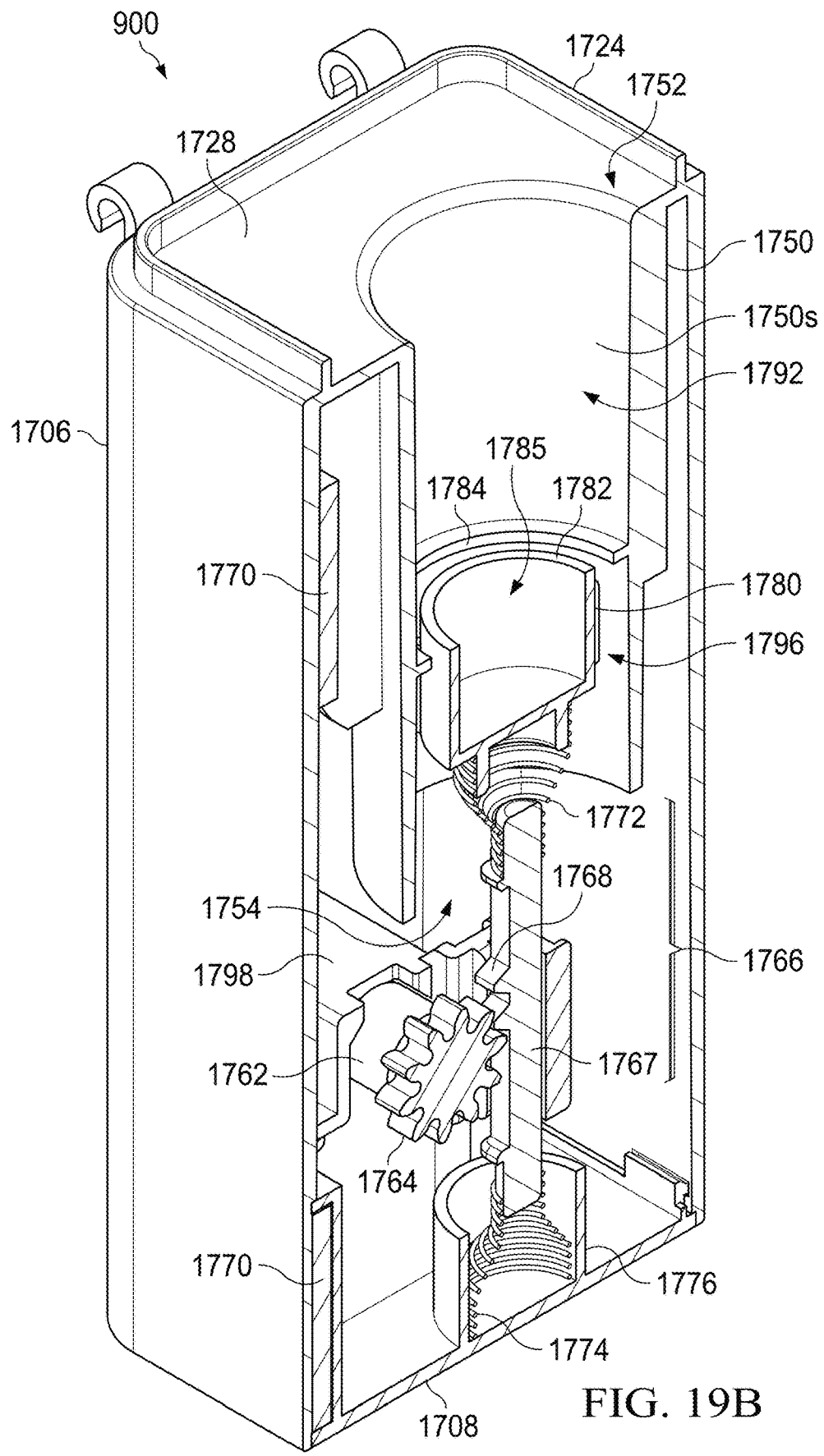
FIG. 19B is a perspective cross-sectional view of the actuator apparatus along cross-sectional view line XIXB-XIXB' of FIG. 19A according to some example embodiments.
Figure 19C:
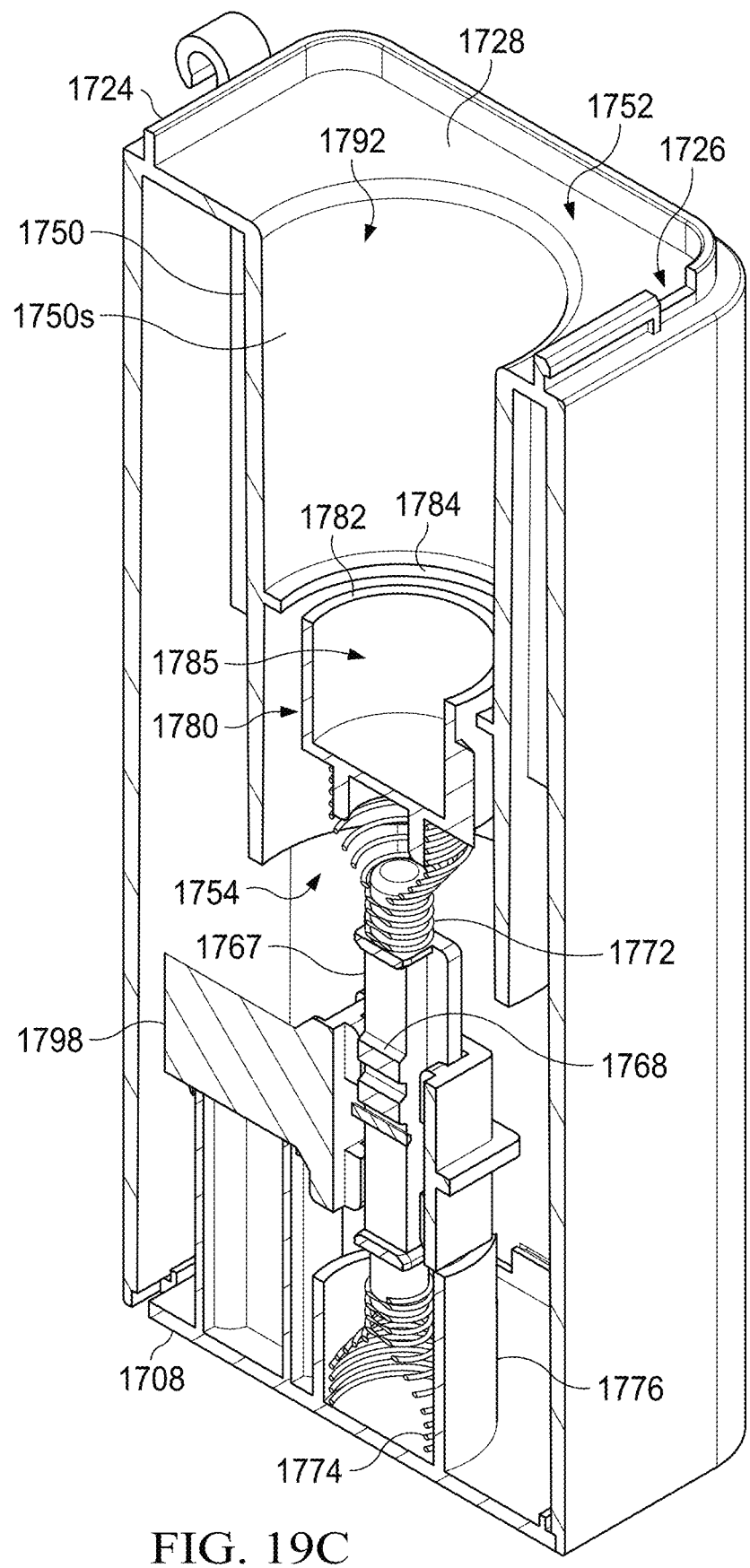
FIG. 19C is a perspective cross-sectional view of the actuator apparatus along cross-sectional view line XIXC-XIXC' of FIG. 19A according to some example embodiments.

FIG. 19A is a perspective top-front-right view of an actuator apparatus 900 according to some example embodiments. FIG. 19B is a perspective cross-sectional view of the actuator apparatus 900 along cross-sectional view line XIXB-XIXB' of FIG. 19A according to some example embodiments. FIG. 19C is a perspective cross-sectional view of the actuator apparatus 900 along cross-sectional view line XIXC-XIXC' of FIG. 19A according to some example embodiments.

Figure 20:
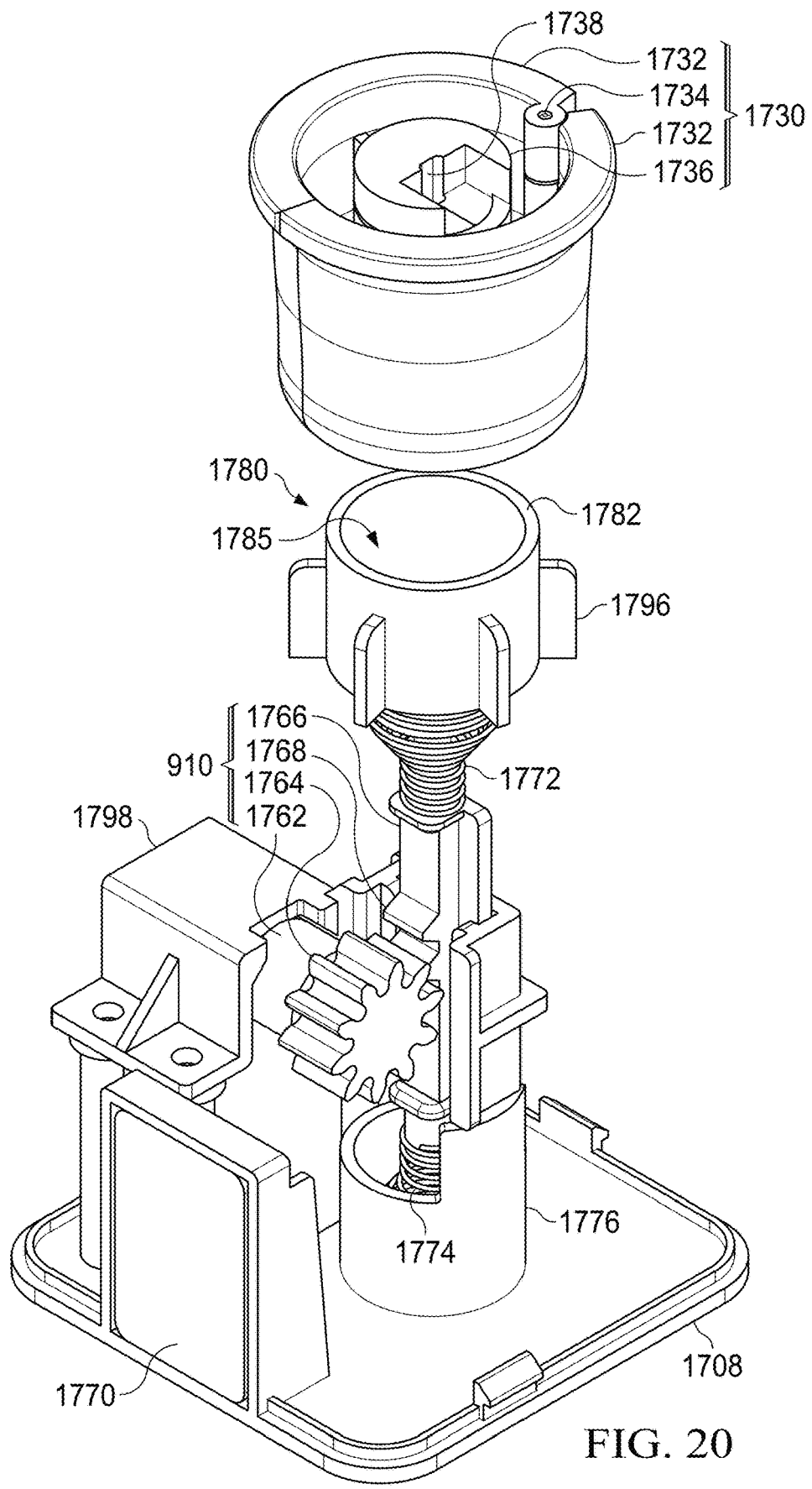
FIG. 20 is a perspective view of elements of an actuator apparatus according to some example embodiments.

FIG. 20 is a perspective view of elements of the actuator apparatus 900 according to some example embodiments.

Figure 21A:
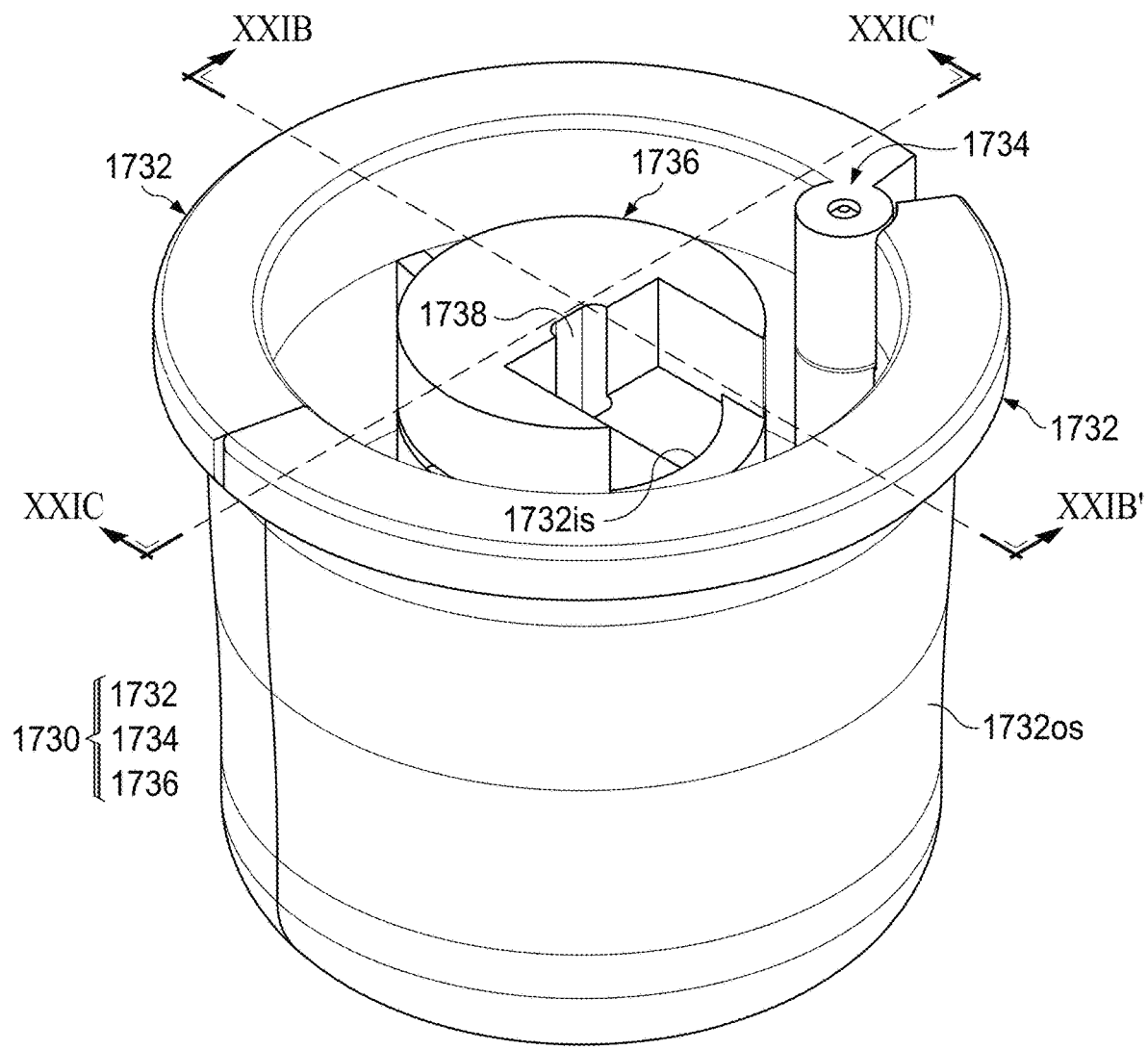
FIG. 21A is a perspective view of a containment apparatus according to some example embodiments.
Figure 21B:
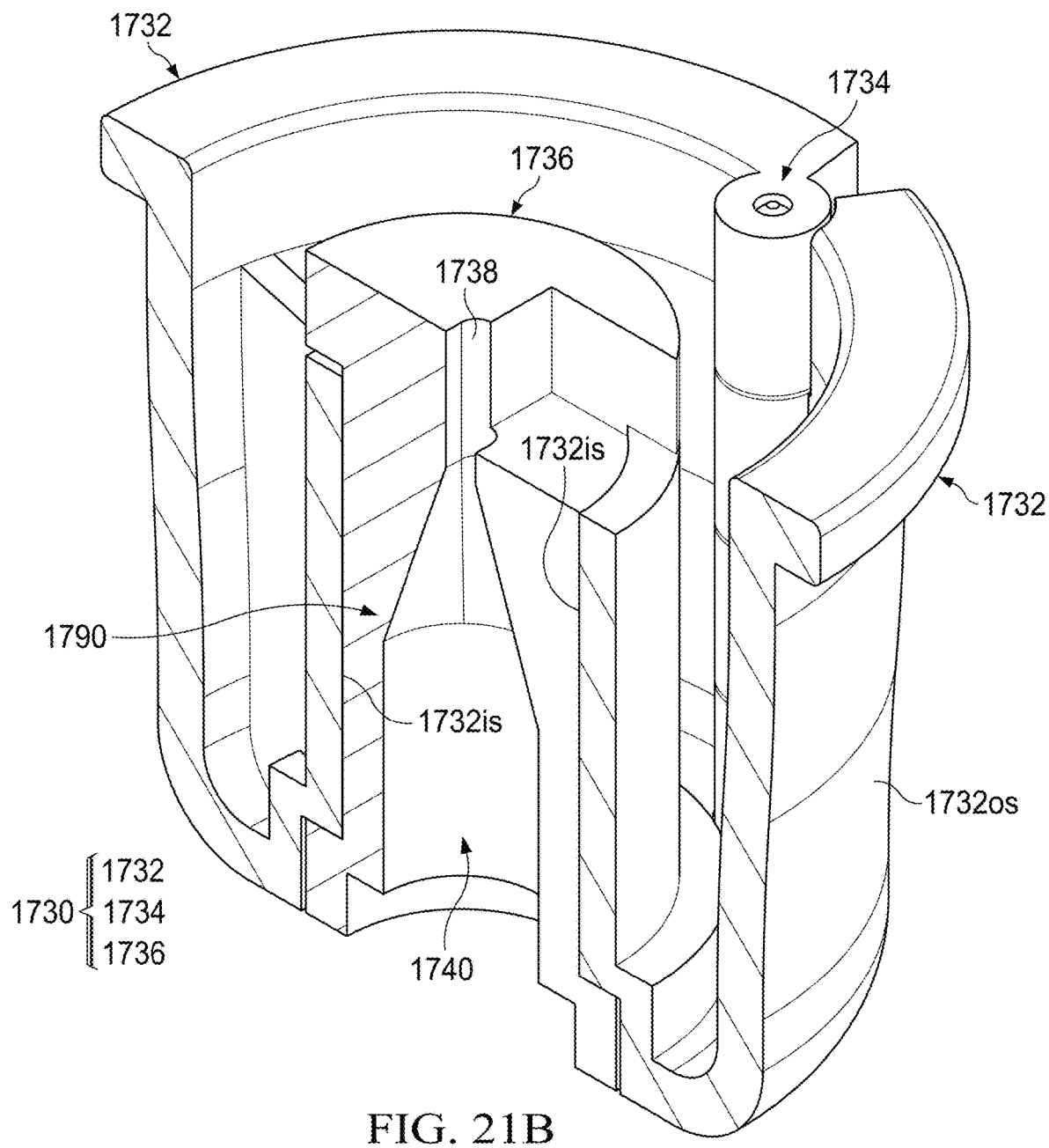
FIG. 21B is a perspective cross-sectional view of the containment apparatus along cross-sectional view line XXIB-XXIB' of FIG. 21A according to some example embodiments.
Figure 21C:
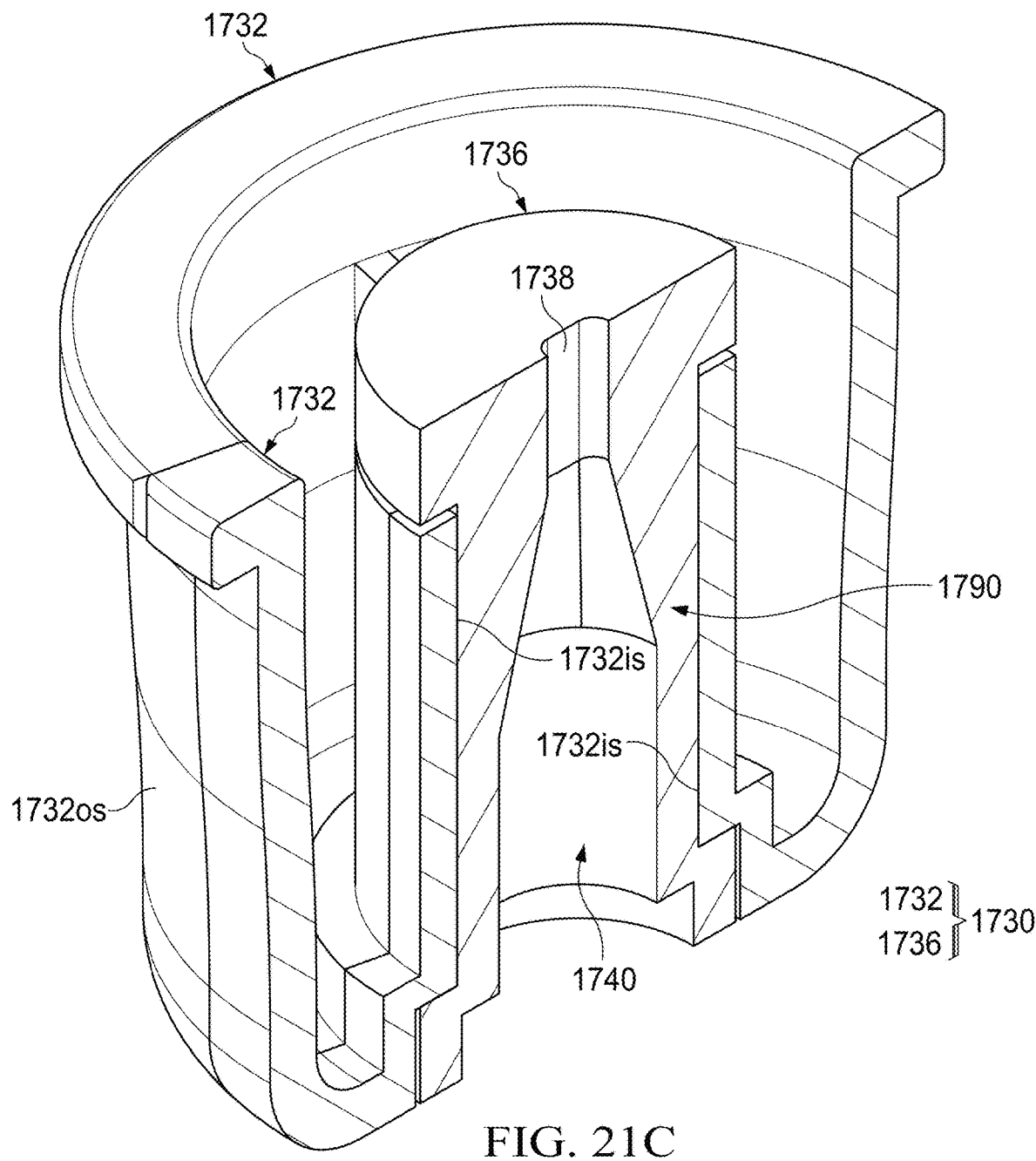
FIG. 21C is a perspective cross-sectional view of the containment apparatus along cross-sectional view line XXIC-XXIC' of FIG. 21A according to some example embodiments.
Figure 22:
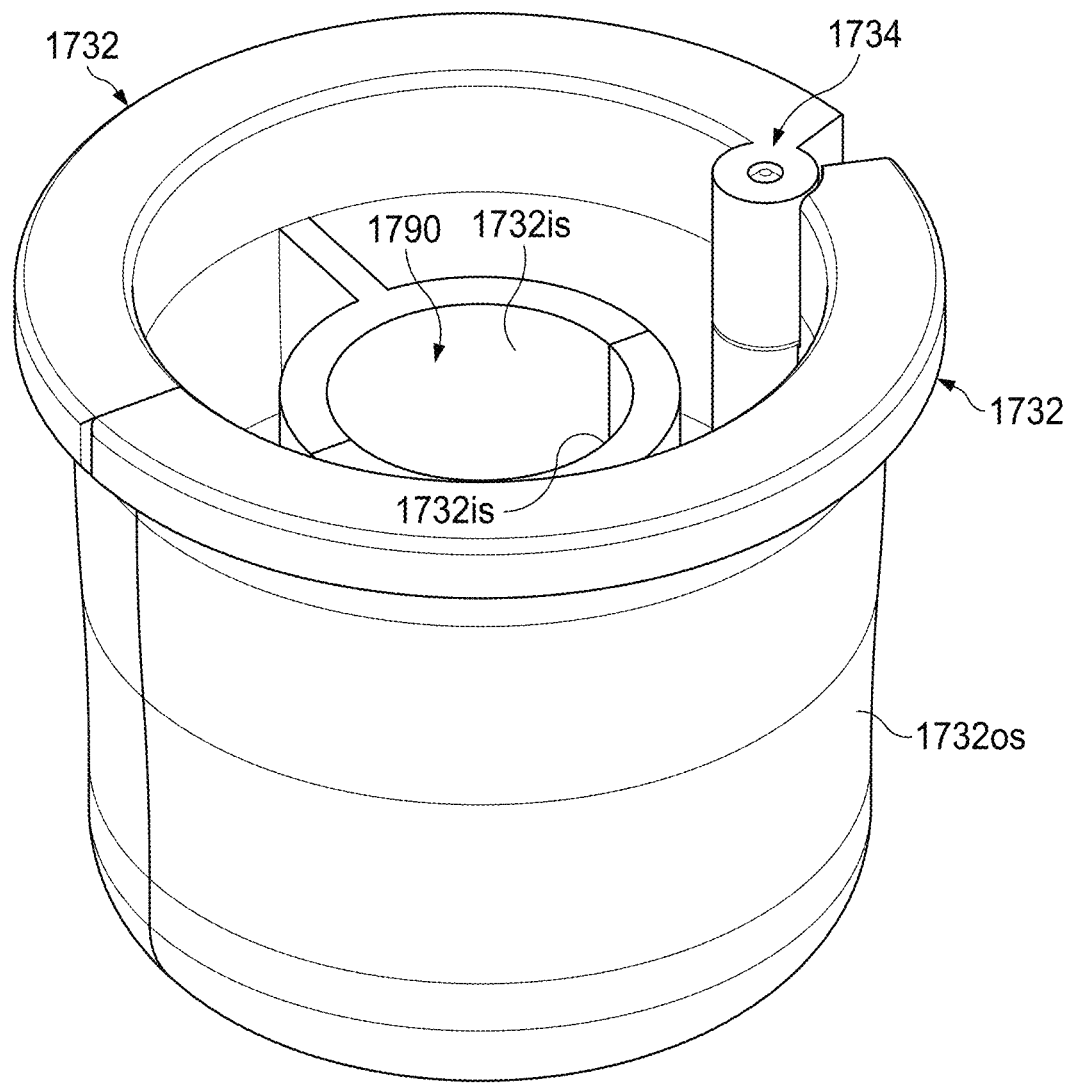
FIG. 22 is a perspective view of outer shells and hinge connection of a containment apparatus according to some example embodiments.
Figure 23A:
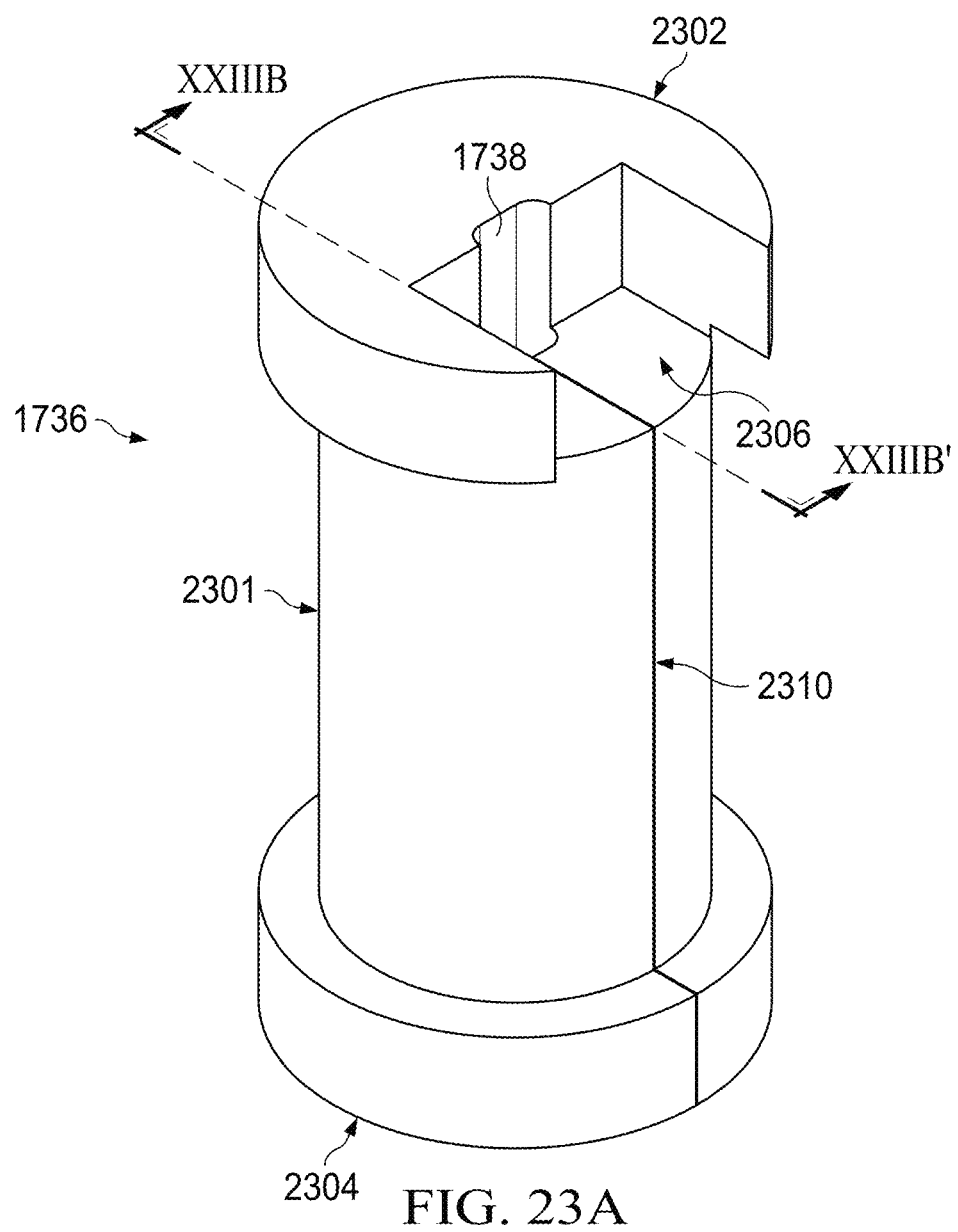
FIG. 23A is a perspective view of an adaptor sleeve structure of a containment apparatus according to some example embodiments.
Figure 23B:
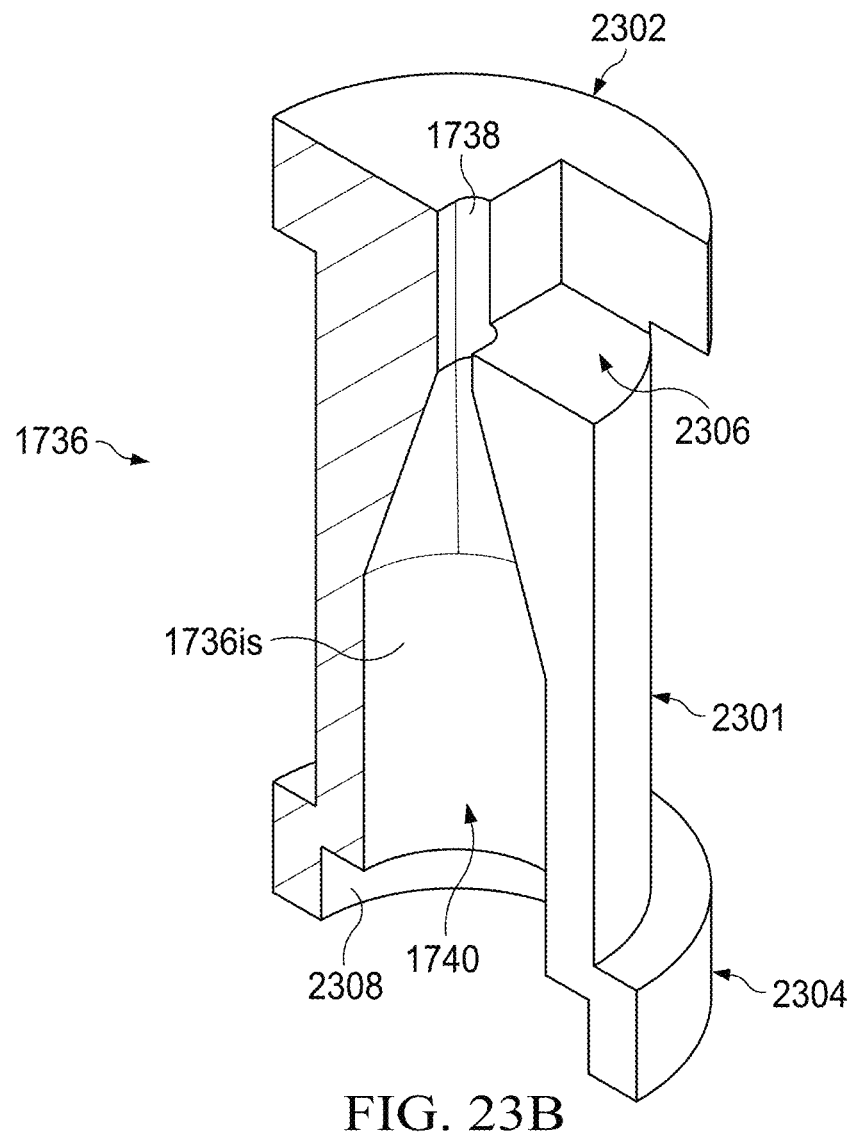
FIG. 23B is a perspective cross-sectional view of the adaptor sleeve structure along cross-sectional view line XXIIIB-XXIIIB' of FIG. 23A according to some example embodiments.
Figure 24A:
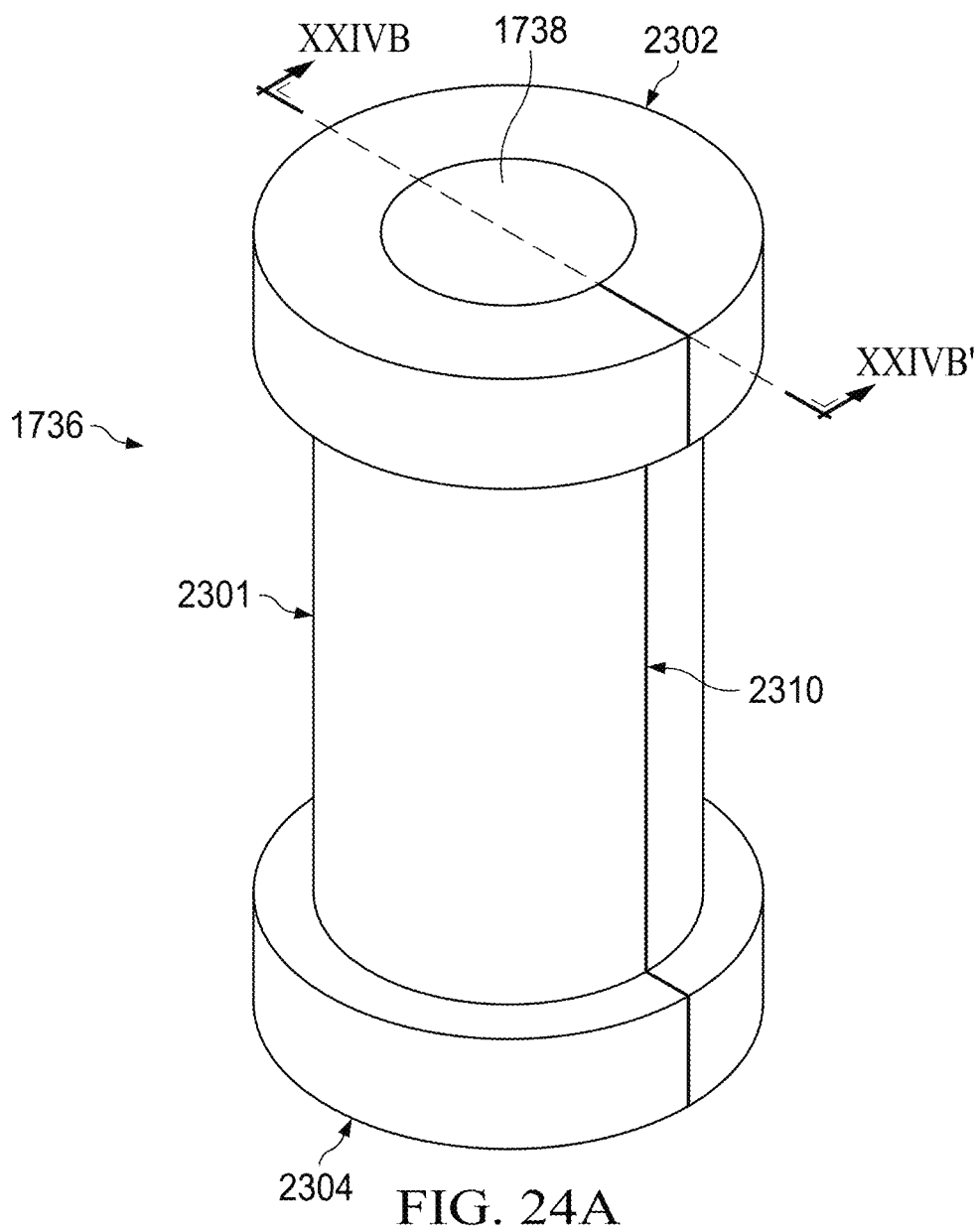
FIG. 24A is a perspective view of an adaptor sleeve structure of a containment apparatus according to some example embodiments.
Figure 24B:
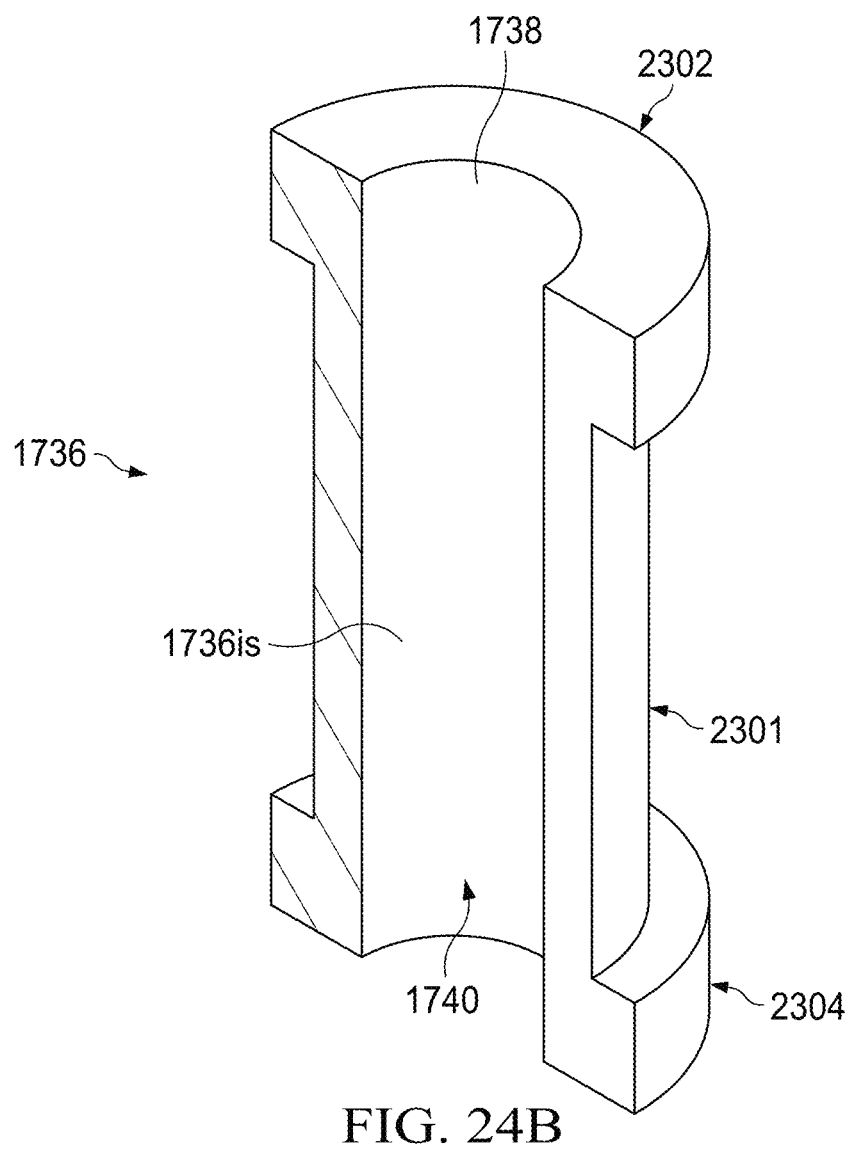
FIG. 24B is a perspective cross-sectional view of the adaptor sleeve structure along cross-sectional view line XXIVB-XXIVB' of FIG. 24A according to some example embodiments.

FIG. 21A is a perspective view of a containment apparatus 1730 according to some example embodiments. FIG. 21B is a perspective cross-sectional view of the containment apparatus 1730 along cross-sectional view line XXIB-XXIB' of FIG. 21A according to some example embodiments. FIG. 21C is a perspective cross-sectional view of the containment apparatus 1730 along cross-sectional view line XXIC-XXIC' of FIG. 21A according to some example embodiments. FIG. 22 is a perspective view of outer shells 1732 and hinge connection 1734 of a containment apparatus according to some example embodiments. FIG. 23A is a perspective view of an adaptor sleeve structure 1736 of a containment apparatus according to some example embodiments. FIG. 23B is a perspective cross-sectional view of the adaptor sleeve structure 1736 along cross-sectional view line XXIIIB-XXIIIB' of FIG. 23A according to some example embodiments. FIG. 24A is a perspective view of an adaptor sleeve structure 1736 of a containment apparatus according to some example embodiments. FIG. 24B is a perspective cross-sectional view of the adaptor sleeve structure 1736 along cross-sectional view line XXIVB-XXIVB' of FIG. 24A according to some example embodiments.

Figure 25A:
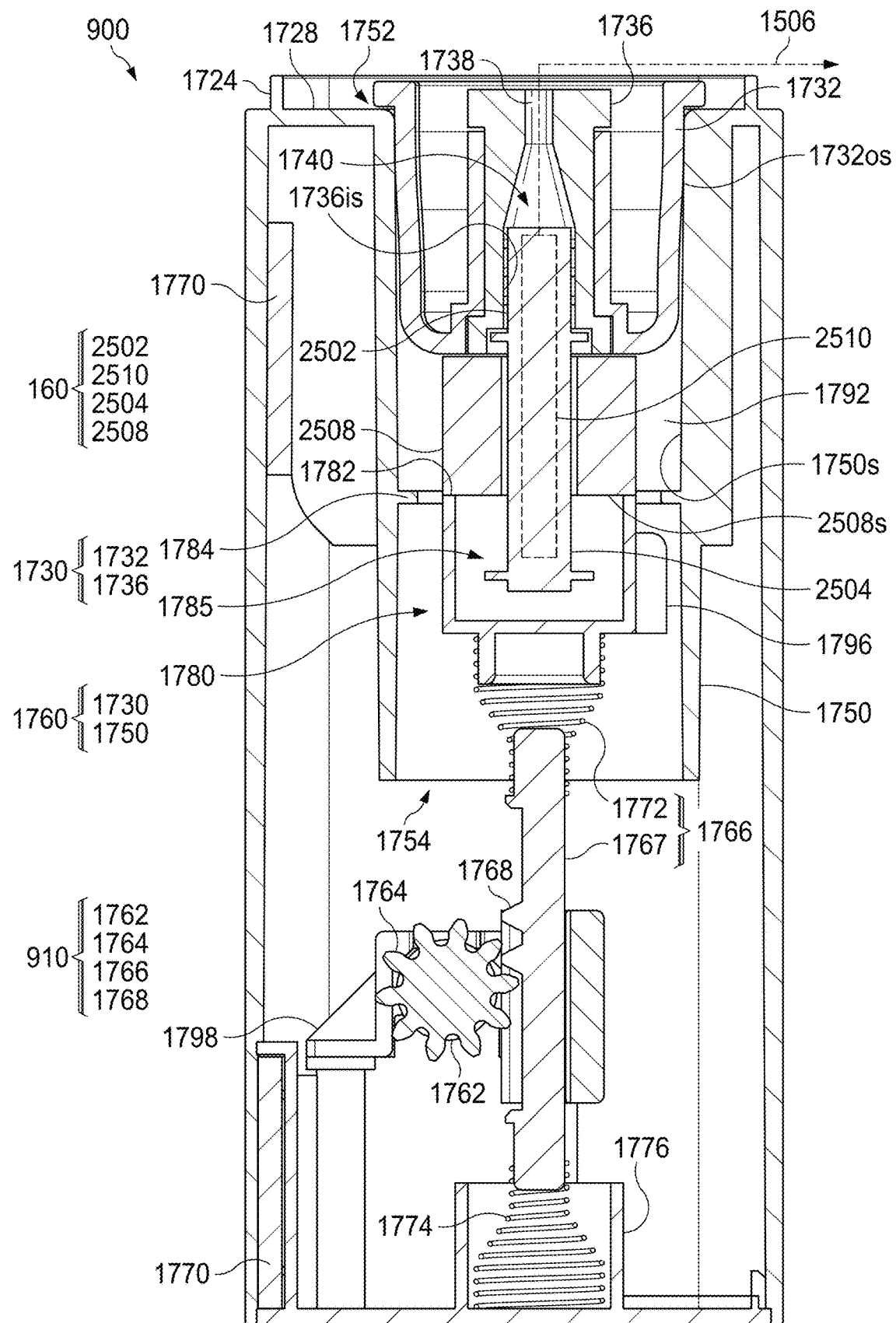
FIG. 25A is a plan cross-sectional view of the actuator apparatus along cross-sectional view line XVIIIB-XVIIIB' of FIG. 18A in which an air handler float switch is positioned according to some example embodiments.
Figure 25B:
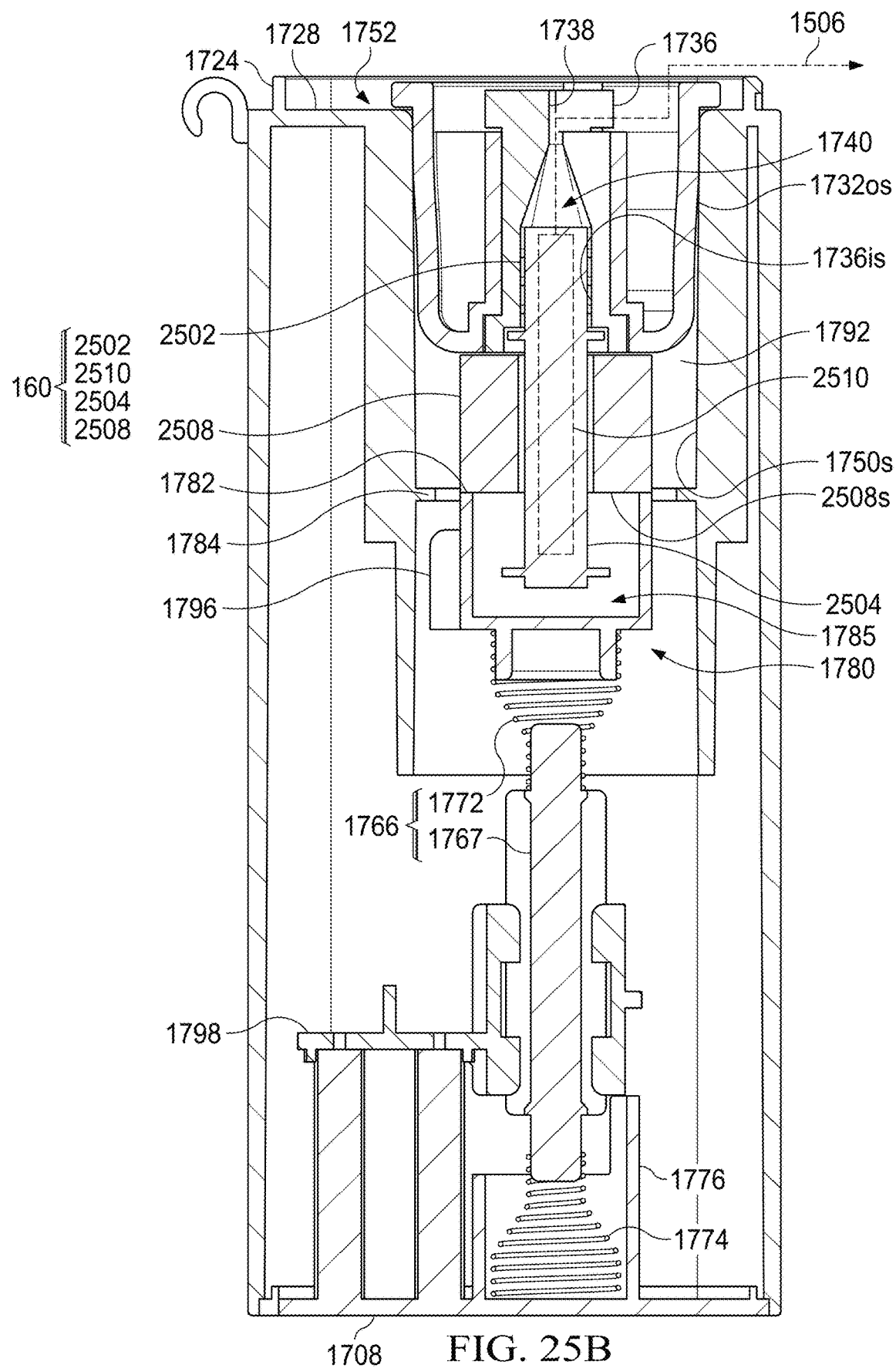
FIG. 25B is a plan cross-sectional view of the actuator apparatus along cross-sectional view line XVIIID-XVIIID' of FIG. 18A in which an air handler float switch is positioned according to some example embodiments.

FIG. 25A is a plan cross-sectional view of the actuator apparatus 900 along cross-sectional view line XVIIIB-XVIIIB' of FIG. 18A in which an air handler float switch 160 is positioned according to some example embodiments. FIG. 25B is a plan cross-sectional view of the actuator apparatus 900 along cross-sectional view line XVIIID-XVIIID' of FIG. 18A in which an air handler float switch 160 is positioned according to some example embodiments.

It will be understood that the actuator apparatus 900 and any elements thereof shown in FIGS. 17A-25A and the air handler float switch 160 shown in FIGS. 25A to 25B may include any of the elements of any of the example embodiments and of the devices, apparatuses, or the like shown in any of the drawings and/or described herein.

Referring to FIGS. 17A-19C, the actuator apparatus 900 may include a body housing 1702 including a side housing 1706, a bottom housing 1708, and a top housing 1728. In the illustrated example embodiments, the top housing 1728 and the side housing 1706 may be separate portions of a single piece of material (e.g., plastic material), but example embodiments are not limited thereto. As further shown, the actuator apparatus 900 may include a lid 1704 having a tab protrusion 1714 and which may be coupled to the body housing 1702 to cover the top housing 1728. The lid 1704 may be configured to be hingeably coupled to the body housing 1702 via a hinge connection 1712, but example embodiments are not limited thereto.

Still referring to FIGS. 17A-19C, the actuator apparatus 900 may include the actuator 910 within the interior defined by the body housing 1702 (e.g., the side housing 1706, the bottom housing 1708, the top housing 1728, etc. As shown, the actuator 910 may include a servomotor 1762 coupled to a rotary gear 1764 (e.g., spur gear) (e.g., a servoactuator) and an actuator piston 1766 including at least a piston structure 1767 having linear gear teeth 1768 configured to engage the gear teeth of the rotary gear 1764. As shown, the servomotor 1762 may be configured to rotate the rotary gear 1764 in a clockwise or counterclockwise direction to cause the actuator piston 1766 to move along a first axis 1802 (e.g., move up or down linearly). The actuator apparatus 900 may include a support housing 1798 configured to fix the servomotor 1762 and rotary gear 1764 in place and to further laterally limit motion (perpendicular to the first axis 1802) of the piston structure 1767 of the actuator piston 1766 to ensure meshing of the respective gear teeth of the actuator piston 1766 and the rotary gear 1764.

Still referring to at least FIGS. 17A-19C, the actuator apparatus 900 may include one or more connector interfaces configured to couple (e.g., attach) the actuator apparatus 900 to an external structure. For example, as shown, the actuator apparatus 900 may include two separate magnets 1770 within the interior of the actuator apparatus 900, isolated from direct exposure to the exterior of the actuator apparatus 900 by at least the side housing 1706, that serve as connector interfaces configured to magnetically couple (e.g., attach) the actuator apparatus 900 to a metal surface of an external structure (e.g., a metal surface of the housing 101 of the air handler 102) separately from the drain cleaner apparatus 200, thereby enabling the actuator apparatus 900 and the drain cleaner apparatus 200 to be adjustably and variably attached to one or more external structures at least partially independently of each other, thereby enabling improved flexibility of arrangement of the apparatuses in different environments.

Still referring to FIGS. 17A-19C and further referring to FIGS. 25A-25B, the actuator apparatus 900 may be configured to receive an air handler float switch 160 of an air handler 102 as shown in FIG. 15A and to hold the air handler float switch 160 in place (e.g., hold at least the shaft parts 2502 and 2504 of the air handler float switch 160 in a fixed position) in relation to the actuator piston 1766. As shown, the air handler float switch 160 may include upper and lower shaft parts 2502 and 2504, float 2508, and circuitry 2510 (e.g., a switch device, a bimetal switch device, processing circuitry, electrical circuitry including an electrical switch, etc.) configured to generate a float switch signal and transmit the float switch signal via the electrical connection 1506 to the air handler 102 (e.g., to the controller 140 thereof) to cause the air handler 102 to shut down (e.g., to cause the controller 140 to initiate shutdown of the air handler 102), but it will be understood that example embodiments are not limited thereto. The actuator apparatus 900 may be configured to actuate the air handler float switch 160 based on causing a float 2508 of the air handler float switch 160 to move in relation to a remainder of the air handler float switch 160 (e.g., in relation to the shaft parts 2504 and 2502 and the circuitry 2510) along the first axis 1802 based on the actuator piston 1766 being caused by the servomotor 1762 to move along the first axis 1802 to actuate the air handler float switch 160 to cause the circuitry 2510 to responsively generate a float switch signal. It will be understood that the air handler float switch 160 is not limited to the structure shown in FIGS. 25A to 25B and may include any known float switch (e.g., bimetal float switch). It will be understood that the actuator 910 may include other types of actuators, servoactuators, or the like, including for example a linear actuator.

Still referring to FIGS. 17A-19C and FIGS. 25A-25B, the actuator apparatus 900 may include a cup structure 1780 that is coupled to the actuator 910, for example coupled (e.g., directly or indirectly coupled) to an upper end of the actuator piston 1766. For example, as shown in FIGS. 17A-19C and 25A-25B, the actuator piston 1766 may include a first spring 1772 coupled to the upper end of the piston structure 1767 and further coupled between the piston structure 1767 and the cup structure 1780, such that the cup structure 1780 may be coupled to the upper end of the piston structure 1767 via a first spring 1772. In some example embodiments, the cup structure 1780 may be understood to be part of the actuator piston 1766. For example, in some example embodiments the first spring 1772 may be omitted and the cup structure 1780 may be coupled to (e.g., directly or indirectly coupled to, a part of a same piece of material as, etc.) an upper end of the piston structure 1767 so that the actuator piston 1766 excludes any first spring 1772 between the cup structure 1780 and the piston structure 1767 and the actuator piston 1766 includes the cup structure 17680 and the piston structure 1767. It will be understood that any signal as described herein may be an electrical signal.

The cup structure 1780 may define an open enclosure 1785 that is configured to accommodate at least a portion (e.g., lower shaft part 2504) of the air handler float switch 160 and may define an upper surface 1782 or ridge configured to directly engage an underside (e.g., lower surface 2508*s*) of the float 2508 of the air handler float switch 160. The cup structure 1780 may be configured to engage the float 2508 to cause the float 2508 to move axially along the first axis 1802 based on movement of the actuator piston 1766 along the first axis 1802, as the axial movement of the actuator piston 1766 may be transferred to the cup structure 1780 (e.g., via the piston structure 1767, and in some example embodiments further via the first spring 1772) and thus further transferred to the float 2508. As described herein, the remainder of the air handler float switch 160 may be held in place while the float 2508 is free to be moved by the cup structure 1780, so the movement of the float 2508 by the cup structure 1780 may cause the air handler float switch 160 to actuate in response thereto.

Still referring to FIGS. 17A-19C and FIGS. 25A-25B, the actuator apparatus 900 may include a conduit structure 1750 having an inner surface 1750*s* defining a conduit space 1792 extending along the first axis 1802 and having opposite first and second openings 1752 and 1754. In some example embodiments as shown, the conduit structure may be a cylindrical structure that may be a separate portion of a same piece of material as at least the top housing 1728 of the body housing 1702, and the first opening 1752 may be an opening in the top housing 1728, but example embodiments are not limited thereto. As shown, the conduit structure 1750 may extend along the first axis 1802 into the interior of the actuator apparatus 900 from the first opening 1752 at the top housing 1728 so that the second opening 1754 is an opening into an interior of the actuator apparatus 900 that is proximate to the actuator 910.

Referring to FIGS. 17A-19C, 20, and FIGS. 25A-25B, the conduit structure 1750 may be configured to receive the air handler float switch into the conduit space 1792 (e.g., at least an upper region of the conduit space 1792 extending between the first opening 1752 and the inner ledge structure 1784 described below) through the first opening 1752. The conduit structure 1750 may be further configured to receive at least the cup structure 1780 into the conduit space 1792 (e.g., at least a lower region of the conduit space 1792 extending between the second opening 1754 and the inner ledge structure 1784) through the second opening 1754. The inner ledge structure 1784, extending into the conduit space 1792 from the inner surface 1750*s* of the conduit structure 1750 and extending circumferentially around the inner surface 1750*s*, may define the upper and lower regions of the conduit space 1792. The cup structure 1780 may include protrusions 1796 that extend laterally underneath the ledge structure 1784 to vertically at least partially overlap the ledge structure 1784. The outer diameter of the cup structure itself 1780 may be smaller than an inner diameter of an opening defined by the ledge structure 1784 so that the cup structure 1780 may be configured to at least partially move axially between the lower and upper regions of the conduit space 1792, and the protrusions 1796 may be configured to engage the ledge structure 1784 to restrict the axial movement of the cup structure 1780 into the upper region of the conduit space 1792.

Still referring to FIGS. 17A-19C, 20, and FIGS. 25A-25B, the enclosure 1785 of the cup structure 1780 and the first spring 1772 may be configured to enable the cup structure to move axially to compensate for varying lengths and/or shapes of the air handler float switch 160. An air handler float switch 160 having a longer lower shaft part 2504 may contact the bottom surface of the cup structure 1780 partly defining the enclosure 1785 and push the cup structure 1780 downwards to compress the first spring 1772 while maintaining engagement between surfaces 1782 and 2508*s*. A float switch 160 having a shorter lower shaft part 2504 may result in the cup structure 1780 moving axially at least partially into the upper region of the conduit space 1792 based on the spring force exerted by the first spring 1772 to maintain engagement between surfaces 1782 and 2508*s*. As further shown, the actuator apparatus 900 may include a second spring 1774 coupled to an opposite end of the piston structure 1767 of the actuator piston 1766 in relation to the first spring 1772 and configured to be compressed between the piston structure 1767 of the actuator piston 1766 and the bottom housing 1708, the second spring 1774 supported and held in place by support structure 1776. The first and second springs 1772 and 1774 may collectively balance and/or adjust the axial position of the piston structure 1767 of the actuator piston 1766 in relation to the remainder of the actuator 910 under the cup structure 1780. As a result of the above, the actuator apparatus 900 may be configured to accommodate air handler float switches 160 having various shapes, particularly various lengths along the first axis 1802, based on compression or expansion of the at least one of the first or second springs 1772 or 1774 and the resultant axial movement of the cup structure 1780 independent of the operation of the actuator piston 1766 by the servomotor 1762 and the rotary gear 1764.

Still referring to FIGS. 17A-25B, the actuator apparatus 900 may include a containment apparatus 1730 that may couple with the air handler float switch 160 and may further couple with a portion of the actuator apparatus 900 (e.g., the conduit structure 1750) so that the containment apparatus 1730 holds the air handler float switch 160 in place (e.g., in place in relation to the actuator 910 and/or the cup structure 1780, at least partially within the conduit space 1792 in relation to at least the cup structure 1780, etc.). The containment apparatus 1730 may be interchangeably referred to herein as a float switch holster, a float switch holster apparatus, a float switch holster device, a float switch holster assembly, a float switch holder, a float switch holder apparatus, a float switch holder device, a float switch holder assembly, a holder, a holster, a float switch cup, a float switch sheath, a float switch adaptor apparatus, a float switch adaptor device, a float switch adaptor assembly, an adaptor, or the like. While the containment apparatus 1730 cooperates with at least a portion of the actuator apparatus 900 (e.g., the conduit structure 1750) to hold the air handler float switch 160 in place, the actuator 910 may be configured to cause the cup structure 1780 to move axially along the first axis 1802 to engage the float 2508 of the air handler float switch 160 and cause the float 2508 to move upwards along the first axis 1802 in relation to the remainder of the air handler float switch 160, thereby actuating the air handler float switch 160. The containment apparatus 1730 may include one or more outer surfaces (e.g., outer surface 1732os) configured to engage in a friction fit with one or more opposing surfaces of the actuator apparatus 900 (e.g., inner surface 1750s of the conduit structure 1750) in order to hold the containment apparatus 1730 and the coupled air handler float switch 160 (e.g., the upper and lower shaft parts 2502 and 2504) in place despite the actuator 910 causing the float 2508 to move upwards.

In some example embodiments, the containment apparatus 1730 and the conduit structure 1750 may collectively define one or more support structures 1760 configured to position the air handler float switch 160 in relation to the actuator 910. It will be understood that the one or more support structures 1760 may include any one or more structures configured to hold the air handler float switch 160 in place while remaining electrically coupled to the air handler 102 via electrical connection 1506 and where the actuator 910 is configured to actuate the air handler float switch 160.

In some example embodiments, the containment apparatus 1730 may be omitted from the actuator apparatus 900, such that the one or more support structures 1760 may exclude the containment apparatus 1730. For example, in some example embodiments the actuator apparatus 900 may include a locking mechanism, a latch mechanism, or the like (e.g., a spring-loaded locking mechanism) configured to engage the air handler float switch 160 held in the conduit space 1792 at least partially defined by the conduit structure 1750 in order to hold the air handler float switch 160 in place in relation to the actuator 910, thereby reducing, minimizing, or preventing upwards movement of the air handler float switch 160 (e.g., at least upward movement of the shaft part and circuitry (e.g., switch circuitry) thereof) in response to the actuator 910 causing a float of the air handler float switch 160 to move upwards. In some example embodiments, the conduit structure 1750 may include a structure, including for example a ledge structure 1784 that is configured to structurally support a weight of the air handler float switch 160 resting on the structure at least partially in the conduit space 1792, where the actuator 910 is configured to apply an upwards force to the float of the air handler float switch 160 that does not transmit sufficient force to the remainder of the air handler float switch 160 to overcome the weight of the air handler float switch 160, such that the weight of the air handler float switch 160 keeps the air handler float switch in place in the actuator apparatus 900 despite the actuator 910 causing the float of the air handler float switch 160 to move in relation to the actuator apparatus 900.

As shown in FIGS. 17A-25B, the containment apparatus 1730 may include at least two outer shells 1732 that are configured to reversibly couple together (e.g., reversibly open and close) in order to enable reversibly enclosing and/or defining an inner conduit 1790 between opposing inner surfaces 1732is of the outer shells 1732 and in which at least an upper portion (e.g., upper shaft part 2502) of the air handler float switch 160 may be held by the containment apparatus 1730.

As shown, the outer shells 1732 may be coupled together via a hinge connection 1734 which includes a pin extending through hinge connection structures of the outer shells 1732, so that the outer shells 1732 may open and close in a clamshell manner, to thereby open and close the inner conduit 1790 in a clamshell manner. As shown, the outer shells 1732 may collectively define a cup structure having outer surfaces 1732os configured to engage in a friction fit with the inner surface 1750s of the conduit structure 1750 to hold the containment apparatus 1730 in place to resist upwards motion in response to the cup structure 1780 moving the float 2508 upwards.

As further shown, the cup structure formed by the closed outer shells 1732 may have an inner conduit 1790 that is defined by the respective, opposing inner surfaces 1732is of the outer shells. As shown, the containment apparatus 1730 is configured to enclose (e.g., at least horizontally and/or radially enclose) at least a portion of the air handler float switch 160 within the inner conduit 1790.

Still referring to FIGS. 17A-25B, the containment apparatus 1730 may include an adaptor sleeve structure 1736 configured to be held in place at least partially within the inner conduit 1790 when the two outer shells 1732 are coupled together (e.g., closed in a clamshell manner to define the inner conduit 1790 as a cylindrical conduit). The adaptor sleeve structure 1736 may be interchangeably referred to herein as an adaptor sleeve, an adaptor sleeve device, or the like. The adaptor sleeve structure 1736 may include a central shaft structure 2301 extending through the inner conduit 1790 and opposing upper and lower flange structures 2302 and 2304 configured to extend over respective upper and lower ends of the inner conduit 1790 to hold the adaptor sleeve structure 1736 in place in relation to the inner conduit 1790. As shown, the adaptor sleeve structure 1736 may have one or more inner surfaces 1736is that define an inner conduit 1740 configured to accommodate at least an upper portion (e.g., upper shaft part 2502) of the air handler float switch 160 and to engage said upper portion to hold the air handler float switch 160 in place in relation to the containment apparatus 1730. As a result, the adaptor sleeve structure 1736 may be understood to at last partially fill an annular space between the portion of the air handler float switch 160 (e.g., the upper shaft part 2502) and the inner surfaces 1736is defining the inner conduit 1790 to hold the air handler float switch 160 in place in relation to the inner conduit 1790.

The adaptor sleeve structure 1736 may comprise a flexible material, such as silicone, rubber, or the like and may be configured to grip outer surfaces of at least the portion of the air handler float switch 160 engaged by the adaptor sleeve structure 1736 to hold the air handler float switch 160 place. As further shown, the adaptor sleeve structure 1736 may define an upper conduit 1738 that is configured to enable one or more wires comprising the electrical connection 1506 to extend from the air handler float switch 160 (e.g., the circuitry 2510 thereof) out of the containment apparatus 1730 and further out to the actuator apparatus 900 to the air handler 102.

Referring to at least FIGS. 23A-24B, the adaptor sleeve structure 1736 may be a single piece of flexible material having a seam 2310 which may be opened to expose the interior of the conduits 1740 and 1738 to enable at least a portion of the air handler float switch 160 (e.g., upper shaft part 2502) to be inserted into the exposed conduit 1740 and to enable at least a portion of one or more wires at least partially comprising the electrical connection 1506 between the air handler float switch 160 and the air handler 102 to be inserted into at least the exposed conduit 1738 without requiring disconnection of the one or more wires from either the air handler float switch 160 or the air handler 102, and the flexible material comprising the adaptor sleeve structure 1736 may then be extended to enclose the portion of the air handler float switch 160 and the portion of the one or more wires to close the seam 2310 as shown in at least FIGS. 23A, 24A, and 25A-25B. Based on enabling the air handler float switch 160 to be inserted into at least the exposed conduit 1738 without requiring disconnection of the one or more wires from either the air handler float switch 160 or the air handler 102, installation and positioning of the air handler float switch 160 into the actuator apparatus 900 to configure the actuator apparatus 900 to actuate 980 the air handler float switch 160 may be simplified, and reliability of the electrical connection 1506 may be protected from interruption or damage due to such disconnection.

In some example embodiments, the portion of the air handler float switch 160 may be inserted into and/or removed from the conduit 1740 of the adaptor sleeve structure 1736 via the opening in the bottom flange 2304.

Still referring to FIGS. 17A-25B, the body housing 1702 (e.g., the bottom housing 1708 as shown) may define an opening 1710 into the interior of the actuator apparatus 900 through which an electrical connection 1504 (e.g., including one or more wires) between the actuator apparatus 900 (e.g., the actuator 910) and the drain cleaner apparatus 200 may extend to electrically couple at least the actuator 910 with the drain cleaner apparatus 200 and to configure the actuator 910 to be controlled by a controller 210 of the drain cleaner apparatus 200. As further shown, the lid 1704 may have a ridge 1720 defining a gap 1722 therethrough and the top housing 1728 may have a ridge 1724 defining a gap 1726 therethrough, where the ridges 1720 and 1724 are configured to align the gaps 1722 and 1726 to collectively define an opening 1718 when the lid 1704 is coupled to the body housing 27016 to cover the top housing 1728. The opening 1718 may enable communication between a space between the top housing 1728 and the lid 1704 and an exterior of the actuator apparatus 900 when the lid 1704 is closed, thereby enabling an electrical connection 1506 (e.g., including one or more wires) between the air handler float switch 160 held in position within the actuator apparatus 900 and the air handler 102 to extend from the air handler float switch 160, out of the containment apparatus 1730 via the upper conduit 1738, and further out of the actuator apparatus 900 via the opening 1718 to electrically couple at least the air handler float switch 160 with the air handler 102 (e.g., the controller 140 thereof) even when the lid 1704 is closed and to configure the air handler float switch 160 to transmit a float switch signal to the air handler 102 to cause the air handler 102 to shut off in response to the air handler float switch 160 being actuated by the actuator 910 of the actuator apparatus 900.

Referring now to FIGS. 23A-24B, the adaptor sleeve structure 1736 may have different shapes to accommodate different types, shapes, etc. of air handler float switches 160 therein. For example, as shown in FIGS. 23A-23B, the adaptor sleeve structure 1736 may include a lower flange structure 2304 with a cutout 2308 configured to accommodate larger-diameter portions of an air handler float switch 160 below the upper shaft part 2502 and with an upper flange structure 2302 having a partial cutout 2306 which may improve routing of one or more wires of the electrical connection 1506 out of the upper conduit 1738 and thus out of the containment apparatus 1730. Additionally, the inner surfaces 1736is of the adaptor sleeve structure 1736 may define an at least partially conical inner conduit 1740 to accommodate a particularly-shaped upper shaft part 2502 of the air handler float switch 160. In another example, as shown in FIGS. 24A-24B, the adaptor sleeve structure 1736 may have upper and lower flange structures 2302 and 2304 and an inner surface 1736is that collectively define a cylindrical inner conduit 1740 extending entirely between the top and bottom ends of the adaptor sleeve structure 1736 to thereby accommodate a differently-shaped air handler float switch 160 than the adaptor sleeve structure 1736 shown in at least FIGS. 23A-23B.

Referring back to FIG. 15A, while FIG. 15A illustrates a system 2000 which includes the drain cleaner apparatus 200, the actuator apparatus 900 and the float switch apparatus 800, it will be understood that example embodiments are not limited thereto. For example, in some example embodiments the float switch apparatus 800 may be omitted from the system 2000, and/or the drain cleaner apparatus 200 (e.g., the controller 210 thereof) may be configured to transmit the actuator command signal to the actuator apparatus, via electrical connection 1504, in response to receiving an actuator command via a user interface (e.g., 1182) of the drain cleaner apparatus 200, a network communication link to a remote computing device via a network communication interface 224 of the drain cleaner apparatus 200, or the like.

Figure 26A:
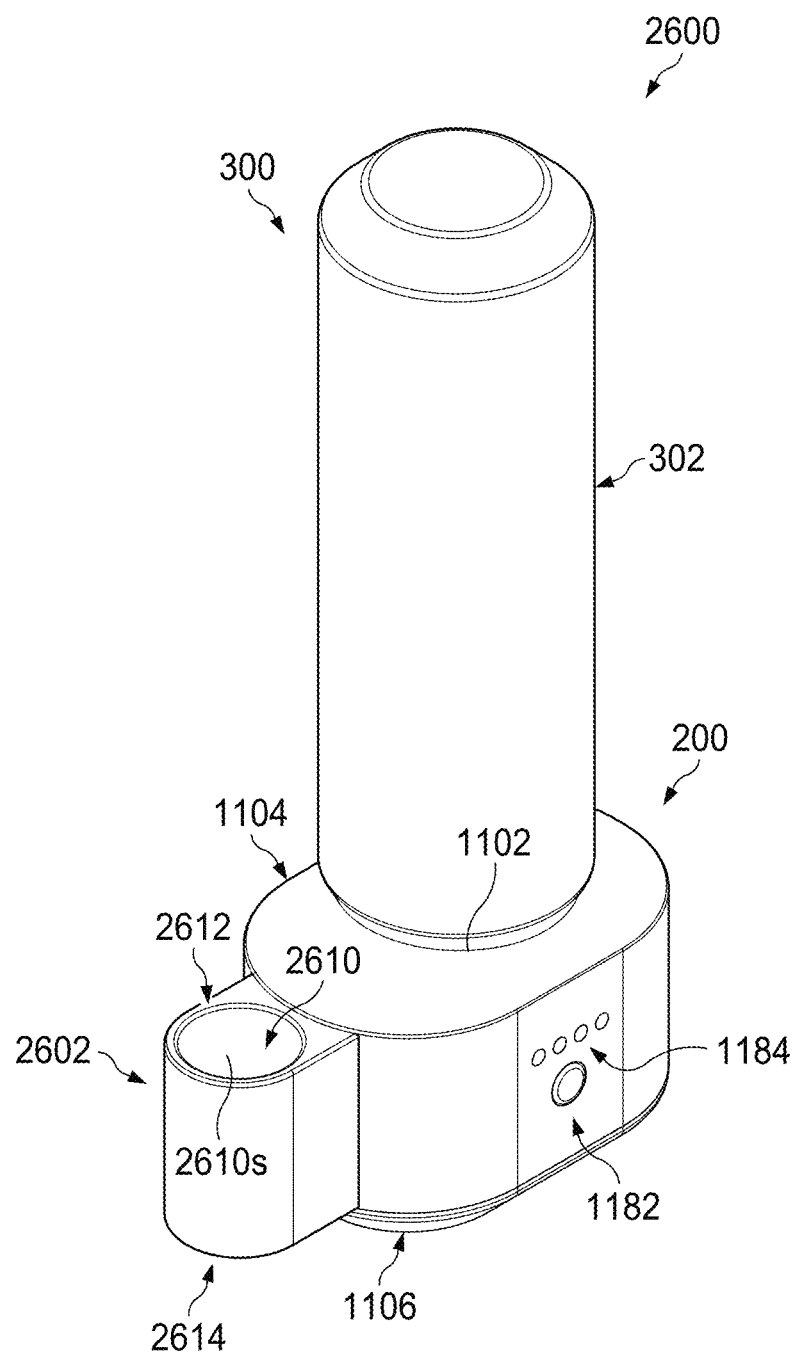
FIG. 26A is a perspective top-front-left view of a drain cleaner apparatus system according to some example embodiments.
Figure 26B:
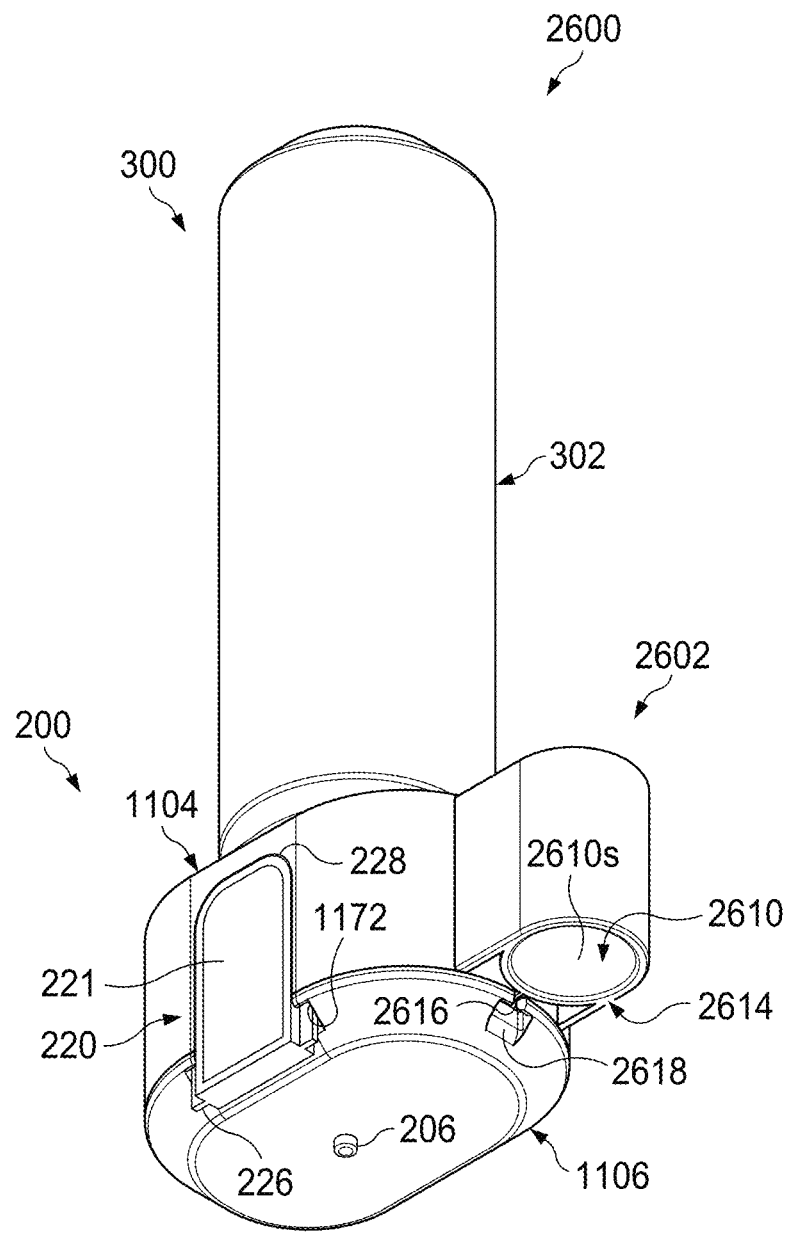
FIG. 26B is a perspective bottom-rear-left view of the drain cleaner apparatus system of FIG. 26A according to some example embodiments.
Figure 26C:
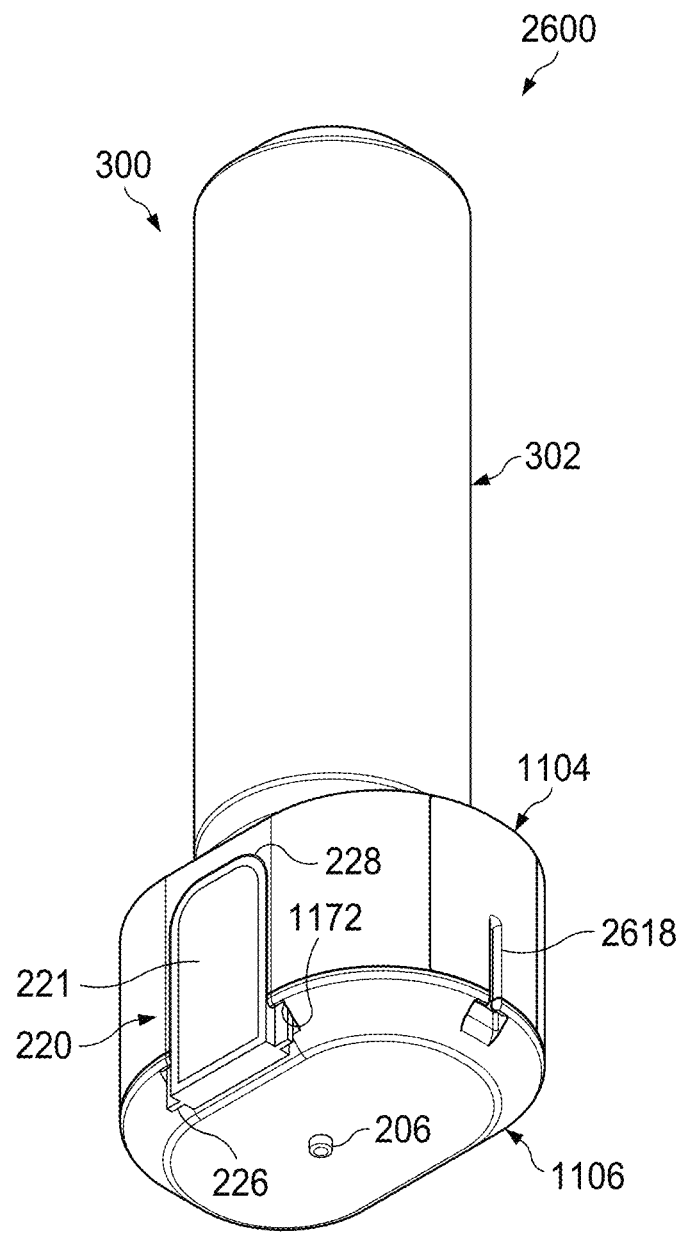
FIG. 26C is a perspective bottom-rear-left view of the drain cleaner apparatus system of FIG. 26A according to some example embodiments.
Figure 26D:
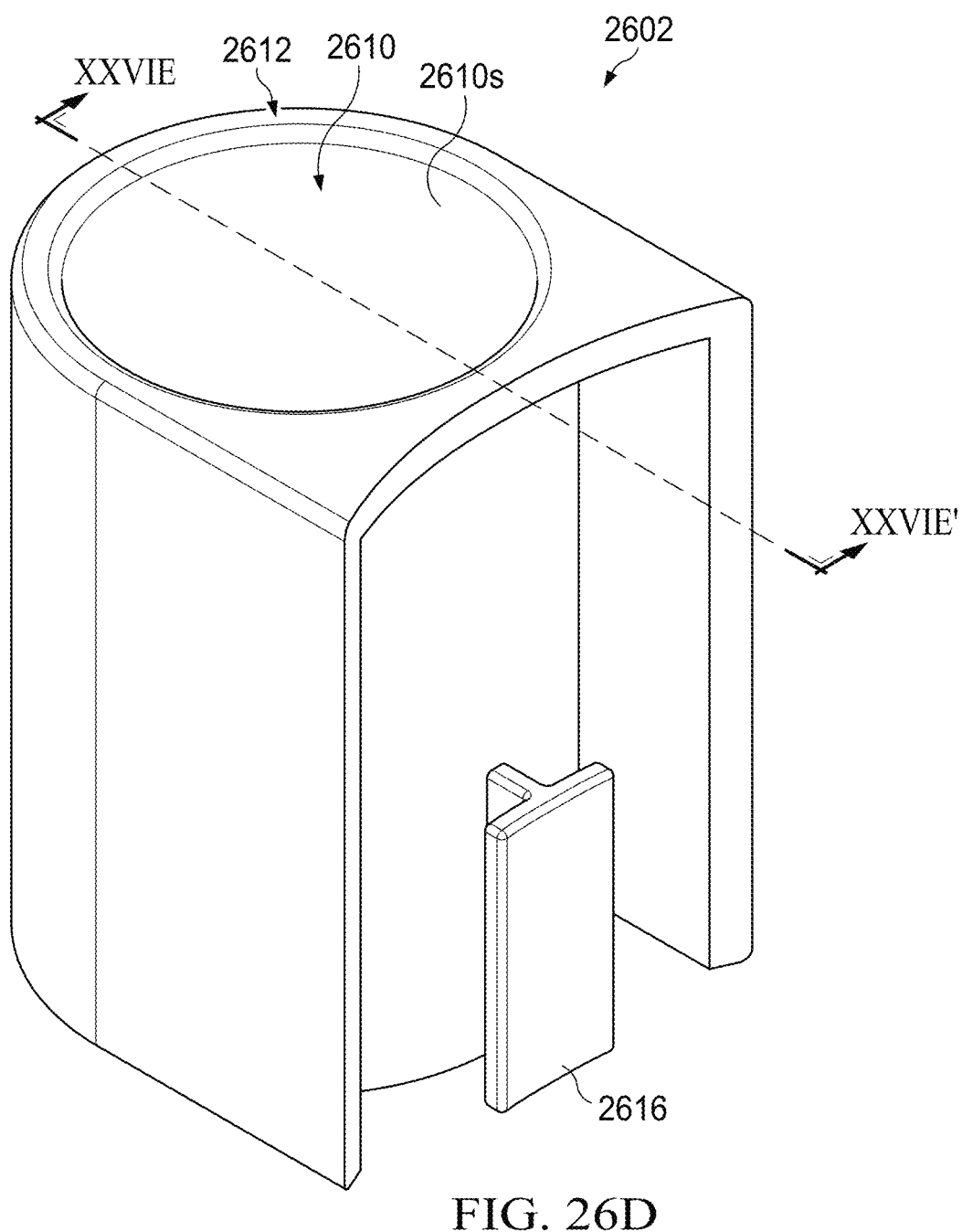
FIG. 26D is a perspective view of an actuator holster according to some example embodiments.
Figure 26E:
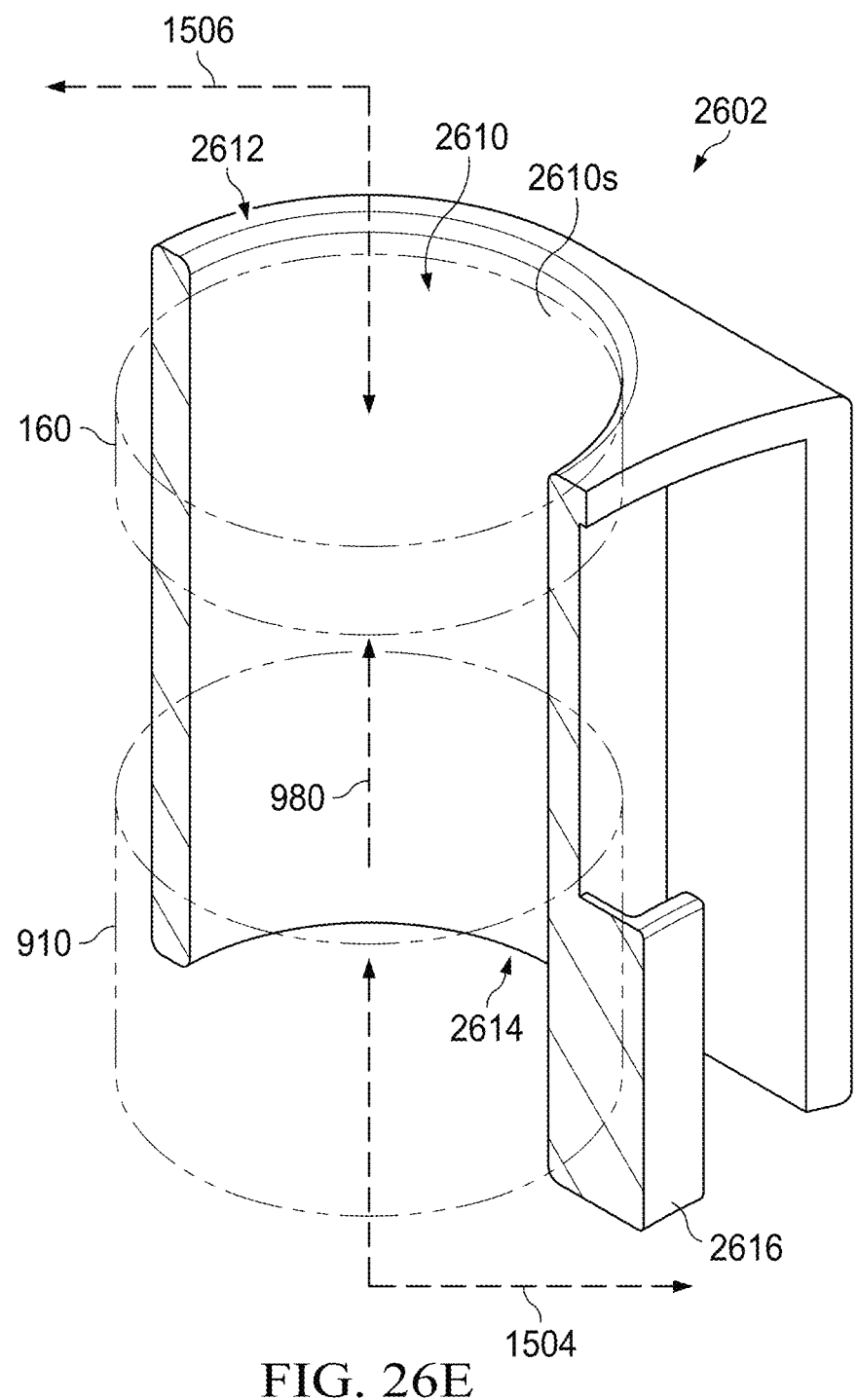
FIG. 26E is a perspective cross-sectional view of the actuator holster along cross-sectional view line XXVIE-XXVIE' in FIG. 26D according to some example embodiments.

FIG. 26A is a perspective top-front-left view of a drain cleaner apparatus system 2600 according to some example embodiments. FIG. 26B is a perspective bottom-rear-left view of the drain cleaner apparatus system 2600 of FIG. 26A according to some example embodiments. FIG. 26C is a perspective bottom-rear-left view of the drain cleaner apparatus system 2600 of FIG. 26A according to some example embodiments. FIG. 26D is a perspective view of an actuator holster structure 2602 according to some example embodiments. FIG. 26E is a perspective cross-sectional view of the actuator holster along cross-sectional view line XXVIE-XXVIE' in FIG. 26D according to some example embodiments.

It will be understood that the drain cleaner apparatus 200, cartridge 300, structure connector 220, and the like shown in FIGS. 26A-26C may include any of the elements of any of the example embodiments of the drain cleaner apparatus 200, cartridge 300, structure connector 220, and the like shown in any of the drawings and/or described herein.

Referring to FIGS. 26A-26E, in some example embodiments, at least a portion of the actuator apparatus 900, for example at least the actuator 910, may be accommodated in an actuator holster structure 2602 which can be physically coupled to the drain cleaner apparatus 200 (e.g., engaged with at least a portion of the housing 201 of the drain cleaner apparatus 200), where the actuator holster structure 2602 may further accommodate an air handler float switch in a position to be engaged and actuated by at les the actuator 910 further held in the actuator holster structure 2602. As a result, the actuator 910 may be configured to actuate 980 an air handler float switch 160, so that the air handler float switch 160 transmits a signal via electrical connection 1506 to cause the air handler 102 to shut down, based on a signal received at the actuator 910 via an electrical connection 1504 with the drain cleaner apparatus 200.

As shown the actuator holster structure 2602 may include a structure having an inner surface 2610s defining a cylindrical conduit 2610 extending between opposite upper and lower ends 2612 and 2614. One or both of the upper end 2612 or the lower end 2614 may be an opening exposing the cylindrical conduit 2610 to an exterior of the actuator holster structure 2602 or a closed end of the cylindrical conduit 2610. As shown, at least a portion of the actuator 910 may be accommodated in a lower portion of the cylindrical conduit 2610, and at least a portion of the air handler float switch 160 may be held in place in the upper portion of the cylindrical conduit 2610 so that the actuator holster structure 2602 holds the air handler float switch 160 in place in relation to the actuator 910, to enable the actuator 910 to actuate 980 the air handler float switch 160.

As further shown, the actuator holster structure 2602 may include a connector structure 2616 that is configured to engage a complementary connector structure 2618 of the drain cleaner apparatus 200. The connector structure 2616 may include a male connector structure (e.g., a male flange structure, tab, etc.) and the complementary connector structure 2618 may include a female connector structure (e.g., a female flange structure, slot, etc.) configured to slidably engage with the connector structure 2616 to couple the actuator holster structure 2602 with the drain cleaner apparatus 200. For example, the connector structures 2616 and 2618 may be configured to establish a friction fit between the drain cleaner apparatus 200 and the actuator holster structure 2602 to hold at least the actuator 910 and the air handler float switch 160 in place in relation to the drain cleaner apparatus 200. As shown, the actuator holster structure 2602, including the connector structure 2616 and the various structures defining the inner surface 2610s and the upper and lower ends 2612 and 2614 may be separate parts of a single piece of material (e.g., plastic material). As further shown, the complementary connector structure 2618 may be partially or entirely defined by one or more parts of the housing 201 of the drain cleaner apparatus 200, such as being defined by separate parts of the base housing 1106 and the side housing 1104.

Figure 27:
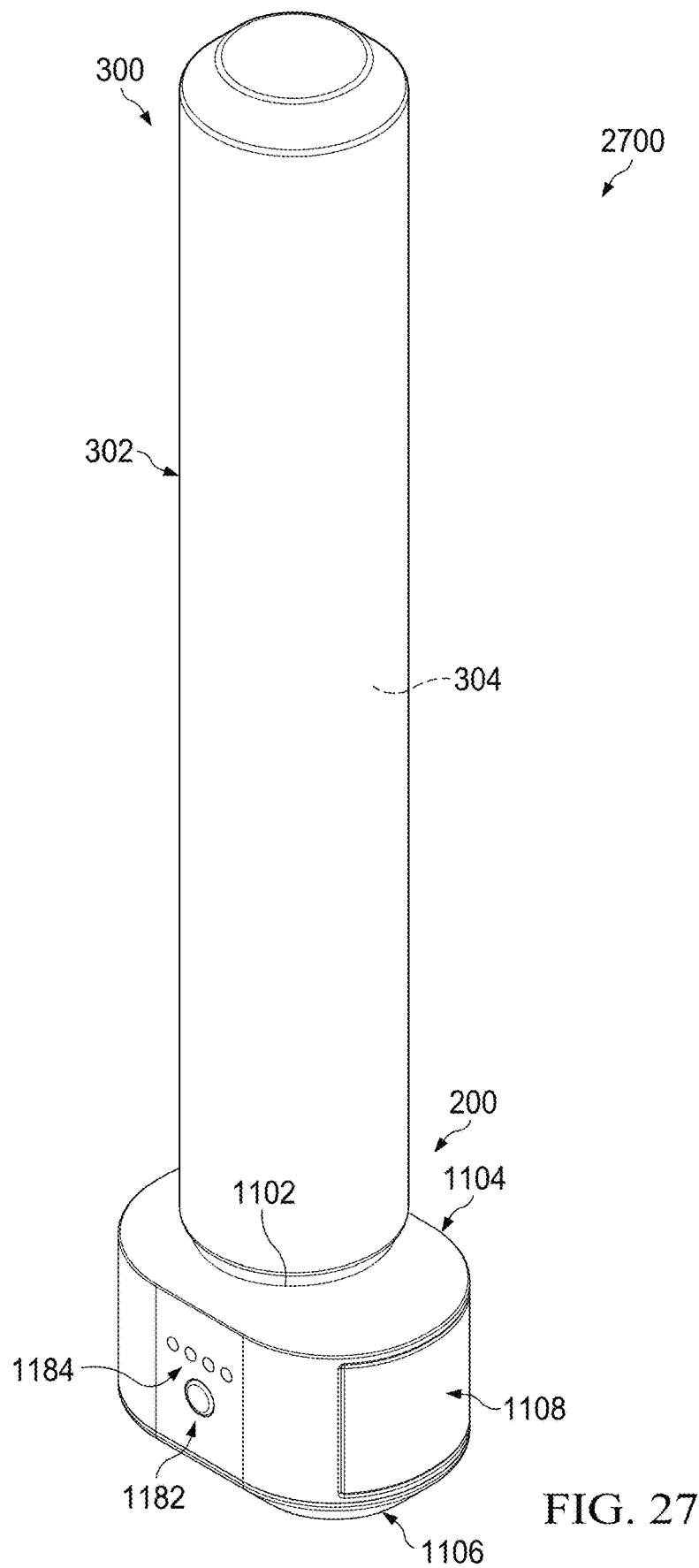
FIG. 27 is a perspective top-front-right view of a drain cleaner apparatus system according to some example embodiments.

FIG. 27 is a perspective top-front-right view of a drain cleaner apparatus system 2700 according to some example embodiments. It will be understood that the drain cleaner apparatus 200 shown in FIG. 27 may include any of the elements of any of the example embodiments of the drain cleaner apparatus shown in any of the drawings and/or described herein. It will be understood that the cartridge 300 shown in FIG. 27 may include any of the elements of any of the example embodiments of the cartridge shown in any of the drawings and/or described herein.

Referring to FIG. 27, in some example embodiments, the drain cleaner apparatus 200 may be configured to couple with cartridges 300 having various different cartridge reservoir 304 volumes. For example, while the cartridge 300 shown in at least FIGS. 11A-11E and 13A-13D includes a cartridge reservoir 304 having a first particular volume (e.g., 36 oz), the cartridge 300 shown in FIG. 127 may have a different, second particular volume (e.g., 72 oz), and the drain cleaner apparatus 200 may be configured to couple (e.g., detachably couple) with either of the cartridges 300 having a first or second volume. As described herein, the controller 210 of the drain cleaner apparatus 200 may be configured to adjust a particular counter value for continuing the dispenser device 204 actuations associated with depletion of the cartridge reservoir 304 to accommodate the drain cleaner apparatus 200 being coupled to different-volume cartridges 300, such that the drain cleaner apparatus 200 may be configured to interchangeably couple with various cartridges 300 having different cartridge reservoir 304 volumes.

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

What is claimed:

1. A system for dispensing a cleaning composition into a condensate drain line of an air handler of an air conditioning system, the system comprising:
   a first apparatus configured to dispense the cleaning composition, the first apparatus including
   an apparatus outlet in fluid communication with an exterior of the first apparatus,
   a pump configured to operate to selectively dispense an amount of the cleaning composition through the apparatus outlet,
   a power supply configured to supply power supply electrical power, the power supply including a battery and a wired power connection, and
   a controller configured to operate the pump based on the power supply electrical power from the power supply to cause the amount of the cleaning composition to be dispensed through the apparatus outlet; and
   a dispenser conduit having a first end and a second end that is opposite to the first end, the dispenser conduit coupled at the first end to the apparatus outlet and in fluid communication at the second end with the condensate drain line, such that the apparatus outlet of the first apparatus is in fluid communication with an interior of the condensate drain line through at least the dispenser conduit,
   wherein the wired power connection is electrically coupled to the air handler and is configured to receive air handler electrical power from the air handler.

2. The system of claim 1, wherein the power supply includes a charging circuit, the charging circuit configured to recharge the battery from the wired power connection based on the air handler electrical power received from the air handler at the wired power connection.

3. The system of claim 1, wherein the power supply is configured to enable the battery to supply the power supply electrical power, such that the controller operates the pump based on the power supply electrical power supplied from the battery, based on an absence of the air handler electrical power being received from the air handler at the wired power connection.

4. The system of claim 1, wherein
   the dispenser conduit is a flexible tube that is configured to enable the first apparatus to be adjustably positioned in relation to the condensate drain line,
   the system further includes a second apparatus coupled to the condensate drain line, the second apparatus including a rigid cylindrical structure extending at least into an opening of the condensate drain line, and
   the flexible tube has a first flexible tube end and an opposite second flexible tube end, the first flexible tube end coupled to the apparatus outlet of the first apparatus, the opposite second flexible tube end coupled to the second apparatus, such that
   the opposite second flexible tube end is in fluid communication with the interior of the condensate drain line through the second apparatus, and
   the apparatus outlet of the first apparatus is in fluid communication with the condensate drain line through at least the flexible tube and the rigid cylindrical structure.

5. The system of claim 1, further comprising:
   a container that is external to a housing of the first apparatus, the housing at least partially enclosing the controller and the pump, the container having a reservoir configured to hold the cleaning composition,
   wherein a port that is exposed at an outer surface of the housing of the first apparatus is coupled to the container that is external to the housing of the first apparatus such that the reservoir of the container is in fluid communication with the pump.

6. A method, comprising:
providing a first apparatus configured to dispense a cleaning composition, the first apparatus including
an apparatus outlet in fluid communication with an exterior of the first apparatus,
a pump configured to operate to selectively dispense an amount of the cleaning composition through the apparatus outlet,
a power supply configured to supply power supply electrical power, the power supply including a battery and a wired power connection, and
a controller configured to operate the pump based on the power supply electrical power from the power supply to cause the amount of the cleaning composition to be dispensed through the apparatus outlet;
coupling a first end of a dispenser conduit to the apparatus outlet and positioning a second end of the dispenser conduit in fluid communication with a condensate drain line of an air conditioning system, such that the apparatus outlet of the first apparatus is in fluid communication with an interior of the condensate drain line through at least the dispenser conduit; and
electrically coupling the wired power connection of the first apparatus to an air handler of the air conditioning system, the wired power connection configured to receive air handler electrical power from the air handler.

7. The method of claim 6, wherein the power supply includes a charging circuit, and the method further includes the charging circuit recharging the battery from the wired power connection based on the air handler electrical power received from the air handler at the wired power connection.

8. The method of claim 6, further comprising supplying the power supply electrical power from the battery such that the controller operates the pump based on the power supply electrical power supplied from the battery based on an absence of the air handler electrical power being received from the air handler at the wired power connection.

9. The method of claim 6, wherein
the dispenser conduit is a flexible tube that is configured to enable the first apparatus to be adjustably positioned in relation to the condensate drain line, the flexible tube having a first flexible tube end and an opposite second flexible tube end, and
the method further includes
coupling a second apparatus with the condensate drain line, the second apparatus including a rigid cylindrical structure, the coupling the second apparatus with the condensate drain line including causing the rigid cylindrical structure to extend at least into an opening of the condensate drain line, and
coupling the first flexible tube end to the apparatus outlet of the first apparatus and coupling the opposite second flexible tube end to the second apparatus, such that
the opposite second flexible tube end is in fluid communication with the interior of the condensate drain line through the second apparatus, and
the apparatus outlet of the first apparatus is in fluid communication with the condensate drain line through at least the flexible tube and the rigid cylindrical structure.

10. The method of claim 6, further comprising:
coupling a port that is exposed at an outer surface of a housing of the first apparatus to a container that is external to the housing of the first apparatus and has a reservoir configured to hold the cleaning composition, such that the reservoir of the container is in fluid communication with the pump, the housing at least partially enclosing the controller and the pump.

11. A system for dispensing a cleaning composition into a condensate drain line of an air handler of an air conditioning system, the system comprising:
a first apparatus configured to dispense the cleaning composition, the first apparatus including
an apparatus outlet in fluid communication with an exterior of the first apparatus,
a pump configured to operate to selectively dispense an amount of the cleaning composition through the apparatus outlet, and
a controller configured to operate the pump to cause the amount of the cleaning composition to be dispensed through the apparatus outlet;
a dispenser conduit having a first end and a second end, the dispenser conduit coupled at the first end to the apparatus outlet of the first apparatus, wherein the dispenser conduit is a flexible tube that is configured to enable the first apparatus to be adjustably positioned in relation to an opening of the condensate drain line; and
a second apparatus coupled with the condensate drain line, the second apparatus including a rigid cylindrical structure extending at least into the opening of the condensate drain line, the second apparatus coupled with the second end of the dispenser conduit to establish fluid communication between the second end of the dispenser conduit and an interior of the condensate drain line through the second apparatus, such that the apparatus outlet of the first apparatus is in fluid communication with the condensate drain line through at least the flexible tube and the rigid cylindrical structure,
wherein the flexible tube has a first flexible tube end and an opposite second flexible tube end, the first flexible tube end coupled to the apparatus outlet of the first apparatus, the opposite second flexible tube end coupled to the second apparatus, such that
the opposite second flexible tube end is in fluid communication with the interior of the condensate drain line through the second apparatus, and
the apparatus outlet of the first apparatus is in fluid communication with the condensate drain line through at least the flexible tube and the rigid cylindrical structure.

12. The system of claim 11, further comprising:
a container that is external to a housing of the first apparatus, the housing at least partially enclosing the controller and the pump, the container having a reservoir configured to hold the cleaning composition,
wherein a port that is exposed at an outer surface of the housing of the first apparatus is coupled with the container that is external to the housing of the first apparatus such that the reservoir of the container is in fluid communication with the pump.

13. A method, comprising:
providing a first apparatus configured to dispense a cleaning composition, the first apparatus including
an apparatus outlet in fluid communication with an exterior of the first apparatus,
a pump configured to operate to selectively dispense an amount of the cleaning composition through the apparatus outlet, and a controller configured to operate the pump to cause the amount of the cleaning composition to be dispensed through the apparatus outlet;

coupling a second apparatus with a condensate drain line of an air handler of an air conditioning system, the second apparatus including a rigid cylindrical structure, the coupling the second apparatus with the condensate drain line including causing the rigid cylindrical structure to extend at least into an opening of the condensate drain line; and coupling a first flexible tube end of a flexible tube to the apparatus outlet of the first apparatus and coupling an opposite second flexible tube end of the flexible tube to the second apparatus, such that the opposite second flexible tube end of the flexible tube is in fluid communication with an interior of the condensate drain line through the second apparatus, and the apparatus outlet of the first apparatus is in fluid communication with the condensate drain line through at least the flexible tube and the rigid cylindrical structure.

14. The method of claim 13, further comprising:

coupling a port that is exposed at an outer surface of a housing of the first apparatus with a container that is external to the housing of the first apparatus and has a reservoir configured to hold the cleaning composition, such that the reservoir of the container is in fluid communication with the pump, the housing at least partially enclosing the controller and the pump.

* * * * *